United States Patent [19]

Lindberg

[11] 4,409,931
[45] Oct. 18, 1983

[54] COMBUSTION AND POLLUTION CONTROL SYSTEM

[75] Inventor: John E. Lindberg, Lafayette, Calif.

[73] Assignee: Owen, Wickersham & Erickson, San Francisco, Calif.

[21] Appl. No.: 190,933

[22] Filed: Sep. 25, 1980

Related U.S. Application Data

[63] Continuation of Ser. No. 657,747, Feb. 13, 1976, abandoned, which is a continuation-in-part of Ser. No. 613,867, Sep. 16, 1975, abandoned, which is a continuation-in-part of Ser. No. 356,589, May 3, 1973, abandoned, which is a continuation-in-part of Ser. No. 227,440, Feb. 18, 1972, abandoned.

[51] Int. Cl.³ .................. F02B 19/00; F02B 47/00; F02B 43/08; F02B 51/00
[52] U.S. Cl. .................... 123/25 R; 123/3; 123/DIG. 12; 123/25 M; 123/25 J; 123/25 K; 123/25 L; 123/25 P; 123/25 E; 123/25 F; 123/536
[58] Field of Search ............... 123/25 R, 25 M, 25 N, 123/25 P, 25 Q, 25 A, 25 H, 25 J, 25 K, 25 L, 25 B, 25 C, 25 D, 25 E, 3, 536, 537, 538, DIG. 12

[56] References Cited

U.S. PATENT DOCUMENTS

| | | | |
|---|---|---|---|
| 1,279,233 | 7/1918 | Bellion | 123/25 M |
| 1,552,158 | 9/1925 | Holloway | 123/25 M |
| 1,966,345 | 7/1937 | Harrell | 123/DIG. 12 |
| 3,631,843 | 1/1972 | Yeiser | 123/25 M |
| 3,653,364 | 4/1972 | Bogan | 123/3 |

*Primary Examiner*—Wendell E. Burns
*Attorney, Agent, or Firm*—Owen, Wickersham & Erickson

[57] ABSTRACT

A controlled amount of a fluid (steam or water or a solution of water plus additives) is injected into an internal combustion engine to improve combustion, efficiency, and to reduce emissions. The amount of the fluid injected is controlled in response to engine need. The steam is generated by the heat produced by the engine. Combustion gas temperature is used to control the amount of steam produced by varying the fluid flow through one or more fixed or variable orifice control valves. The steam is injected in a piston engine to cool peak temperatures, to prevent detonation and pre-ignition, to smooth out hot spots, to prevent auto-ignition or dieseling, and to use the vapor energy in the expansion cycle to increase low speed torque and acceleration. The steam is used to cause full retard of the vacuum spark advance during acceleration at full load from low speed, and a large amount of steam is injected at this point in the cycle to prevent pre-ignition and detonation. Ultrasonic energy is added to the injected steam to produce better mixing and distribution. Hydrogen is also injected to permit better combustion with higher amounts of air. The hydrogen is produced by the interaction of a catalyst on the steam and fuel hydrocarbons and ultrasonic energy. At times exhaust gas and other additives, such as hydrogen peroxide, methyl alcohol and ammonia are injected.

63 Claims, 131 Drawing Figures

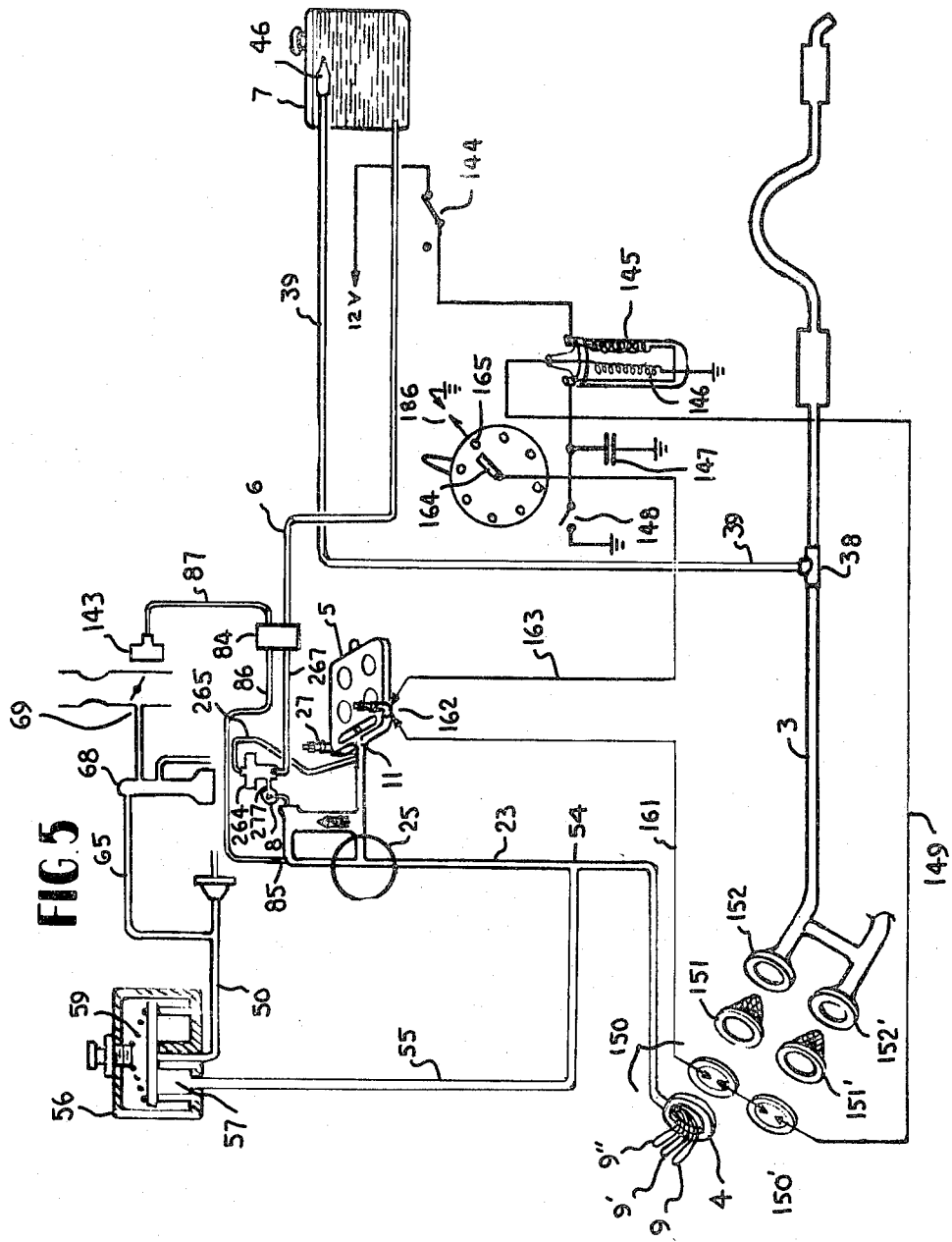

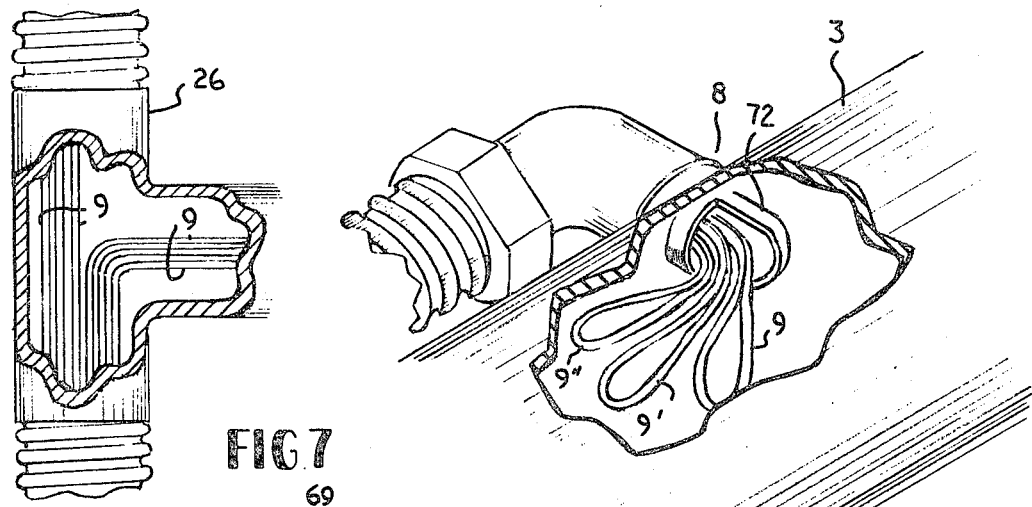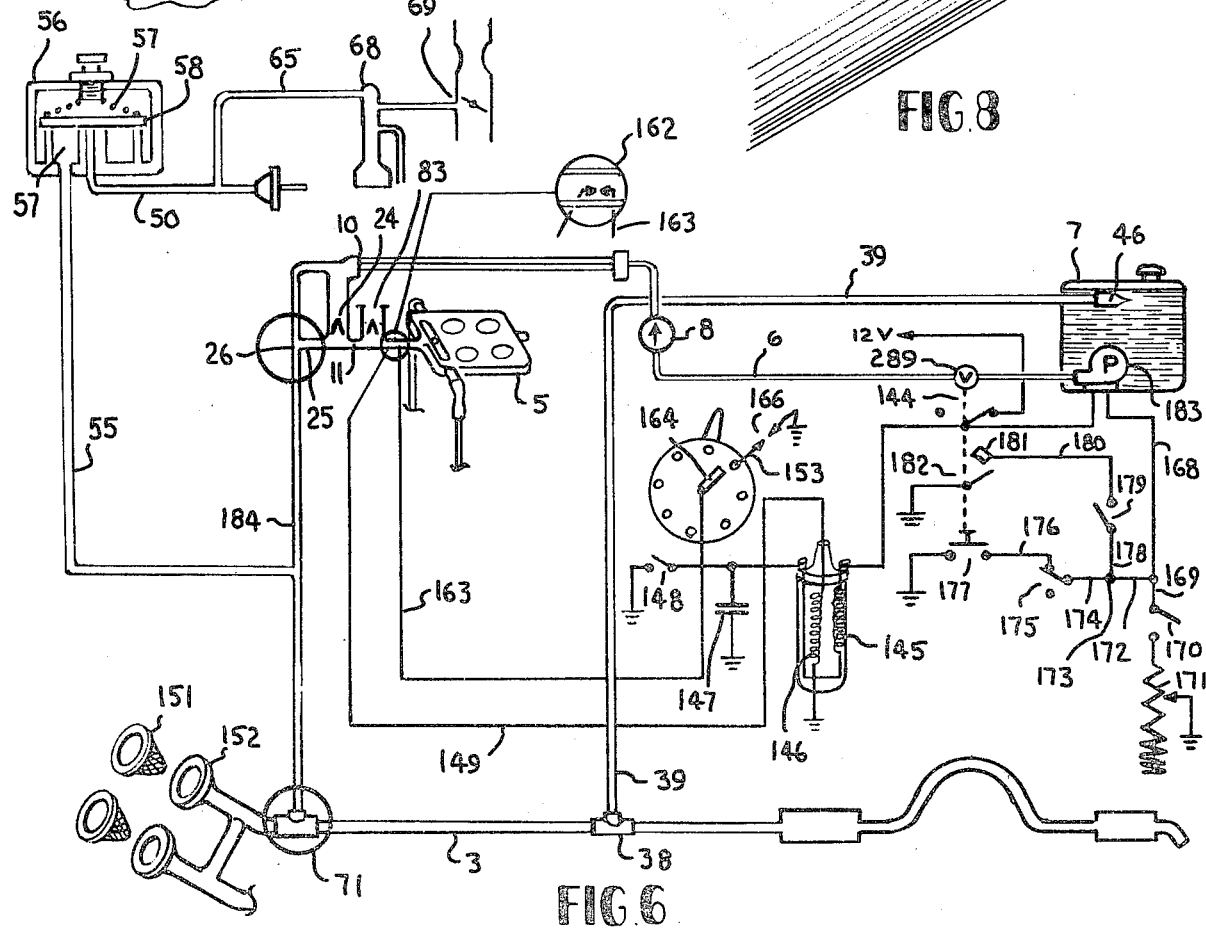

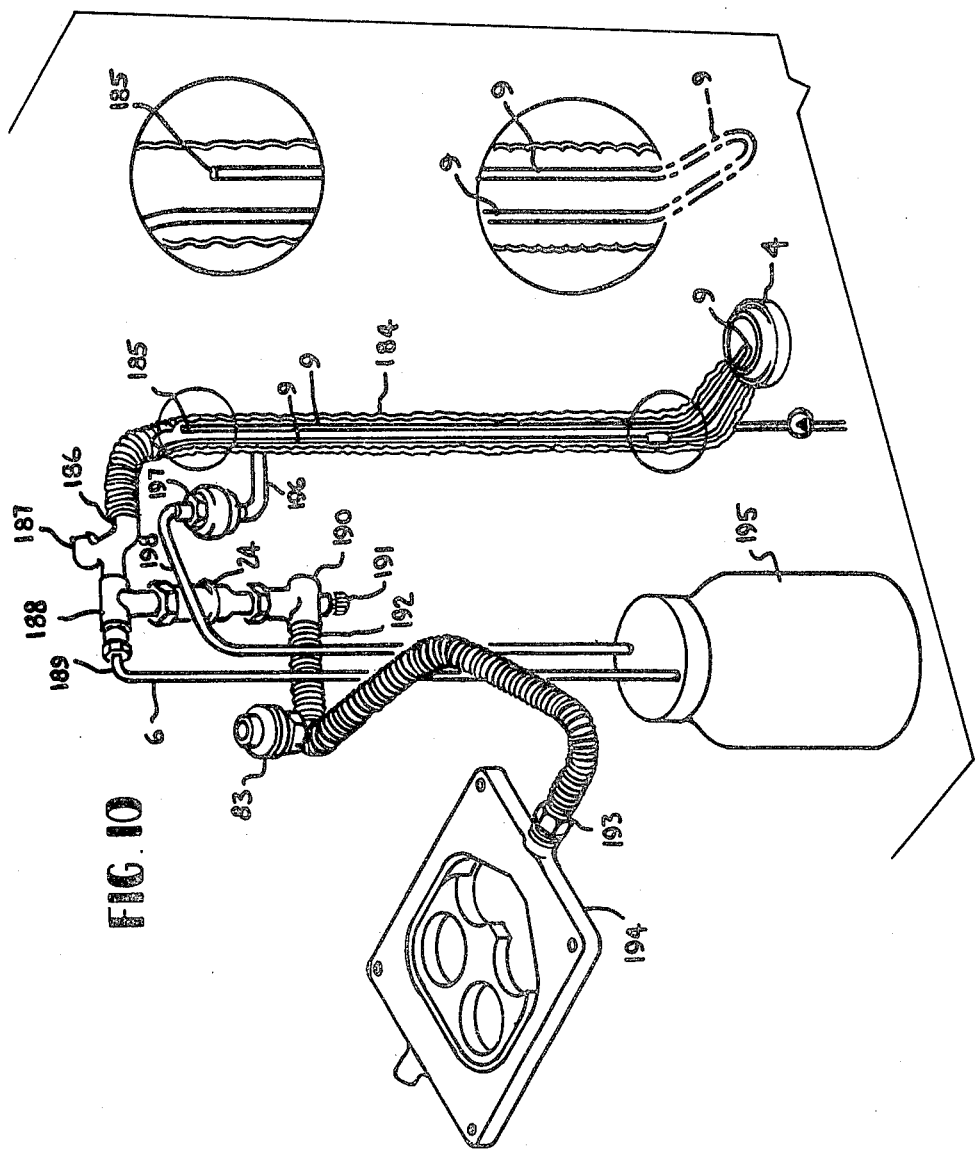

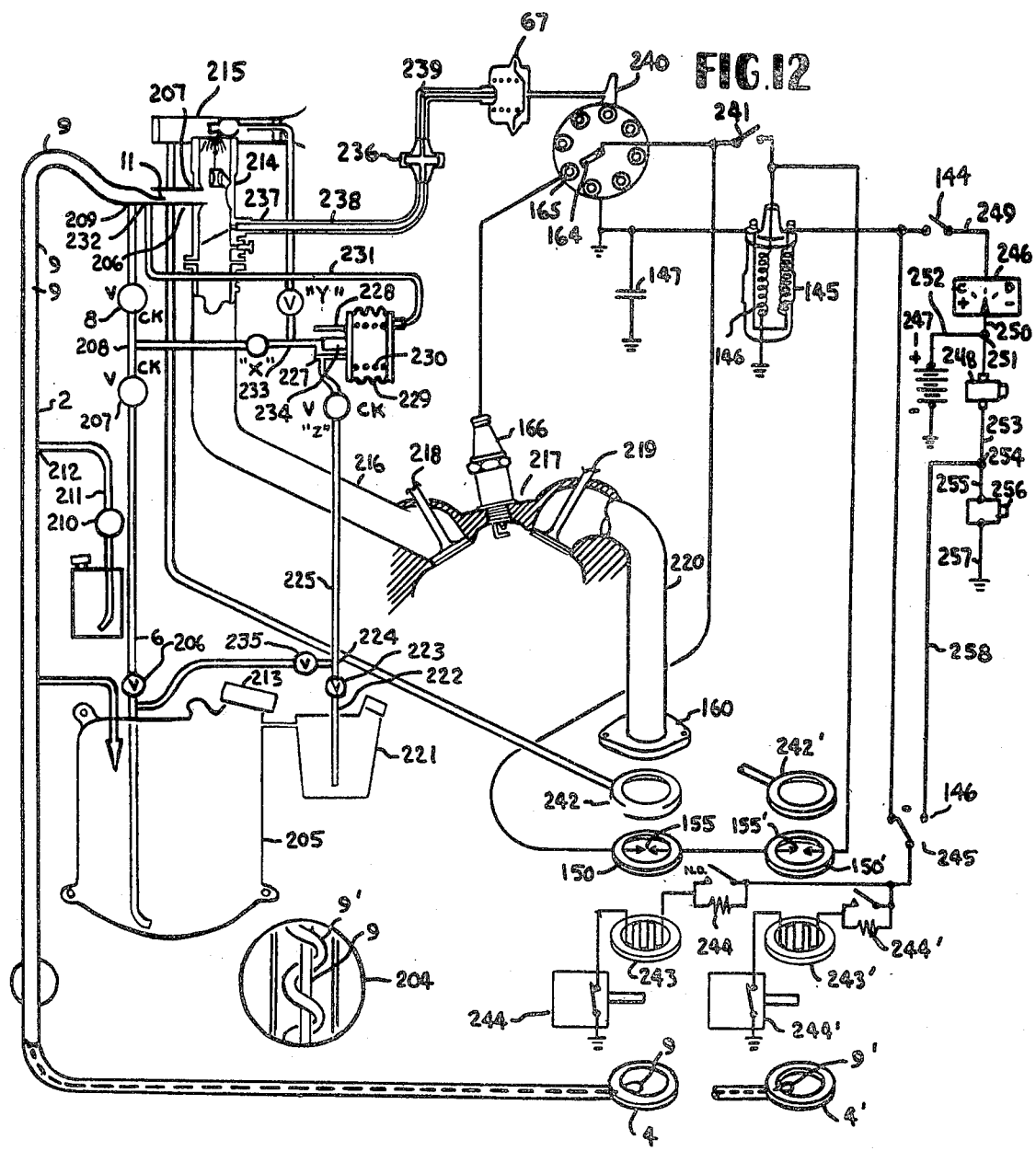
FIG.12

PRESSURE-TIME RELATIONSHIPS FOR COMBUSTION

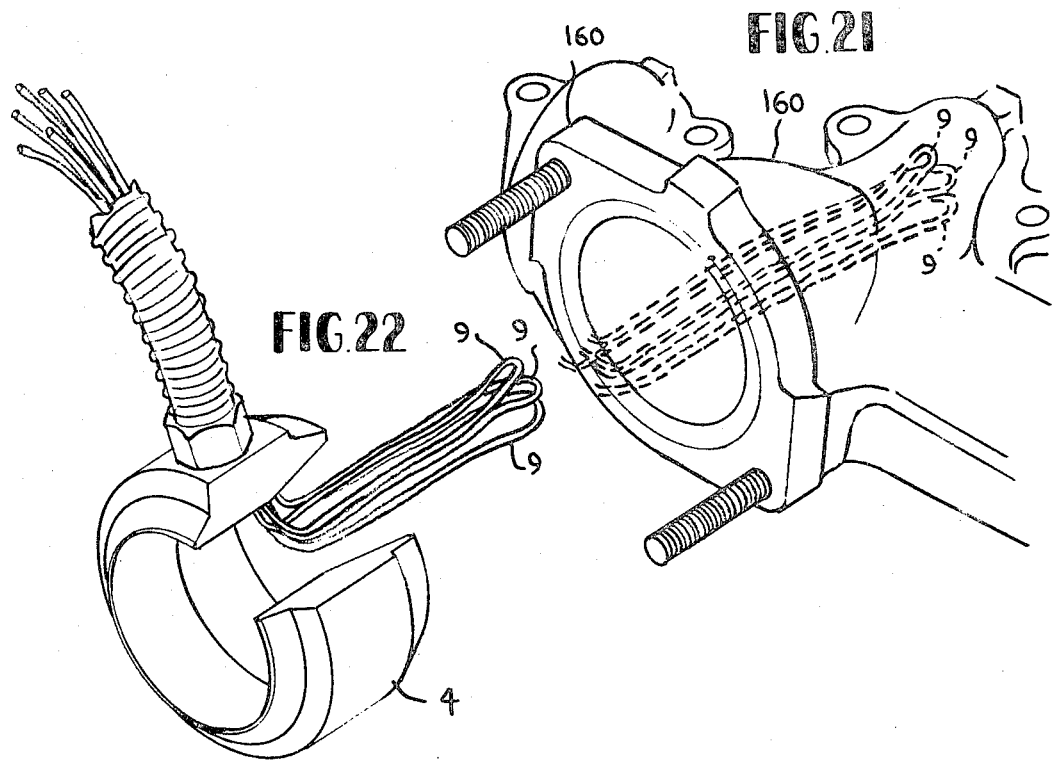
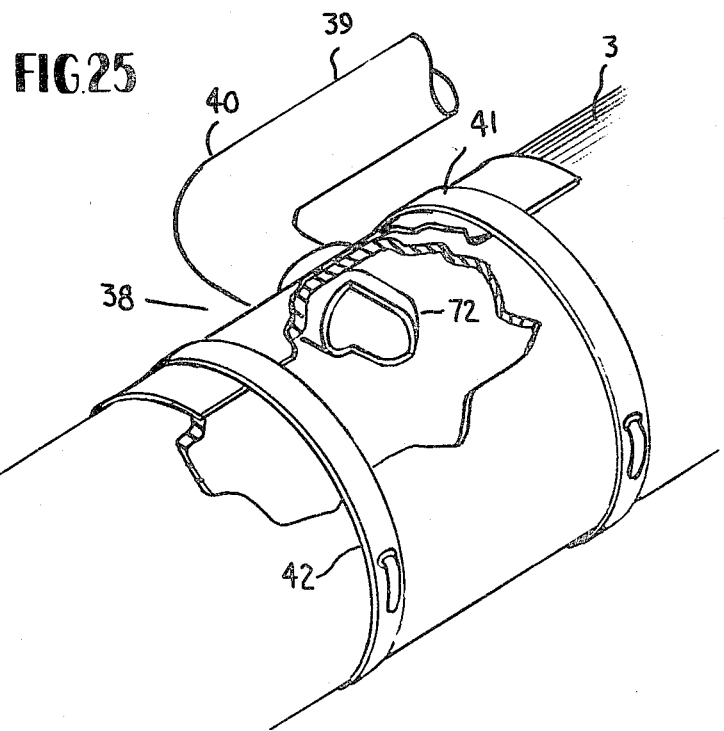

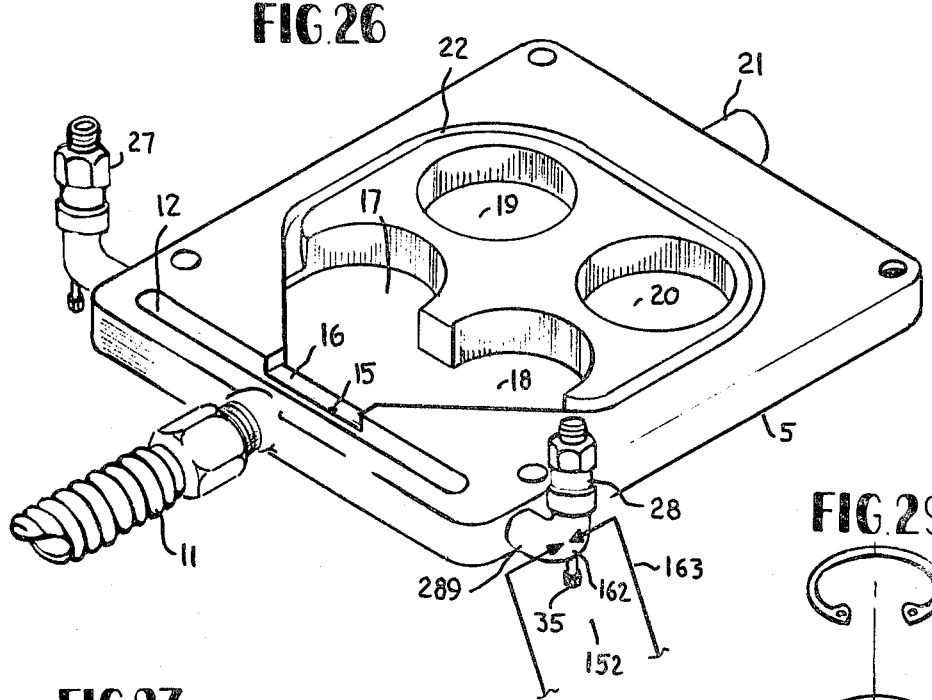
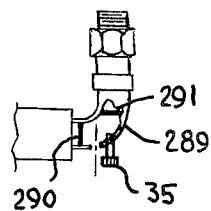
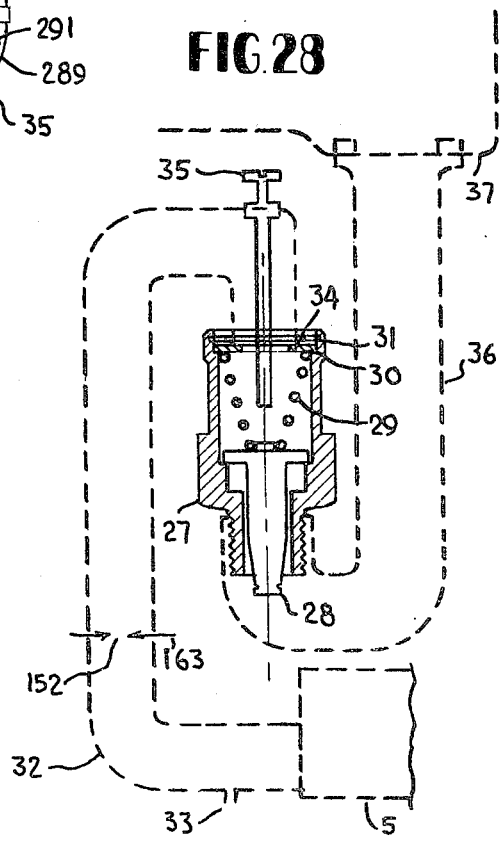
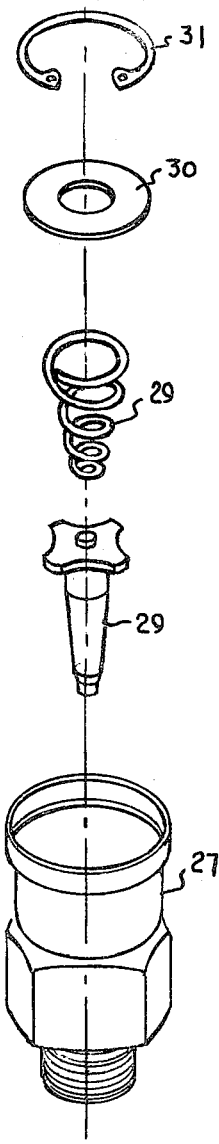

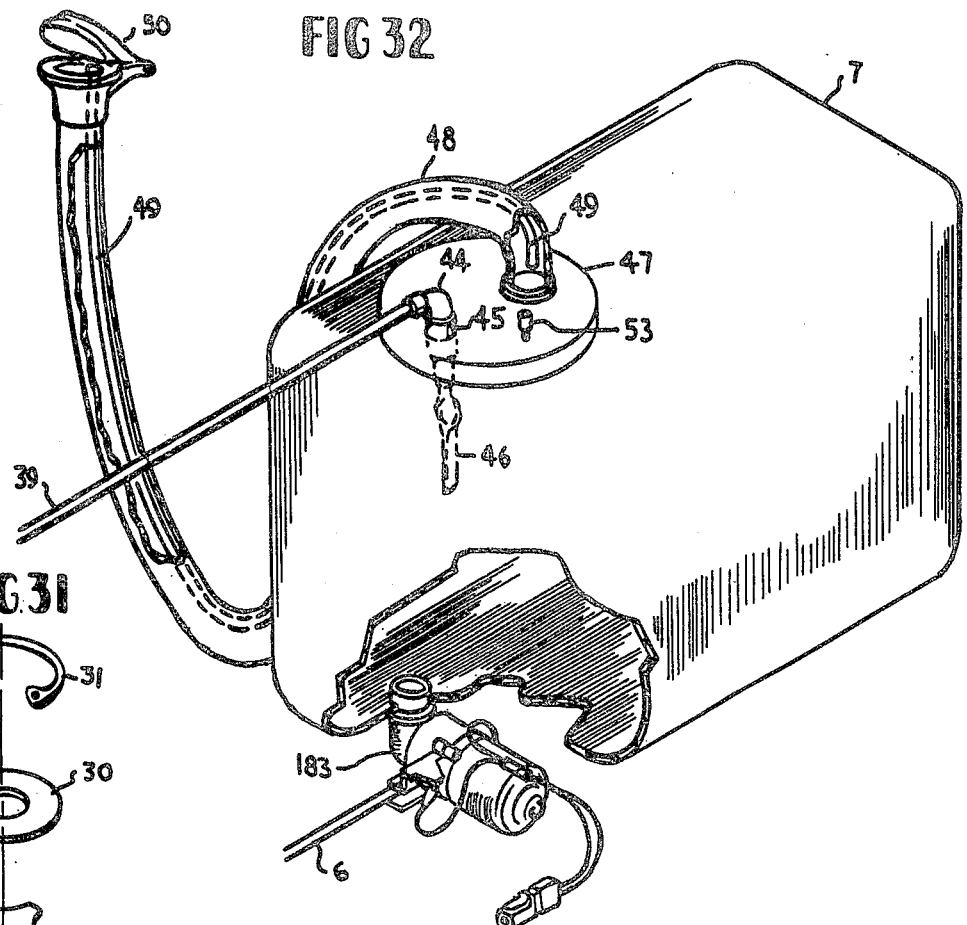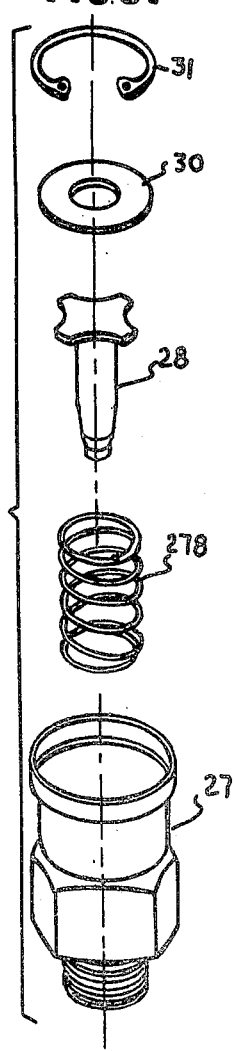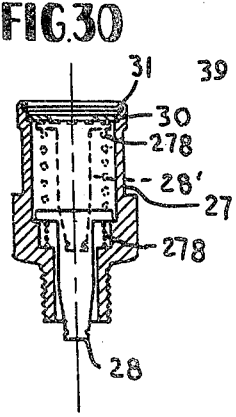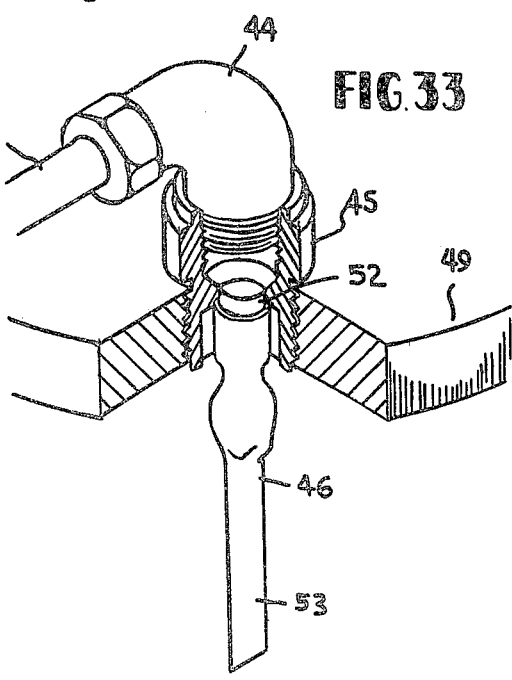

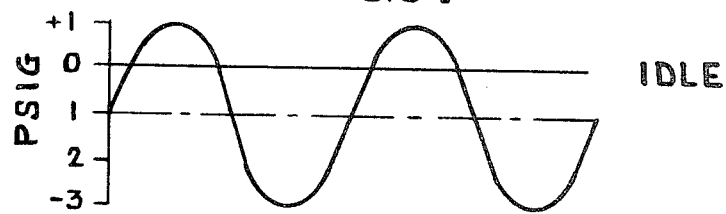
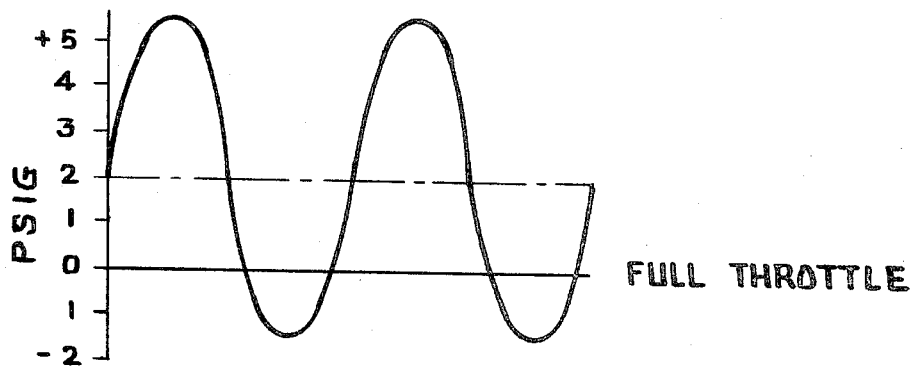
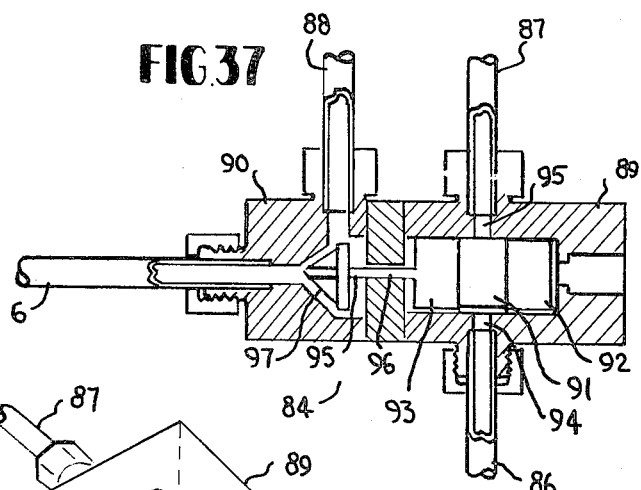
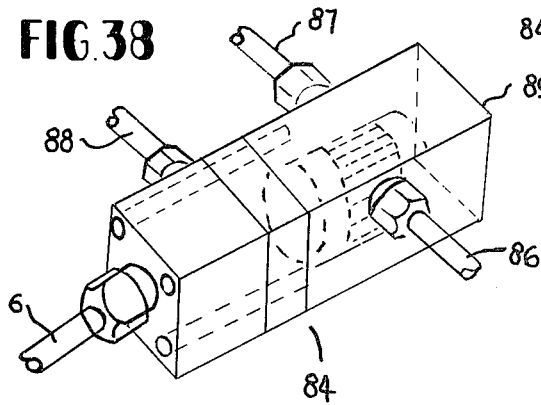

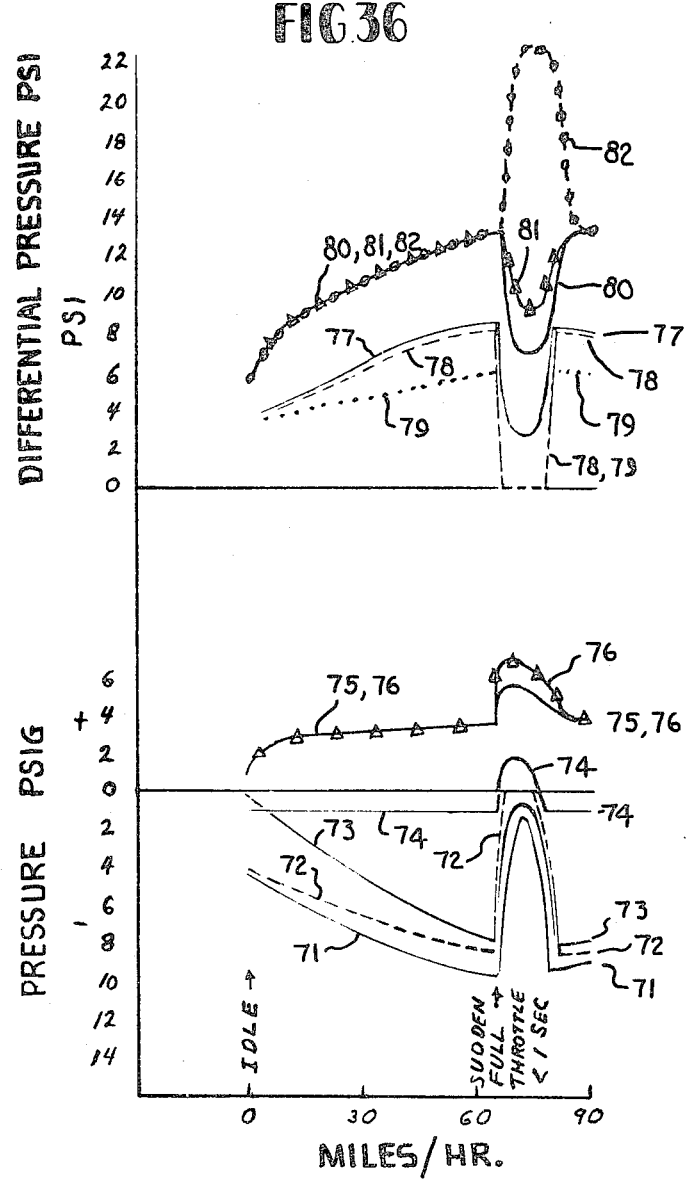

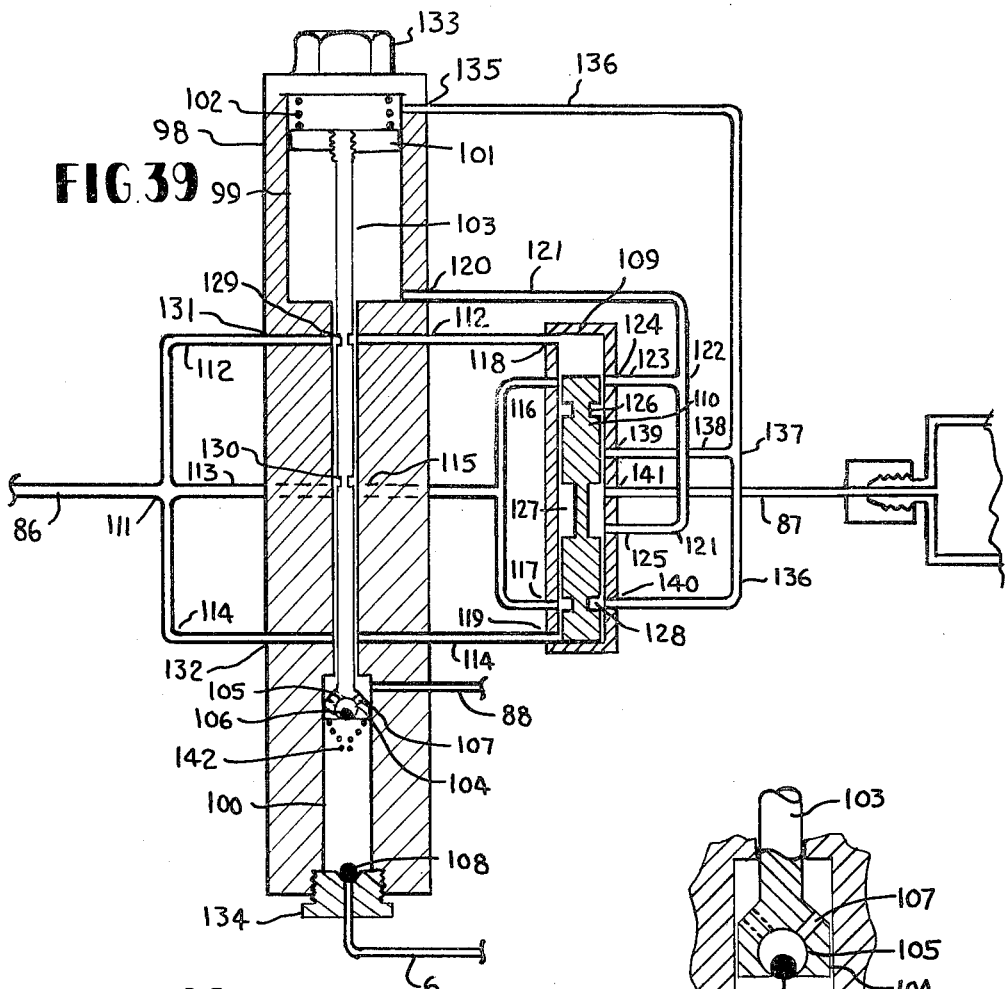
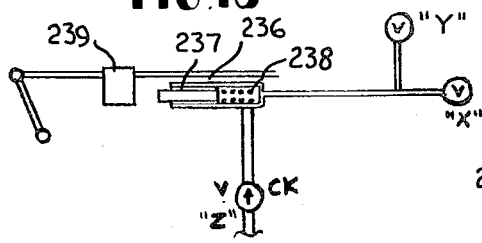
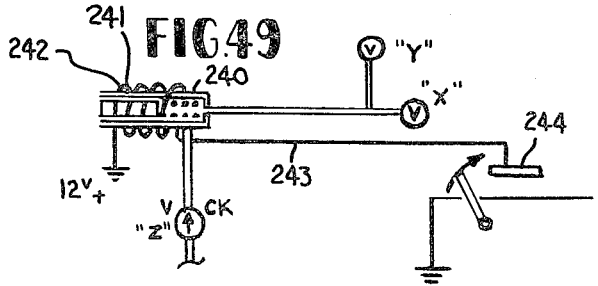
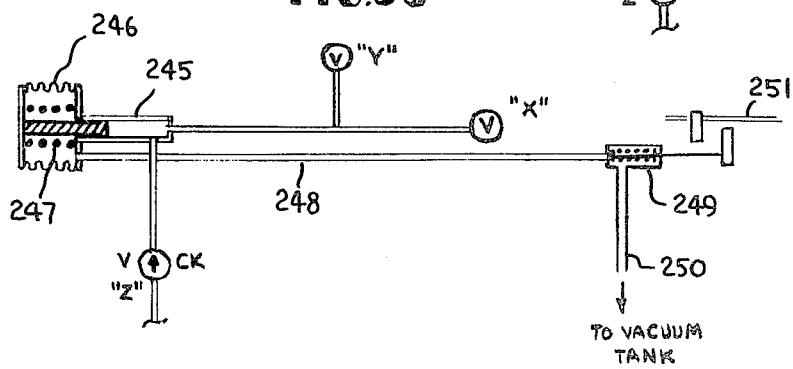

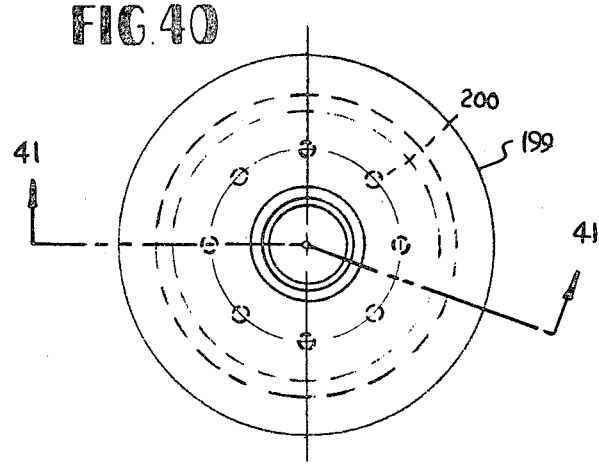
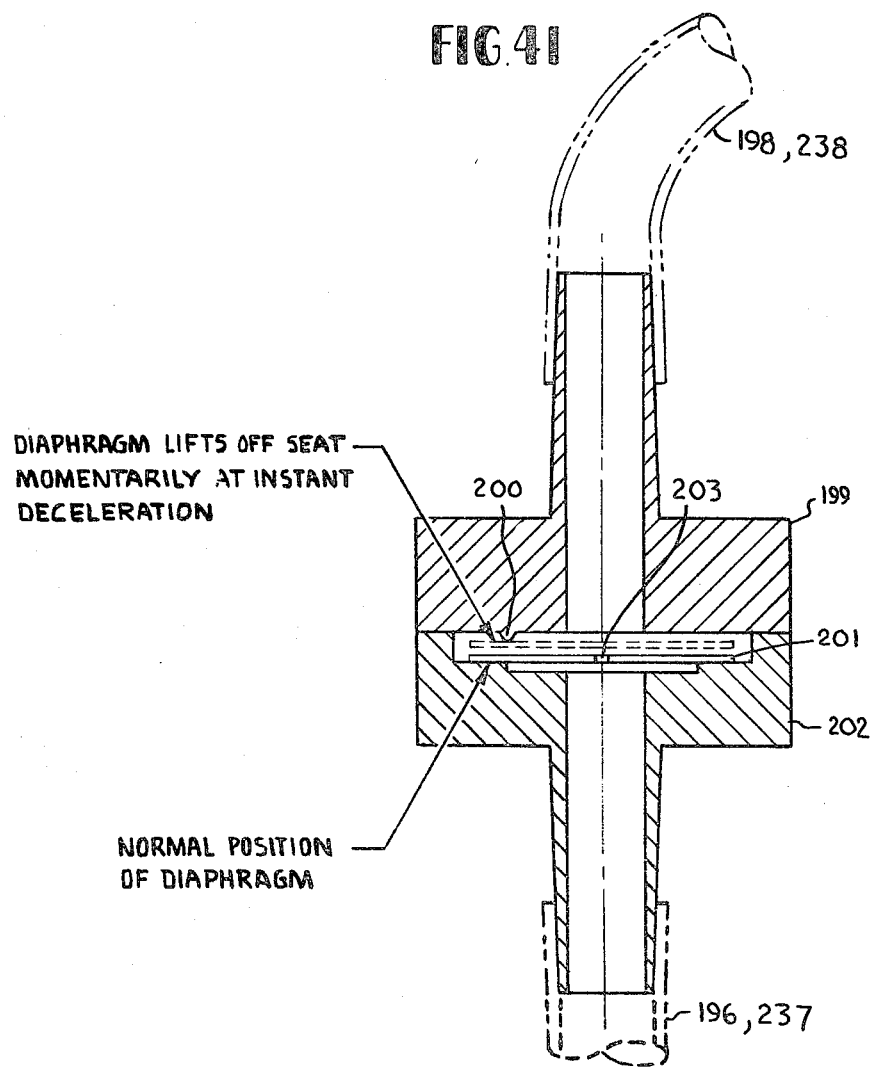

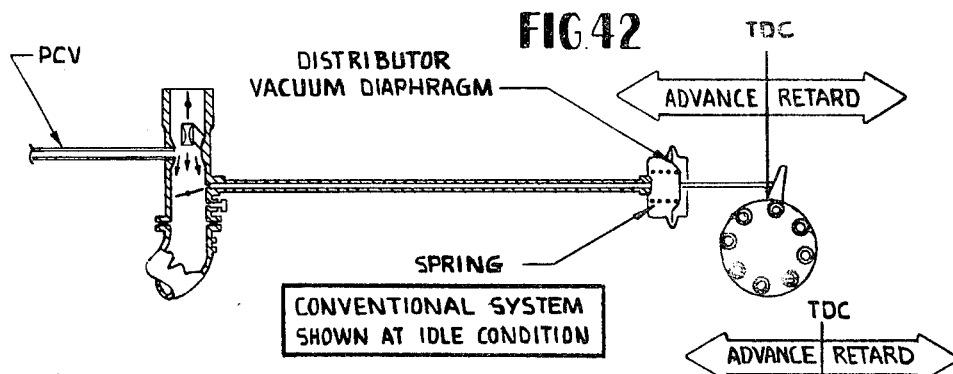
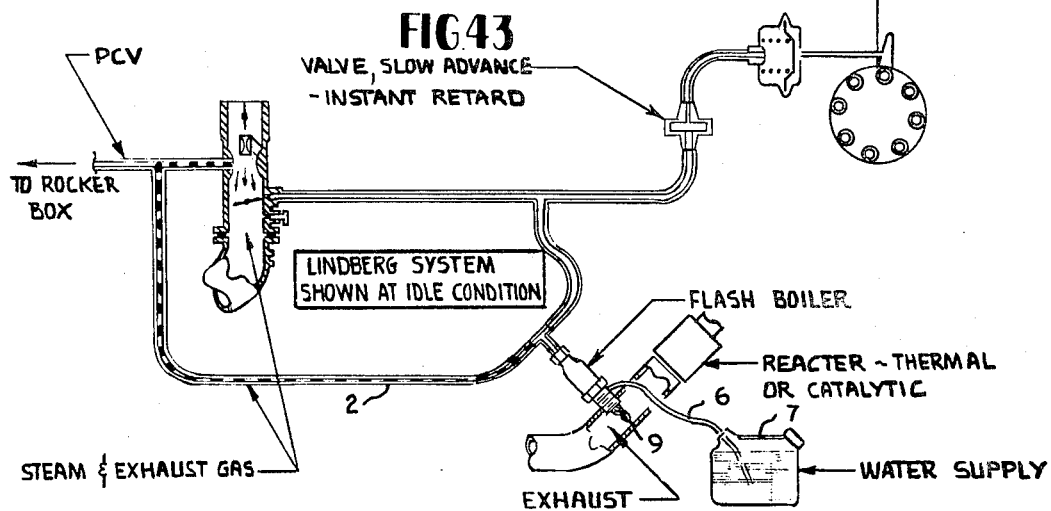
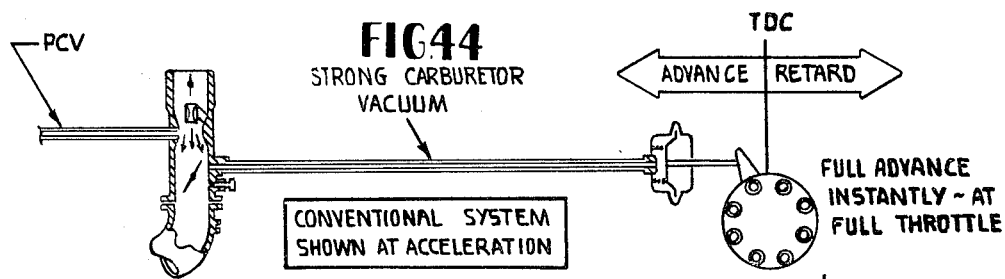
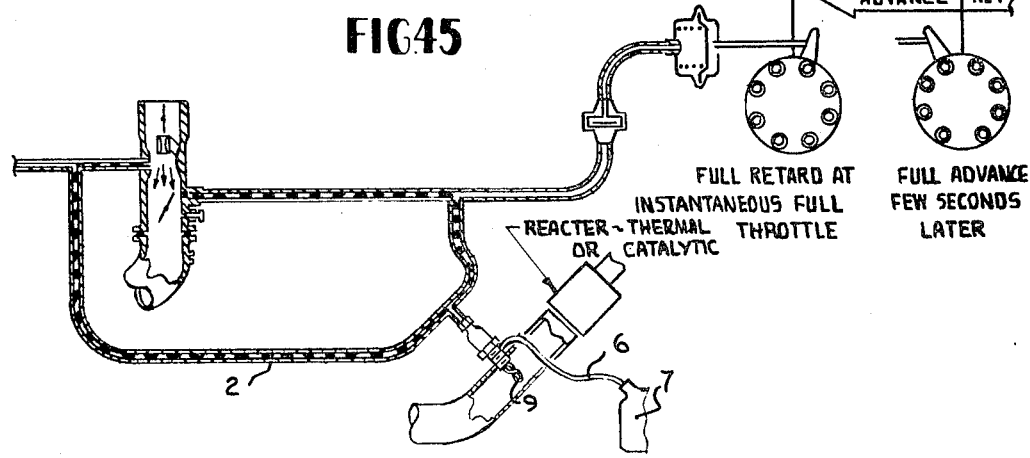

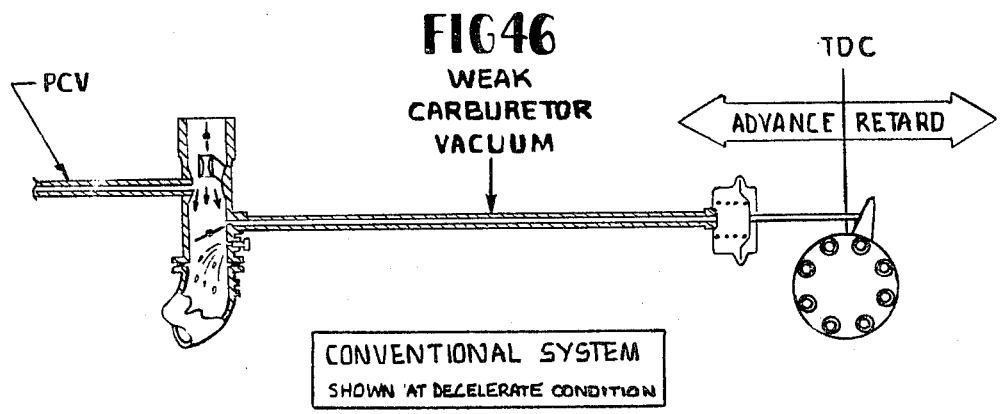
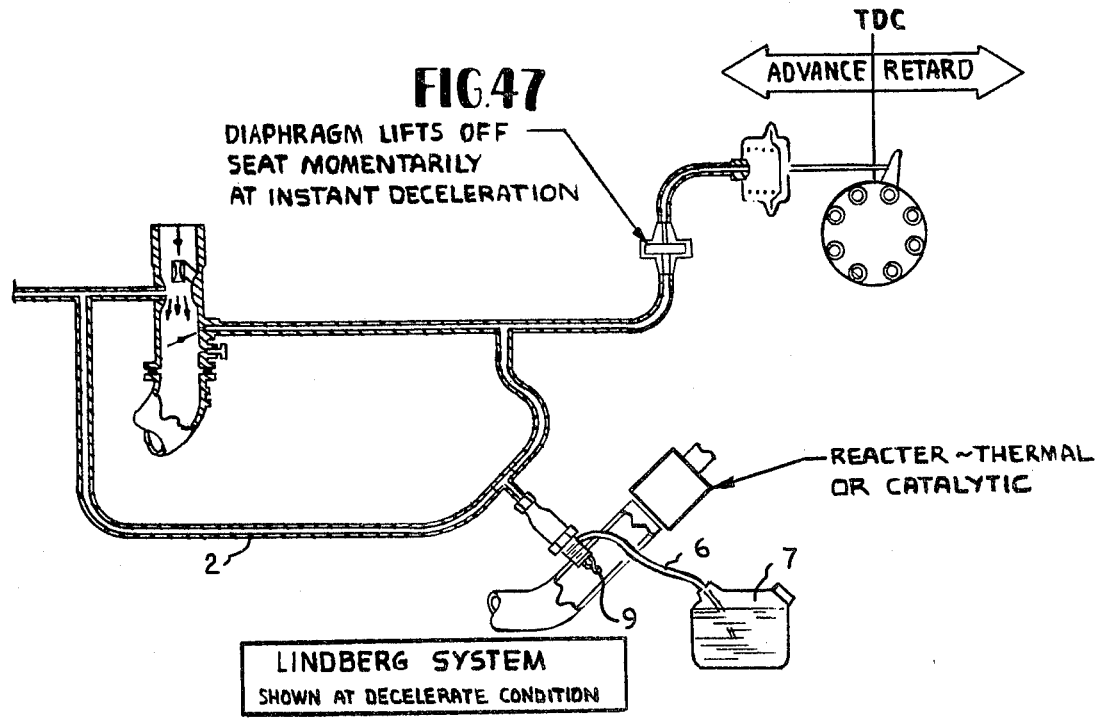

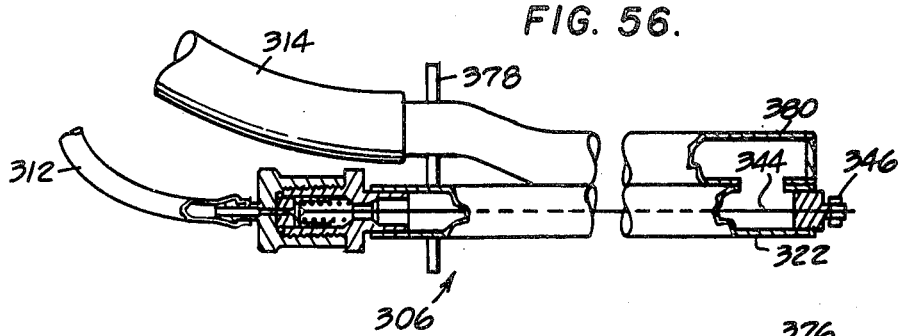
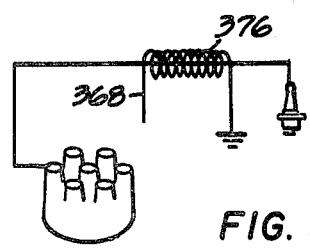
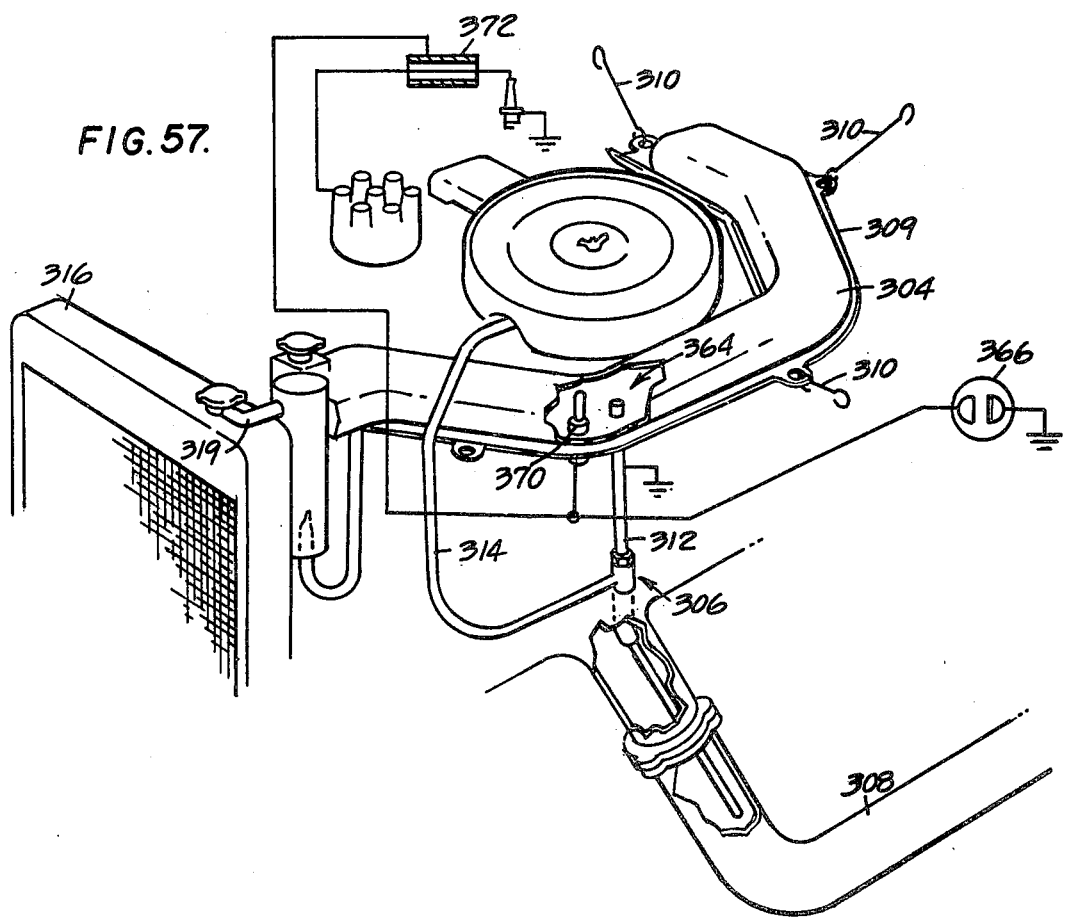

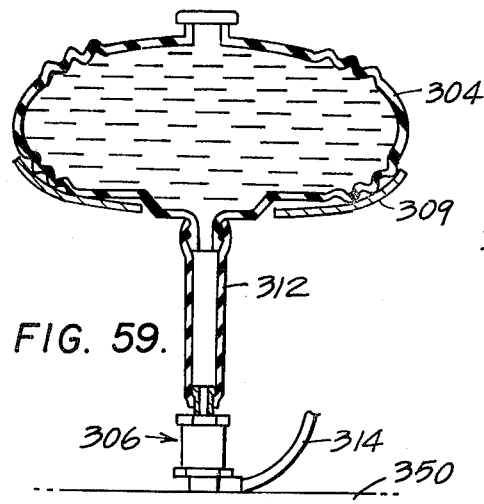
FIG. 59.
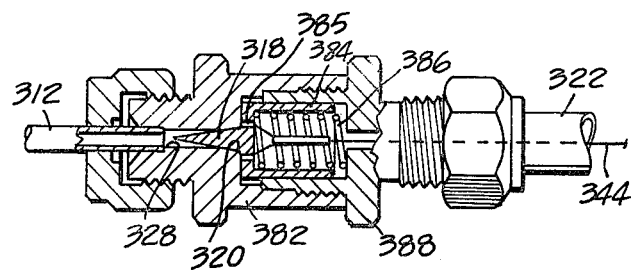
FIG. 60.
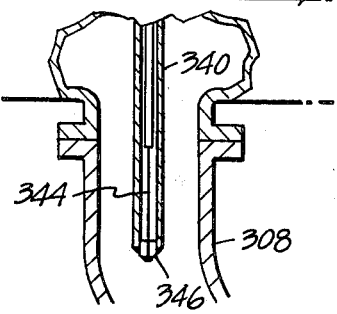
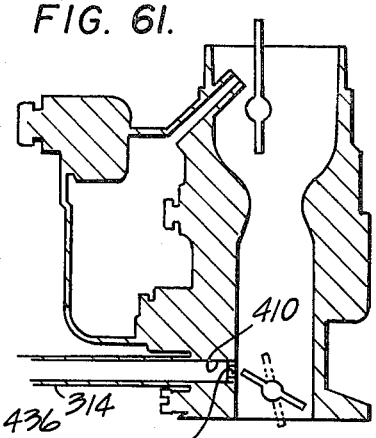
FIG. 61.
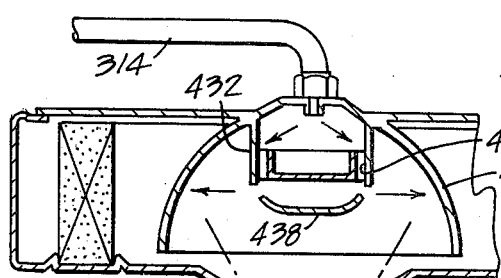
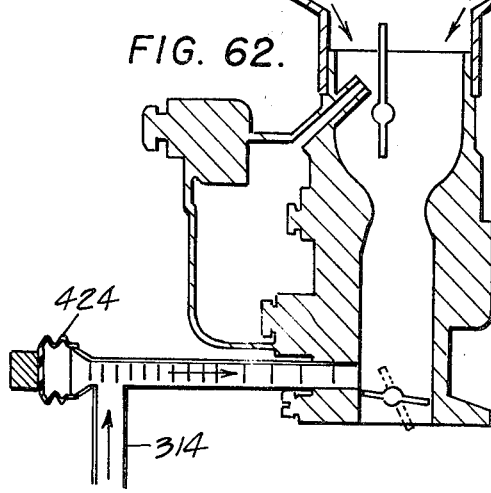
FIG. 62.
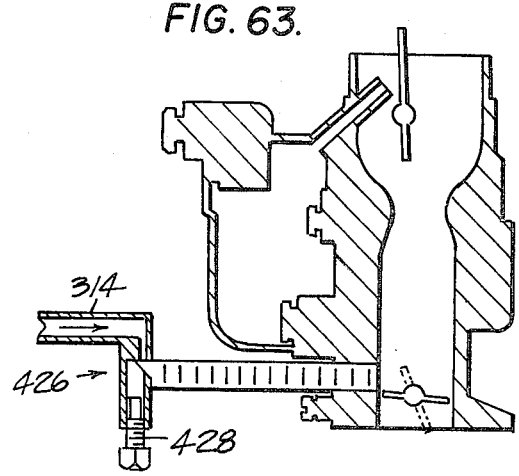
FIG. 63.

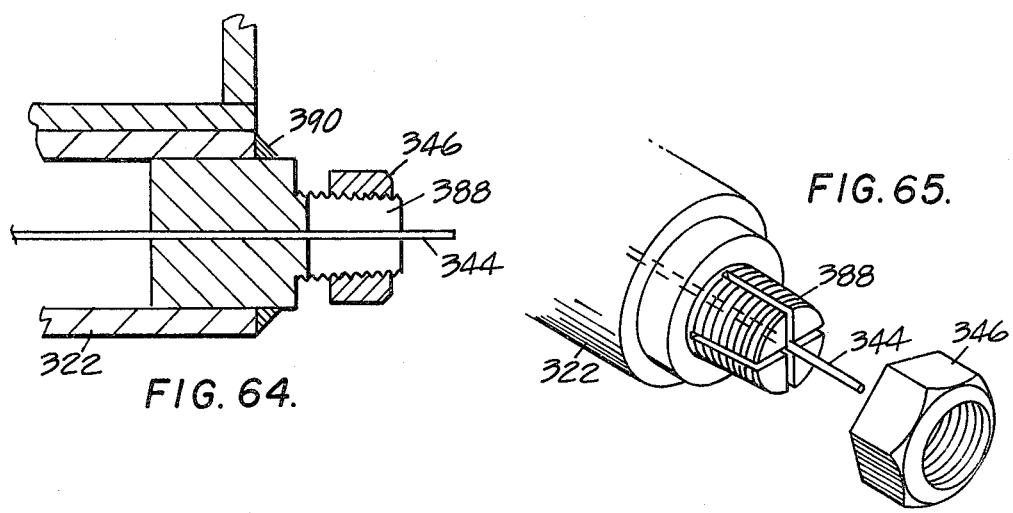
FIG. 65.
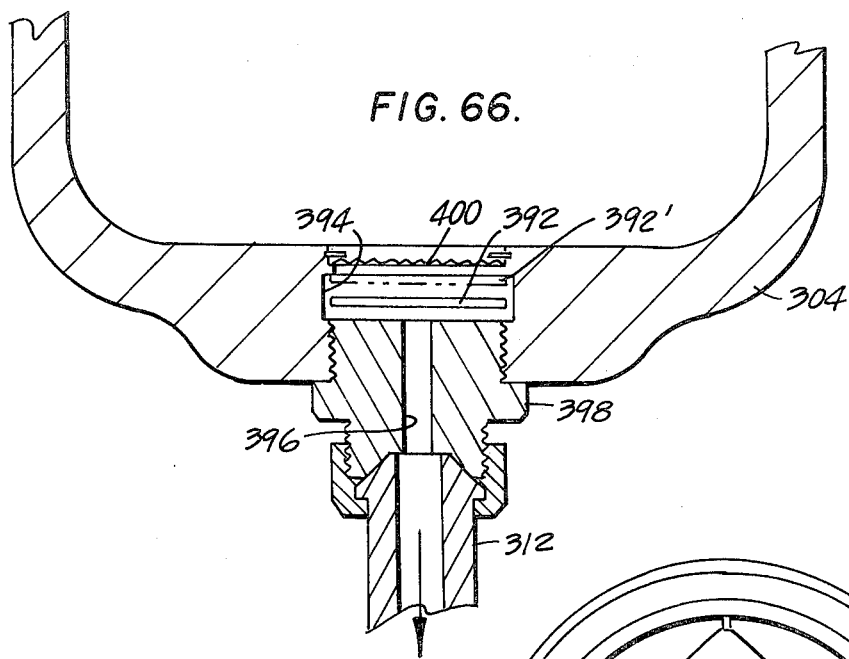
FIG. 64.
FIG. 66.
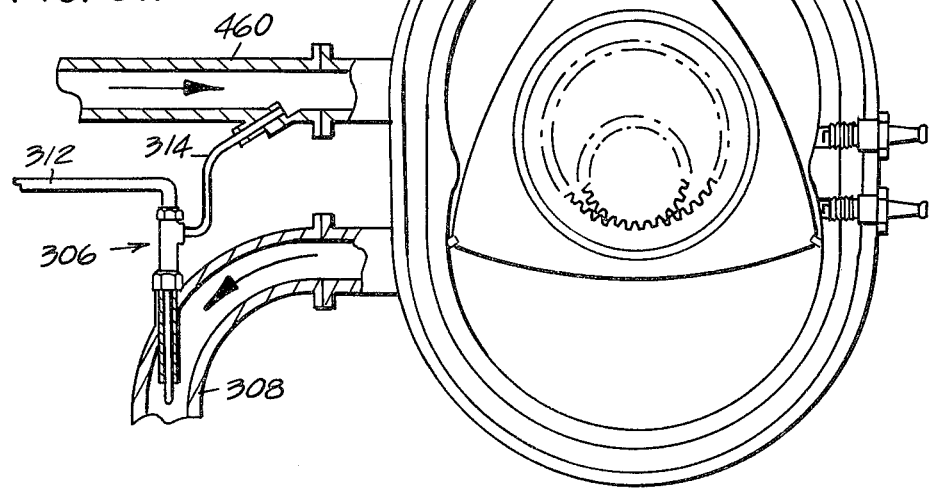
FIG. 67.

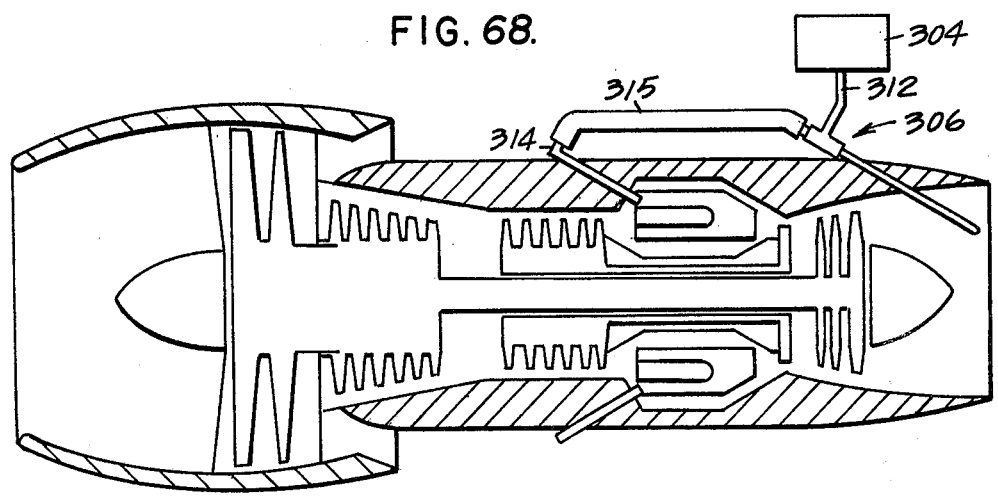
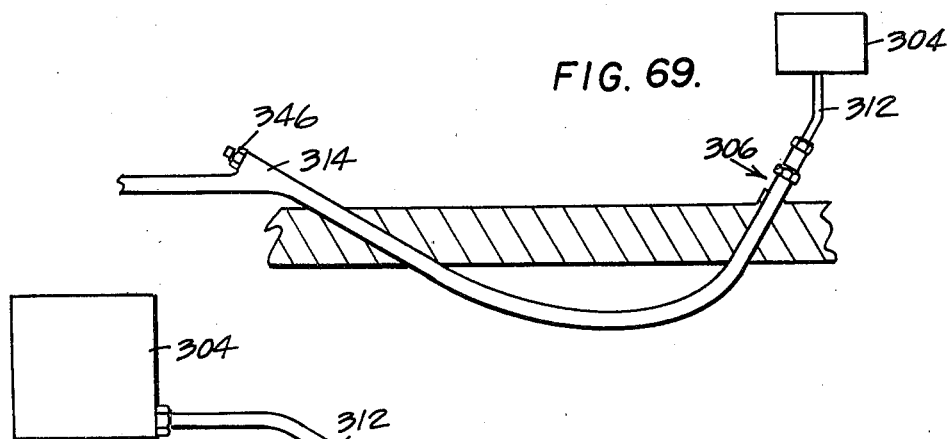
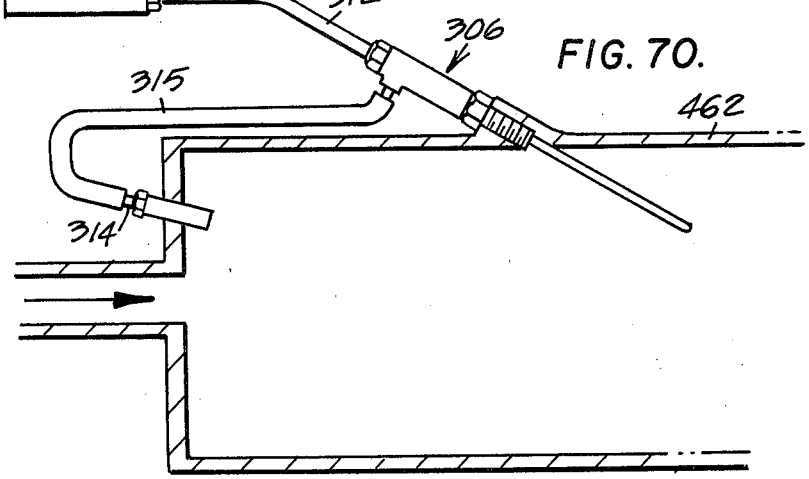

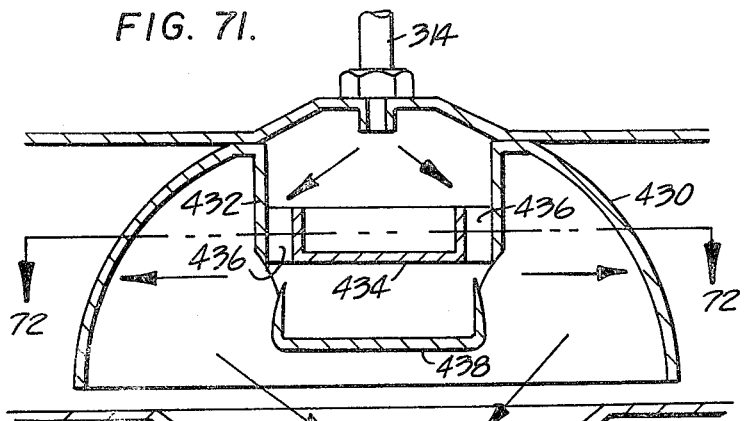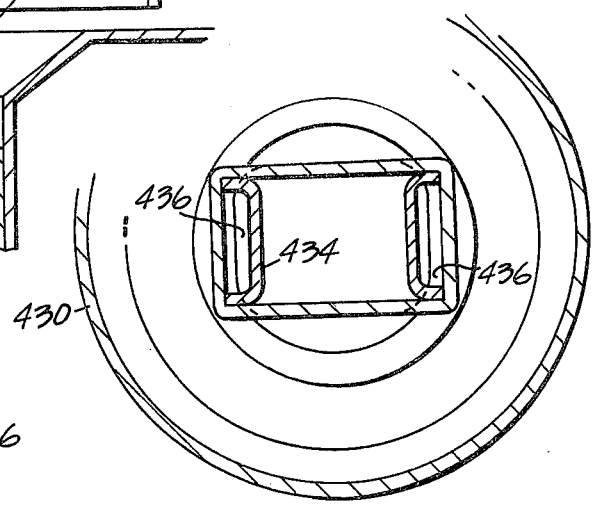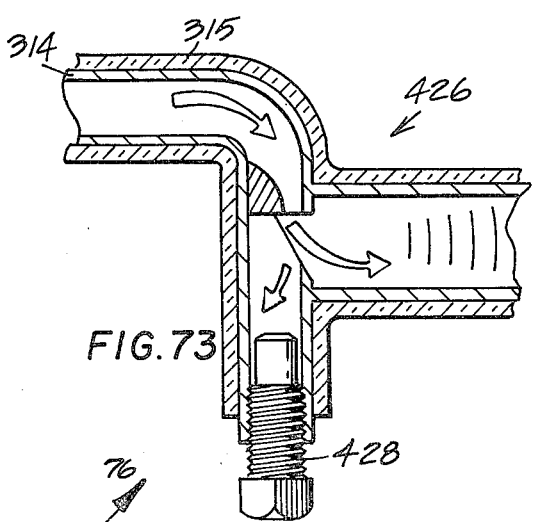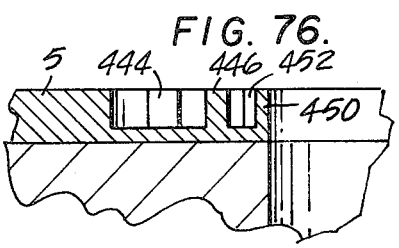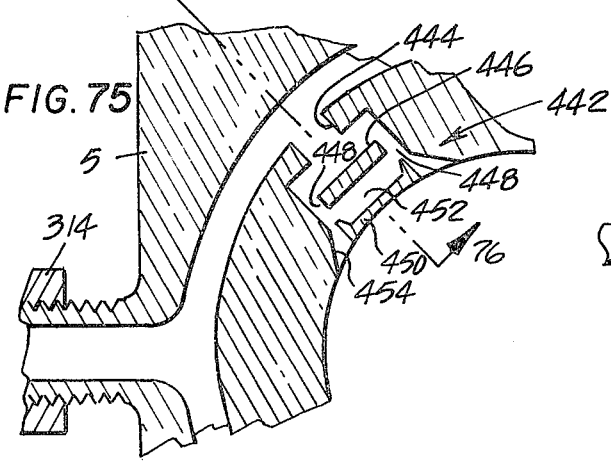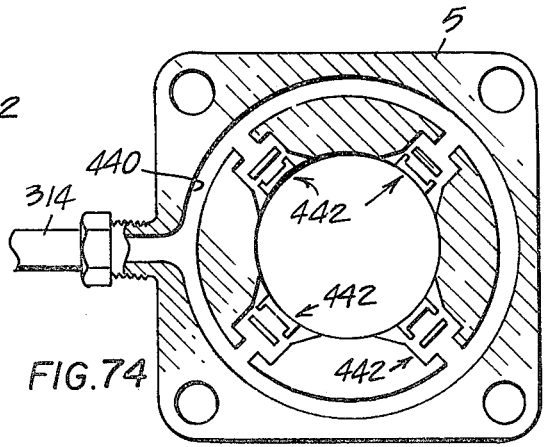

FIG. 79.
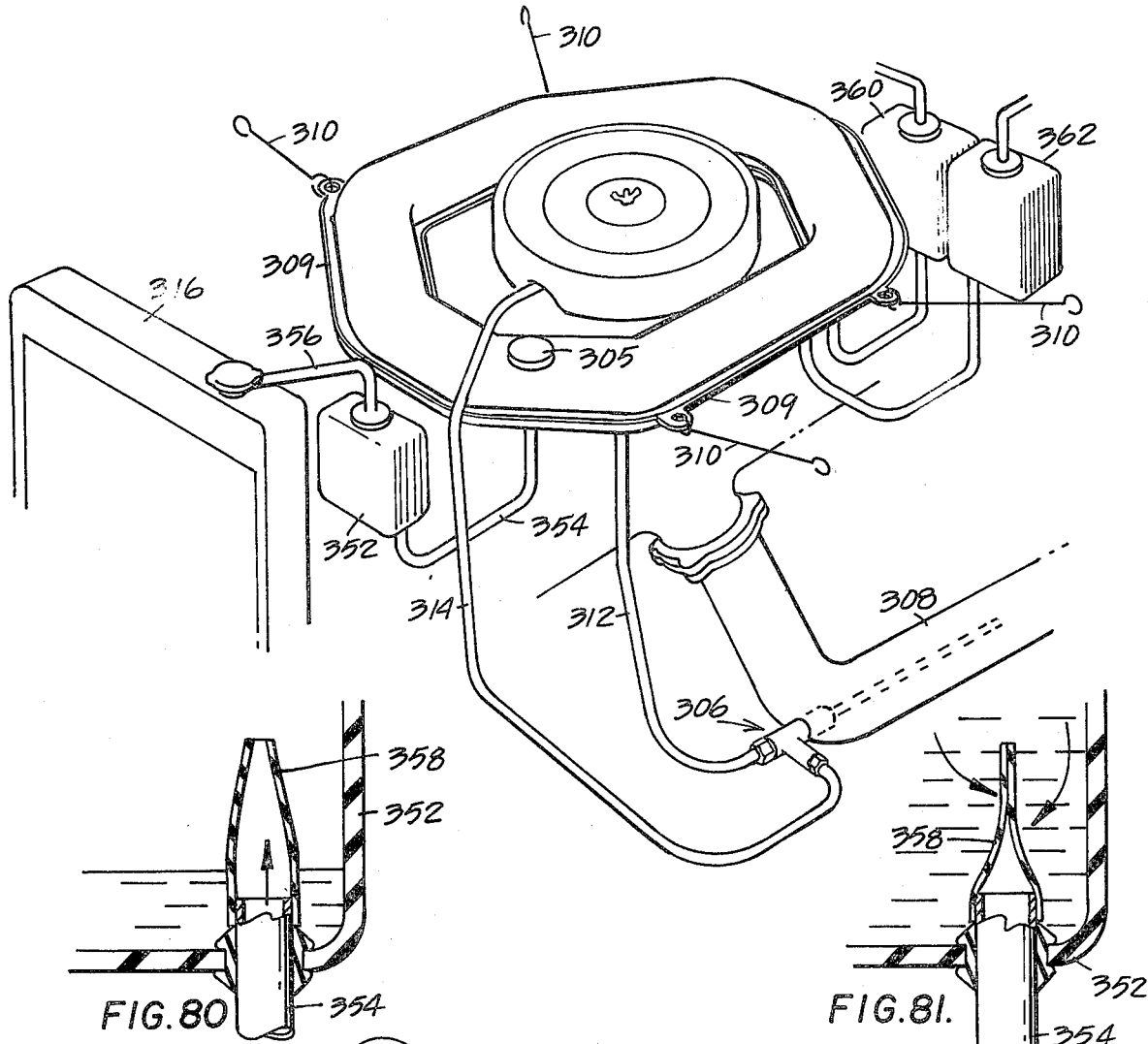
FIG. 80.   FIG. 81.
FIG. 82.
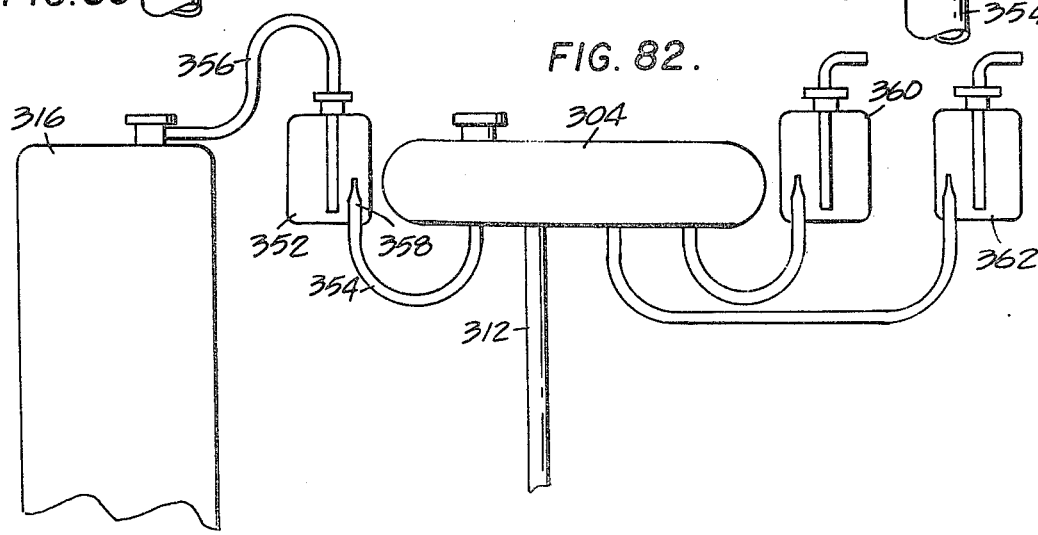

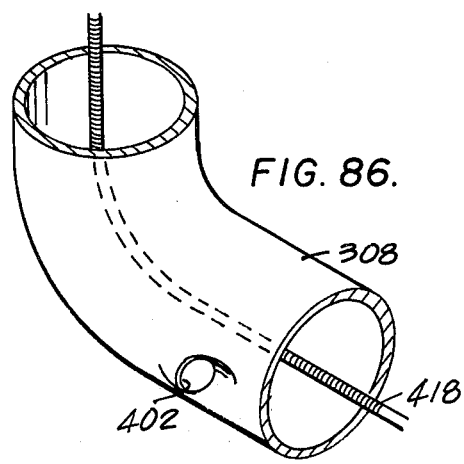
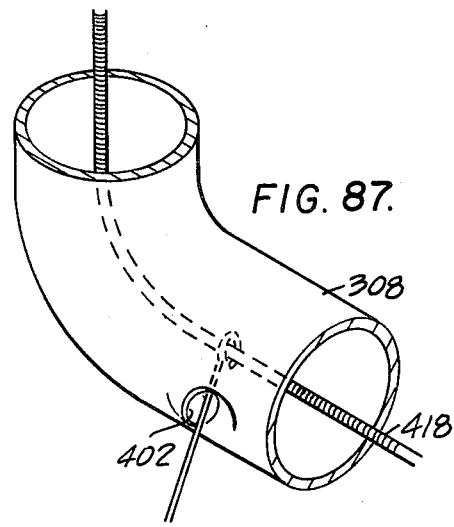
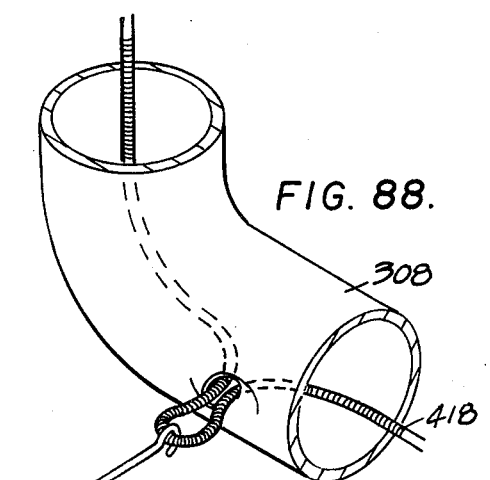
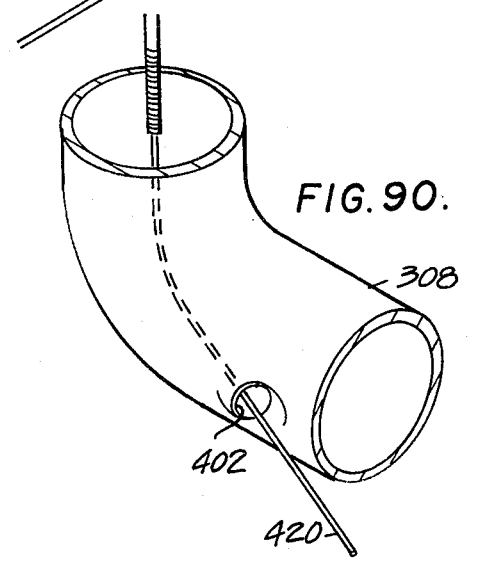
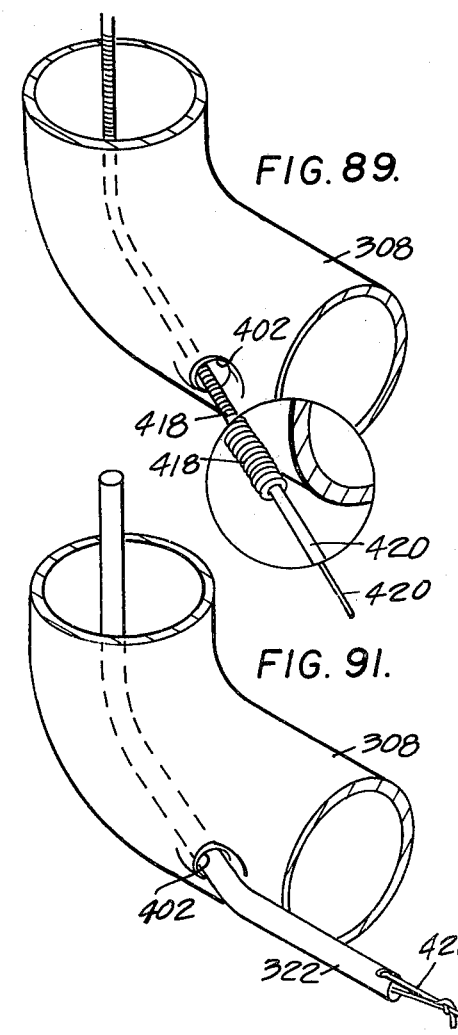

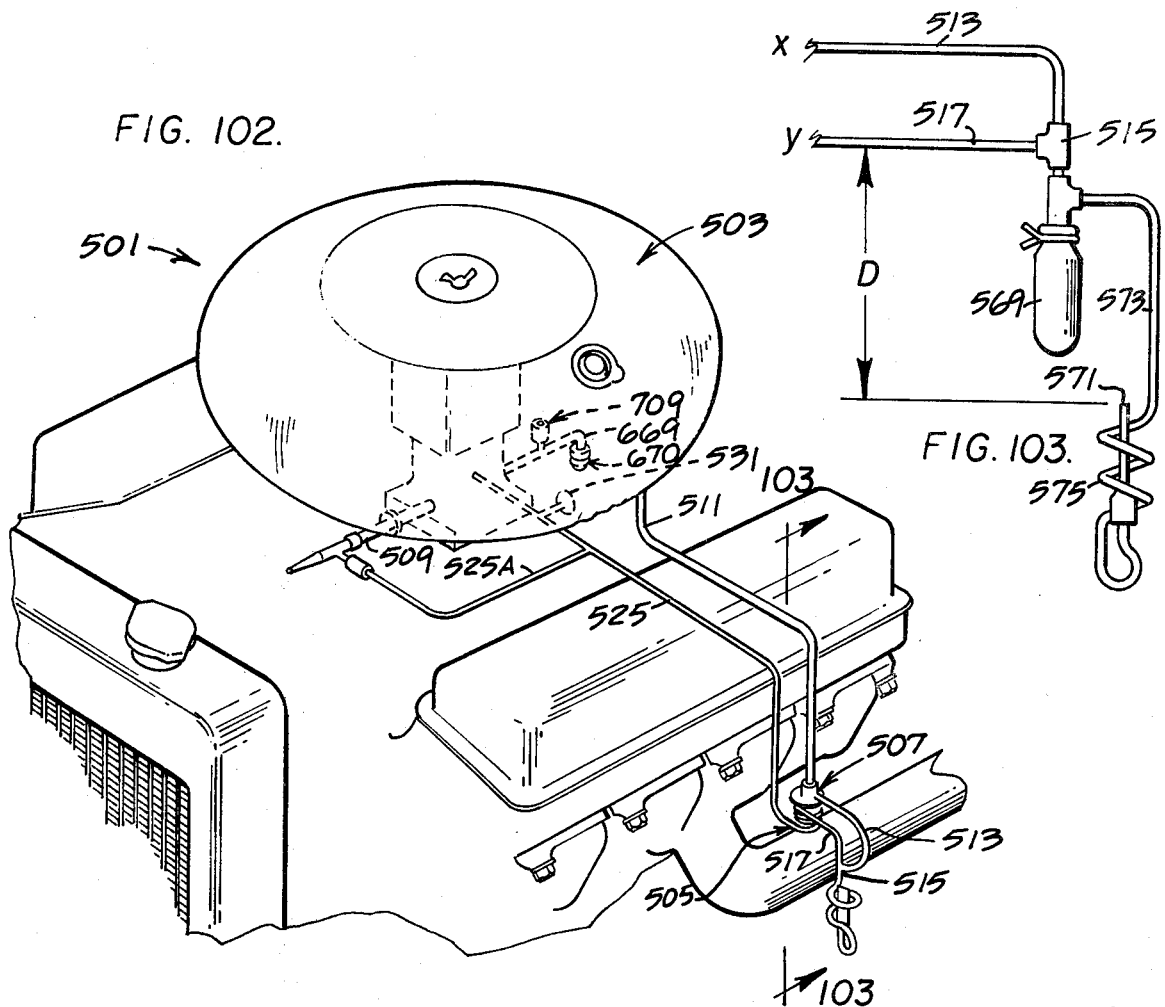
FIG. 102.
FIG. 103.
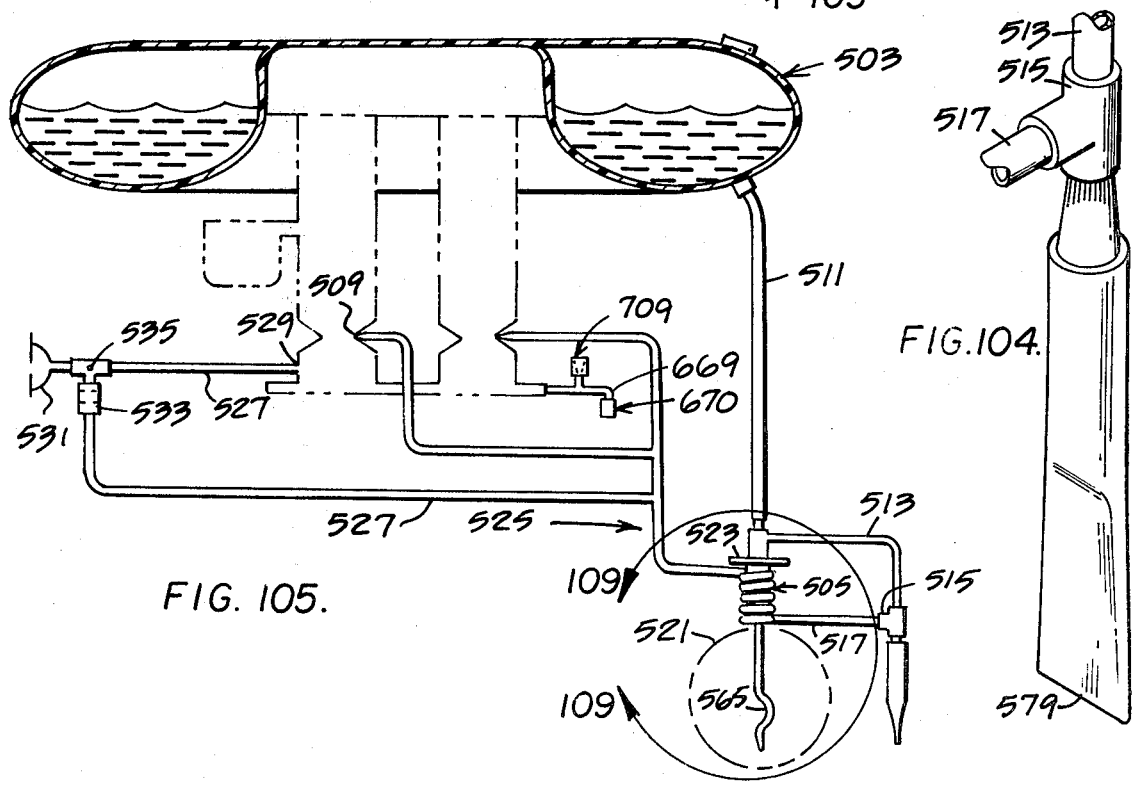
FIG. 104.
FIG. 105.

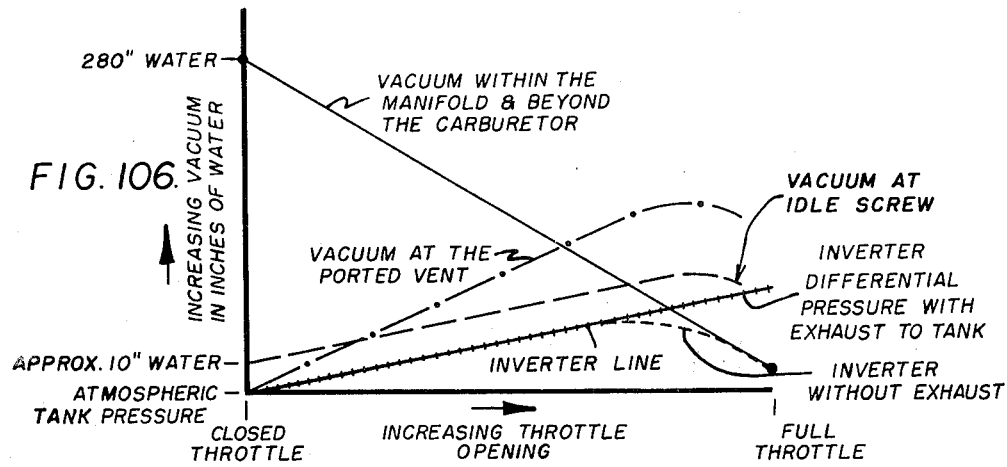
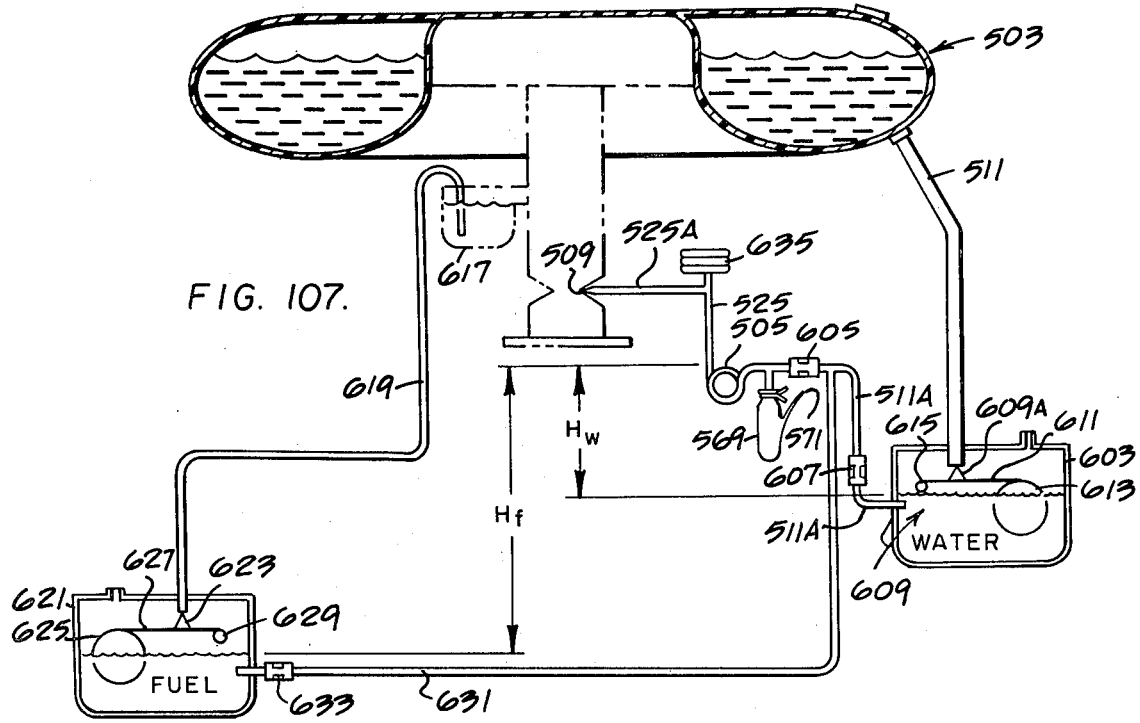
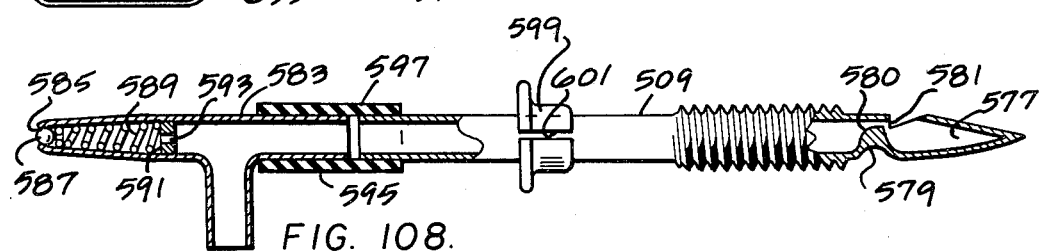

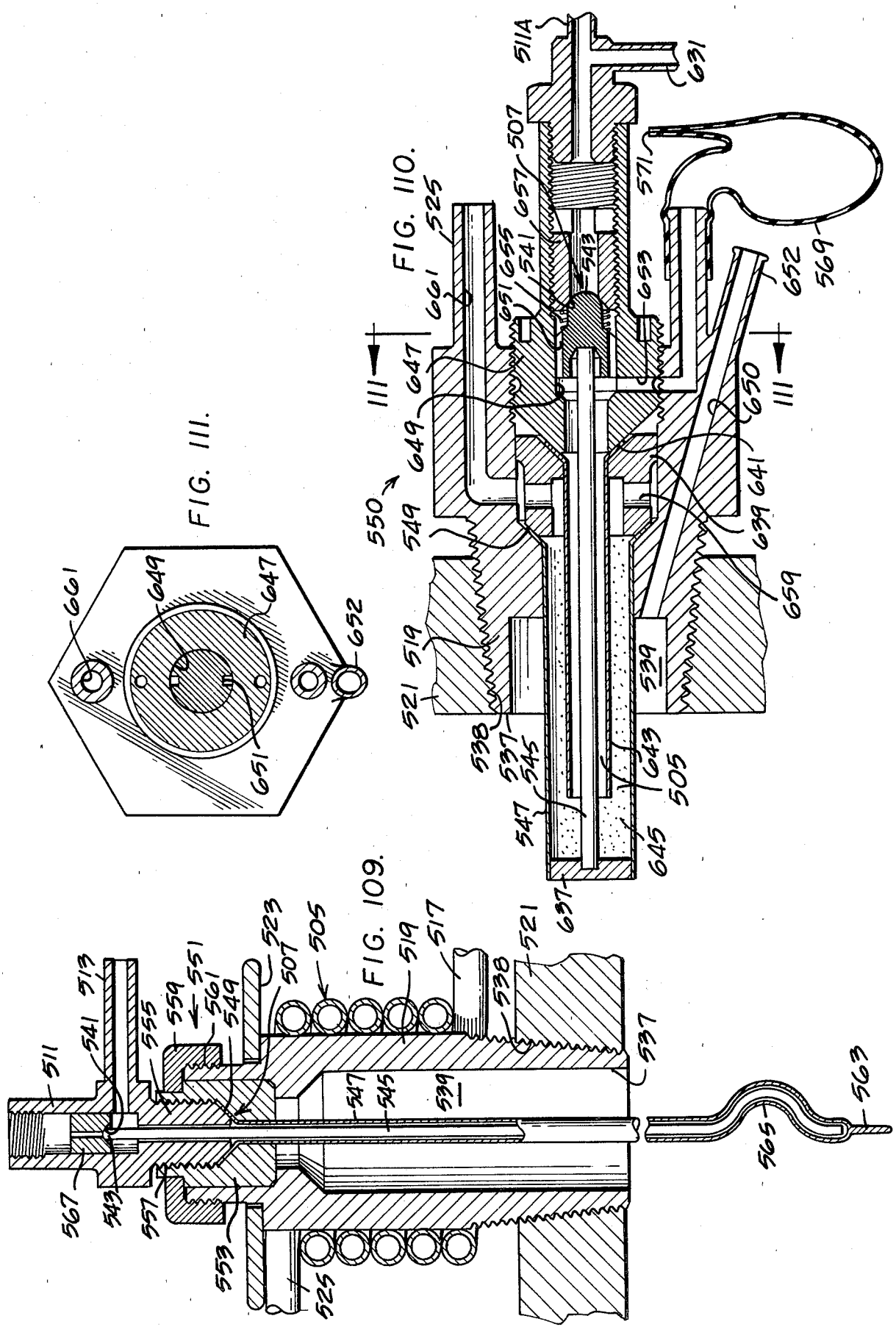

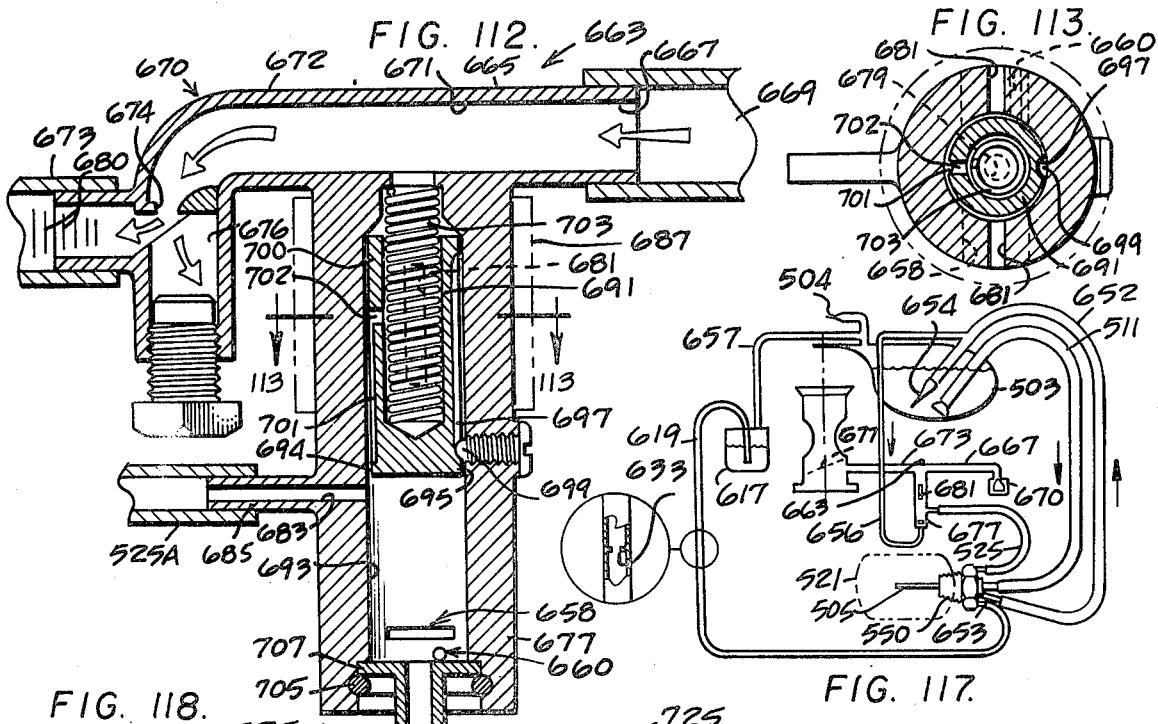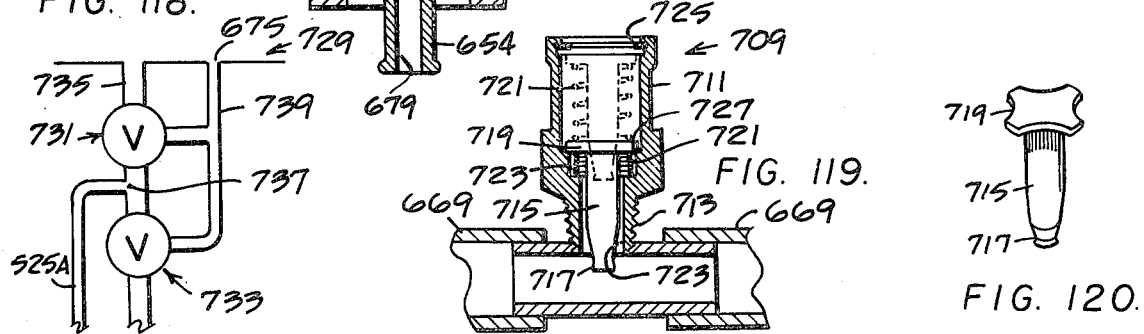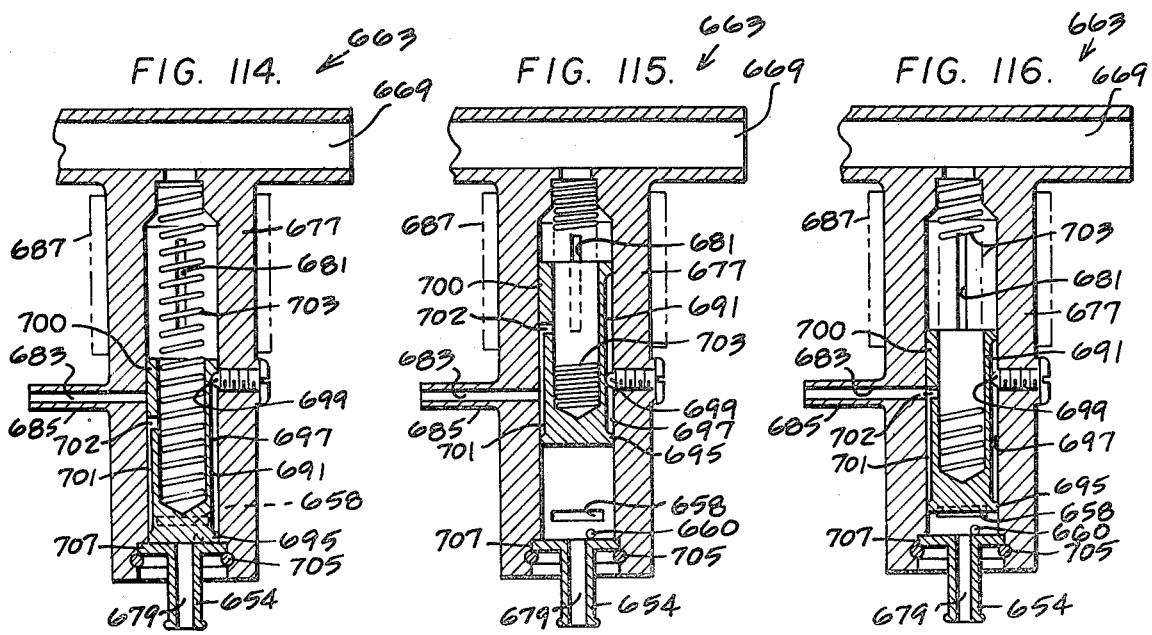

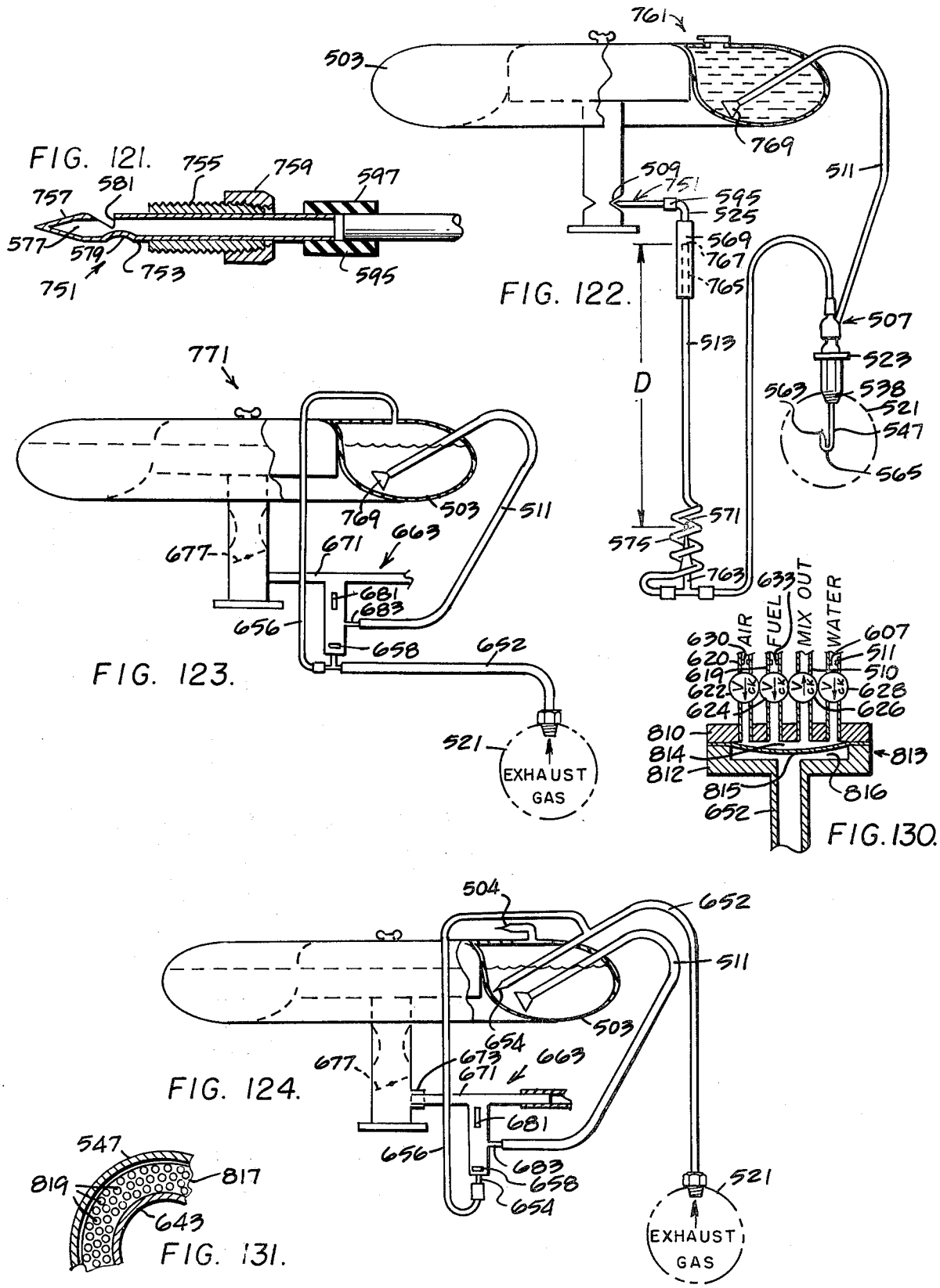

COMBUSTION AND POLLUTION CONTROL SYSTEM

This is a continuation of application Ser. No. 657,747 filed Feb. 13, 1976 which was a continuation-in-part of application Ser. No. 613,867 filed Sept. 16, 1975, which was a continuation-in-part of application Ser. No. 356,589 filed May 3, 1973, which in turn was a continuation-in-part of application Ser. No. 227,440 filed Feb. 18, 1972 now abandoned.

BACKGROUND OF THE INVENTION

The problem of pollution from automobiles is now very well recognized, and national, state and local laws have been passed requiring corrections. Attempts at solving the problem of pollution by cars have steadily been accompanied by decreasing the performance of the vehicle, making it harder to start and hard to stop when ignition is turned off due to auto-ignition, more critical to keep in adjustment and less drivable, less powerful, and less economical. A vast amount of money has been spent in many, many projects by the automobile companies and others, but the automobile companies are having great difficulties finding solutions that can meet the requirements established by the laws. Considerable work has been done on catalytic converters in the exhaust system but it all shows that to date there is no successful catalytic material that has reasonable life which can exist without eliminating the lead in the fuel. It therefore becomes an essential ingredient of any catalytic system that is to be successful that is must first of all eliminate the lead from the fuel. In FIGS. 13 and 14 the historical improvements steadily made over the years by refining and by the addition of lead in regular gasolines and in premium gasolines is shown for the period 1930–1970. The relationship between the octane member of the fuel and its antiknock content of lead is shown in FIG. 15, those for premium grades and regular grades in today's market. Also, a line is plotted in, showing the result of pooling of the premium and regular grades. As you see, when all of the lead is removed, this results in 91 octane. FIG. 17 shows clearly how much longer catalytic converters will last and how much more efficient they are if they are used with clear gasoline instead of leaded gasoline. Also, FIG. 18 shows the change in half life of the catalytic converter versus the amount of lead in gasoline showing clearly that even a small amount of lead has a very serious effect upon the life of the catalytic converter. Past solutions to this problem of emission control are also in general very expensive and generally do not lend themselves to application to already existent cars in the field. Another problem common with present cars is their tendency to pre-ignite and to afterfire when the ignition is cut off. They continue to cycle, which is called auto-ignition or dieseling. This is caused by a local hot spot in the combustion chamber which is hot enough to cause ignition of the fuel-air mixture and in advanced state is moved steadily ahead in ignition cycle after cycle, getting the combustion chamber hotter and hotter. When present high compression ratio engines with high spark advance used are used with no lead low octane fuel, they invariably go into a condition of pre-ignition or auto-ignition within their operating cycle. In an attempt to eliminate this problem, spark advance is normally retarded very severely and in new engines the cylinders and/or pistons are changed to lower compression ratio from 10.5 to approximately 8 to 8.5. These both seriously hurt combustion efficiency and so increase exhaust emissions, carbon monoxide and unburned hydrocarbons, making them much worse, and also seriously hurt economy and engine performance. Solutions proposed so far do not lend themselves to application to already existent vehicles in the field. This is a serious problem as any successful solution to the problem must cope with the very large number of cars already existent in the field and do so easily. In California laws have been passed requiring an emission control device to be applied to all 1955 to 1970 cars.

It has previously been proposed to inject water and steam into the induction systems of reciprocating piston internal combustion engines.

The prior art proposals for the injection of water or steam can be dividable primarily into two areas. The water or stream was injected either directly into the vacuum in the inlet manifold or was injected as a part of the throttle linkage speed control. In either case the prior art fluid injection systems did not produce the injection of sufficient amounts of fluid over the full engine operating range and/or gave excessive amounts under some conditions and did not supply fluid as needed.

In the vacuum control system the fluid was not injected in correct amounts at idle (normally being too much) and at full load was quite insufficient.

In both the former vacuum control and the throttle linkage control systems little or no fluid was injected during acceleration at full throttle under full load from low speed. This is precisely the time when the maximum amount of fluid injection is needed.

SUMMARY OF THE INVENTION

The present invention solves these problems by use of injection of properly controlled amounts, relating to operating mode, of a fluid (water or steam plus at times hot exhaust gas, air, hydrogen and additives such as hydrogen peroxide, methyl alcohol or ammonia) into, preferably, an inlet point that increases its vacuum with increasing engine power, such as the idle screw and/or the ported vent of the carburetor or it can be injected by an inverter into the PCV port or by separate adapter plate below the carburetor and thereby into the combustion chamber. This keeps the PCV system, ports, and combustion chambers clean and provides a cylinder charge of increased heat capacity and higher specific heat per cycle to increase internal cooling of hot spots within the combustion chamber cycle, to lower peak temperature, to prevent detonation, hot spot preignition, and nitrous oxide (NOx) formation (formed above approximately 3400° F.) and to use the vapor energy of steam expansion to increase the torque, acceleration and efficiency. As shown in Table I, the specific heat Cp for steam increases rapidly with temperature.

At 2000 K. (absolute) the Cp for $H_2O$ = 14.9
$NH_3$ ammonia = 29.84

Other gases in the cylinder combustion process are:

| | |
|---|---|
| $O_2$ | 8.5 |
| $N_2$ | 8.5 |
| NO | 8.5 |
| CO | 8.5 |

| | -continued | |
|---|---|---|
| | $CO_2$ | 13.78 |

Thus, steam and ammonia each provide remarkable internal cooling ability. As noted by the formula in Table I, both ammonia and steam continue to increase Cp as the square of absolute temperature increases and so are very effective in snubbing peak damaging temperatures. The data given is for moderate pressure. At high pressure the heat capacities become appreciably greater. $H_2O_2$ (not shown) also provides high specific heat.

This system provides for increased quantity of high specific heat vapor to be added as the engine (or, broadly, as the combustion cycle process) requires it due to temperature and/or load. This disclosed system is applicable to all combustion processes (to increase efficiency and reduce thermal and mechanical stress and emissions): in internal combustion engines such as the cycle reciprocating engine (as has been discussed); in internal combustion rotary engines as the Wankle, to provide very much needed internal cooling, to protect the critical rotor seals, to increase economy by operation at a near best F/A ratio, to obtain clean and complete combustion (present operation of these engines is very rich to obtain fuel cooling to protect rotor seals, but this gives very poor economy and emissions of hydrocarbons and carbon monoxide are very high and require a substantial thermal or catalytic reactor to reduce to even today's emission requirements): in turbine and jet engines, to improve combustion efficiency and reduce critically high temperatures, as of the turbine blades, to increase safety and reliability, reduce maintenance, and reduce production costs and emissions; external combustion engines such as steam engines and Sterling engines, and any heating boiler or heating furnace to improve combustion efficiency, reduce emission pollutants, and reduce critical burner part temperatures to obtain extended life.

The amount of vapor injected at high temperature at the input to cycle raises the vapor transition point that will occur during the exhaust cycle so that a condition can be obtained to recover part or all of the energy of vaporization (condensation) within the working cycle to increase further the efficiency and not throw this energy away in the exhaust.

TABLE I

| Gas | Empirical Equation | Cp at 2000° K. abs. |
|---|---|---|
| Monatomic | $Cp = 5.0$ | 5.0 |
| $H_2$ | $Cp = 6.5 + 0.009T$ | 8.3 |
| $O_2, N_2, NO,$ CO, HCl, HBr, HI | $Cp = 6.5 + 0.0010T$ | 8.5 |
| $Cl_2, Br_2, I_2$ | $Cp = 7.4 + 0.001T$ | 9.4 |
| $H_2O, H_2S$ | $Cp = 8.81 - 0.0019 + 0.00000222T^2$ | 14.9 |
| $CO_2, SO_2$ | $Cp = 7.0 + 0.0071T - 0.00000186T^2$ | 13.76 |
| $NH_3$ | $Cp = 8.04 + 0.0007T + 0.0000051T^2$ | 29.84 |
| $CH_4$ | $Cp = 7.5 + 0.005T$ | 17.5 |

Since the energy used to vaporize the fluid is waste energy at the exhaust any recovery of heat of vaporization provides substantial further efficiency increase.

We are by the above substantially cooling the exhaust. At the limit, greatest efficiency will be obtained by exposing the flash boiler to waste heat at critical temperature points of the combustion chamber, while the exhaust valve seat insert, the spark plug insert or a special flash boiler plug with flash boiler exposed at the combustion chamber inner surface (said plug located near or at the combustion chamber critical temperature area), act as a coolant, as well as provide more heat for the flash boiler. A heat pipe, as discussed later, could provide the access to this heat and provide maximum heat for the thermal-catalytic reactor when used.

The system incorporates a spiral corrugated flex stainless steel tube to transfer exhaust gas to an adapter plate below the carburetor (FIG. 26). Superheated steam is generated in one or more small stainless steel tubes run preferably inside, but, if not, then on the exhaust transfer line to permit heating the flash boiler fluid flow in an increasing temperature gradient field as the flash boiler goes down the exhaust transfer line until the flash boiler tube is extended into the active full very hot exhaust gas, preferably in the exhaust manifold near the exhaust valve (see FIG. 22) and then returns through the exhaust transfer tube (to keep the superheated system hot) to the entrance point below the carburetor (FIG. 26). Automatic variable orifice valves (FIGS. 28-31) control the rate of flow of exhaust gas and flow of intermixed air to correctly automatically meet the engine needs; simultaneously the proper amount of steam to meet engine needs is fed to it by automatic control of the flash boiler exit vacuum (inc. FIGS. 112-118), and use of engine fluctuating exhaust pressure "rectified" by low mass, high frequency response check valve (FIGS. 33 and 112-118) to provide peak pressure in the fluid tank (FIG. 32) supplemented, when needed, by a pump, either electric (FIGS. 6 and 32) or, preferably, steam powered (FIGS. 5, 37-39) from a flash boiler, plus of course, control of the temperature flow around the flash boiler, together result in providing automatically the right amount of steam for each mode of operation: idle, acceleration, low speed cruise, high speed cruise, and full throttle. The system has great inherent stability. In idling it will automatically compensate for any condition changes to maintain the lean fuel/air ratio which the engine was set to run at. The high specific energy of the combustion cycle provides stable low speed idle (even two hundred rpm, if desired) almost from start-up.

The emissions are decreased because the turbulence and the high energy and specific heat of the steam and exhaust added to the engine cycle provide excellent vaporization of the fuel and distribution of fuel vapor, air, exhaust gas, and steam. Also, the specific energy of the combustion cycle is increased to give more efficient and complete combustion. The steam acts to internally heat the combustion at start-up and then as temperature rises acts as an internal coolant, to lower peak surface temperatures and combustion peak temperature.

Detonation and preignition are also prevented. This more perfect combustion accounts for the decreased CO and HC emissions. The formation of NOx is prevented by the steam and exhaust gas keeping combustion temperature below the formation temperature of NOx (approximately 3400° F.). Because combustion is smoother the engine runs smoother and bearing loads are decreased.

It is recognized that exhaust gas recirculation as a method of nitrogen oxide control in internal combustion engines was tested by R. Kopa and A. Kimura at UCLA in 1960. To date attempts to use exhaust gas recirculation have suffered from problems of drivability and of rapid deposit build-up in the intake system.

I have invented a system to improve internal combustion engine performance and emission control using steam, and have tested and perfected it over the past several years. It uniquely combines in a control system superheated steam, air, and recirculated exhaust gas with the fuel-air mixture in the induction system as above described. I have, in fact, been using it in my Lincoln Continental Mark III '69 (FIGS. 1 and 3) for approximately 6 years with no lead 91 octane fuel with excellent results, and have substantially solved the emission problem to the point of meeting standards years ahead.

Control of the vacuum spark advance is provided by exhaust pressure to provide full retard of vacuum advance (FIG. 3) during any instance of rapidly going to full throttle, so as to aid in preventing detonation and pre-ignition. Through the combination of these two systems it is possible to use no lead fuel of 91 octane rating and still retain the high compression ratio, high spark advance condition, and therefore the high efficiency of the present engine. In fact, the engine efficiency is even further increased beyond that of the original engine with its premium fuel by an amount in total of up to over 60% in cents per mile. In the full system a catalytic reactor is used which is kept clean by being kept at temperature throughout its operating cycle by an ignition system consisting of either a continuous spark system (FIGS. 5 and 51) or a thermal igniter (FIGS. 12 and 52) which are turned on the instant the ignition of the engine is turned on. This also assures that the pollutants which are maximum during the cold starting cycle of the engine are burned in the exhaust reactor if they are not burned within the combustion cycle in the cylinder.

As shown in FIG. 5, exhaust from the steam boost fluid pressure pump is fed to the bimetal control element of the automatic choke system standard today in most cars (instead of hot air from the intake manifold structure) as this provides very rapid removal (less than 30 seconds) of the enrichment necessary to get vapor sufficient at cold temperatures to start any car (FIG. 21). By doing this we get the full benefit of the disclosed system to operate lean almost immediately after starting due to the recycle of heat energy in the form of exhaust and steam to give the needed fuel vaporization even with a lean mixture.

The disclosed system increases the engine efficiency. This increase in efficiency is in part due to the increase in the average temperature of the combustion cycle. Engine efficiency increases as the temperature of the working fluid. Therefore anything that can be done to raise the temperature of the steam that is put in the engine will raise the efficiency of the engine for the normally anticipated amount of steam to be used in the cycle (30% steam by weight of fuel used). If the steam in temperature is 1550° F. and the steam out temperature is 550° F. an over 11% increase in cycle efficiency occurs. It is proposed, therefore, that in new design the flash boiler be arranged to have access to the full combustion temperature at the surface of the combustion chamber. A flash boiler tube could be placed in a thermoplug having its surface on the surface of the inside of the combustion chamber. Alternately, it could be provided in the design to have it as a part of the exhaust valve seat to thereby provide cooling of the exhaust valve seat at the same time it picked up desired extra high inside combustion chamber temperatures. As an alternate to this, a heat pipe could be placed around the seat of the exhaust valve or in a part as described before to the inside combustion chamber surface and the extension of this heat pipe could be used to heat the flash boiler. the heat pipe was first put forward in 1942 by Richard S. Gaugler of General Motors Corporation and more recently put to work by George M. Grover of the Los Alamos Scientific Laboratory. The heat pipe is essentially a closed evacuated chamber whose inside walls are lined with a capillary structure or wick that is saturated with a volatile fluid. The operation of the heat pipe combines two familiar principles of physics: vapor heat transfer and capillary action. Vapor heat transfer is responsible for the transporting of the heat energy from the evaporator section at one end of the pipe to the condenser section at the other end. The heat pipe capillary action is responsible for the returning the condensed or heat fluid back to the evaporator section to complete the cycle. Current development of the heat pipe was described in May 1968 in Scientific American. It is also proposed to use this heat pipe action to carry heat down into the working area of our thermal and catalytic reactor within the exhaust manifold and down at the gasket section between the exhaust manifold and the exhaust pipe. This is necessary to give the required high temperature and the required residence time in flight at high temperature for completion of the combustion reaction.

In one specific embodiment of the present invention the water tank is mounted in the engine compartment above the engine to provide gravity feed. A maximum amount of gravity feed is obtained by placing the water tank high and by placing a flash boiler low in the engine compartment.

The flash boiler is heated by the exhaust gas, and the flow of water into the flash boiler is controlled by a variable orifice flow control valve in response to the exhaust gas temperature. As the temperature goes up, the valve opens to permit more water to flow into the flash boiler, and this produces more steam. Thus, the amount of steam injected is controlled in response to the engine's need for the steam.

Regulating the flow of the water, rather than the flow of the steam, simplifies the control and minimizes problems of high temperature corrosion.

Various constructions of the flash boiler can be used, depending on the installation and other factors.

Ultrasonic energy is added to the steam injected. The ultrasonic energy can be developed by the steam itself by passing the steam through whistles, or the ultrasonic energy can be developed by other means. The ultrasonic energy improves mixing and distribution.

The invention also provides for the combination of steam, catalysts and ultrasonic energy with the fuel-air mixture to produce hydrogen gas. The hydrogen gas improves combustibility so that the engine can be operated on a leaner fuel-air ratio. The hydrogen also improves heat transfer and distribution.

The prior art proposals injected water or steam into a decreasing vacuum field (max vacuum at idle and min at full throttle). This is diametrically opposite to the desired condition which is to inject into a field where the vacuum increased from zero at idle to max at full throttle.

This ideal is approached in FIGS. 102–110 and FIG. 121 with input through the idle screws. The small vacuum remaining at idle is made effectively zero by use of a standing column of water (equal to or slightly greater than the idle screw idle vac. in inches of water) connected at one end to the flash boiler input and at the other end to the fluidic drain valve. This system permits use of a common tube connection to a resilient collapsible wall accelerator-decelerator reservoir to add or remove water flow to the flash boiler to match engine need for quantity and quality of steam under dynamic change conditions.

The use of a decreasing vacuum field to produce an increasing vacuum input effect for the fluid is shown in the inverter system, FIGS. 106–118. The inverter provides the ideal zero vacuum at idle (so no fluidic drain column is required).

As shown in FIG. 106, the vacuum continues to smoothly increase until full throttle is approached, where it drops off rapidly. As shown in FIGS. 106, 117 and 110 this is corrected by applying above the water exhaust manifold total pressure either directly or through a low inertia fluidic valve to half wave rectify the alternating exhaust pressure and also applying this exhaust pressure to the inverter. This provides an increasing exhaust pressure (super atmospheric) over the water to correct for the vacuum decrease at full throttle noted above. The result is a steady increase in differential pressure of atmospheric total pressure over the tank water minus the total pressure at the fluid inlet point via the inverter which starts at zero at idle and which steadily increased with increasing power to max at full throttle. The inverter follows the power demand, giving zero flow at idle and steadily increasing fluid flow with increased power up to full throttle. On deceleration the fluid flow is fully cut off and any excess fluid is drained. On acceleration exhaust pressure over the top of tank fluid provides the extra fluid needed during acceleration. At engine off all fluid flow to the engine is instantly cut off, and drainage for any possible fluid in the engine fluid line is also provided. Air lean-out at engine cut-off is provided to aid in preventing dieseling (afterfire).

The inverter also provides air bleed lean-out proportioned to power to provide the additional air lean-out the engine is capable of using when operating with the described invention to give best economy and minimum emissions.

The fluid flow, in one specific embodiment of the present invention is controlled by a variable orifice valve responsive to heat flux produced by the engine so that an increase in heat flux results in an increase in the amount of fluid supplied to the engine. In this embodiment of the invention a very desirable control function is produced on an increase in heat flux because of a regenerative feedback resulting from an increase in the fluid flow. This regenerative effect is also effective on a decrease in heat flux to provide a rapid decrease in the fluid flow as a function of the decreasing fluid flow initially produced by the decreased heat flux. This heat flux fluid flow responsive system coacts with dynamic engine operating conditions to provide both a rapid control response and a response in the direction desired.

In another specific embodiment of the invention a pulse pump is operated by the pulsations in the engine exhaust gas pressure and is effective to pump water (or a mixture of water, fuel and air) to a thermal control valve (or to a reactor in the case of a mixture of pumped water, fuel and air) using the power available from the engine exhaust pressure. The pulse pump is effective to pump the fluid in direct relation to the various engine operating conditions.

Fluid injection apparatus and methods which incorporate the structure and techniques described above and which are effective to function as described above, constitute specific objects of this invention.

Other objects, advantages and features of my invention will become apparent from the following detailed description of one preferred embodiment taken with the accompanying drawings.

BRIEF DESCRIPTION OF THE DRAWINGS

In the drawings:

FIG. 5 is a diagrammatic view of a combustion and emission control system as disclosed, similar to FIG. 3 with the addition of a water acceleration pump and shut off valve, and a steam powered pump to boost the pressure of the fluid feed to the flash boilers and the addition of spark ozone generator as a part of the feed into the induction system and the addition of a spark ignition thermal and catalytic reactor at the gasket between the exhaust manifold and the exhaust pipe.

FIG. 6 is a diagrammatic view, partly in cross section and partly isometric, of a further form of the disclosed invention basically similar to FIG. 5, but using an electric pump instead of a steam pump.

FIG. 7 is a detail of FIG. 6 of the exhaust transfer line at the tee, isometric with a partly broken away cross-section section to show the routing of the three flash boilers.

FIG. 8 is an isometric view partly broken away to show the three flash boilers extending from the exhaust transfer line scoop into the exhaust pipe at the lower end of the exhaust transfer tube of FIG. 6.

FIG. 10 is an isometric view partly broken away to show flash boiler details and is a further form of the invention disclosed herein.

FIG. 12 is a further form of the invention shown in diagrammatic view partly in cross section and partly isometric.

FIG. 21 is an isometric view of a typical automotive exhaust manifold from the exhaust flange side showing in phantom the location of the flash boilers.

FIG. 22 is an isometric view partly in section of the end of our exhaust transfer line connected to the manifold to exhaust pipe, gasket showing the feed through of, in this case, three flash boilers extending upward into the exhaust manifold, and is shown in assembly exploded relationship to the exhaust manifold of FIG. 21.

FIG. 25 is an isometric view of the exhaust pressure scoop used to provide "total exhaust pressure" to the fluid tank.

FIG. 26 is an isometric view of the adapter plate used between the carburetor and the intake manifold and it provides the PCV connection and also provides for input of the exhaust gas, steam, and air provided in the disclosed invention.

FIG. 27 is a detail partly in section of the air variable orifice valve connection to the adapter plate shown in FIG. 26.

FIG. 28 is a diagram in cross section and partly in phantom showing the variable orifice valve and its basic installation as used in the disclosed invention.

FIG. 29 is a diagram in isometric form exploded to show the various parts in their relationship to each other of the variable orifice valve as shown in FIG. 28.

FIG. 30 is a figure in cross section and phantom showing a variable orifice valve showing a different variable orifice valve that can also, in some cases, be used in the disclosed invention.

FIG. 31 is a diagram in isometric and exploded to show the relationship of the parts of the variable orifice valve as shown in FIG. 30.

FIG. 32 is a diagram in isometric, with a section broken away to show interior detail of the fluid tank used in the disclosed invention.

FIG. 33 is an isometric view in cutaway cross section to show detail of the "exhaust pressure rectifier" used in pressurizing the fluid tank in FIG. 32.

FIG. 34 shows a plot of the alternating exhaust pressure in p.s.i.g. versus time under idle condition (no time scale intended).

FIG. 35 shows the alternating exhaust pressure wave versus time in p.s.i.g. at full throttle (no time scale intended).

FIG. 36 is a plot in the lower part of pressure in p.s.i.g. positive and negative, versus car miles per hour speed showing the exhaust gas pressure, water pressure, and steam pressure. The upper plot of the same figure is the differential pressure which is a replot of the lower figures in p.s.i.g. versus car miles per hour, again of the exhaust pressure, water pressure, and steam pressure, all as used in the disclosed invention.

FIG. 37 is a drawing in cross section showing the details of a steam turbine driving a fluid turbine to boost the pressure of the flash boiler feed system.

FIG. 38 is an isometric view of FIG. 37 as used in the proposed invention.

FIG. 39 is a diagrammatic view partly in cross section of a double acting steam powered fluid pump to boost the flash boiler feed system pressure as used in the disclosed invention.

FIG. 40 is a plan view of a vacuum spark advance rate control valve.

FIG. 41 is a cross section view along section line 41—41 of FIG. 40 advance rate control valve useful in the disclosed invention.

FIG. 42 is a diagrammatic drawing in part in cross section of a conventional system showing the vacuum spark advance system at idle condition.

FIG. 43 is a diagram partly in cross section of the disclosed invention advance rate control system at idle condition.

FIG. 44 is similar to FIG. 42, shown under acceleration condition.

FIG. 45 is similar to FIG. 43 but shown under accelerator condition.

FIG. 46 is similar to FIG. 42 but shown under the decelerate condition.

FIG. 47 is similar to FIG. 43 but shown under decelerate condition.

FIG. 48 is a diagrammatic view of a mechanically driven acceleration boost pump for use in the disclosed invention and as specifically shown in detail for application in FIG. 12.

FIG. 49 is an electrically driven fluid boost acceleration pump for use in the disclosed invention and as specifically set for application to FIG. 12.

FIG. 50 is a vacuum powered fluid acceleration pump used in the application of the present invention and as specifically set for application to FIG. 12.

FIG. 56 is a fragmentary view, partly broken away to show details of construction, of another embodiment of a flash boiler and variable flow control valve constructed in accordance with the present invention. Details of construction of the variable orifice flow control valve are shown in FIG. 60.

FIG. 57 is an isometric, diagrammatic view of a low water level indicating system for the embodiment shown in FIG. 53. In FIG. 57 the pickup is a capacity pickup.

FIG. 58 shows an inductive pickup for the warning system shown in FIG. 57.

FIG. 59 is a fragmentary elevation view, partly broken away to show details of construction, of a water tank and flash boiler arrangement which is particularly adapted for new car installation as part of the original equipment.

FIG. 60 is a side elevation view, mostly in cross-section, of the variable area orifice flow control valve used in the FIG. 56 flash boiler embodiment.

FIG. 61 is an elevation view in cross-section through a carburetor showing a conduit connection to the ported vent of the carburetor for injecting steam into the engine and having an orifice for producing shock waves in resonance in the injected steam to enhance intermixing of the steam, fuel, vapor and air inducted into the engine.

FIG. 62 is a view like FIG. 61 showing two different ways of injecting steam into the carburetor while producing resonant shock waves in the steam. FIG. 62 illustrates an electro mechanical resonance generator in the lower part of the figure for producing resonance in steam injected into the ported vent of the carburetor. FIG. 62 shows a whistle arrangement in the air filter housing for producing resonance in steam injected into the air filter housing. Further details of the whistle arrangement are shown in FIGS. 71 and 72.

FIG. 63 is a view like FIG. 61 showing a whistle connected in the steam inlet conduit for producing shock waves in the steam injected through the ported vent.

FIG. 64 is a fragmentary cross-section view showing a clamp arrangement for holding a wire (associated with the movable valve element of the variable area orifice flow control valve of the FIGS. 56 and 60 embodiment of the flash boiler) in an adjusted position.

FIG. 65 is an isometric view of the clamp arrangement shown in FIG. 64

FIG. 66 is a side elevation view in cross-section showing a floating check valve associated with the outlet conduit of the water tank for preventing back flow of water on acceleration of the engine and resulting pressure build-up in the outlet conduit because of increased generation of steam.

FIG. 67 is an elevation view showing how an embodiment of a flash boiler constructed in accordance with the present invention is associated with the exhaust gas conduit and the air inlet conduit of a rotary engine for injecting steam into the combustion chamber of the rotary engine.

FIG. 68 is a side elevation view in cross-section of a gas turbine engine showing how a concentric tube flash boiler constructed in accordance with the FIG. 54 embodiment of the present invention is associated with the exhaust and the combustion chamber of a gas turbine engine for injecting steam into the combustion chamber of the gas turbine engine.

FIG. 69 is a fragmentary view showing how a flow-through flash boiler constructed in accordance with another embodiment of the present invention is associated with the gas turbine engine shown in FIG. 68.

FIG. 70 is a side elevation view showing how a flash boiler constructed in accordance with an embodiment of the present invention is associated with the combustion chamber of a stationary heater (such as used for power plants or a building heater) for injecting steam into the combustion chamber of the heater.

FIG. 71 is an enlarged fragmentary view in cross-section of the part of an air filter for an internal combustion engine which has a whistle arrangement for producing resonant shock waves in steam injected into the engine through the air filter housing in accordance with the embodiment of the invention shown at the top of FIG. 62.

FIG. 72 is a top plan view, in cross section taken along the line and in the direction indicated by the arrows 72—72 in FIG. 71.

FIG. 73 is an enlarged view in cross section of the whistle arrangement shown in FIG. 63. FIG. 73 shows an adjustable stop for setting the frequency of the whistle.

FIG. 74 is a top plan view, in cross section, through a carburetor adaptor plate showing how a series of whistles are formed in the steam inlet conduit for producing resonant shock waves in the steam injected and for focusing the shock waves so produced to increase the effectiveness of the intermixing produced by the shock waves.

FIG. 75 is an enlarged fragmentary view showing a portion of one of the whistles incorporated in the FIG. 74 embodiment.

FIG. 76 is a fragmentary side elevation view in cross section taken along the line and in the direction indicated by the arrows 76—76 in FIG. 75.

FIG. 79 is an isometric, diagrammatic view showing another installation of the water tank in the engine compartment constructed in accordance with another embodiment of the present invention. The water tank shown in FIG. 79 is of a doughnut configuration of fit around the air filter housing and beneath the hood above the engine. In the FIG. 79 embodiment separate water tanks are also provided to provide water for radiator refill, for the windshield washer and for water for the passenger compartment, and these separate and additional tanks are filled through a single fill point in the water tank for the flash boiler and by one-way flow control valves as shown in FIGS. 80–82.

FIG. 80 is a fragmentary enlarged view showing a one-way flow control valve in one of the additional water tanks with the flow control valve in the open position for flow from the flash boiler water tank to the additional tank.

FIG. 81 is a side elevation view in cross-section like FIG. 80 but showing the one-way flow control valve closed to prevent the flow of water back from the additional tank to the water supply tank for the flash boiler.

FIG. 82 is a side elevation view showing the connections between the water supply tank for the flash boiler and the additional tanks for the radiator refill, the windshield washers and the automobile passenger compartment.

FIGS. 86–91 are isometric diagrammatic views illustrating a technique for installing the flash boiler of the FIG. 77 embodiment of the present invention in the exhaust pipe.

FIG. 102 is an isometric view of another embodiment of an emission control system constructed in accordance with the present invention. In the embodiment shown in FIG. 102 the steam is conducted to the engine through connections to both the idle adjustment screw of the carburetor and a connection to the ported vent of the carburetor.

FIG. 103 is an end elevation view taken generally along the line and in the direction indicated by the arrows 103—103 in FIG. 102, showing details of a flexible wall accumulator which is resilient so as to be collapsible proportional to engine vacuum and showing details of a fluidic control drain valve which can be incorporated in the FIG. 102 embodiment.

FIG. 104 is an isometric view showing a combined flexible wall accumulator and fluidic control drain valve (which can be used in place of the structure shown in FIG. 103) in the FIG. 102 embodiment of the emission control system.

FIG. 105 is an elevation view of the FIG. 102 embodiment (but showing a two-barreled carburetor in place of the single barreled carburetor of FIG. 102) and incorporating the combined accumulator and fluidic control drain valve structure of FIG. 104 rather than the structure shown in FIG. 103.

FIG. 106 is a diagram showing the manner in which the vacuums within the engine manifold, at the ported vent, at the idle screw and at the inverter (FIGS. 112-118) respectively vary with changing throttle openings.

FIG. 107 is an elevation view like FIG. 105 but showing another embodiment of the present invention in which a regulated amount of fuel may be mixed with a regulated amount of water and is then heated within the flash boiler reactor to produce precombustion reactions of these two materials before they are introduced into the engine induction system at the idle adjustment screw. In the embodiment shown in FIG. 107 one of the precombustion reaction products is free hydrogen ahead of the cylinder when either fuel is mixed with the regulated amount of water or additives are added to the water tank.

FIG. 108 is a side-elevation view, partly in cross section to show details of construction, of one embodiment of an idle adjustment screw which incorporates a resonating chamber for producing ultrasonic injection of the materials introduced into the engine induction system through this idle adjustment screw. FIG. 108 also shows a variable orifice air bleed construction associated with the idle adjustment screw for introducing additional lean-out air if desired and in proportion to changing intake vacuum at the idle adjustment screw.

FIG. 109 is an elevation view in section of the flash boiler and water feed control to the flash boiler as shown encircled by the arrows 109—109 in FIG. 105.

FIG. 110 is an elevation view in cross section of a reactor which is particularly well adapted for incorporation in the part of the FIG. 107 system as shown encircled by the arrows 110—110. The FIG. 110 reactor can also be used in place of the FIG. 109 structure in the FIG. 102 and FIG. 105 embodiments. The reactor shown in FIG. 110 incorporates a flash boiler as an integral part of the reactor and readily produces precombustion reaction products because the flash boiler is exposed directly to exhaust gas temperatures in the range of 1,000 to 1,800 degrees Farenheight. The reactor shown in FIG. 110 is a preferred, integrated form of flash boiler and water and fuel feed control. Total exhaust manifold pressure tube for use in inverter FIGS. 112-118 is shown.

FIG. 111 is a cross sectional view taken along the line and in the direction indicated by the arrows 111—111 in FIG. 110 and shows flow slots for permitting the metered feed water or combination of feed water and fuel to flow from the metering valve to the flash boiler. Also the exhaust total pressure port is shown.

FIG. 112 is a side elevation view in cross section of an inverter apparatus for converting a vacuum existing below the butterfly in the carburetor from a vacuum that decreases with increasing engine power to a vacuum which increases with increasing engine power. FIG. 112 shows the inverter apparatus with the parts in the relative positions assumed at idle condition of operation of the engine. FIG. 112 also shows an ultrasonic device for generating ultrasonic waves to aid in mixing the fuel, air and steam using the flow energy of the PCV system and the added steam and air provided through the inverter apparatus.

FIG. 113 is a cross section view taken along the line and in the direction indicated by the arrows 113—113 in FIG. 112.

FIG. 114 is a view like FIG. 112 but showing the parts in the operative position assumed when the engine is off and is not running.

FIG. 115 is a view like FIG. 112 but showing the operative parts in the relative position assumed at part throttle operation of the engine.

FIG. 116 is a view like FIG. 112 but showing the operative parts in the relative positions assumed at full throttle operation of the engine.

FIG. 117 is an elevation view of another embodiment of an emission control system constructed in accordance with the present invention and incorporating the inverter apparatus of FIG. 112 and the reactor apparatus of FIG. 110.

FIG. 118 is an elevation view of another embodiment of an emission control system constructed in accordance with the present invention and incorporating a dual valve arrangement for using a decreasing vacuum field to produce an increasing vacuum effect.

FIG. 119 is an elevation view in cross section through a valve construction which provides an increasing air orifice bleed with decreasing vacuum of the manifold below the carburetor. The FIG. 119 valve construction is usable in the FIG. 102 and FIG. 105 embodiments to provide additional lean out air on increasing throttle to optimize the fuel air ratio as permitted by the system of the present invention.

FIG. 120 is a view of the movable valve element of the FIG. 119 valve construction.

FIG. 121 is a side elevation view, in cross section, of an injector assembly constructed in accordance with another embodiment of the present invention for injecting fluid at the idle screw opening of the carburetor.

FIG. 122 is a side elevation view of another embodiment of an emission control system constructed in accordance with the present invention. In the embodiment shown in FIG. 122, water is injected into the carburetor at a point (such as the idle adjustment screw) where the vacuum increases with increasing throttle opening and in a metered amount which is controlled by both changes in engine operating temperature and changes in vacuum conditions. In the FIG. 122 embodiment a flash boiler is not utilized and waater (or water with additives) is injected into the engine intake without being converted to steam prior to injection, although in the FIG. 122 embodiment a certain amount of heat is added to the water.

FIG. 123 is a side elevation view of another embodiment of an emission control system constructed in accordance with the present invention. In the FIG. 123 embodiment the fluid injected into the engine is water, or a solution of water plus additives, and the amount of fluid injected into the engine is regulated by an inverter apparatus like that shown in FIGS. 112-117 so that the amount of fluid injected is metered in response to vacuum in the engine induction system, as modified by engine exhaust gas pressure at large throttle openings.

FIG. 124 is a view like FIG. 123 but shows an embodiment of the invention in which the exhaust gas pressure is rectified and supplied to the interior of the water storage tank.

Figure 125:
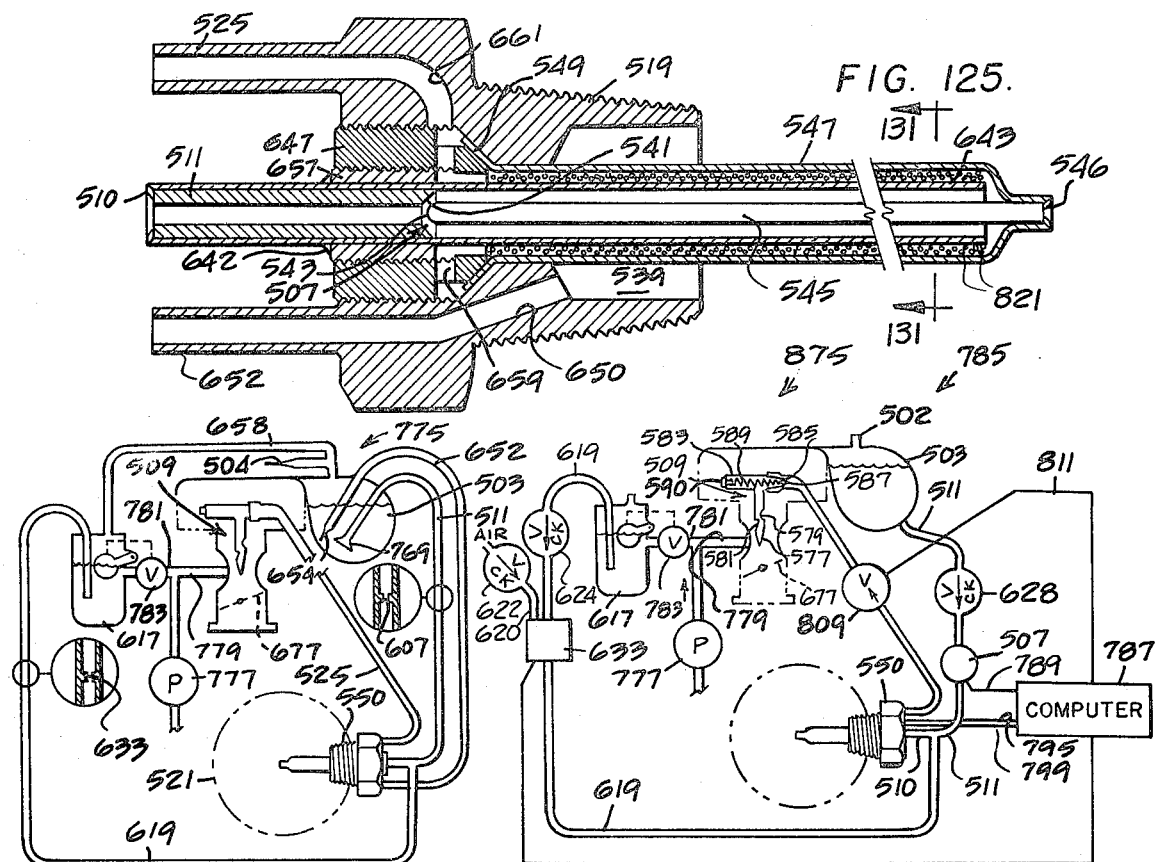

FIG. 125 is a side elevation view in cross section of a heat flux valve construction which controls the flow of fluid in response to heat flux produced by the engine. The FIG. 125 valve assembly can be used to control the flow of fluid in the entirely liquid form (such as water or water plus additives) or the FIG. 125 valve assembly can be used to control the flow of fluid in the form of steam or steam plus precombustion reaction products to the engine, depending upon the relative size of certain elements of the valve structure and/or the placement of the valve in the engine exhaust system (e.g. a location nearer the engine to produce a greater amount of heat transfer or a location farther from the engine to produce a lesser amount of transfer from the exhaust gases to the fluid flow controlled by the valve).

Figures 126, 128:
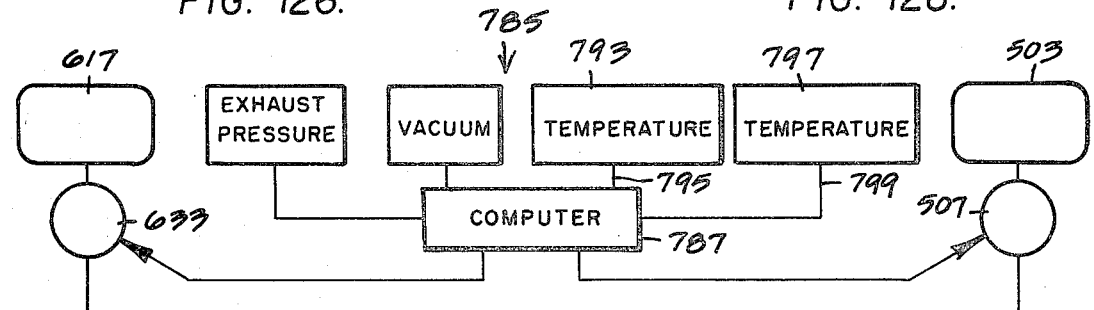

FIG. 126 is a side elevation view of another embodiment of an emission control system constructed in accordance with the present invention. In the FIG. 126 embodiment rectified engine exhaust pressure is used to provide the fluid flow past the control orifice rather than relying on engine vacuum for providing this fluid flow as in some other embodiments of the invention. The exhaust pressurized feed system of the FIG. 126 embodiment permits feeding the fluid into the top of the engine intake system above the carburetor but is not limited to feeding the fluid into the engine at this point in the induction system. In the FIG. 126 embodiment the fluid flow is controlled by heat flux and preferably uses a control valve assembly like that shown in FIG. 125.

Figure 127:
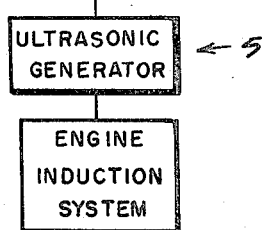

FIG. 127 is a diagrammatic view of an emission control system constructed in accordance with another embodiment of the present invention and incorporating a computer for sensing a number of enging operating conditions and controlling a variable orifice valve which regulates the flow of aqueous fluid. The computer, as illustrated in FIG. 127, can also be used to control a second variable orifice valve for regulating the flow of fuel to be combined with the aqueous fluid in a reactor before feeding to the engine.

FIG. 128 is an elevation view of a specific embodiment of an emission control system incorporating the computer controlled system shown in FIG. 127. FIG. 128 also illustrates how the computer controlled system of FIG. 127 is incorporated in a system similar to the mechanical system illustrated in FIG. 127.

Figure 129:
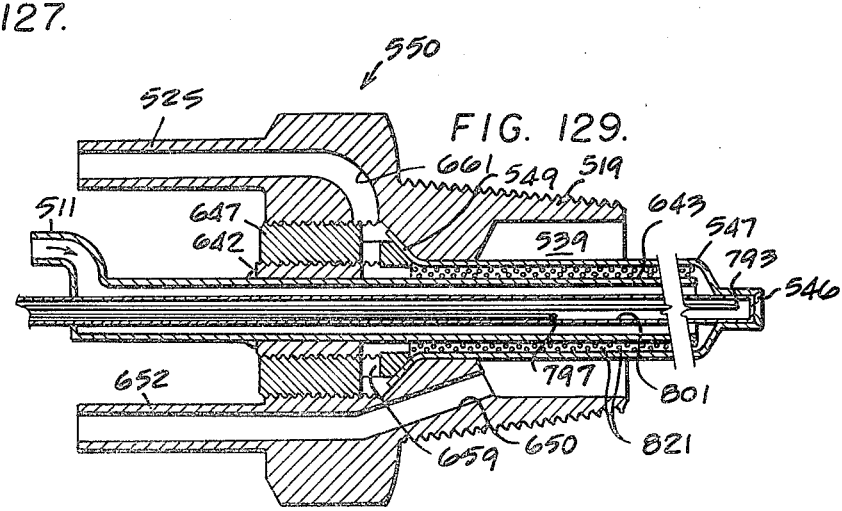

FIG. 129 is a side elevation view in cross section of a reactor used in the FIG. 127 and FIG. 128 system. FIG. 129 illustrates how two thermocouples are positioned to the reactor structure to provide a temperature differential reading which is used as one control signal for the computer controlled system shown in FIGS. 127 and 128.

FIG. 130 is an elevation view in cross section of a pulse pump operated by engine exhaust pressure and effective to pump either water alone to a thermal control valve such as, for example, the FIG. 125 valve or a mixture of water with fuel and air to a reactor of the kind shown in FIGS. 126 and 128, or in FIG. 129.

FIG. 131 is a fragmentary enlarged view in cross section taken along the line and in the direction indicated by the arrows 131—131 in FIG. 125 and shows a monolithic type of catalyst which can be used with the FIG. 125 reactor for both lowering the temperature at which the fuel reforming process can occur and for adding heat to the process in the reactor.

DESCRIPTION OF THE INVENTION

Figure 1:
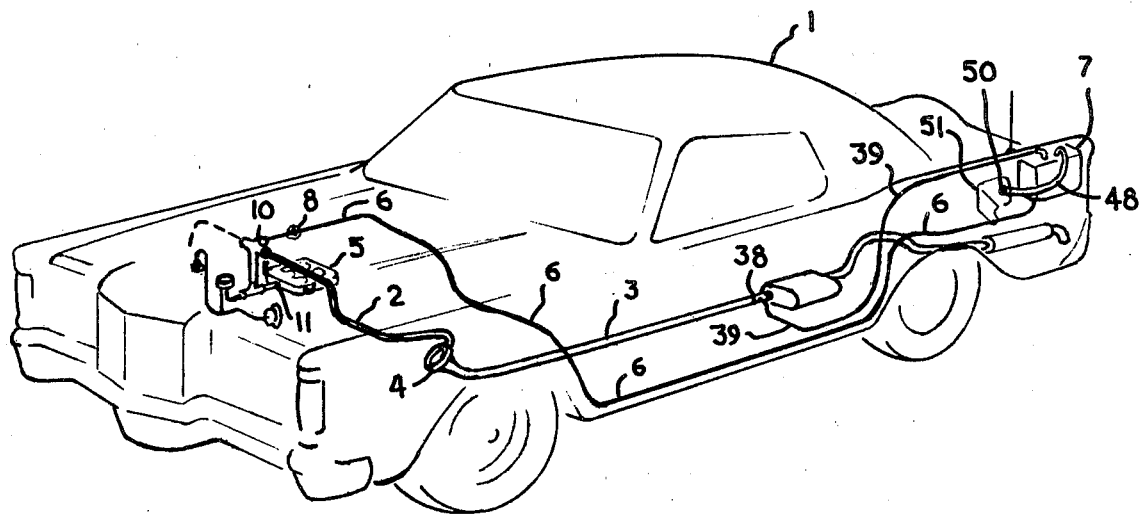
FIG. 1 is a phantom isometric view of a 1969 Continental Mark III car with one embodiment of the disclosed combustion improvement and emission control system installed.
Figure 2:
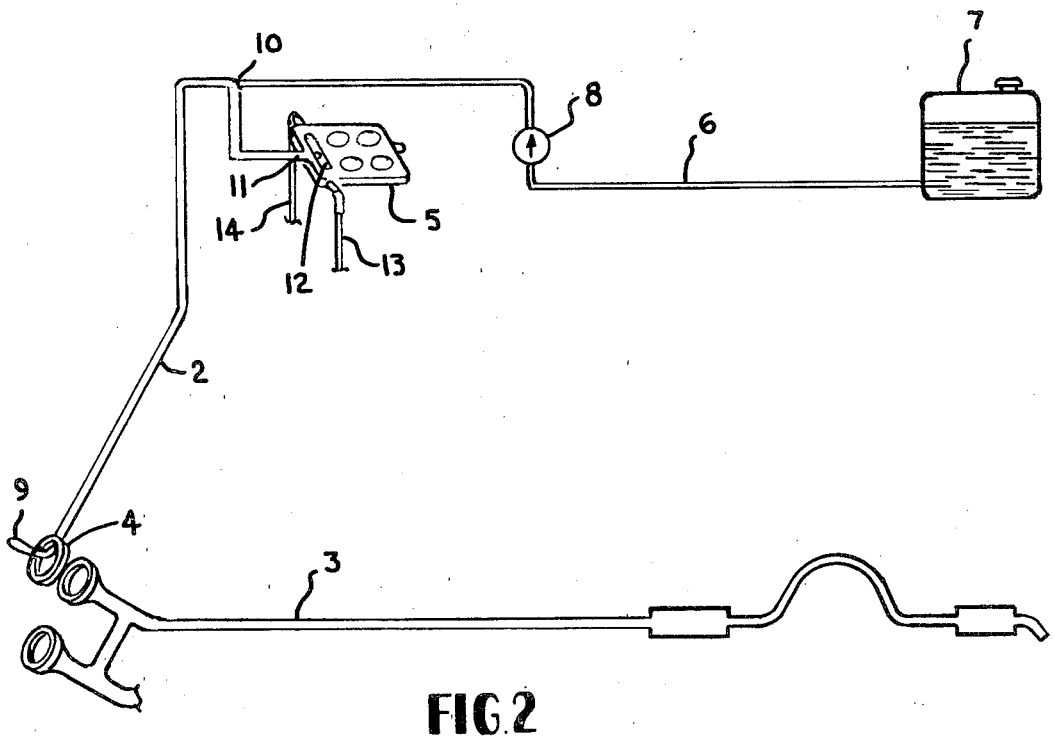
FIG. 2 is a diagrammatic view partly in isometric of one simple form of the disclosed combustion and emission control system.

Referring now to FIG. 1, the disclosed invention ois shown installed in an automobile 1. Exhaust transfer line 2 is connected to the auto exhaust system 3 by means of a special adapter gasket 4. The opposite end joins carburetor adapter plate 5. Fluid carrying line 6 transfers fluid from tank 7 through check valve 8 to the flash boiler 9 joining it at 10 to its entrance into the exhaust transfer line 2. The exhaust transfer line is normally one-half inch to five-eighths inch diameter flexible corrugated stainless steel tubing. Flash boiler 9 may be stainless steel tubing 0.093 inches outside diameter. The flash boiler starts at 10 and passes down the exhaust transfer line to 4. Flash boiler is then formed to go forward into the exhaust manifold as shown in more detail in FIGS. 21 and 22 and returns into adapter gasket 4 and into the exhaust transfer line and terminates at the far end of the exhaust transfer line at 11 before entering adapter plate 5. Refer to FIG. 2 involving the basic system of the disclosed invention in its simplest form as shown in FIG. 2. Engine vacuum below the adapter plate 5 in the system shown in FIG. 2 typically will be, at idle, in the order of nineteen to twenty-one inches of mercury vacuum. Details of adapter plate 5 are shown in FIG. 26. This vacuum which provides the force to draw the water from tank 7 through line 6, check valve 8, and into the flash boiler starting at 10 and carries the water down the flash boiler tube inside the exhaust transfer line steadily rising temperature gradient until it reaches 4 and goes into the very hot exhaust gases of the exhaust manifold, superheating the steam and then carrying it back through the flash boiler return line still surrounded by hot exhaust gases, to keep the steam at a very elevated temperature as it is carried clear back to 11 where flash boiler 9 ends before the entrance to plate 5. Exhaust transfer tube ends at 11 and the steam with the turbulent hot exhaust gases flows into the induction system at plate 5. There is a gradient of increasing temperature between 11 in exhaust transfer line 2 because of the heat transfer to the surroundings through the walls of the exhaust transfer tube 2. Provision of a rising temperature gradient in the flash boiler from the point of its entrance at 10 on down to 4 is important as it provides a great degree of stability in the flash boiler. The water entering the flash boiler at 10 is converted to steam after it has gone only a short distance down the flash boiler 2. As the engine's power is dropped, vacuum therefore increases as the throttle is closed. The increased vacuum and decreased temperature draw the water much farther down the flash boiler before it converts to steam. For good operation it is designed so that the water point never will go past the very high temperature of the flash boiler as it is extended out into the hot exhaust gases of the manifold. Thus, only steam will be fed into the engine from the flash boiler. It assures that steam will be formed in the flash boiler as it enters the hot exhaust gases and this steam so formed will stay as steam because it is surrounded by hot exhaust gases of the exhaust transfer line all the way from 4 back to 11 and on into the plate 5. The use of the adapter gasket 4 shown in more detail in FIGS. 21 and 22 is very simple and convenient as a way to obtain the very high temperature exhaust gas needed and at the same time superheat the flash boiler. In FIG. 26 the exhaust transfer line is made from spiral corrugated flexible stainless tubing, causing rotation and turbulence to a high degree in the exhaust gas for excellent mixing with the superheated steam, and together the hot turbulent exhaust gas and steam provide the energy to vaporize the gasoline and air mixture to provide excellent mixing and distribution. Approximately one gallon of water is consumed for every five gallons of fuel. Therefore, in a large car approximately five gallons of water is desirable. Normally the water tank should be placed at the nearest convenient point to the engine, but in a modern car we find little space available near the engine and it is sometimes necessary then to locate the water tank in a wheel underwell or in the trunk as shown in FIG. 1. The low silhouette of the modern car also makes it more difficult to avoid the potential liquid lock that can occur in the car when it is tipped (as on a hill) so that the tank level of the fluid is higher than the flash boiler exit adjacent to plate 5. In this situation water will carry through the flash boiler system and into plate 5 and end up in the engine cylinders, causing what is called liquid lock. The water enters any open intake valve and enters the cylinder combustion chamber so that when the engine is started the next time, it comes up solid as it is full or partly full of liquid. It is a dangerous situation, because it can cause serious engine damage; if just the critical amount of fluid occurs to lock a cylinder at near top dead center and the engine is turning fast or starts to fire it can bend a link rod. FIG. 2 shows drain lines 13 and 14 of one-eights inch copper tubing, for draining water away from the engine. FIG. 26 shows raised passage 16 with ledge 15 in drain groove 12 which helps to control any water, keeping it within the drain groove 12 to let it drain through drains provided, such as tubes 13 and 14 of FIG. 2. The wide and large entrance 16 provides for easy, complete flow of the exhaust gas and steam mixture into the intake system. The plate holes 17, 18, 19 and 20 are the matching holes to the four barrels of the carburetor above the plate. The PCV tube connection 21 connects to 22 the passage for the PCV gases. In idling the flash boiler partially fills as the exhaust transfer line is cool and because the vacuum is high at idle in the system shown. As we accelerate the temperatures rise and the temperature of the exhaust transfer line increases, causing conversion of the held water in that line to steam, providing in part the extra steam needed for anti-detonant, anti-preignition agent during acceleration. The check valve is important as it prevents reverse flow in the water line 6 under conditions as just reviewed where steam is built up in the flash boiler. Absence of check valve 8 would cause an emptying of the flash boiler of residual water and during acceleration the above extra steam source would be unavailable.

The standard system, shown in FIG. 1 in a '69 model Mark III, has been on test for approximately six years using 91 octane no lead fuel.

Figure 3:
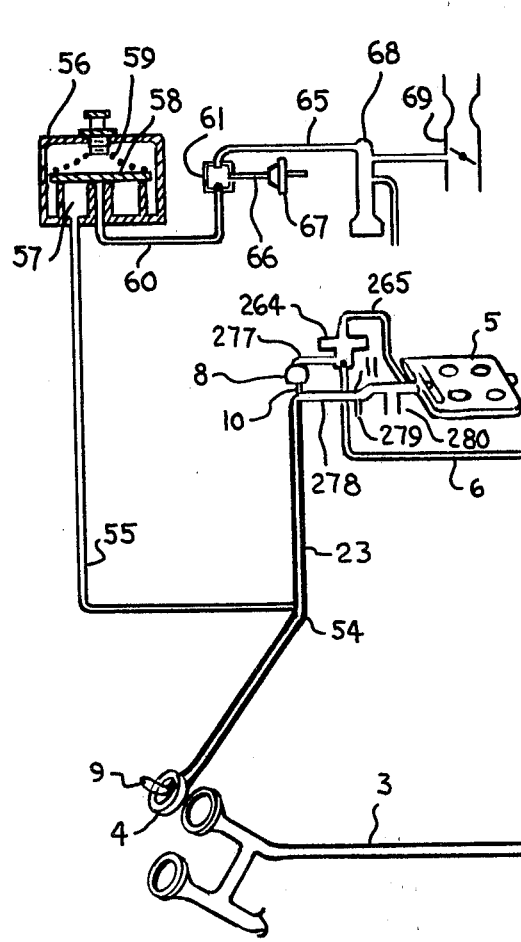
FIG. 3 is a diagrammatic view partly in isometric and partly in cross section of the basic emission and combustion control system as installed in the car of FIG. 1. The system is the same as FIG. 2 with the addition of several features such as the exhaust pressure feed system for the fluid tank and the feature of exhaust pressure controlled retard of the vacuum spark advance system in acceleration.

The system in FIG. 3 is similar to FIG. 2, but incorporates features that further extend its capabilities. Exhaust transfer line 23 incorporates a selected fixed orifice 278 matched to the engine displacement. The flash boiler stops at 11, just beyond the orifice, but before the safety drain 279; alternately, a variable orifice valve to control exhaust flow at 24 in FIGS. 5 and 6 can be used. The merits will be discussed in discussing these figures. This orifice is designed to provide a continuous flow of exhaust gas. The steam will remain hot all the way to the plate 5. The number of flash boilers may vary from one to three or more. If there is more than one flash boiler following exactly the same route and task, they would simply be manifolded beyond the check valve, and routing of the flash boilers is shown in FIG. 7, which is a cutaway isometric view of the T-section at point 26.

In FIGS. 5 and 26–28 are shown variable orifice valves designed to increase their area as the vacuum increases. This valve is shown in FIG. 28 and an exploded view in FIG. 29. In these two figures, 27 is the housing of the variable orifice valve, and 28 is the movable plunger that moves under the dynamic gas forces across the valve thereby changing the effective area of the valve. 29 is the restraining spring. 30 is a retaining washer with air hole in the center and 31 is a snap ring, shown in phantom. 5 is the carburetor adapter plate. Attached to the plate drain hole on one side is the tubing shown in phantom 32 with a drain hole at the bottom 33. Inlet tube 32 is braised to washer 30 at 34. 35 is an adjustable lean limit stop. 36 is the air intake tube. The air filter holder is 37. Limit stop 35 is adjusted to prevent 28 from moving farther than the optimum lean out point of the engine to prevent it from coming into the area of where combustion would be incomplete. If this is not provided, the system would lean out to the point where the engine lost power, then would swing back to provide extra richness to cause the engine to again operate and lean out again, and it tends to surge back and forth at the natural frequency of 29 and 28 as an undampened spring mass system. By providing the stop it holds very steady at the proper ideal lean point, but when it reaches any condition where it might have a momentary loss of stability and because of its leanness is about to lose good combustion and is therefore losing power because it is on the very lean side of the best power operation, the manifold pressure drops and this causes the valve body to have its port cross-sectional area abruptly reduced by motion of 28, by action of spring 29, plus the aid of gravity. This system provides stable combustion and low emissions. With this arrangement the engine can be set at a considerably lower fuel-air ratio and still operate stably. The valve shown is the ideal mounting for stability. With this arrangement, as the car goes over a bump, as you rise, the inertial force causes plunger 28 to come down and close the orifice, which richens the carburetor and increases the power to aid in the car smoothly going over the bump. Upon going down into a "valley", so to speak, of a bump, inertial forces acting on 28 cause it to rise, causing it to lean the mixture and reduce the power, thus cutting back on the power as the car goes into a valley. These are the opposite forces which come from the car striking these objects, for under the normal conditions as you strike a bump, on rise the car will be slowed down momentarily, while going down into a little valley, the car will be accelerated slightly. These forces are offset by this system as above disclosed automatically. The variable orifice valves can be turned over and mounted as shown in FIGS. 5, 26, and 27, provided the stop is used. Without the stop, if it were mounted in this (FIG. 26) position, it would create instability in the ride of the car in that the power forces upon striking bumps would be exactly wrong and reinforce the normal effects of the fore-and-aft motion (as described above) due to striking a bump. If the stop is not provided in the system regardless of which way the valve is oriented, it would be unstable and together with the engine causes surging and as the valve first richens (closes) slightly to compensate for a momentary loss of power and, being an undampened spring mass system, it overswings as it goes in the lean direction, causing the engine to be excessively lean, causing it to again "ask" for more fuel in relation to air, causing the valve to swing in the opposite direction, so it swings back and forth, oscillating, causing engine surge. This causes very poor idling and causes very poor emissions, since it is swinging into the area of poor combustion repetitively. In contrast, using the valve as shown with a stop, the system is very stable. The engine is set (with a fuel/air mixture ratio) and must be set on the lean side of best power. Thus, any increase in leanness rather substantially drops power and increase in richness raises power. It is necessary to operate in this lean area in order to be able to control emissions (providing an excess of air for complete combustion of the fuel and minimum CO and HC) and to provide a limit stop that is adjusted at idle for optimum leanness of the engine in conjunction with the carburetor idle adjustment settings to obtain the optimum leanness for low emissions at idle. While in operation and with the dynamic forces involved acting on the moving plug is set at essentially a zero force point so that as engine might start to have momentary low power in one or more cylinders for any reason, the valve will quickly and freely move in a closed orifice direction to richen the engine momentarily to avoid poor combustion, but the valve plug is prevented on the rebound from overrunning the ideal lean set point to go to excess lean-out and so poor combustion, as it would do in the absence of the stop. The recycling and overswing that would occur in the absence of the stop has been shown to cause seriously high emissions in both idle, low cruise and high cruise conditions. FIGS. 5 and 26 are shown as using two variable orifice valves, but by changing the dimensions of the valve involved, one variable orifice valve could be used instead. This single valve could be at the location of 27 or 28 or it could be in the exhaust transfer line as shown in FIGS. 3 and 6, for example.

Alternately, the single valve could have its junction to the plate at 11, or nearby. The system is much more stable if the location of the variable orifice valve for air enters the system at near the end of the line of exhaust transfer line rather than partway down the exhaust transfer line. It is possible to obtain a vacuum at the point 11 which is lower at idle and gradually increases with power in the car. This is a desirable characteristic as it allows us to use it to obtain a better control of out water supply, steam supply, and air and exhaust supply in relation to engine power, since these should increase with engine power throughout the cruising, operating range.

Control of the exhaust flow at 24, with a variable orifice valve which is of design similar to that of the valve is shown in FIGS. 28 and 29. Thus, as there is an increase in differential pressure across 24, there is increase in exhaust flow. The system of FIG. 2 works reasonably well in cruising range; it has difficulty at idling both in emission control and in reasonable idling smoothness. Drivability is difficult and adjustments are made to try to improve emissions in the low end. Further, at full power it suffers, for it has still full flow of exhaust that decreases the volumetric efficiency of the engine and therefore it does not reach quite full power capability of such a system, though because of the gains from adding steam, it does a job very close to that of the original engine, but not as good as can be done with the system with the addition of the variable orifice valves in the exhaust and in the air system as shown in FIG. 5. This situation is corrected, and we now have an engine which starts easily, idles smoothly, and has very low emissions.

FIG. 3 shows 38, an exhaust scoop to pick up total pressure as shown in FIG. 25 and transfer it through pressure transfer line 39, which is a one-quarter to five-sixteenths inch copper tube, to water tank 7, to pressure this tank and thereby provide higher water feed pressure to the flash boilers. This is important because otherwise we find that at conditions of operation of the system as in FIG. 2, which does not have the means of pressurizing the tank to increase the pressure to the flash boiler, and during operation at higher powers where the vacuum has diminished considerably that we run out of fill in our flash boiler and this results in less than the ideal amount of steam being provided to the engine and effects especially nitrous oxide formation at higher powers, and also seriously effects the detonation limits of the engine inasmuch as we are not providing one of the anti-detonants of the system, the two anti-detonants being, of course, the recirculated exhaust gas, which is a very good anti-detonant, but even more important is the hot steam, which is an exceedingly good anti-detonant and anti-pre-ignition agent. We need to have the flash boiler run partially full so that as we accelerate we can get extra amount of steam at acceleration by the sudden increase in temperature of the flash boiler occurring due to sudden power increase, and we also need to have a continuous feed of steam throughout the cruising and high power operation. This is the function which the pressurized system on the tank 7 provides. As soon as the engine is started, the pressure starts to build up in the tank to approximately one pound, and as the power further increases to cruising operation, the pressures build up to five pounds. Pressure at high powers, and in any case of acceleration, goes right up to seven pounds. Steam pressures that are accompanying this match the power, or, during acceleration, exceed it, because of the sudden increase in temperature of the flash boiler causing extra steam to be made, converted out of the residual partially cool flash boiler suddenly converting a higher percentage of this water into steam during the period of acceleration due to the sudden increase in temperature of the exhaust gases at the flash boiler in the exhaust manifold at 4 and in the exhaust transfer line 23. Water pressure to the flash boiler feed makes a very important change in characteristics of the system, greatly smoothes out the operation at higher powers, and eliminates detonation during acceleration in most all instances, when using 91 octane fuel in an engine designed for 100 to 101 octane fuel. Check valve 8 prevents the water partially filling flash boiler tube 9 and that in the region normally between 10 and 4 from being forced back into tank 7.

Referring to FIG. 25, the exhaust scoop pressure scoop is shown as 72 inserted into a hole that had been drilled inside of exhaust pipe 3. The scoop 72 picks up total pressure, exhaust dynamic pressure, plus static pressure and transfers it through pressure line 39 to tank 7. Scoop assembly 40 is readily installed by drilling a hole in the side of exhaust pipe 3 and then clamping it in place using clamps 41 and 42. Line 39 is a smooth tube not corrugated to avoid pressure loss. In FIGS. 32 and 33 exhaust pressure is fed through tube 39 to fittings 44 and 45 through the top wall of the tank 7 through a pressure check valve 46 having high-frequency characteristics. Check valve 46 (in FIG. 5) is made of thermosetting heat shrink plastic. By application of heat it is shrunk over tubular extension 52. The section of check valve 46, designated by 53, is flattened, clamping surfaces applied to either side of the tube to provide a medium pressure and applying temperature until the set point of the plastic is reached. The specific temperature needed varies with the particular plastic; with Teflon shrink plastic the necessary temperature is in the range of 300° F., but with a lower temperature plastic the temperature needed was in the order of 125°–200° F. The shrink plastic is formed in production by expanding plastic under heat and then locking it in this position by irradiation, so that later on when it is heated it will shrink back to its original size. It is a standard commercial product. Specifically to FIGS. 32 and 33, the fitting 44 is inserted through the tank plate 47 and also through 47 there is provided a bleed valve 53, which can be adjusted to provide desired small bleed-off of pressure from the tank so that the pressure can stabilize to atmospheric pressure after shut-down of the engine. Also attached through plate 47 is a fill tube 48 and within the fill tube is provided a small vent tube, running from one end to the other as shown by breakaway of fill tube 48 so vent tube 49 can be observed. At the end of fill tube 48 is a spring loaded cap 50 so that during filling the spring loaded cap will open and the nozzle is inserted into fill tube 48, but upon completion and removal of water fill nozzle, cap 50 automatically closes to assure the system is always closed during operation, so that pressure can be maintained in the entire system. (See FIG. 1) Fill cap 50 is located inside through back wall of the fuel tank fill compartment 52. This is done in order to assure that the service man will always refill the water tank each time he fills the fuel tank. The tank caps and connecting tubes are such that an error in tanks could not be made, filling a tank with the wrong fluid.

Referring to FIG. 3, the 1969–1970 vintage cars were designed for maximum economy and power and so were equipped with high compression high spark advance engines. Therefore all development testing was applied toward making the solution workable on even this tough environment. The system described so far in FIG. 3 essentially solves the problems of preignition and detonation for this class car, and of course for all others which are of lower spark advance and compression ratio. However there remained a small amount of detonation still under the most severe conditions of sudden full throttle at low rpm zero speed starting, and sometimes at transition change between gears at acceleration at about 60–65 miles per hour. To correct this problem I added an additional feature 56 as shown on FIG. 3— an exhaust retard control to the vacuum spark advance system. In FIGS. 34–35 we see a representation of the varying cyclic exhaust pressure wave, in 34 under the condition of idle, and in 35 under the condition of full throttle. Under modern well-designed cars, the exhaust system is tuned so the result is that during idle and cruising the average pressure of the exhaust is negative, as shown in FIG. 34. However, under sudden acceleration, the average pressure becomes positive, a positive two-pounds gauge as shown in FIG. 35 is a typical valve, as contrasted with a negative figure of minus one pound gauge in FIG. 34.

Figure 11:
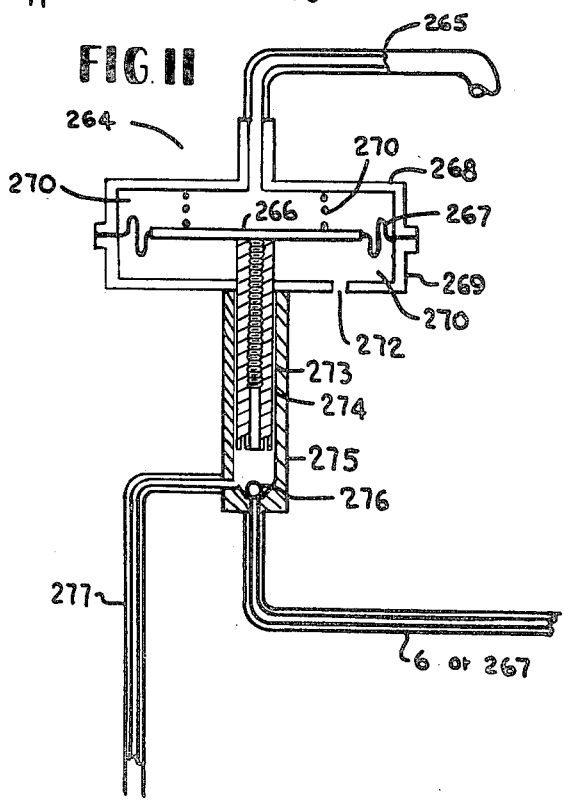
FIG. 11 is a diagrammatic view in cross section showing a vacuum operated water acceleration pump and cut off valve as used in FIGS. 3 and 4 in practice of the invention disclosed herein.

An additional feature 264 (vacuum controled water acceleration pump and shut off valve) has been added to FIG. 3 to aid further in desired automatic water and steam feed control. Referring to FIGS. 3 and 11, on starting the engine, vacuum immediately is present at adapter plate 5 and from there into vacuum line 265 drawing diaphragm plate 266, attached and sealed by flexible diaphragm section 267, up within chamber created by upper body 268 and lower body 269, to overcome spring force of 270 as the upper body chamber 268 is evacuated and the lower body chamber 271 is vented to atmosphere by vent hole 272. Upward motion of diaphragm 266 moves with it, attached piston 273 being secured by screw 274 to diaphragm 266. Piston 273 moves upward within cylinder 275, drawing water from line 6 past ball 276 checkvalve. Upon full throttle acceleration the vacuum drops to essentially zero momentarily, then rises to about 1.5 in. Hq. and spring 270 forces piston 273 down and the water in cylinder 275 out exit line 277 (as flow to line 6 is blocked by 276 ball check valve) and past check valve 8 and into the flash boiler at 10. The flash boiler converts this water to steam and emits the steam at 11 into the engine intake.

Thus the extra internal coolant, anti-preignition, and anti-detonant is provided at the instant most needed by the engine.

When any engine is set at optimum lean fuel air ratio for minimum exhaust emissions and the ignition key is turned off there is a strong tendency for the engine to afterfive (auto-ignition, also called dieseling). Acceleration pump 264 solves this problem. Since the manifold pressure drops from an idle setting of 9" to 4 to 4½" Hq. in autoignition the acceleration pump injects extra coolant into the engine at this very moment, caused by the manifold pressure drop. This extra internal coolant steam allows the engine to stop without auto ignition.

The acceleration pump 264 is also a fluid cut off valve. When the engine is off spring 270 forces piston 263 against ball 276 closing off all fluid flow from line 6 out of tank 7. In tests, pressure in line 6 even up to 50 p.s.i.g. did not cause leakage at ball 276 when engine was off. This, then, totally solves the problem of potential liquid lock from leaking fluid into the engine.

Figure 20:
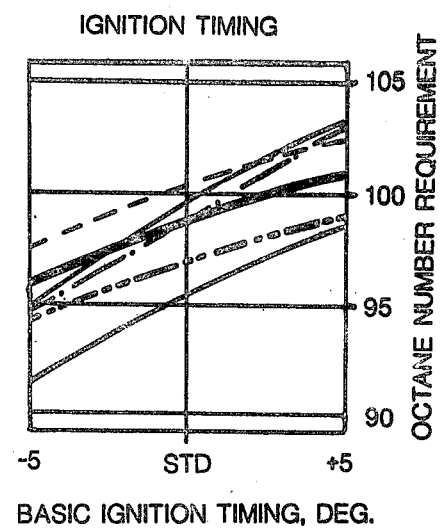
FIG. 20 is a diagram to show the effects of ignition timing on octane number requirement of various typical engines.

This shut off valve permits the tank vent 53 to be operated fully closed so that operating pressure up to 7 p.s.i.g. in the tank can be retained. The valve shuts off the moment the engine stops, thus providing dry flash boiler at time of restart to assure steam and not water enters the engine. The engine easily accepts the full 7 p.s.i.g. of water pressure through the flash boilers even at start up. In fact it permits remarkably slow steady idle even at start up. This change in average pressure is what I use in the exhaust pressure control to retard the vacuum spark advance at the time of sudden acceleration when detonation is most prone to happen. Under these conditions retarding spark timing is of substantial help as shown on typical engines of automotive practice today. In FIG. 20 the effect of increasing or decreasing spark advance is shown at the base and the octane number requirement for the engine is shown on the vertical scale. Spark retard of 10° is shown to be effective in reducing the octane requirement of 5 to 7 units. A typical engine today may have a spark advance control covering around 30°, so you can see the automatic retarding of the spark advance during acceleration can be very effective in eliminating detonation during this critical period. In FIGS. 34 and 35 it shows clearly why the rectifier, or we can call it of course a fast acting check valve, 53, shown in FIGS. 32 and 33, is necessary to otain pressure throughout the operating range in the tank 7. If it were not provided during idle, we would have a negative pressure in the tank instead of a positive pressure. The same would be true in cruising. It would only be at acceleration that we would have a small pressure build-up of about two pounds. In contrast, by using a fast acting check valve 46, we are able to obtain even at idle a positive pressure of one pound, and in acceleration, full throttle, pressure of about seven pounds. By use of shut off valve 264 as discussed above we can use the full seven pounds pressure even at idle.

Figure 4:
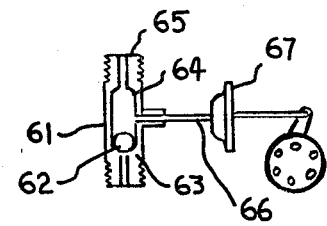
FIG. 4 is a diagrammatic view partly in section of a detail of FIG. 3 related to the exhaust controlled retard system in the vacuum spark advance control system.

Shown in FIG. 3 at junction 54, exhaust pressure line 55 provides pressure to control unit 56, and specifically to chamber 57, and since the exhaust pressure is negative in idle and cruise, this chamber is then below atmospheric pressure. However, at sudden acceleration, full throttle, this chamber then becomes pressurized, and causes diaphragm 58 to lift off its seat, overcoming spring pressure 59 and allows the exhaust pressure to pass through line 60 to check valve 61, shown in more detail in FIG. 4. Exhaust pressure moves check ball 62 off of the lower seat 63 to the top seat 64, thereby cutting off the vacuum from line 65, allowing the full exhaust pressure into line 66 to cause retard of the vacuum advance control unit 67 to its full retard stop. 68 is the thermal vacuum selector unit and 69 is the ported vacuum source at the carburetor. Exhaust retard control 56 effectively provides a means to very rapidly retard the spark upon going to full throttle at any power setting or at a passing situation at 60 miles per hour, for example. If the flow restrictions of 65, 68, 69 are sufficient and they usually are, the control check valve 61 can be eliminated. Check valve 61, however, does provide a slightly more positive control and does keep any contaminant from the exhaust gas from getting into line 65 and control unit 68 and in port 69. The above disclosed invention has been used for nearly two years in a Continental Mark III '69 model with very effective results in improvement of combustion, improvement of efficiency of engine operation using 91 octane no lead fuel without preignition or detonation in the engine. Most cars today in trying to meet as best they can the emission standards go into auto-ignition or preignition and this has been fully taken care of by the disclosed invention. Tests by an approved laboratory show reduction of emissions such that 1974 Federal standards for hydrocarbon and nitrous oxides have been exceeded, and it is expected soon that 1975 standards will have been exceeded with this design. In CO emissions 1980 standards have been exceeded. 55% improvement in mileage has been obtained, and a saving of approximately 5% in use of 91 octane no lead fuel instead of premium grade fuel, giving a total of over 60% saving in cents per mile.

It is believed that 1975-1976 standards can be met by at least that time using special fluids as additives to the water solution in the above disclosed system. A dilute solution of vinegar should be added to assure no scale formation in the flash boilers, or alternately other well-known products used in the industry for such descaling purposes. Hydrogen peroxide, $H_2O_2$, is a very strong oxidizing agent and can be used to further improve the combustion process. Ammonia solution is useful in reducing carbon monoxide and nitrous oxide emissions. Alcohol can be added to the water to aid in easy vaporization of the fuel.

Figure 9:
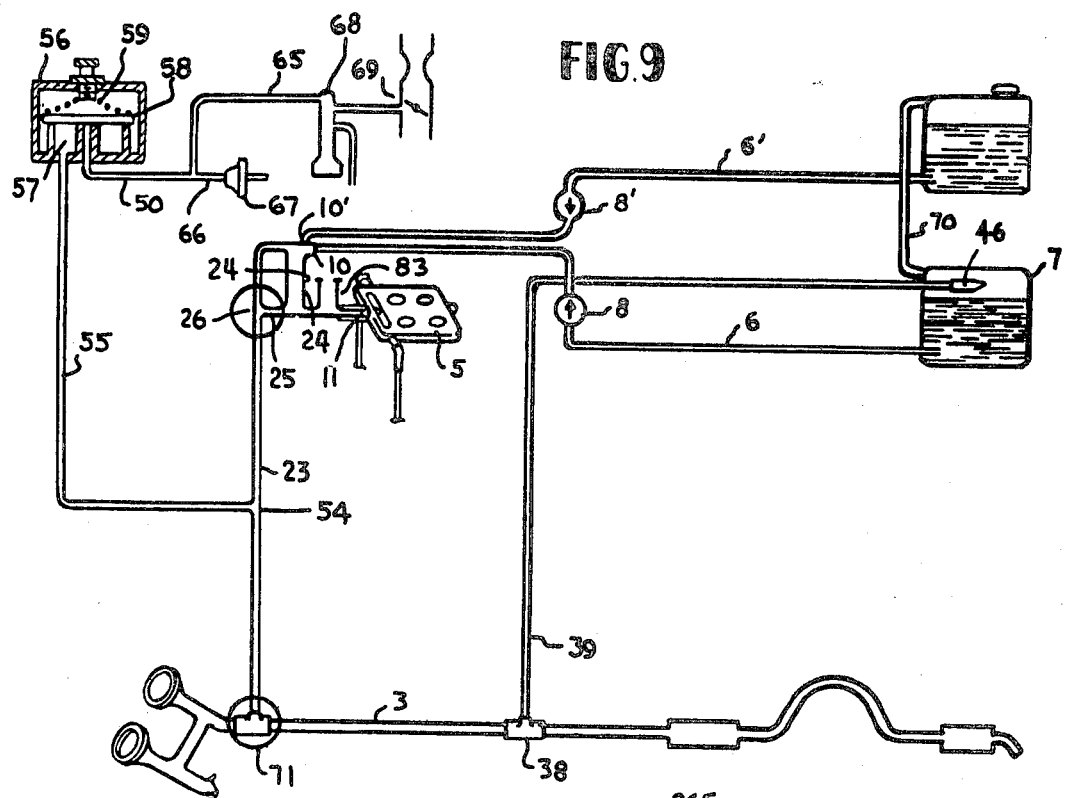
FIG. 9 is a diagrammatic view, partly isometric and partly in cross section, of a further form of the invention similar to FIG. 3 with the addition of two separate pressure tanks for fluid, each indpendently feeding a separate flash boiler.

For the system shown in FIG. 3 which we have just finished reviewing, curves of pressure p.s.i.g. (pounds per square inch gauge) plus and minus in relation to the zero line, which would be atmospheric pressure, are plotted against car speed in miles per hour for various important points in the system. Their review will aid in our understanding of the system. This is plotted in the lower part of FIG. 36. The lowest curve, 71, is a plot of the pressure which is a vacuum below atmospheric pressure at the adapter plate below the carburetor. It is therefore the pressure at point 11, which is the end of the flash boilers. It is the vacuum pressure across variable orifice valve 280. The curve is plotted for the changing conditions of idle, on up through increasing speed to approximately 65 miles per hour, where it shows the effect of a sudden full throttle acceleration, wherein the application of full throttle is faster than one second, and then upon completing the maneuver of accelerating to pass, the car ends up at about 82 or 83 miles per hour and continues on up to 90 miles an hour at part throttle condition. The increase in vacuum pressure from idle to high speed cruising is to be noted. This is a very useful characteristic, as it allows us to have increase in flow of air and of pressure across the flash boiler to aid in increasing the flow of water and therefore the flow of steam. The same vacuum also applies to increasing exhaust flow. It is to be noted that as we go suddenly to full throttle the vacuum is lost and this, of course, would cause closure of the variable orifice valves in the exhaust line, that is, valve 24, when used, would cause closure of the variable orifice valves air 279 (or 27 and 28 of FIG. 5). This is a useful characteristic as it will cut off the lean-out caused by these valves being open and cut out the dilution of the exhaust by the exhaust orifice valve being open, and allow full flow of normal air and fuel to the engine to get maximum power and acceleration, which is, of course, desired upon going to full throttle. Upon returning to part throttle after completing the passing move, the vacuum returns, and of course, the variable orifice valves again open up. In FIGS. 6 and 9 the variable orifice valve air 83 is located about one-half way between variable orifice valve exhaust 24 and plate 5. The curve of pressure vs. car operating condition expressed in speed is shown in curve 72 for this location of the variable orifice valve air. Curve 73 is the normal carburetor vacuum advance curve. This shows a steadily increasing vacuum in going from idle to high-speed cruising, which, of course, causes the increase in vacuum spark advance. Curve 74 is a plot of the exhaust controlled spark advance retard with full throttle system. As is shown here, upon reaching full throttle, there is an abrupt change from a negative pressure in the exhaust to a positive pressure, from a negative pressure of minus one pound to a positive pressure of approximately two pounds. Comparing this curve to the vacuum advance curve, it is apparent why it is able to retard the spark more rapidly upon application of full throttle, and therefore avoid detonation at this sudden load on the engine by so rapidly retarding the spark. Curve 75 shows the tank water pressure, and how this increases, upon starting at idling at about one pound, and gradually rising as the power increases to be operating at about four pounds, and upon acceleration it goes on up to beyond to approximately six pounds. Curve 76 shows how steam pressure increases. It follows very close to the same pressure in operation to water pressure because of course there is a necessity of keeping the flash boiler full for it to generate steam, so it is really dependent upon the water pressure. At the time of acceleration, some of the stored water in the flash boiler is suddenly converted to extra steam and that causes a further rise in steam pressure over that of the water pressure. In the upper portion of FIG. 36 the differential pressure in p.s.i. (pounds per square inch) is plotted. Curve 77 is the differential pressure controlling the variable orifice valve exhaust. Curve 78 is the curve of differential pressure operating the variable orifice valve air when in the location of 83 on FIG. 9. FIG. 79 is the curve of a variable orifice valve air with its outlet close to the carburetor adapter such as a location at approximately 11, the end of the flash boilers, or a location at 27 or 28 of FIG. 5; as noted, there is less change in pressure across the variable orifice valve air as it is located near the plate with change in operating condition between idle and high speed cruising, for example. However, upon going to full throttle the valve in either location abruptly goes closed. FIG. 80 is a curve showing the differential pressure across the water feed to the flash boilers. As noted, as we increase from idling with a pressure of approximately six pounds differential pressure, it gradually increases to approximately 13 to 14 pounds at high speed cruising. However, as we go to full throttle, we lose differential pressure as shown by the curve 80. This is because we lose the assistance of a vacuum upon going to full throttle. As the pressure at 11, the end of the flash boiler, becomes atmospheric, very nearly, curve 81 is the differential pressure of the steam feed. It is the same as the water curve up to the point of going to full throttle, at which time it has less dip than the water feed line, but nevertheless is a dip. This dip in the steam feed pressure at the time when it is needed the most is unfortunate. We really would like to have a curve like curve 82 in which at the point of going to full throttle, pressure would abruptly increase. This is substantially accomplished by acceleration pump 264. Other means of accomplishing this will now be discussed in discussing some of the further figures.

In FIG. 5 the basic system is the same as FIG. 3. However, a steam driven boost pump 84 is provided to boost the pressure of the feed water to the flash boiler or boilers. Use of steam pressure from one of the flash boilers as the driving force in the pump to boost the water feed pressure to the flash boilers, is ideal as it will then boost the feed water pressure in a power function multiple of the temperature the flash boiler is exposed to. This is then related to the real need for a boosted steam feed pressure. It relates to the real need of further steam feed pressure. The steam pump then takes one of the flash boiler's outputs at 85 and through line 86 applies it to the driving turbine or pump, according to which is used. See FIGS. 37 and 38 for the turbine system, and see FIG. 39 for the pump system. Now referring to FIGS. 37 and 38, in FIG. 37, 84 is a steam pump useful in this invention. 89 is a steam turbine driving 90, a turbine pump to boost pressure to the feed water. 91 is a steam rotor like a pelton wheel, mounted on bearings 92 and 93 at either side. Steam jet orifice at 94 drives across the top of the turbine wheel, causing its rotation and the steam exits at 95 through tube 87. Shaft 95 is driven by the steam turbine and is sealed by Teflon seal 96 and drives water turbine 97. As shown, the water turbine is conical in shape, having four vanes. The water feed into the water turbine is 6 and the out pressure boost pressure of the turbine is 88. As shown in FIG. 5, the output is fed as 267 into the acceleration pump and shut off valve 264 and then to the flash boilers by a manifold at 10. In the turbine the rotor is preferably stainless steel, bearings can be ball bearings, but should be stainless steel, or they could be Teflon bearings. The body could be stainless steel or nylon.

Now referring to FIG. 39: as shown, housing 98 has an upper cylindrical cavity 99 and a lower cylindrical cavity of smaller cross-sectional area 100. 99 is the driving steam piston, double-acting, and 100 is the driven water piston, double-acting. 101 is the steam piston, 102 is the spring cushion, the end of the piston travel. 103 is a link rod threaded into the piston 101 for assembly. The connecting rod 103 drives the water pump piston 104 which contains a cavity 105 and a check valve in the form of a ball 106, which seals as the piston rises vertically, and lifts off its seat as the piston goes down, permitting water flow through cavity 107. Upon the next cycle upward, water is pumped out of line 88. At the same time the lower part of the water pump cylinder is filled from line 6 by lifting ball check valve 108 off its seat. The water pump is therefore double-acting in that it fills the lower part of the pump at the same time that it empties the top and on the downstroke, it transfers the fluid from below the piston to above the piston. 109 is the slide valve housing and 110 is the control slide valve for controlling the operation of the steam piston. It is pneumatically operated by steam pressure. Steam feed line 86 branches at point 111 to lines 112, 113, and 114. Line 113 branches at 115 to enter the slide valve control at 116 and at 117. Line 112 enters the end of slide valve cylinder at 118 and at the opposite end of the cylinder line 114 enters at point 119. Port 120 at the base of the steam cylinder is connected to line 121, which has a branch point 122 with a branch line 123 that enters port 124 of slide control valve assembly, said port 124 being in line with previously mentioned port 116. Line 121 also enters port 125 as shown. Slide valve 110 has three circular grooves as ports, one at the top is 126. The one at the center, which is longer, is 127 and the bottom one, which is symmetrical with the top 126 port, is port 128. Connecting rod 103 has two annular grooved ports. The upper one is 129 and the lower one is 130. Cylinder housing 98 has drilled cross ports 131, which tube 112 connects to on each side, and drilled port 132, which tubes 114 match with on either side. Port 131 and annular groove 129 are designed so that they will match when the steam piston is at the top of its travel. Likewise, drilled port 132 is matched with position designed for annular port 130 so that they will match when the steam piston is at the bottom of its travel. 133 is the steam piston head and 134 is the water piston head, containing check valve 108 and input line 6. As now shown in FIG. 39, the steam piston is at the upper end of its travel. 135 is a port at the top of the steam piston connected to the line 136 which has a branch line coming off at line 137 to the branch line 138 which makes a port entrance into slide valve housing at 139. Line 136 continues and makes an additional entrance at the bottom of slide valve housing at port 140, which is in line directly, of port 117 on the opposite side of the housing, and also in line with the annular port of slide valve, port 128 when said slide valve is at the bottom of its travel. Port 141, in the center of the slide valve housing, is joined to steam exit tube 87. This said port 141 is located in the center of the slide valve housing, and port 127, which is in the center of the slide valve itself, is designed with proper width so that it includes the port 141 and port 125 when it is at the lower end of its travel, and includes port 141 and port 139 when it is at the upper end of its travel. Also when slide valve is at the upper end of its travel, port 126 lines up with port 124 and 116. As a consequence, port 129 and port 131 line up, permitting steam pressure to pass through line 112 to port entrance 118 to the top of the cylinder of the control slide valve 110 forcing said slide valve 110 to the bottom of its travel.

The slide valve 110 now having been forced to the bottom of its travel has aligned port 128 with ports 117 and 140 so that now steam pressure coming in from 186, passes through lines 115 and will then pass through said ports and through line 136 to the top of the cylinder to one port 135 and put pressure upon the top of the cylinder, forcing it down. At the same time the bottom of the cylinder is vented through port 120, line 121 to port 125 and through the annular port 127 of the slide valve, to port 141 through line 87, which is the exit line. Upon the steam piston reaching the bottom of its travel, port 130 will line up with a port 132. This, then, allows steam pressure from 186 to pass through line 114, port 132, port 130, to the line through 119 to the lower end of slide valve 110, forcing said slide valve upward to the end of its travel. Upon reaching the upper end of its travel, slide valve ports 126 will line up with port 116 and 124, therefore steam will now travel through line 115 and through port 116, annular port 126, port 124, through line 121 to port 120 to put pressure on the bottom of the steam piston and force it to the top of its travel. At the same time, there will be an exit passage for the steam which is being exited from the top of the piston through line 136 through port 139 to annular port 127, which is now therealigned, back through port 141 and out exit 87. Thus, the steam piston continuously cycles back and forth, causing pneumatically operation of the slide valve to cause proper changes in the valve ports to permit this operation. In doing so it cyclically pumps water with the piston 104, as previously disclosed. The pressure pumped with the water is at the boost pressure proportional to the ratio of the area of the steam piston divided by the area of the water piston. This allows substantial boost in fluid pressure if desired. For instance, it could be as much as 50:1 if desired. At the bottom of water piston 104 is an attached spring 142, when steam pressure is off, the slide valve and the steam piston will both go to the bottom of their travel, and the steam piston and its link rod and water piston will rest upon check valve ball 108 at the bottom of the travel, by way of spring 142. This would be designed to require at least two pounds per square inch pressure on line 6 to force water through check valve 108 under this condition, and therefore act as a block against liquid lock in the system should the water tank level be above the flash boiler outlet 11 due to the car being out of level. This could make the shut off valve in 264 not required.

In FIG. 5, the exit line of the steam pump, be it turbine or piston, is 87, and will be fed back into the induction system through the inlet port of bimetal control element of the automatic choke control used as standard equipment in most of the American cars. The input of this unit 143 is normally from a hot air bleed, to take hot air from the intake manifold, and the output is at a vacuum point in the induction system of the carburetor. Because of the massiveness of the engine and induction system, it takes considerable time to heat this up to the point of causing the bimetal unit to operate and eliminate the effects of the enrichment caused by the automatic choke unit. In order to start the engine it is necessary to have the vapor air ratio within the combustible zone. If it is cold at starting, it is necessary to use a rich mixture of fuel air ratio in order to get sufficient vapor air ratio to start the engine. For instance, in FIG. 21 with a typical summer fuel, at 20° F. it requires 4:1 fuel-air ratio to get 16:1 vapor air ratio. However, as the engine warms up, the ratio rapidly changes, and very soon it is excessively rich in vapor air ratio. The automatic bimetal control in the choke assembly is designed to match the thermal characteristics of the engine to slowly heat up as the engine slowly heats up to keep it within the combustible range. This means that during the start-up period, which is a condition of the worst emissions, there is a long period in which the excessive richness of automatic choke is causing serious emissions. With the disclosed invention, the energy of the recycled exhaust gas, and the super-heated steam combined and with their considerable turbulence and heat energy very quickly vaporize the fuel-air actual mixture; since the flash boiler is directly in the exhaust stream it is only a matter of seconds until it is forming steam. And so the whole system operates very quickly to heat the induction system ingredients to provide good vaporization. Except for the starting of the engine automatic choke would not be needed at all with the system disclosed. However, with the arrangement just described where the exit of the steam from the steam pump, or in the absence of a steam pump a flash boiler steam content would be fed into the engine through the automatic choke control thermostatic unit 143. Because of the high specific heat and the high temperature of the steam, this very quickly heats the bimetal element and removes the effect of the automatic choke from the system. This is done within a few seconds to thirty seconds, rather than in minutes. This further greatly works to eliminate unwanted exhaust emissions.

Figure 51:
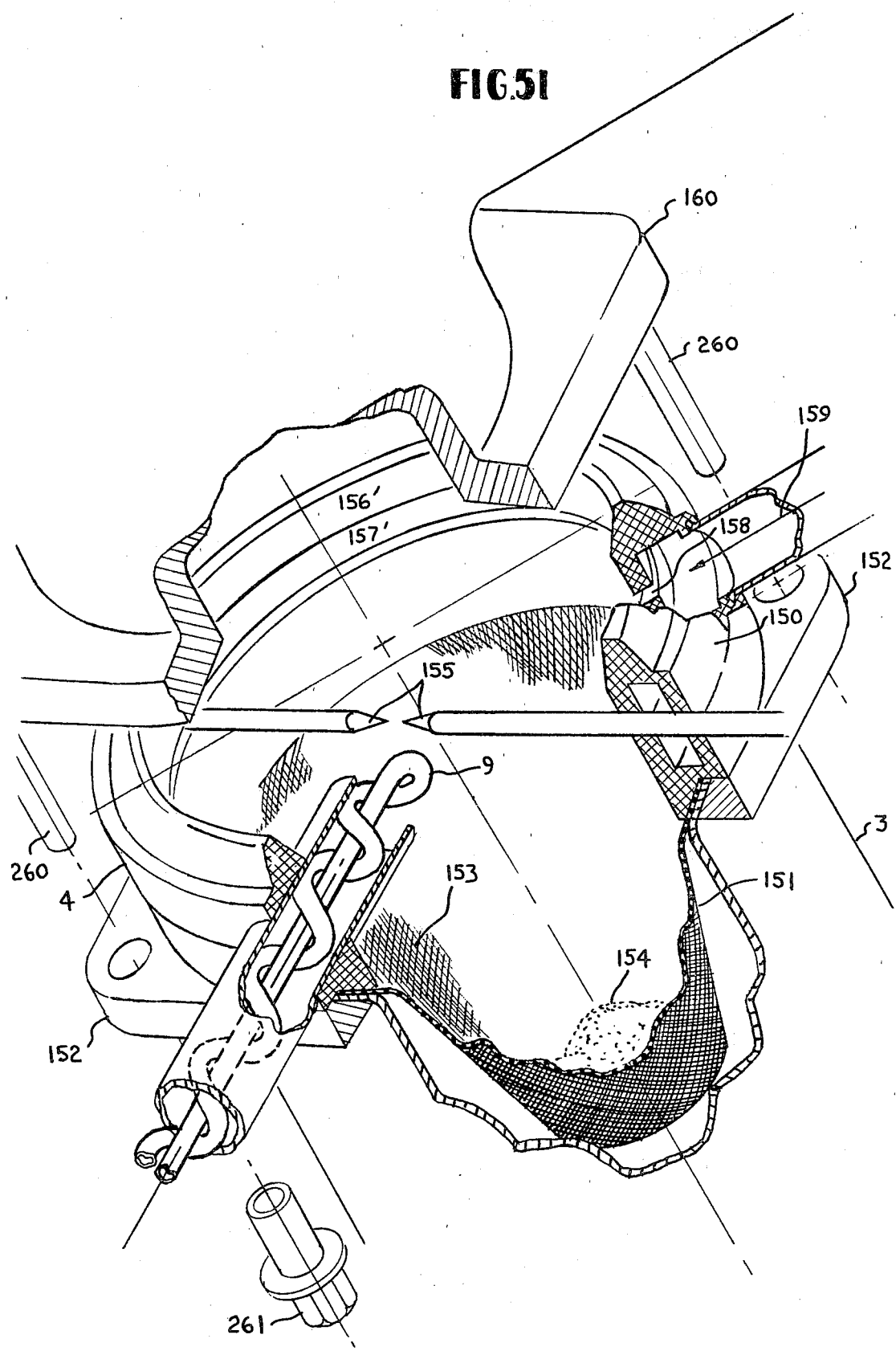
FIG. 51 is an isometric drawing partly in cross section and partly broken away showing a spark ignited thermal and catalytic converter for installation at the manifold to exhaust pipe gasket for use in the disclosed invention.

Referring again to FIG. 5, 144 is the ignition switch, at present shown in the ignition on position, 145 is the primary ignition coil, 146 is the secondary ignition coil, 147 is the breaker point condenser, and 148 is the breaker point of the ignition system. 150 and 150' are spark gaps provided in each of the two exhaust manifolds at the exhaust manifold gasket as it joins the exhaust pipe. The spark gaps are part of a sandwich thermal catalytic reactor that fits at the gasket point into the exhaust pipe just below the exhaust manifold. The spark gaps assure continuous ignition even at starting of any unburned combustibles in the exhaust system. The spark gaps are part of a small catalytic thermal reactor that fits into the gasket space in place of the gasket, between the exhaust manifold and the exhaust pipe header. As shown, 150 fits with 151 into 152 and 150' fits with 151' into 152', 151 and 151' being the thermal catalytic reactors. This is shown in more detail in FIG. 51. Referring to FIG. 51, exhaust pipe 3, partly cut away, is shown with the header flange 152. Above this is shown the gasket adapter 150, which is in two halves. In construction 156 and 157. These are of high-temperature insulating material, such as filled asbestos. The gasket 150 is arranged to provide a slight venturii action and therefore creates a suction at the air gap 158, so that air 159 can flow inward, so that air can be added to any combustibles in the exhaust to create complete combustion. Flash boiler line 9 is shown in the exhaust stream. Thermal catalytic reactor 151 is shown supported in conical form by the gasket. It is made of woven very high temperature fibers such as coated graphite or silicon carbide-carbon fibers. These would be vapor or solution dipped with a thin platinum coating to make them catalytic in reaction, because they are very small in mass, made up of many many fine fibers. This woven net-like structure will act like a flameholder and still not be an appreciable restriction to the flow of exhaust gases. Granular catalyst can be placed in the bottom of the flame holder to further augment the catalytic reaction. Because of the primary cleanup of emissions being done by the primary system, already described, the remaining unconverted emissions are relatively small in volume, and therefore a small efficient catalytic thermal reactor located in the area where the exhaust gases are still very hot, provides a very efficient way to finish the clean-up to meet the standards such as 1980 standards. In 51, 160 is the exhaust manifold flange.

Referring now to FIG. 5 again, after the ignition leaves the two spark gaps, one in each of the two reactors, at the left and right exhaust gasket, at the base of each exhaust manifold, it goes by lead 161 to an ozone creating arc gap in the variable orifice valve air bleed system shown as 162 in FIG. 5. The job of this arc is to provide ozone to mix with the other ingredients as it goes into the combustion stream and into the cylinders to improve combustion. Ozone is a very good oxidizing agent. From gap 162 lead 163 takes ignition to the distributor arm 164, where it passes to a distributor electrode 165 to a spark plug 166 and to ground. The ignition in gaps 150 and 150' and 162 occurs every time a spark plug fires, that is, any time any spark plug fires.

Referring next to FIG. 6, the basic system here is exactly similar to that of FIG. 5, except for the exhaust input to the exhaust transfer line. The detail of this exhaust input is shown in FIG. 8, where 72 is the scoop and flash boiler lines 9 extend into the exhaust pipe 3 as shown. The primary difference in FIG. 6 over that of FIG. 5 is the form of the boost water pump used. In FIG. 6 an electric driven pump is provided, which would be a turbine, or ring or piston type. When ignition switch 144 is turned on it simultaneously turns on, as shown in the circuit, the 12-volt power at the center point of the ignition switch. This is fed to the electric pump through lead 167, and from the pump by 168 to a junction point 169 to a switch 170 and from there to a variable resistor 171. Also from junction point 169 through lead 172 to junction point 173 through lead 174 to switch 175. From switch 175 through lead 176 to switch 177, which is mechanically coupled to ignition switch 144, such that whenever ignition switch 144 is closed, 177 will be closed. From junction 173 an additional branch circuit 178 to switch 179, to lead 180, to the momentary contact 181 of switch 182. Ignition switch 144 is directly tied to switch 182 so that the arms move together when switch 144 is in ignition on position, the switch 182 is not engaged with contact 181 as shown in FIG. 6. However, as ignition switch 144 is turned to the center "off" position, it swings the arm of switch 182 past contact 181 to momentarily close this circuit, and then reopen it by the time it gets to the switch off position. This will occur any time switch 179 is closed. This provides a means to provide extra coolant into the engine at that moment of shutting the engine off, to prevent autoignition. This allows one a greater choice of set points to get more ideally the best emission free combustion in idling and still be able to shut the engine down without autoignition. If switch 175 is closed and every time the ignition switch is closed to "on" the switch 177 is closed and complete the service to ground for the pump and the pump will go on, and when the ignition switch is turned off, the pump will be turned off. If a vane pump or piston pump are used which will block the flow when they are not in operation, this will serve as a means of cutting off any water flow through lines 6 when the engine is shut off, to assure that there is no drainage of water through the flash boiler and into plate 5 and into the engine eventually. It is a way to assure that there will be no liquid lock and would eliminate the need of having drain means, alrady described, at the plate. It would keep the flash boiler dry, so that at the next start up it would be completely hot and dry and form steam at the earliest possible time. If switch 175 is left open and switch 170 is closed and rheostat 171 can be used to vary the output of the electric pump movable arm of this rheostat, it could be coupled to the throttle arm to give a pump output related to the throttle setting. The rheostat could be special wound to match the motion of the contact related to the change in power to related water flow desired, so that it could be matched up to a given water flow for a given throttle setting. The electric pump 183 is shown in detail in FIG. 32 at the bottom of the water tank. Other pumping systems are not shown but are meant to be included within the invention when related to the invention. It is planned, for instance, that we could use a mechanical pump which would then tie it to the engine drive and relate it to the engine speed, and we could relate this to the flow to the power of the engine by control of the output using exhaust pressure to control a regulator. Regardless of how it is done, the important thing is that the fluid flow should be related to the engine demand for the steam, which is closely related to engine power and engine temperature.

In FIGS. 5 and 26 arc gap 162 is supported in housing 289 and ignition barrier screens 290 and 291 are installed in housing 289 on either side of said arc-ozone generator, to assure that no contact from fire from ignition of any combustibles in the area is possible. Screw 35 is lean limit stop previously described in discussions of FIG. 28.

In FIG. 6, water shut off valve 289 in flash boiler water feed line 6 is mechanically coupled to the ignition switch 144 so that when the ignition switch is "on", i.e. closed, the valve is open to supply water to the flash boiler, and when the ignition key is turned "off" the valve is closed to automatically assure that there will be no water overfill of the flash boiler and no liquid lock. This is the most practical answer for the new car market and vacuum valve 264 of FIGS. 5 and 3 is the most practical answer for retrafit in the used car market.

FIG. 9 is similar to FIG. 6, but without (1) the ozone generator 162 in the intake, (2) electric boost pump 183, (3) water shut off valve 289. The system incorporates two separate liquid containing tanks 7 and 7' with a tank pressure equalizing tube 70 so that equal or relative flow between tanks can be standardized Each tank feeds its own flash boiler through its own feed line and check valve and relative flow control orifice (not shown) if desired. This system permits simultaneous use of two additives which could not be premixed in one tank as they would react and destroy their effectiveness in the engine. For example, one tank could contain an ammonia solution and the other tank could contain hydrogen peroxide ($H_2O_2$). The ammonia solution is a very effective combustion peak temperature coolant due to its very high specific heat at high temperatures. This tends to keep the peak temperature below 3400° F., the approximate temperature above which pollutant nitrogen oxide (NOx) is formed. Also, if any nitrogen oxides are formed, ammonia reacts with them, eliminating this pollutant by forming nitrogen gas and water.

A water solution of hydrogen peroxide ($H_2O_2$) can be placed in the other tank and feed into the exhaust transfer tube by its flash boiler. Hydrogen peroxide is a strong oxidizing agent and will aid in providing complete combustion of the fuel air mixture in the cylinders.

Hydrogen peroxide and ammonia are very active together in removing sludge, gum, and carbon deposits which they could not do independently. If they were both placed in the same tank they would react and destroy their potential capability while in storage; therefore each is stored separately in tanks 7 and 7' and they are mixed in flight as they each leave their flash boiler exit within the exhaust transfer tube.

As shown in FIG. 9, variable orifice exhaust valve 24 is of the type in which the orifice area decreases as the differential flow pressure across the valve increases. This valve is shown in detail in FIG. 30 where it is shown assembled and in cross section. FIG. 31 is an exploded isometric view of FIG. 30. In FIG. 30 the phantom line shows the valve 28' and spring 278' in no flow minimum orifice at rest position, and the solid lines show the full flow maximum differential pressure position of the valve 28 and spring 278. The housing 27 has spring 278 installed with variable cross section plunger 28 placed on top and supported by the spring. Retaining washer with a flow hole as the gas entrance is held in the top of housing by retainer ring 31, as shown. This valve is useful as the variable orifice exhaust valve or air valve to meet certain special engine characteristic needs. If the engine needs additional anti-detonant at full throttle even at the sacrifice of some power this valve can be useful as shown in FIG. 9.

FIG. 10 shows another form of the invention disclosed herein. Exhaust transfer line 184 shown in isometric, broken away to show the interior flash boiler 9 ending its output point below the highest point of the exhaust transfer line. This is done as another way to prevent any possibility of liquid lock if the attitude of the car is such that the top of the liquid tank is higher than the exit point of the flash boiler; the liquid that would transfer would end up by simply running out the end of the flash boiler tube at 185 back down the exhaust transfer line 184 into the exhaust pipe at gasket 4 located between the lower part of the exhaust manifold and the header of the exhaust pipe. It is unnecessary to provide the safety liquid drain groove 12 in adapter plate 5 shown in FIG. 26, as it is not possible for any liquid to go over the highest point in the exhaust transfer line, which is higher than the highest point of the output of the flash boiler 185. As described earlier, the exhaust transfer line is made of flexible brass tubing or similar material, with spiral corrugations to provide turbulent mixing and rotation of the exhaust gas, steam, and air. The exhaust transfer line flexible corrugated tubing is brazed to a header at point 186. The other side of the header 187 is provided for an exhaust transfer line similar to 184 coming from the opposite side exhaust system of the engine, that is, the right side of the engine, since 184 is on the left side of the engine. The header is next joined to "T" 188 which provides an input for the water feed line 6 at point 189, and at the lower point of the T joins with variable orifice exhaust valve 24. Below variable orifice valve 24 it joins to elbow 190 which has an adjustable screw 191 used to adjust the limit position of the variable orifice valve. The maximum opening of the variable orifice exhaust valve 24 is set at the optimum lean out point. Elbow 190 is then brazed to flexible corrugated spiral tubing 192 which ends at the adapter plate with a fitting 193. In between a fitting is brazed for insertion of variable orifice air valve 83, previously described. (Shown in detail in FIGS. 28-31) The adapter plate to be installed below the carburetor is similar to FIG. 26, but does not have the safety drain groove 12 as previously stated, because it is unnecessary in this design, because liquid lock is prevented by the position of the end of the flash boiler ending at 185 below the highest point of the exhaust transfer line. Also the variable orifice valve shown in FIG. 26 of course is not needed, because the variable orifice valve air is installed within the exhaust transfer line as previously described. Variable orifice valve 83 can be installed anywhere along the exhaust transfer line beyond 24, that is, toward adapter plate 194. In fact, it often will be installed almost immediately adjacent to 194 and could be installed within 194, just beyond fitting 193. This location provides for maximum stability as previously described. Drain line 292 is installed in the lower side of exhaust transfer line 184 near gasket 4 to assure that any water will be drained overboard and not into the exhaust system. This is important as water on a hot exhaust pipe can cause warpage, and, if pipes have inner liners, can cause them to warp to point of closing off inside passage. Check valve 293 can be installed in drain 292 to keep cold air dilution to a minimum, or if drain 292 is kept small, approximately 0.050" and a foot or more long, dilution will be nil.

Refer to FIGS. 40 and 41. These figures describe one form of tank pressure check valve as referred to as 83 in FIG. 10 above. They also describe the advance rate control, the use of which will be described shortly. FIG. 40 shows a plan view of the structure and section 41—41 through this plan view in 40 as shown in FIG. 41. Housing 199 has dimples 200, which prevents plate 201 from sealing against 199 when moved to its upper position, shown in phantom. Housing 202 is sealed to housing 199 with diaphragm 201 contained inside as shown. When used as a check valve as just described in relation to FIG. 10, diaphragm 201 will not have the small hole in its center 203. Upper housing 199 would be joined to tube 198 of FIG. 10 and lower housing 202 would be joined to tube 196 of FIG. 10. Exhaust pressure shown in FIGS. 34 and 35 is applied at 196, diaphragm 201 will on the positive pressure move upward to the phantom-shown position, allowing the exhaust gases to pass through to 198. On the negative swing of the exhaust gas pressure, diaphragm 201 will seat against housing 202, thus it will effectively rectify the fluctuating pressure of the exhaust applied, resulting in peak pressure of the exhaust appearing in 198 and in the tank 195 of FIG. 10.

Refer to FIG. 12, showing another form of the disclosed invention herein. Tube 2 is the exhaust transfer line, which would carry exhaust from 4, the adapter, between the bottom of the exhaust manifold 160 and the header of the exhaust pipe. Flash boiler 9 extends out into the exhaust stream as shown. Fluid tank 205 is located at a low point to avoid any possible liquid lock; in other words, it is lower than the exit point of the flash boiler regardless of the attitude of the car. Safety drainhole 206 is provided in the exhaust transfer line just below the carburetor at point 207. The flash boiler 9 starts at 209 and passes down the center of the exhaust transfer line 2 to ring 4, loops out into the exhaust and then back, and spirals around 9 as 9' as it continues back up the exhaust transfer line to point 11. Fluid tank 294 contains upper cylinder lubricants and anti-valve sticking agents which can be of oil base. This is metered through valve 210 through line 211 and enters exhaust transfer line at point 212, or could be at another point, as 11. This fluid is metered in small quantity into the induction system by the exhaust transfer line, under vacuum. Lead previously used in the gasoline served as a valve stem lubricant. The fluid of petroleum base, such as STP, a commerical product, will provide the special upper cylinder lubrication as required. Fill cap 213 provides a vent for the tank similar to 53 on tank 7, shown in FIG. 32. Carburetor 214 is provided with the air filter 215. The intake manifold 216 joins to a typical cylinder 217. A typical intake valve 218 and a typical exhaust valve 219 are shown with the exhaust manifold 220. Tank 221 contains special additive concentrate for antidetonant or for special clean-up of carbon, sludge, etc. to be done periodically. A volatile base as a part of the additive to aid in starting. Fluid output line from 221 is 222, passing through check valve 223 to T point 224 to fluid line 225 to check valve 226 to input point 227 of fluid pump 228. Pump 228 is an acceleration pump and as shown is controlled by change in vacuum occuring at the time of acceleration. 229 is shown as vacuum bellows; under normal conditions vacuum compresses spring 230. The vacuum is obtained through line 231 from the carburetor vacuum picked up at the end of exhaust transfer line fitting at point 232. Acceleration pump 228 fluid output passes through line "T" 233 past check valve X with feed lines 6 at point 208 between check valves 8 and 207. Back to "T" 231, second branch line goes to check valve Y through line 295 to spray 296 above carburetor 214. During idling and normal cruise, the vacuum will cause bellows 229 to compress spring 230 and pull piston pump 234 back, filling acceleration pump 228 with fluid from tank 221 and tank 205, the mixture depending upon the valve settings of 235 and 223. Upon going to full throttle the vacuum at point 232 and therefore at the bellows 229 is suddenly lost and therefore spring 230 will cause acceleration pump 228 to force the mixed fluid through check valve Y to create spray at 296, and X into junction 208, be blocked by check valve 207, pass through check valve 8 to mix with the fluid from 205, into flash boiler 9, 9' with additional fluid of special additive mix. The acceleration spray at 296 can be useful in cooling input gases at moment of acceleration to increase charge and therefore power. Tank 221 can provide any of the additives just mentioned or could provide additives such as $H_2O_2$ or ammonia or other special additives. Of course, in the use of additives which do not themselves properly accept premixing it would be provided as previously discussed in separate tanks, drawn together at the time they would be used. In other words, if ammonia and $H_2O_2$ were to be used as a part of the additive system, they would be separate, independent tanks in addition to 221, drawn in through proper independent check valves, not shown. In place of acceleration pump 228, other types of acceleration pumps may be used to accomplish this same objective. Refer to FIGS. 48–50. These pumps can be considered installed in place of pump 228 with junctions at points Z, X, and Y. FIG. 48 shows acceleration pump 236 with plunger 237 held open by spring 238, which is actuated upon motion of the carburetor linkage upon acceleration, causing stop 239 to engage 237 and to cause piston pump 236 to operate. FIG. 49 accelerator pump 240 has piston 241 operated by solenoid coil 242 with electrical line 243 to contact 244 is engaged by moving contact which provides ground contact engaging the electrical strip 244. The other end of solenoid coil 242 being 12 volts D.C. through a power source. Referring to FIG. 50, 245 is controlled by bellows vacuum pump 246 which is held open by spring 247 and is connected by line 248 to valve 249 to vacuum 250, said valve 249 being actuated by the linkage 251 connected to the throttle mechanism such that upon acceleration valve 249 is opened to vacuum tank source or to the engine vacuum.

As stated earlier, the time most prone to have detonation in an engine is at low speed, full throttle, and there is therefore great advantage in having minimum spark advance under this condition. The normal vacuum spark advance advances the spark very rapidly as the throttle is opened. FIGS. 40 and 41 show advance rate control 236 as a means to keep the spark advance at a low advance point during acceleration to lower the octane requirement of the engine and thus to permit use of 91 octane fuel in high compression high-spark advance engines.

Referring to FIGS. 40, 41, and 43, vacuum 237 by line 238 carries vacuum to advance rate control 236 and vacuum line 239 carries it on to the vacuum advance control 67 which controls the spark advance of ignition distributor 240. During closed throttle conditions, ported vent 237 is at atmospheric pressure or very nearly so, and as the throttle opens, the vacuum rapidly rises in 238. Rate control 236 under this condition is seated such that plate 201 is seated against body 202 preventing the vacuum from passing on through 239 to vacuum advance control 67 except at a slow rate through port 203, and provides slow advance control. However, upon putting the throttle closed and therefore obtaining atmospheric pressure at 237, which appears through 238 at advance rate control 236, this pressure lifts diaphragm 201 off its seat and the air passes around diaphragm 201 because points 200 prevent seating of 201 against body 203. Therefore the air passes around diaphragm 201 rapidly and quickly retards the advance control 67. Thus the system becomes one which has the characteristic of slow advance, rapid retard under the conditions of acceleration and closed throttle. This characteristic then changes the octane requirement of the engine and in conjunction with the other parts of the system that have been described, allows the engine to be operated on 91 octane fuel. This system would be used as an alternate to 56, FIG. 3, exhaust retard control. The advance rate control is shown in detail in FIGS. 42–47. Referring to these figures, 42 shows a conventional system at idle condition, and 43 shows the disclosed system using the advance rate control under idle conditions. FIG. 44 shows the conventional system under acceleration condition, giving full advance instantly at full throttle condition. FIG. 45 shows full advance instantaneously for the disclosed system, and also the advance after a few seconds showing that the advance is held back during the first few seconds, which is the important time to prevent detonation during acceleration, and the retarded spark is needed. FIG. 46 shows the conventional system under decelerate condition and FIG. 47 shows the disclosed system using the variable advance rate control under decelerate conditions. Referring again to FIG. 12, ignition switch 144 controls ignition primary 145, secondary 146 and as shown goes directly to the distributor 164 and typically to one of its electrodes 165 and to a spark plug 166.

Figure 52:
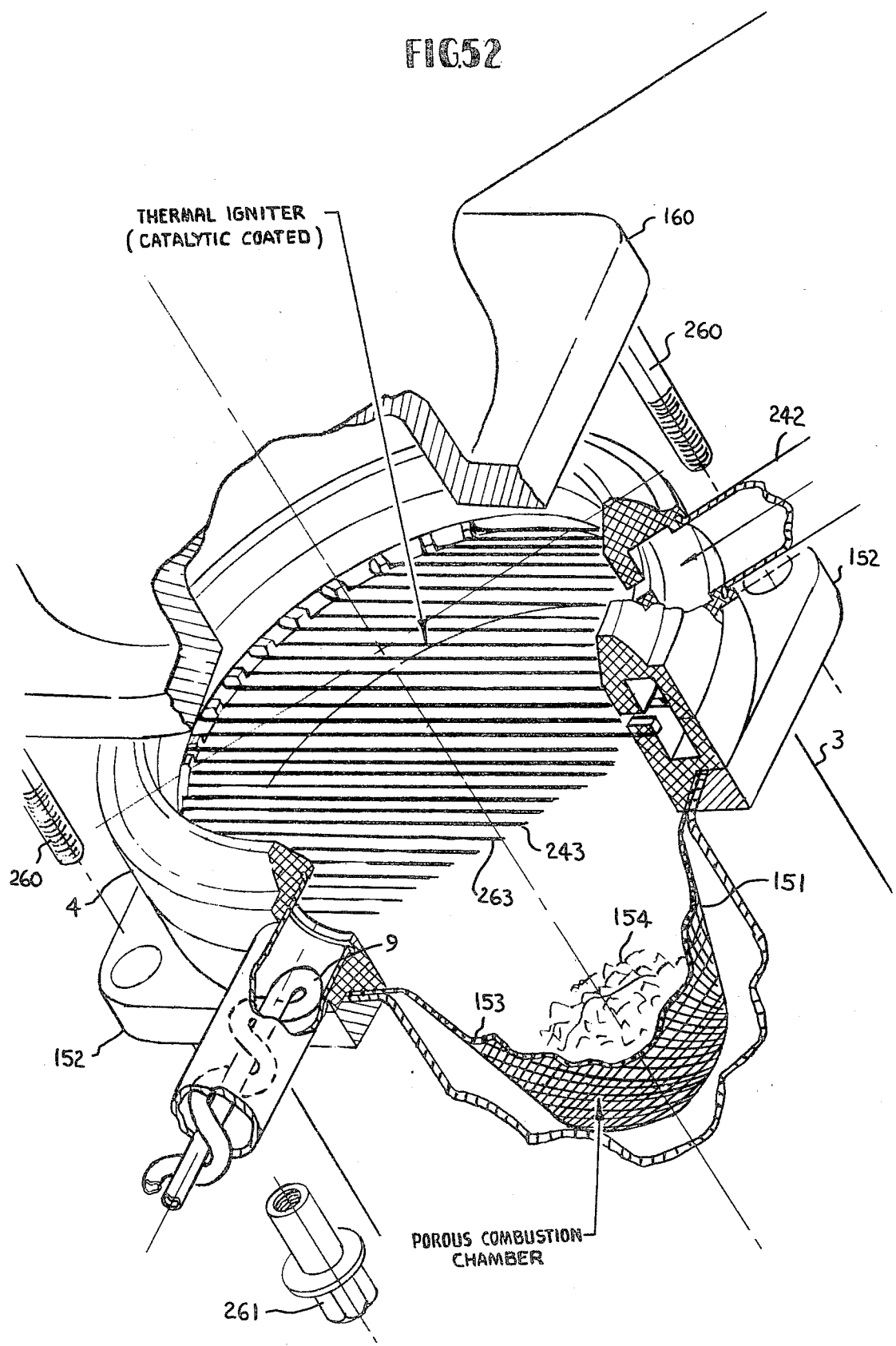
FIG. 52 is an isometric view partly in cross section and partly broken away to show details of a thermal igniter and catalytic and thermal reactor for installation at the exhaust gasket between the exhaust manifold and the exhaust pipe as shown in FIG. 12 for use in the disclosed invention.

In FIG. 12 at the catalytic thermal reactor, gaps 150 and 150' are in series with the engine ignition between the secondary and the distributor. Other ignition sources, such as alternator AC, ahead of rectifiers, could power a step up transformer or an electronic multi vibrator, or a chopper could control a high voltage ignition source. In the present shown system switch 241 may be closed, if desired, and the ignition will go directly to the distributor, eliminating the spark gaps 150 and 150' in the thermal catalytic reactor. Air distribution rings 242 and 242' are inputs which come from the hot filtered air of the carburetor intake to provide the extra air desired for creating complete combustion and thereby the final removal of all residual unburned exhaust pollutants. 143, 143' are heating elements which can be used to provide heating of the catalytic element and provide for both ignition and optimum efficiency of the catalytic reactor; reactors such as platinum will only work efficiently in a selected temperature range. Therefore to get good operation the catalyst should be preheated to bring it up to operating temperature so that it will start to react upon receiving in this area the first of the unburned combustibles of the exhaust gas. 244 and 244' are thermal element control switches to control the level of current passing through the heating element. Thermal switches 244, 244' serve as the prime control for keeping the termperature of the heating elements at the right condition. These would be placed below the elements 243, 243' and as combustion occurs from these elements the elements 244 would become heated and open since the catalytic reaction will continue to heat elements 243, 243' once catalytic reaction is occurring, and it is desirable not to overheat the catalytic heating elements. Switch 245 is shown in position closed to activate the elements 243 and 243'. If this is not desired, the switch can be put in the center off position, or if it is desired only to have this operate to heat the elements during engine starting it would be placed in the position on the right, 146. 246 is the ammeter, 247 is twelve-volt DC battery, 248 is the starter solenoid, 144 is joined to ammeter 246 by lead 249. Ammeter 246 is joined by lead 250 and goes to junction 251 and one wire going from junction 251 is 252, which goes to battery 247. The other wire from junction 251 is 253 and goes to solenoid 248. Lead 255 goes to alternator or generator 256 and further lead 257 goes to ground. Back to starter solenoid 248 at output terminal 254 lead 258 goes to terminal 146 of the previously mentioned switch 245. Catalytic reactors are placed in each of the exhaust systems at the gasket between the base of the exhaust manifold 152 and the exhaust header, these are made up of air inlet 242; spark gap 150, heated catalytic reactor 243 and ring 4 are designed to provide exhaust gas to the exhaust transfer tube 2 and for carrying the flash boiler 9 into the exposed exhaust; and catalytic reactor elements 259 and 259', of cloth-like, loose-weave platinum wire catalytic reactor, or, alternately, of very high temperature graphite, coated as already discussed, woven into a loose-weave cloth-like element with platinum coating. FIG. 52 shows the detail of a thermal catalytic reactor of this general type. Looking at 52, 160 is the base of the exhaust manifold. 152 is the flange for the exhaust header. 3 is the exhaust pipe. 153 is the porous combustion chamber, of woven cloth-like material, platinum coated, or of platinum material previously described. 154 is granular catalytic material to aid in the catalytic reaction. 9 is the flash boiler being inserted into the tube. It will extend out into the exhaust area in operation; it is shown being inserted, not yet through the tube. The studs are 260. 261 are the bolts for mounting the assembly together (one for each stud 260). 263 is the heated catalytic reactor. 242 is the tubular air source. Current control switches 297, 297' may be added in series with catalytic reactor elements 243, 243' and be controlled by the current in the circuit. Catalytic elements 243 are the primary resistance of the circuit they are in, so as they become cool their resistance decreases and the current in the circuit and therefore in 297 increases. At a prechosen current level, related to the minimum desirable temperature for the catalytic reactor to properly work, current controlled switch 297 closes intermittently, increasing the current in and therefore the temeprature in catalytic elements 243 to keep them at a temperature above their low threshold operating point. Electronic equivalent current control circuits can of course be used. Thermal switches 244 could be omitted if 297 is used or they can be used together for even more complete control.

Tank 205 is provided with an exhaust pressure scoop 92 (See FIGS. 12 and 25) which transfers exhaust total pressure through line 39 into the tank through check valve 46 (see FIGS. 32 and 33). Tank pressure equalizing line 70 keeps tanks 205 and 221 at the same pressure.

Figure 13:
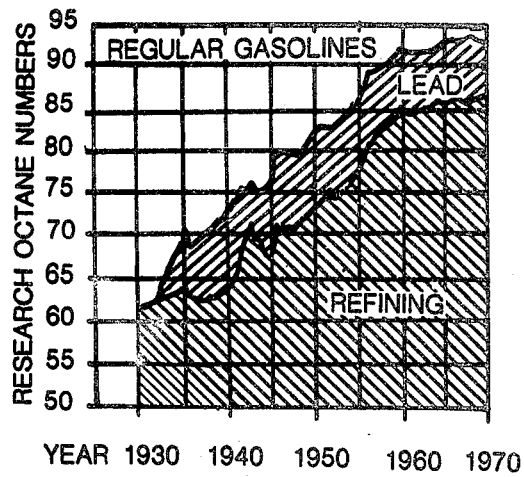
FIG. 13 is a graph showing the steady improvements made in automotive regular gasolines as a result of the improvements in refining and by the addition of lead in research octane number through the period 1930 to 1970.
Figure 14:
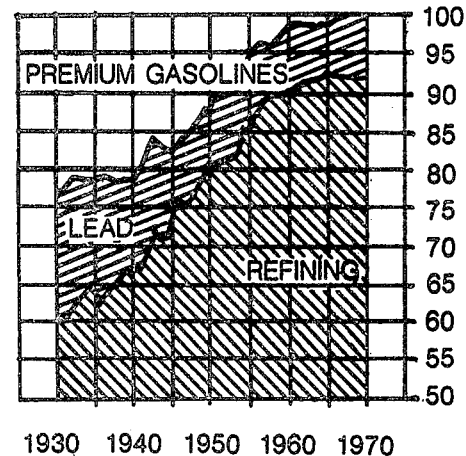
FIG. 14 is a graph showing the steady improvements in automotive premium fuels made by refining and by the addition of lead in increased research octane numbers for the periods 1930 to 1970.
Figure 15:
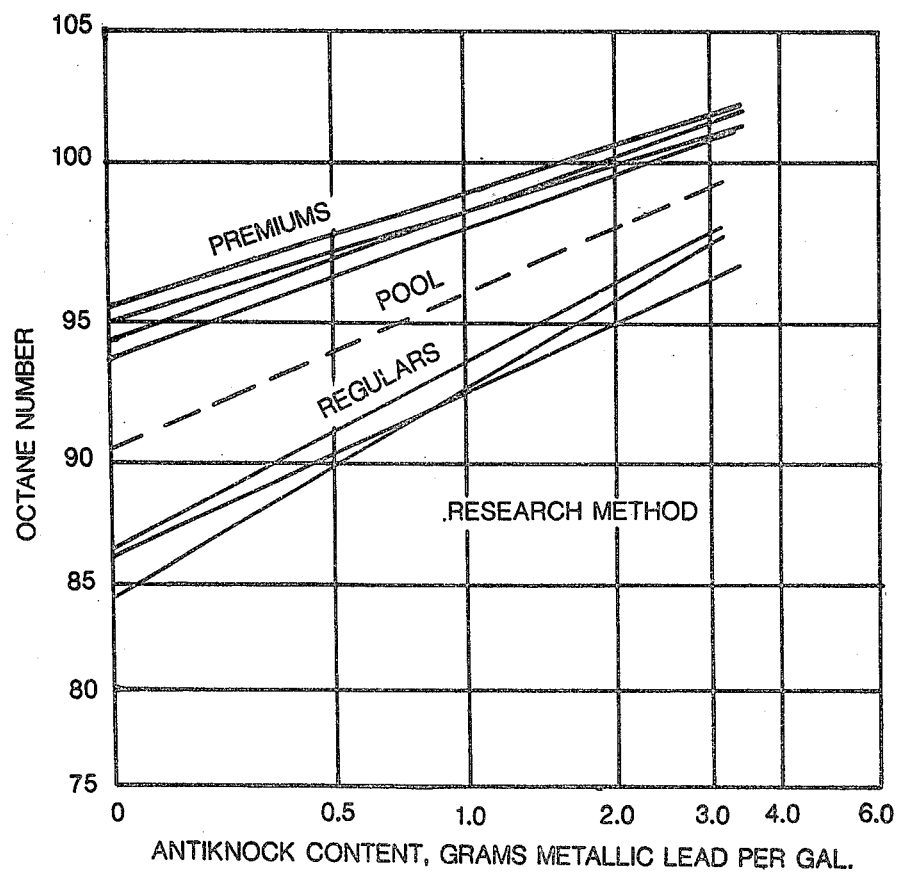
FIG. 15 is a graph showing the change in octane number versus the amount of antiknock metallic lead added per gallon for automotive fuels of regular grade and of premium grade and also includes a plot of the result of pooling all premium and regular grades.
Figure 16:
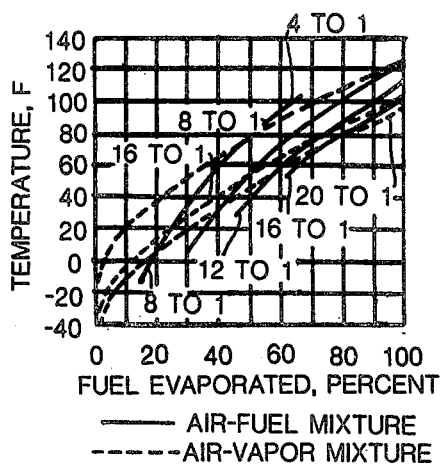
FIG. 16 is a graph of fuel volatility vs. temperature for a typical summer automotive gasoline.
Figure 18:
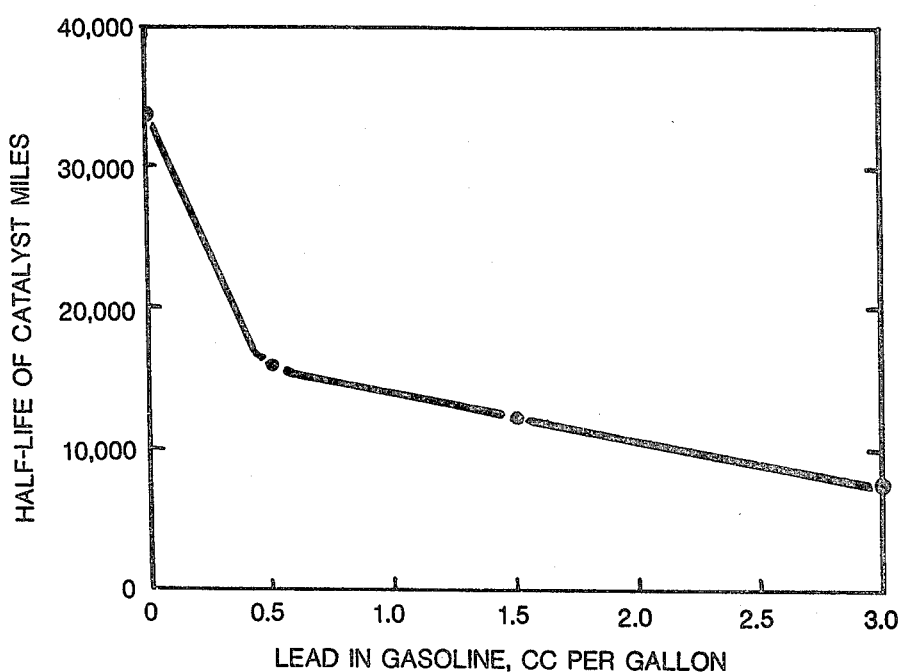
FIG. 18 is a diagram to show the half life of a catalyst in miles versus the amount of lead in the gasoline in cc's per gallon.
Figure 17:
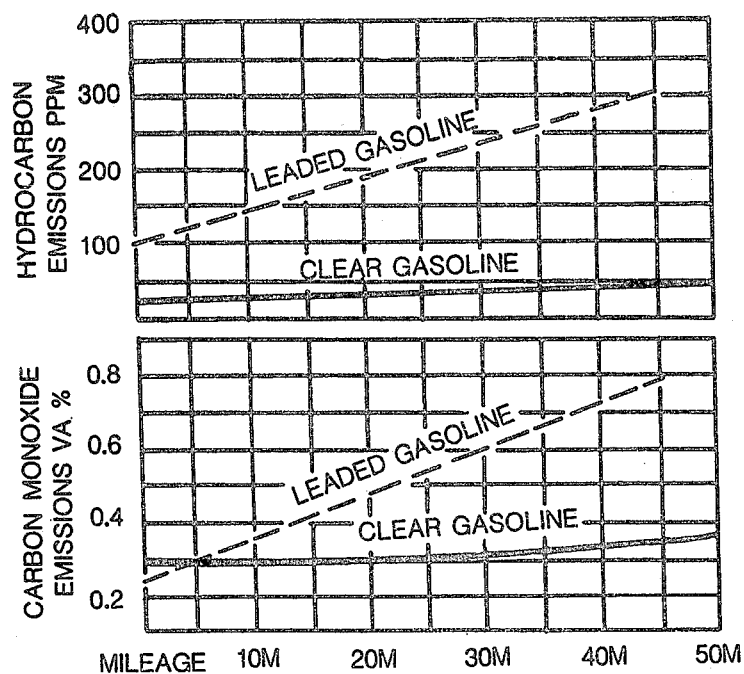
FIG. 17 is two graphs to show the deterioration of a catalytic converter in its ability to remove hydrocarbon emissions in parts per million and carbon monoxide emissions in volume percent versus mileage in miles from zero to fifty thousand miles.
Figure 19:
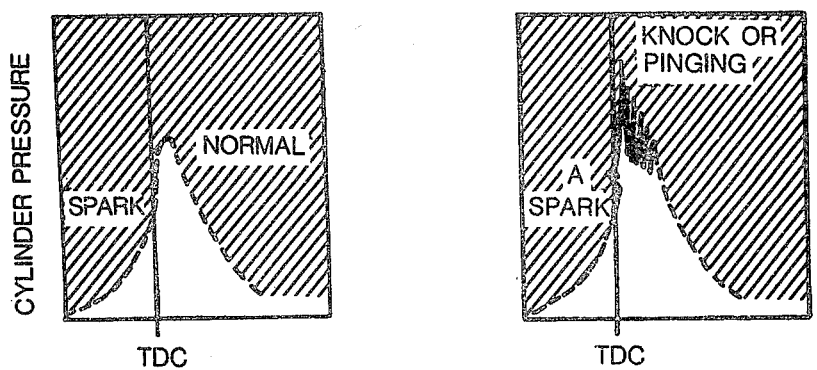
FIG. 19 is a plot of the pressure time relationship for combustion for normal combustion and for knocking or detonating combustion. Pressure is plotted vertically and degrees crank angle is horizontal.

FIGS. 13-21: FIG. 13 is a diagram showing the improvement in automotive regular fuels by refining and by addition of tetraethyl lead in improvement of the octane number by research method for the years 1930 to 1970. FIG. 14 is the same information presented for premium automotive fuels. FIG. 15 presents typical runs of premium and regular fuel, showing their sensitivity to the addition of lead in increasing octane number by research method of testing. Also it shows what would occur if all of the premium and regular fuels were mixed together into a pool. As you know, it will end up with 91 octane fuel if no lead is put in the fuel. FIG. 16 shows the change in air vapor moisture ratio with fuel air ratio with change in temperature for a typical summer automotive gasoline. FIG. 17, upper curve, shows the change in effectiveness of a catalytic reactor with time, mileage, up to 50,000 miles, with leaded fuel and with pure gasoline in addition to hydrocarbon emissions in parts per million. FIG. 17, lower curve, is the same data in relation to carbon monoxide emissions in percent volume. FIG. 18 shows the half life of a typical catalyst in relation to the amount of lead in the gasoline being used, showing its very substantial sensitivity to even a small amount of lead added to the fuel in relation to the deterioration of the catalyst. FIG. 19 on the left presents pressure vs. time curve vertically pressure, horizontally time or normal combustion, and on the right is presented the curve under conditions of knock or pinging. FIG. 20 presents data on typical engines showing their sensitivity to spark advance setting in establishing the octane number requirement of the engine. This data shows that in some engines the effect of a ten degree change in ignition timing can result in about a nine octane number difference in requirement of the engine and in other cases it may only result in about 5 octane numbers difference. The spark advance in the vacuum spark advance may well be 20 to 30 degrees or more, control of it at the critical time of need at going to full throttle and low speed is therefore very significant.

FIG. 9 systems are identical to those described earlier except for the addition of the separate tank, and tank pressure balance line 70, and, in this case, the inlet scoop to obtain the exhaust transfer line is a modified version shown as 72 and in detail is shown in FIG. 8.

Referring to FIG. 25, the scoop is installed by drilling a hole in the side of the exhaust pipe 3 and strapping it to the pipe with straps similar to those shown in FIG. 25 as 41 and 42. Scoop 72 is in line of exhaust flow to pick up the full dynamic pressure and static pressure, therefore the total pressure of the exhaust gas in the stream. Extending out through the scoop are three flash boilers, 9, 9', and 9". One of the flash boilers is to serve one of the tanks and the other two flash boilers serve the second tank, or, if desired, two flash boilers instead of three could be used so that both tanks would then have one flash boiler to feed.

Figure 24:
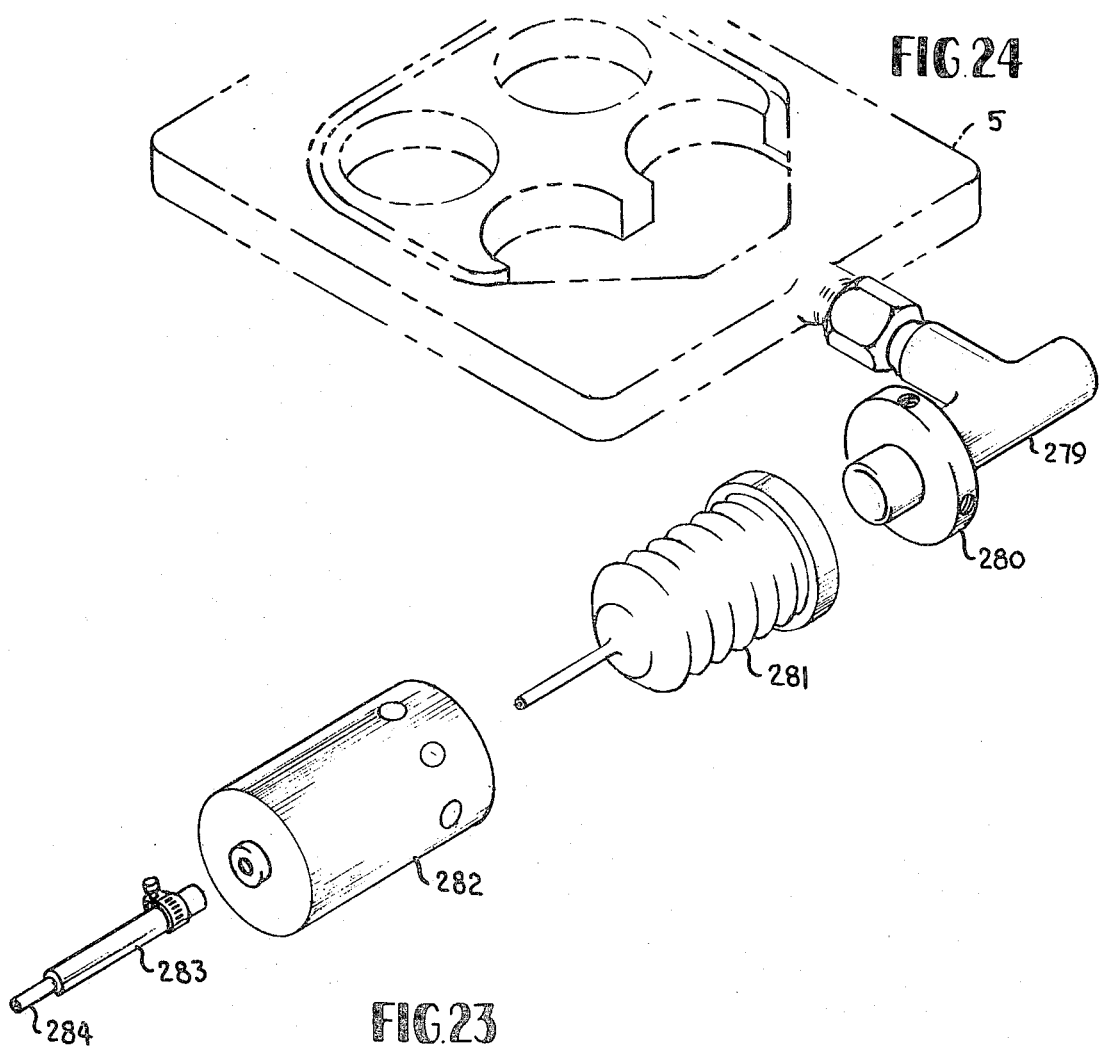
FIG. 24 is an exploded view of the valve of FIG. 23.
Figure 23:
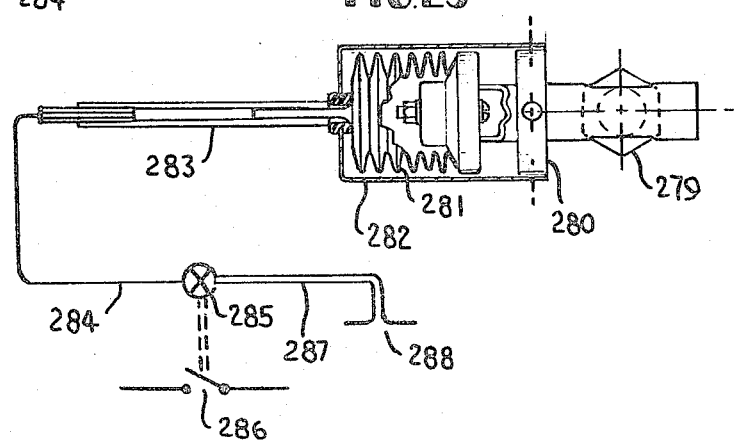
FIG. 23 is a diagrammatic view partly in section of a vacuum lean out valve to cut engine combustion at ignition off without afterfine.

One of the serious problems confronted in controlling exhaust emissions is the tendency of engines set for minimum emissions to after fire at time of turning off the car ignition key. One effective solution to this prblem is shown in FIGS. 23 and 24. FIG. 24 shows an exploded assembly view of the parts shown assembled in FIG. 23. 5 is the carburetor adapter plate previously described. 279 is a T fitting brazed into the exhaust transfer line at its end. 280 is a support ring for case 289. High temperature Teflon molded bellows 281 are inserted into case 282. Tubes 283 and 284 connect to valve 285 which is controlled by ignition switch 286. Valve 285 is closed when ignition switch 286 is closed and the engine is therefore running. When ignition switch 286 is opened to stop engine operation valve 285 opens and vacuum from engine intake manifold 288 is connected through tube 287 through open valve 285 through tubes 289 and 283 to evacuate bellows 281, drawing its soft end seal plug back away from the exhaust transfer line T allowing full atmospheric pressure to immediately enter through holes in case 282 to lean out plus internal air cool the engine to point of no combustion to cause smooth engine stoppage on key ignition off.

The system as shown uses exhaust gas to insulate the steam to keep it at high temperature. Other well known thermal insulation can be applied to the flash boiler tube or tubes after they leave the maximum temperature superheat to carry this superheated steam direct to the intake manifold. With this system it is again very important to use superheated steam of maximum temperature and as before a high pressure feed and transfer system is most important. In all cases the maximum combustion temperature of the combustion chamber surfaces should be the location of the flash boiler maximum temperature point or the heat should be transferred by heat pipe to the flash boiler outside the combustion chamber, as previously described.

Figure 53:
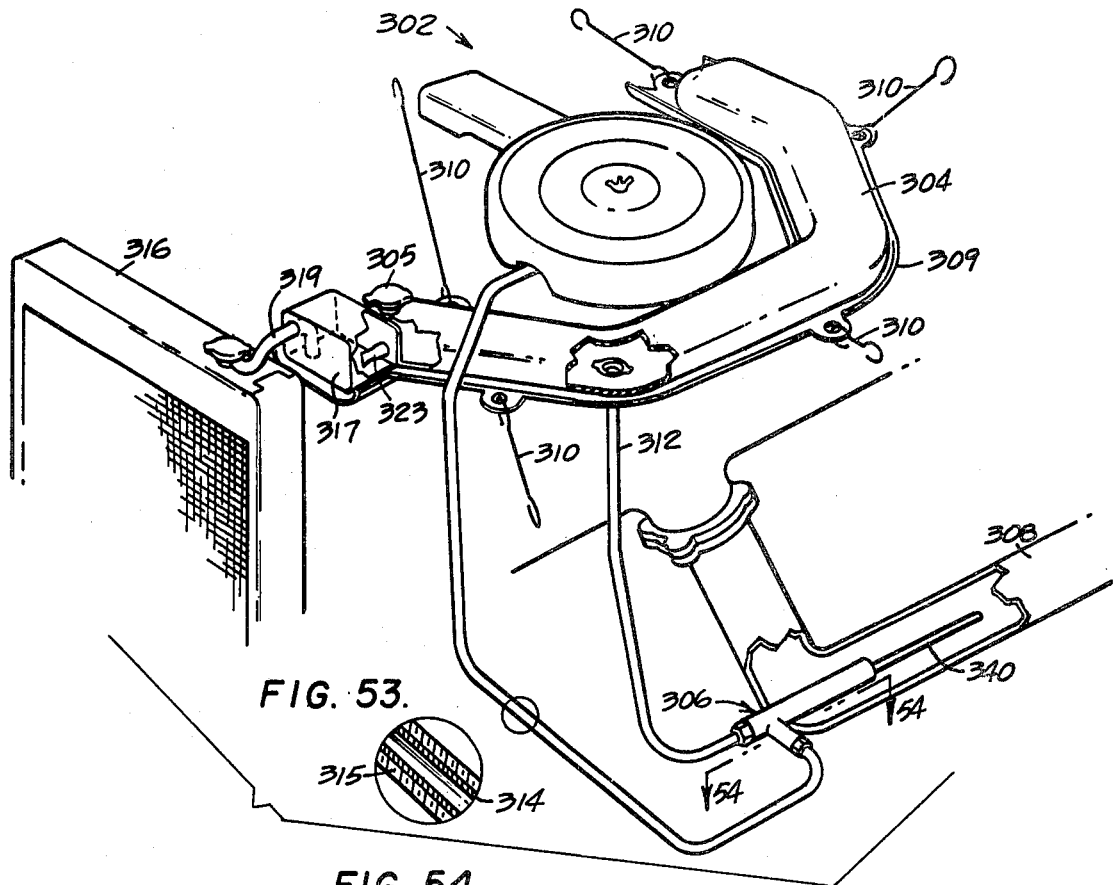
FIG. 53 is an isometric view of another embodiment of an emission control system constructed in accordance with the present invention. In the FIG. 53 form of the invention the flash boiler and related conduits inject only superheated steam (without exhaust gas) into the engine; the water tank is mounted in the engine compartment above the engine to provide gravity feed; and the flash boiler incorporates a variable orifice flow control valve for regulating the amount of water converted to steam in response to engine's need.

A steam injection system constructed in accordance with another embodiment of the present invention is illustrated in FIG. 53 and is indicated generally by the reference numeral 302.

The embodiment shown in FIG. 53 injects only steam. It does not inject exhaust gases with the steam as was done in some of the other embodiments described above.

Also in the embodiment shown in FIG. 53 the amount of steam injected is controlled by a variable orifice flow control valve incorporated in the flash boiler. The flow area through the variable orifice flow control valve is controlled in response to the engine's need for injected steam. The value controls the flow of water from the supply tank into the steam flash boiler.

As will be described in further detail below in a specific embodiment, the flow control valve is actuated in response to the temperature of the exhaust gas.

As illustrated in FIG. 53, a water tank 304 is mounted in the engine compartment above the engine so as to provide a gravity feed to a flash boiler 306 mounted in the engine exhaust pipe 308.

The water tank in the FIG. 53 embodiment is mounted high in the engine compartment to provide a maximum amount of gravity feed to the flash boiler. The flash boiler entrance is mounted at a relatively low point in the engine exhaust pipe.

Putting the tank in the engine compartment permits the rising heat from the engine to warm the water which minimizes problems of icing, as compared to locating the water tank in some other part of the automobile. Furthermore, a tube from the exhaust pipe can be run up through the water tank or close to the water line to heat the water, however this normally will not be needed.

Putting the tank up front and as high as you can get it in the engine compartment not only provides increased gravity feed but also minimizes the effects of grades.

The tank 304 is preferably relatively soft to permit ambient air pressure to act through the walls of the tank and on the water within the tank.

The flow of generated steam to the engine is controlled in response to engine need by a variable orifice flow control valve incorporated in the flash boiler. The variable orifice flow control valve not only regulates the amount of steam injected into the engine; it also acts as a shut-off valve to prevent liquid lock. That is, when the engine is not running, the variable orifice flow control valve is closed to prevent any water from flowing through the valve to the engine cylinders.

The tank 304 is mounted in position on a tray or shelf 309 by a series of cables or springs 310 as illustrated. The support-tray 309 provides a very simple means of mounting the tank 304. The tank 304 is flexible and is preferably filled from a flat condition to permit total filling without air in the tank. With the present invention about one-fifth as much water as gasoline is required. So, for a 25 gallon gasoline tank about five gallons of water are needed for each tank of gas.

A tube 312 conducts water from the tank 304 to the inlet of the flash boiler 306. By taking the water out of the bottom of the tank 304 as illustrated in FIG. 53, any freezing of water in the tank will be least likely to prevent the supply of water from the tank to the flash boiler since the water will freeze across the upper surface first and will freeze across the opening for the conduit 312 last. Further engine heat will heat tube 312 and the base of the tank 304 first to rapidly get water flow to the flash boiler even under total freeze conditions.

A tube 314 conducts steam from the outlet of the flash boiler 306 to the engine. The line 314 is a relatively large diameter line which permits a substantial amount of steam to flow due to low impedance. The line 314 is also kept as short as possible to minimize the impedance. As described above in reference to other embodiments of the invention, the tube 314 can be connected to a ported vent of the carburetor, or to an adaptor plate like the plate 5 of FIG. 2 or to the inlet manifold.

The tube 314 is insulated up to the point of connection to the engine with insulation 315 so that the superheated steam coming out of the flash boiler is kept as hot as possible. The insulation 315 may be a glass tape wrapped around the tube 314 or other suitable insulation as multiple layers of aluminum foil and glass cloth or asbestos insulation.

The location of the water tank in the engine compartment has a further advantage of permitting a single fill point 305 for filling the water tank and the engine radiator 316 as well as other water containers, such as the windshield washer bottle and an outlet to provide warm water for the passenger compartment as will be described in greater detail with reference to FIGS. 80-82.

The single fill point arrangement for adding water only to the tank 304 has several advantages. As will be described in more detail below, the check valves associated with the radiator 316 and the various additional tanks prevent dirty water from entering the water tank for the flash boiler and thus prevent dirty water from entering into the engine combustion chambers. The combination of the single fill point with the check valve arrangements with the additional tanks also ensures that the engine radiator and the windshield washer bottle always contain sufficient water.

As illustrated in FIG. 53, the radiator has an overflow tank 317 connected to the radiator cap by a line 319. The line permits liquid to flow from the radiator to the tank 317 under certain pressure conditions and it permits water to be sucked back from the tank 317 to the radiator cap and to the radiator under other conditions of operation. A one way check valve 323 connects the tank 317 to the tank 304.

The tube 312 is maintained as short as possible and is of a relatively large diameter to minimize the resistance to flow through the tube 312.

The connection of the steam conduit 314 to the carburetor is shown in more detail in FIGS. 61-63 and in FIGS. 71-76.

Figures 77, 78:
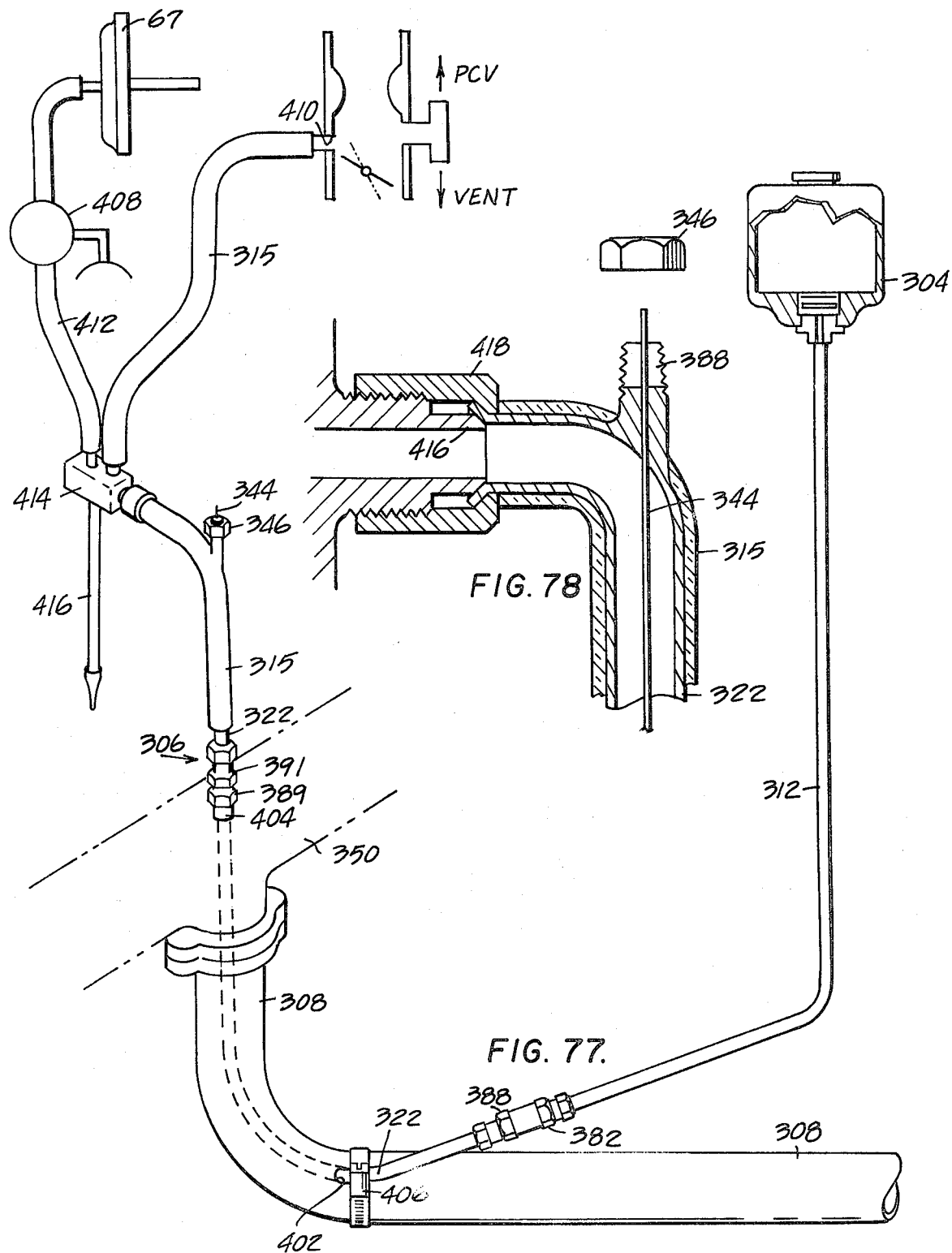
FIG. 77 is an isometric, diagrammatic view showing another embodiment of the flash boiler installation constructed in accordance with the present invention. The flash boiler incorporated in the FIG. 77 embodiment is a flow through flash boiler and is fitted within a shaped hole formed in the engine exhaust pipe. The steam produced by the flash boiler is conducted to the vacuum spark advance of the engine to provide retard of the spark advance on acceleration similar to that produced by the exhaust retard control of FIG. 3 and the control of FIG. 12 and FIG. 45.
FIG. 78 is a fragmentary enlarged view showing the connection of the steam conduit to a steam-water separator box and showing the clamping arrangement for adjusting the control wire of the variable area orifice flow control valve of the flash boiler. The clamp arrangement shown in FIG. 78 is like that shown in FIG. 64 and FIG. 65.

In another embodiment of the present invention the steam conduit 312 is connected to the vacuum spark advance for retarding the spark advance as illustrated in FIG. 77 and described in greater detail below.

Figure 54:
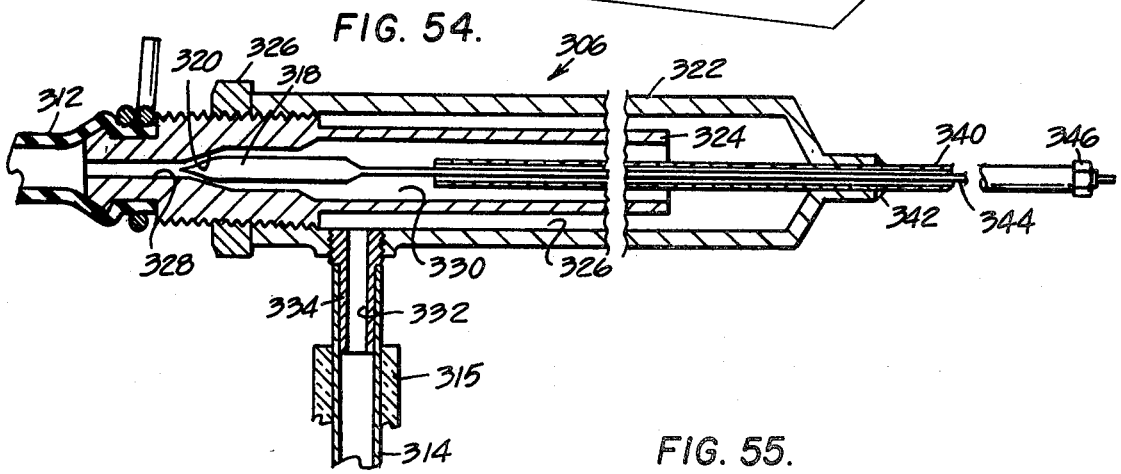
FIG. 54 is a cross-section view, taken along the line and in the direction indicated by the arrows 54—54 in FIG. 53 of the flash boiler incorporated in the FIG. 53 embodiment.

The flash boiler 306 is shown in more detail in FIG. 54. As shown in FIG. 54 the flash boiler 306 is a concentric tube construction and relies on the differential thermal expansion of different materials to control the position of a variable orifice control valve in response to the temperature in the exhaust pipe of the engine.

A movable valve element 318 coacts with a valve seat 320 to control the flow of water through the water inlet conduit 312 into the interior of the flash boiler 306.

The valve element 318 is positioned in the flash boiler to meet the water rather than the steam. This makes the metering function easier because less movement is required to control the water flow than to control the less dense steam flow. It also minimizes problems of corrosion.

The valve element 318 has a contour which produces the proper amount of steam injection under all conditions of operation of the engine as will be described in greater detail below.

The flash boiler 306 comprises an outer housing 322 which is a thin wall construction to facilitate heat transfer through the housing. At one end the outer housing 322 is attached to a tube 324. The tube 324 contains the valve seat 320 at its forward end, and the outer housing 322 is screwed on to the tube and locked in position by a lock nut 326 as illustrated in FIG. 54.

The tube 324 is concentric within the outer housing 322; and, as illustrated, forms a folded back flow path 326 disposed annularly around the outside of the tube 324. Thus, water flows into the flash boiler from the conduit 312 through a passageway 328, past the valve element 318 and into the interior 330 of the tube 324 where it is converted to steam by the hot exhaust gases surrounding the outside of the outer housing 322. The steam must then pass out the rear end of the tube 324 and then flow back around the outside of the passageway 326, where it is superheated, before it can flow into the outlet passageway 332 of the flash boiler and into the steam conduit 314.

The outlet passageway 332 is formed in a short pipe 334 which is screwed into the outer housing 322 as illustrated in FIG. 54. The pipe 334 can also be welded in place.

Insulation 315, which may be glass tape, extends around the outside of the conduit 314 to retain as much as possible of the heat within the superheated steam flowing through the conduit 314. The insulation 315 can also be a flexible glass sleeving or other suitable material, such as asbestos.

The valve element 318, and the flow area between the valve seat 320 and the valve element 318, is controlled in response to the engine's need for steam. In the FIGS. 53-55 embodiment of this invention the temperatures of the exhaust gases in the exhaust pipe 308 produce differential thermal expansion of the flash boiler structure to control the position of the valve element 318, as will be more apparent from the description of the structure and mounting of the flash boiler which follows.

The flash boiler 306 is fitted within a shaped hole formed in the exhaust pipe 308. A hole is drilled perpendicular to the pipe and a rod is then inserted in the hole. The area around the hole is heated to permit shaping. The rod is then rotated to produce the curvature of the area around the hole so that the flash boiler fits in at a slight angle rather than completely perpendicular. This also provides a good seal around the flash boiler.

Actual tests have indicated that sealing material is not really needed, but in practice it is preferable to use a calking type of material which is commercially available as an exhaust gas sealing material. This material is put on and the flash boiler is clamped in place, and the material then sets up to provide a seal.

The flash boiler 306 includes a tube 340 which projects inwardly into the interior of the outer housing 322 and which also extends outwardly for a sufficient extent to provide the necessary differential thermal expansion to control the positioning of the valve element 318. The tube 340 is welded, as by heliarc welding at 342 to the outer housing 322.

A thin wire 344 extends through the interior of the tube 340 and is connected to the valve element 318 or forms it at one end. While not illustrated in the drawing, the wire 344 can itself serve as the valve element 318 by suitably shaping the end of the wire 344 and making it larger in diameter.

The other end of the wire 344 is connected to the end of the tube 340, either by a lock nut 346 as illustrated in FIG. 54 (and as also described in more detail below with reference to FIGS. 64 and 65) or by crimping the end of the tube 340 and swaging or by heliarc welding, depending upon the materials used.

The valve element 318 is positioned in response to the exhaust gas temperature and this positioning is achieved by making the wire 344 and the tube 340 of different materials so that the tube 340 will expand more rapidly with increases in temperature than the wire 344.

In one embodiment of the present invention the tube 340 is a stainless steel tube $\frac{1}{8}$" in outside diameter and about 0.060 of an inch inside diameter. The wire 344 is a tungsten, molybdenum or zirconium wire, coated with corrosion resistant material if operating temperatures require (silicon, gold, nickel and many others might be used) or wire of other material having a coefficient of expansion about one-half that of the stainless steel tube 340 and also having the necessary resistance to corrosion at the high temperatures produced by the superheated steam within the flash boiler. The wire 344, and the specific embodiment referred to above, is 0.040 inch in outside diameter but can be larger or smaller.

The inside diameter of the tube 340 is just slightly greater than the outside diameter of the wire 344 to permit the wire 344 to expand and move axially within the interior of the tube but to prevent any substantial flexing of the wire 344 in a lateral direction. The entire thermal expansion of the tube 340 with respect to the wire 344 is therefore translated to the valve element 318 as axial movement of the valve element 318 with respect to the valve seat 320.

In the assembly of the flash boiler 306, the wire 344 is positioned within the tube 340 to engage the valve element 318 with the valve seat 320 and to close off the flow of water through the passageway 328 into the flash boiler at temperatures corresponding to exhaust gas temperatures when the engine is not operating. The length of the tube 340 is related to the relative coefficients of thermal expansion of the tube 340 and the wire 344 to cause the valve element 318 to retract from the valve seat 320 as soon as the engine is started and the exhaust gas temperatures corresponding to engine start-up act on the flash boiler 306. In the area of engagement with exhaust header 308, body 322 may be tapered (not shown) to aid seal at installation. A wire clamp, not shown, may be used to assure tight installation to the header. The valve head 318 is held seated against a valve seat 320 when the flash boiler is cold because the 0.040 tungsten wire has only 0.010 to 0.020 inch clearance between the wire and the internal diameter of the ⅜" stainless steel tube.

The threaded connection between the outer housing 322 and the tube 324 also permits obtaining any desired amount of initial load between the valve head 318 and the valve seat 320. This is in addition to the adjustment provided by the clamping arrangement 346 to be described below with reference to FIGS. 64 and 65.

The valve element 318 is, in the FIG. 54 form of the flash boiler, seated by the inherent stiffness of the members.

In the FIG. 56 embodiment of the flash boiler the valve element is seated by a spring as will be described in greater detail below.

The coaxial arrangement shown in FIG. 54 has some advantages over the embodiment of the flash boiler shown in FIG. 56. The coaxial construction eliminates warping and a tendency of one part to crawl with respect to an adjacent part due to inherent temperature difference of the two tubes. Because the construction is coaxial, the clearances cannot change appreciably even if there should be some distortion in the flash boiler.

The axial movement of the valve element 318 and the contour of this valve element with respect to the contour of the valve seat 320 coact to regulate the supply of steam to the engine in response to the engine's need of steam.

The engine's need for steam is greatest at full throttle and less but essential at low speed, full load conditions. Under these conditions of full throttle the problems of detonation, preignition and excess emissions are the greatest. The correct amount of steam is needed at each time to improve the distribution, to soak up the energy during compression, to snub the peak temperatures by transferring high heat spots to lower heat spots in the cylinder and to provide smoother energy on the expansion stroke. On acceleration under these conditions the load on the engine increases substantially, and the exhaust gas temperature rises quickly while the speed of the engine is low on the horsepower curve. The engine need is thus related to the load, the temperature and the speed. It is also indicated by the brake mean effective pressure (BMEP).

The exhaust gas temperature is a good indicator of an engine need because it changes rapidly as the engine's need for steam changes. Thus, the temperature of the exhaust changes more rapidly than the engine block temperature. The exhaust gas temperature is therefore an indication of the energy flow through the system. Making the position of the exhaust valve 318 responsive to the change in the exhaust gas temperature, therefore, provides control means responsive to the energy flow through the system. This also provides a flow of steam in response to the rate of change of energy flow since during acceleration the valve opens more so that it is more than just a thermal valve. The variable orifice therefore acts together with whatever produces the driving force for moving the water past the valve to result in a steam flow that matches what the engine requires. The variable orifice valve provides the proper steam amount (the proper mass of steam) to meet the true engine need. If too much steam is provided (say at low power) it can result in low combustion efficiency and excess emissions. If too little steam is provided, the steam injection does not produce the results desired and emissions again rise and dieseling or after fire at shut down occur. There therefore is a band width for the positioning of the valve throughout the range of operation of the engine.

The driving force for moving the water through the variable orifice valve results from a combination of factors. As noted above, the gravity feed is a very important factor. Some additional benefit is also obtained from the heating of the water and the increased vapor pressure produced by the heating of the water from the heat rising from the engine. This of course only occurs with a hard wall tank. A soft tank will still give atmospheric pressure in the tank. Another factor which causes the water to be supplied to the flash boiler and then to the engine as steam is the vacuum produced by the engine. This is the vacuum on the intake manifold. The top surface of water in the supply tank 304 is of course exposed to atmospheric pressure at all times through the flexible walls of the plastic tank. The atmospheric pressure is a relatively constant pressure. The engine vacuum is a variable which is the greatest at low power and which is the least at high power. Therefore, if the engine is operating under high power, you are dependent primarily on the gravity feed and there is a reduction in the vacuum effect produced by the atmospheric pressure-engine vacuum differential.

Figure 55:
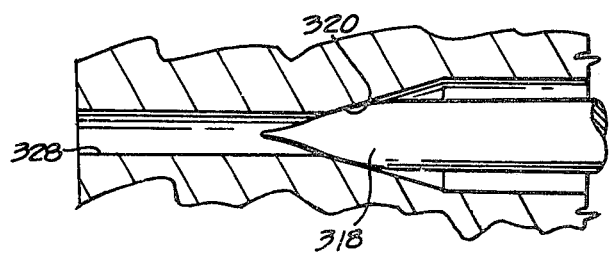
FIG. 55 is a fragmentary enlarged view showing details of construction of the variable orifice valve incorporated in the flash boiler of FIG. 54.

As illustrated in FIG. 55, the contour of the valve element 318 with respect to the valve seat 320 is such that you get an increase (with retraction of the valve element 318 from the seat 320) which is greater than a straight linear relationship.

The valve element 318 has a curvature which acts with the taper of the valve seat 320 to provide a more than linear increase of flow area on retraction movement of the valve element 318. This causes more steam to be injected (to meet the requirements of prevention of detonation, increasing combustion efficiency, preventing pre-ignition, and preventing nitrous oxide formation) as the exhaust gas temperature increases to cause the retraction movement of the valve element 318.

This same result could be obtained by controlling the shape of the valve seat. In some cases it is preferable to shape both the valve element and the valve seat. The objective is always to match the flow area during retraction of the valve element to the engine need corresponding to that amount of retraction while taking proper account of the changing water pressure differential caused by changing vacuum with engine RPM and throttle setting. These of course are quite different between ported vent, carburetor plate and above carburetor inside air filter.

The point of injection of the steam is important. If the steam is injected before the venturi of the carburetor (as by going in above the throttle), the steam is cooled as it goes past the venturi point. In the present invention therefore the steam is, in most instances, injected below the throttle. By using a variable area orifice valve and by the design of the valve itself, the valve will more than compensate for the change in pressure differential as the engine goes from a high vacuum at low throttle to a low (½ pound or less) vacuum at full throttle.

A one shot acceleration pump for injecting steam cannot do the job because under steady load (the condition most often incurred) the engine does not get any injection.

In the present invention by going from a water tank at the top of the engine to a flash boiler at the bottom of the exhaust system, several pounds of gravity feed pressure are always available. This gravity feed pressure is combined with acceleration effects (the increased exhaust gas temperature which opens the valve more, and the increased pressure differential between the atmospheric pressure in the water supply tank and the increased suction created in the intake manifold on acceleration when using ported vent) for providing a greater driving force for moving the water through the valve on acceleration and also the increased exhaust gas temperature moves the transition vapor liquid plane back toward the water inlet thus increasing conversion of water to steam beyond the valve.

FIG. 59 illustrates a water tank-flash boiler installation which is particularly adapted for new car installation. While the embodiment shown in FIG. 59 loses some of the gravity feed effect because the water is not dropped as far, the FIG. 59 embodiment has offsetting factors. Thus, the length of the steam flow conduit 314 is shorter in FIG. 59 because the flash boiler 306 is mounted in the top of the exhaust gas manifold 350. This is a shorter path than going from the exhaust pipe to the inlet of the engine. There is less path for the loss of heat from the generated steam. The way of mounting shown in FIG. 59 in the exhaust gas manifold 350 permits a larger diameter tube to be used and this lowers the impedance. The way of mounting also permits a relatively long flash boiler to be used and this permits greater heat transfer. The flash boiler 306 is coaxial like the embodiment shown in FIG. 54. The wire 344 is welded or brazed to the end of the tube 340 in the FIG. 59 flash boiler. The position of the wire 344 with respect to the tube 340 is adjusted to provide proper operation prior to welding or brazing.

As illustrated in FIG. 79, the water tank 304 is a doughnut shaped tank which encircles the air cleaner housing. The tank 304 is connected to the radiator 316 through an additional tank 352, and the details of the tank 352 are shown in FIGS. 80 and 81. A conduit 354 extends from the bottom of the tank 304 to the additional tank 352, and a conduit 356 extends from the bottom of the interior of the tank 352 (see FIG. 82) to the radiator 316. The radiator cap and the conduit 356 have the dual capability of permitting flow from the radiator to the tank 352 when the radiator pressure gets above a certain pressure and also permitting a reverse flow from the overflow tank 352 back through the line 356 and into the radiator 316 on suction conditions.

A short piece of flexible tubing 358 fits over the end of the conduit 354 which projects within the tank 352. As shown in FIG. 8 when the water level is low, this tubing 358 is opened by the difference in head in the tanks 304 and 352 to permit the water flow from the tank 304 into the tank 352. As shown in FIG. 81 when the tank 352 contains sufficient water, the pressure of the water acting on the outsides of the tube 358 and the normal flat shape of the tube collapse the tube to prevent reverse flow of water from the tank 352 back through the conduit 354 and into the tank 304.

As illustrated in FIGS. 79 and 82 additional tanks 360 and 362 are connected to the tank 304 for the windshield washers and for supplying heated water to the passenger compartment, respectively.

In accordance with the present invention a low level water warning system is incorporated in the tank 304 as illustrated in FIG. 57.

A low water level detector, indicated generally by the reference numeral 364, is mounted in the water tank 304 and is connected to a warning light 366 which is mounted in the passenger compartment of the automobile, preferably in a prominent place on the dashboard.

The detector 364 comprises a conductor 368 which is mounted in an insulator 370. The insulator 370 extends a short distance above the bottom of the tank 304, and the conductor 368 extends upwardly from the top surface as illustrated.

The conductor 368 is connected to a capacitor pickup 372 which surrounds one of the spark plug wires 374 going from the distributor to a spark plug. The conductor 368 is also connected to the warning light 366, which as illustrated is preferably a neon bulb. The bulb flashes in synchronism with the current flow from the distributor to the spark plug through the wire 374 when the water level drops below the upper surface of the insulator 370. When the water drops below the upper surface of the insulator 370, the flow path from the upper tip of the conductor 368 to the upper end of the grounded metal tube 312 is broken, since the water no longer connects these two elements, and the warning light 366 then flashes to indicate the low water level condition. This liquid level indicator is covered by U.S. Pat. No. 2,618,248.

As illustrated in FIG. 58 an inductive pickup 376 may also be used in place of the capacitive pickup 372.

Another embodiment of a flash boiler 306 is shown in FIG. 56, and the details of the variable orifice flow control valve of this embodiment are shown in FIG. 60.

The flash boiler 306 shown in FIG. 56 is mounted in the engine exhaust pipe 308.

To simplify the installation of the FIG. 56 form of the flash boiler a section of the exhaust pipe is cut out and a plate 378 of the flash boiler is welded into the exhaust pipe. This permits the flash boiler 306 shown in FIG. 56 to be completely assembled at the factory and installed as a unit in the exhaust pipe without the need to adjust or calibrate the flash boiler in any way at the time of actual installation. The actual installation involves only a very simple cutting of the exhaust pipe and welding of the plate 378 in place.

The flash boiler 306 shown in FIG. 56 has two outer housings 322 and 380 mounted side by side. The water inlet conduit 312 is connected to the outer housing 322 and the steam outlet conduit 314 is connected to the outer housing 380 of the flash boiler. The water flows into the flash boiler through an inlet passageway 328 in a fitting 382. The valve seat 320 is also formed in the fitting 382.

The valve element 318 is mounted in, or formed as part of, a cylindrically shaped spring retainer 384. The wire 344 is welded or otherwise suitably attached to the valve element 318.

The spring retainer 384 includes two or more ports 385 to ensure free flow of the water from the variable area orifice flash control valve past the spring retainer 384 and into the flash boiler.

A spring 386 engages the inside of the spring retainer 384 and an inner face of a second fitting 388 to urge the valve element 318 toward seating contact with the valve seat 320. The threaded connection between the fittings 382 and 388 permit adjustment of the valve seat 320 with respect to the outer housing 322 to ensure proper seating of the valve element 318 against the valve seat 320 by the spring 386 when the engine is not running. The wire 344 thus acts in tension in the FIG. 56 embodiment of the flash boiler rather than in compression as in the FIG. 54 embodiment.

As illustrated in FIGS. 64 and 65 the end of the wire 344 may also be adjusted with respect to the end of the outer housing 322 by the clamping arrangement 346. The clamping arrangement 346 includes an outer nut 346 which, when screwed onto the split ends of a bolt 388, progressively clamps the split ends inwardly against the wire 344 to hold the wire in any adjusted position. As illustrated the bolt 388 may be connected to the outer housing 322 by weldment 390.

When the engine accelerates the exhaust gas temperatures increase rapidly, particularly at full throttle acceleration from a relatively low speed, and the increase in exhaust gas temperature produces more steam. That is, the water entering the flash boiler past the valve element 318 is converted to steam more rapidly than is the case under steady load conditions. More steam is produced, and the steam is produced more quickly on acceleration because of the increased exhaust gas temperatures. This increased generation of steam can have the effect of forcing the flow of water in the conduit 312 backward into the tank 304 if the impedance or resistance in the conduit is not sufficient to prevent this reverse flow. Such reverse flow is undesirable because it tends to decrease the amount of steam that is generated, and, as noted above, under such conditions of acceleration, the engine's need for steam is the greatest.

In accordance with the present invention a check valve is incorporated in the connection between the conduit 312 and the water tank 304 to prevent such reverse flow of water. As illustrated in FIG. 66, the check valve is a plastic disc 392 which is lighter than water so that it floats in a counterbore 394 formed in the bottom wall of the tank 304. The plastic disc 392 thus floats above the upper end of a passageway 396 formed in a fitting 398 to permit water to flow in the direction indicated by the arrow in FIG. 66. However, when increased steam pressure tends to cause reverse flow of water in the conduit 312 (flow in a direction opposite to that indicated by the arrow) the disc 392 is forced upward to the position illustrated in phantom outline in FIG. 66 where it engages the bottom of the counterbore 394 to prevent flow from the passageway 396 into the interior of the water tank 304. As the generated steam flows into the engine and the pressure in the flash boiler reduces, the weight of the water in the tank 304 then acts on the plastic disc 392 to move the disc down to the position shown in bold outline 392 and normal flow of water in the direction indicated by the arrow resumes.

A screen 400 may be mounted above the counter bore 394 as illustrated to prevent foreign matter from entering the conduit 312 and the flash boiler.

The plastic disc 392 has very little inertia and requires no springs to perform its check valve function.

FIG. 77 illustrates an embodiment in which the flash boiler 306 is mounted in a flow-through installation. FIG. 77 also illustrates how the generated steam can be connected to the vacuum actuated spark advance to retard the spark advance on acceleration.

The flash boiler 306 in the FIG. 77 embodiment incorporates a variable area orifice flow control valve like that shown in FIG. 60, and the outer housing 322 of the flash boiler is mounted in the engine exhaust pipe 308 and the outlet manifold 350 within openings 402 and 404.

The fittings 382 and 388 provide for adjustment of the valve element 318 with respect to the valve seat 328 as described in relation to FIG. 60. As illustrated, these fittings are preferably physically spaced from the exhaust pipe. The space provides a heat barrier which avoids heating the water to steam prior to flow through the control valve.

The clamp 346 provides for additional adjustment of the wire 344 with respect to the outer housing 322 as described in relation to FIGS. 64 and 65.

The inlet part of the flash boiler 306 is clamped to the engine exhaust pipe 308 by a clamp 406.

The steam generated in the flash boiler 306 flows through the conduit 315 to the ported vent 410 below the throttle valve as illustrated in FIG. 77.

The steam is also conducted to the vacuum spark advance control 67 through a conduit 412 and a drain box 414 which has a drain pipe 416 for draining water which condenses from the steam The drain box 414 provides a space to prevent a slug of water from going up through the flash boiler outlet and into the conduit 315 and into the ported vent 410. The slug of water will instead go into the inside of the box 414 and drop out through the drain tube 416. The steam flowing through the box 414 goes up through the conduit 412 to the vacuum spark advance 67 to retard the spark on acceleration when the exhaust gas temperature rises and generates more steam. Putting the steam in an acceleration kills the vacuum which would normally cause advancement of the spark. The steam molecules take the place of the vacuum to in fact retard the spark above the condition existing at a steady state operation. By this system the normal vacuum spark advance control is disabled or partially disabled by the system shown in the FIG. 77. It, however, does retain the possibility of vacuum spark advance and an overheat control 408 during idle conditions which are built into some automobiles at the present time. The overheat control 408 is like that shown and described in FIG. 12.

As illustrated in FIG. 78 the upper end of the outer housing 322 of the flash boiler may be flared as illustrated and attached to a threaded fitting 416 on the drain box 414 by a nut 418.

The embodiment of the flash boiler 306 shown in FIG. 77 is largely pre-assembled and pre-adjusted at the factory before installation in the exhaust pipe 308 and the inlet manifold 350.

FIGS. 86–91 illustrate the mode of installation of the flash boiler shown in FIG. 77. After the holes 404 and 402 are drilled in the exhaust manifold 350 and the exhaust pipe 308, a tool is inserted in the hole 402 and twisted while the exhaust pipe is heated. This is done to shape and to align the hole so that the flash boiler can go right through the sidewall at the proper angle. A small spring 418 is then inserted through the hole 404 and is run down through the exhaust pipe 308 past the opening 402. As illustrated in FIG. 87 a hook is then inserted through the hole 402 and engaged with the spring.

The flexible spring is then pulled through the hole 402 as illustrated in FIG. 88. A piece of piano wire is then pushed through the spring 418 and the spring 418 is pulled back up through the hole 404. The piano wire 420 serves as a guide for the tubing which forms the outer housing 322 of the flash boiler and can be pushed over the wire or be attached and be pulled through by the wire.

As illustrated in FIG. 91 this tubing 322 is then inserted through the holes 404 and 402 and the end fittings 382, 388, 389 and 391 and the control wire 344 and valve element 318 illustrated in FIG. 77 are then attached to the projecting ends of the outer housing 322.

The flash boiler outer housing is long enough to get the required control motion of the wire. If the flash boiler is about 3 feet long, about 0.2 inch of control motion will be obtained with the combination of copper and steel. Double this amount of control motion is obtained with the same length of flash boiler if molybedenum and copper is used. If stainless steel and molybedenum is used, then approximately 0.2 inch of control motion is obtained.

It is desirable to obtain the best possible mixing of the injected steam with the fuel air mixture flowing to the engine cylinders.

In accordance with the present invention, resonance at ultrasonic frequencies is produced in the injected steam. The resonance produced causes pulses or shock waves in the fluid flowing into the engine. The shock waves increase the energy transferred to the engine itself. Pulsing at ultrasonic frequencies produces better mixing because it breaks down the barrier between the fuel and the air and the steam.

As illustrated in FIG. 61 a small orifice 422 is installed in the ported vent 410. The high velocity of the steam flowing through this small orifice 422 generates a shock wave to cause the desired ultrasonic result.

FIGS. 62, 63 and 71-75 show additional embodiments for producing the desired resonance.

As illustrated in the lower part of FIG. 62, the resonance may also be produced by a mechanical driver or an electro-mechanical driver 424.

FIG. 63 illustrates an embodiment in which a whistle 426 is incorporated in the steam inlet conduit 314 for producing resonance. The whistle 426 includes an adjustable stop 428 for setting the frequency of the ultrasonic sound wave. This is shown in more detail in FIG. 73.

Alternatively, the inlet conduit 314 may be connected to the top of the housing for the air filter to produce a dual port resonance arrangement as illustrated in the top of FIG. 62 and as illustrated in greater detail in FIGS. 71 and 72.

In this embodiment the air filter housing is formed with a dome shaped member 430. A generally cylindrical member 432 is located within the dome shaped member 430 and a central baffle 434 provides two or more ports 436 which, in combination with a lower baffle 438 causes the steam flow to form shock waves. The resonance chamber formed within the interior of the dome 430 then reinforces and focuses the shock waves downward and into the inlet carburetor as illustrated.

In the FIGS. 62 and 71 embodiment the two whistles oscillate, that is, one whistle produces a shock wave front at one instant of time, and then the other whistle produces the subsequent shock wave front in the next instant of time before the subsequent shock wave front by the first whistle. It is like a push-pull amplifier. The passageways 436 and the wall 438 act together to provide the resonance and the disturbance resonant chamber for producing alternation of the whistles.

Figure 92:
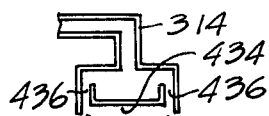
FIG. 92 is a diagrammatic view illustrating how the ultrasonic steam injection arrangement shown in detail in FIG. 71 operates as a resonant fluidic amplifier to produce a better distribution of the steam in the passageway below the carburetor. The arrangement shown in FIG. 92 involves a resonant whistle couple which causes the air to flow first in one downwardly curved direction as shown by the solid arrows and then in the other downwardly curved direction as shown by the dashed arrows.

FIG. 92 illustrates how an ultrasonic arrangement like that shown in FIG. 71 is made to function as a resonant fluidic amplifier for causing the mixture flow to sweep across the carburetor venturi in resonance with the alternation of the shock waves to provide better mixing and distribution.

When two whistles are diagonally offset from each other, the mixture flow follows first the path indicated by the full line arrows in FIG. 92 and then the path indicated by the dashed line arrows in FIG. 92 as the shock waves emanate from first one passage 436 and then the other passage 436 in the diagonal couple. A plurality of couples can be used to produce deflection in directions other than those indicated by the full line arrows and the dash line arrows in FIG. 92.

Figure 93:
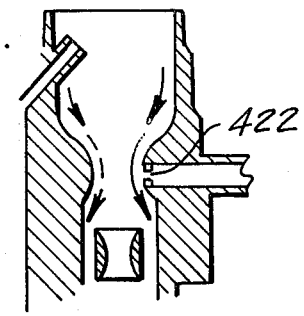
FIG. 93 is a diagrammatic view showing a boundary layer type of resonant fluidic amplifier associated with the venturi just downstream of the throat of the carburetor. The arrangement shown in FIG. 93 uses high frequency high pulses to deflect the stream at the same frequency as the pulses so that the stream will sweep back and forth across the passageway.

FIG. 93 illustrates another embodiment of a resonant fluidic amplifier constructed in accordance with the present invention.

In FIG. 93 an orifice 422 like that shown in FIG. 61 is incorporated in the sidewall of the carburetor slightly below the throat. The high frequency pulses produced by the orifice act on the boundary layer to deflect the stream at the same frequency as the pulses so that the stream sweeps alternately back and forth across the passageway as illustrated by the full line arrows and the dashed line arrows.

A steam whistle like the whistle 426 shown in FIG. 63 or a driver arrangement like 424 shown in FIG. 62 can also be used with the resonant fluidic amplifier arrangement shown in FIG. 93. Ultrasonic devices used with the embodiment shown in FIG. 93 can be located at one or more locations around the venturi to produce any desired geometry of stream deflection.

FIGS. 74-76 illustrate another embodiment of the present invention for producing resonance. In this embodiment the resonance is produced and focused by the adaptor plate 5. As best illustrated in FIG. 74, the adaptor plate 5 has an outer annular channel 440 connected to the steam inlet 314. A plurality of whistles 442 are connected to the channel 440 and produce shock waves in the steam flowing from the channel 440 into the inlet to the carburetor while focusing these shock waves to reinforce the energy distribution effect of the shock waves. Thus, as illustrated in detail in FIG. 75 each whistle 442 comprises a passageway 444 opening to the annular passageway 440. A baffle 446 causes the steam to divide into two paths and to flow through orifices 448. A second baffle 450 provides a resonance chamber 452 and causes the steam to exit from ports 454 in high energy intensity and focused shock waves. Because the shock waves are focused, the forces increase as the square of the mass velocity of the fluid flowing through the orifices. This produces a greatly increased energy transfer result.

Figure 83:
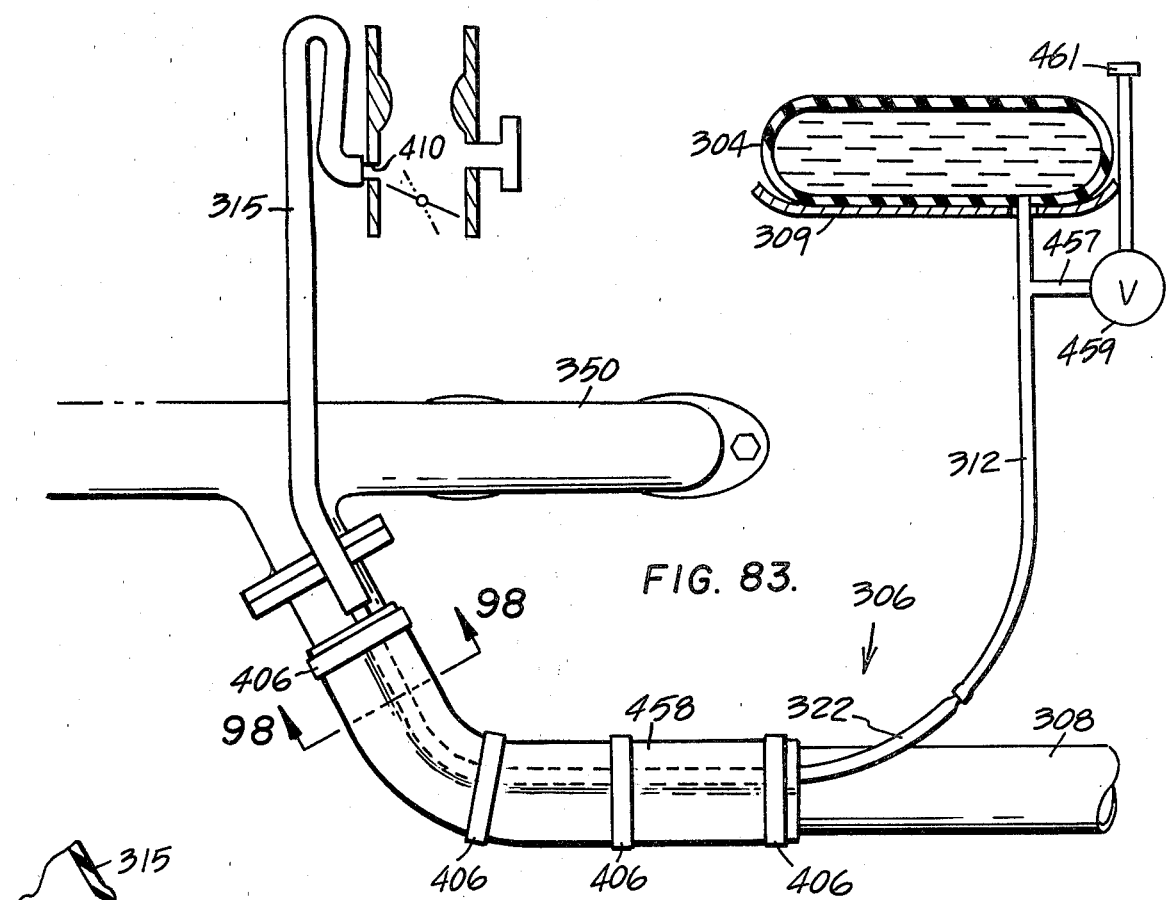
FIG. 83 is a side elevation view showing a flash boiler installed on the outside of the exhaust pipe in accordance with another embodiment of the present invention. In the FIG. 83 embodiment spring clips are used to clamp the flash boiler to the exhaust pipe; and an evacuated and seam welded aluminum foil blanket is clipped in place about the outside of the flash boiler to maintain the flash boiler in heat transferring contact with the exhaust pipe while permitting thermal expansion of the flash boiler components.
Figure 85:
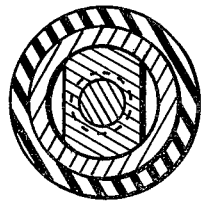
FIG. 85 is an elevation view in cross section taken along the line and in the direction indicated by the arrows 85—85 in FIG. 84.
Figure 84:
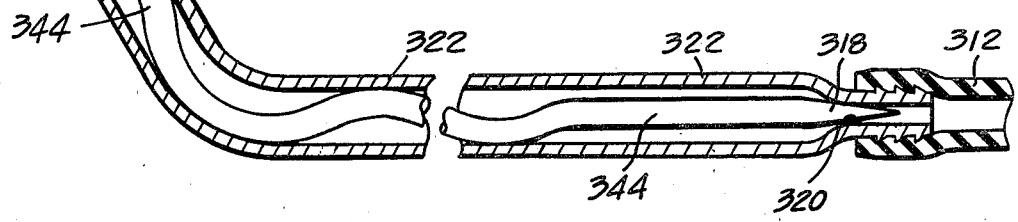
FIG. 84 is an enlarged side elevation view in cross section of the flash boiler and shows details of the variable area orifice flow control valve and a spiral coiled wire associated with the movable element of the flow control valve. The wire is spiral coiled within the flash boiler tube to permit bending of the tube (to conform to the exhaust gas pipe configuration) without restricting relative movement between the control wire and the flash boiler tube on differential thermal expansion and contraction of the flash boiler and without causing a change in the preset valve adjustment as the center of the spiral coil wire 344 remains in the tube center when the tube is bent.

Another embodiment of a flash boiler installation is illustrated in FIGS. 83-85. In this embodiment the flash boiler is attached to the outside of the exhaust pipe 308 and no modifications to the exhaust or the inlet manifold are required. The flash boiler 306 in the embodiment illustrated in FIGS. 83–85 uses the variable orifice control valve as illustrated in FIG. 84. However, the control rod 344 is pre-spiral wound to fit within the outer housing tube 322 so that it maintains near contact with the inside surface of the outer housing throughout its entire length. This permits the outer housing tube 322 to be shaped to the exhaust pipe without losing the adjustment of the control rod 344 with respect to the outer housing tube 322. The spiral coiled rod permits bending of the tube 322 (to conform to the exhaust pipe configuration) without change in the preadjusted relative position of valve 318 to seat 320. Thus, on differential thermal expansion of the tube 322 and the control rod 344 the valve element 318 moves off of the valve seat 320 in exactly the temperature responsive movement for which the flash boiler was designed and initially adjusted regardless of the configuration to which the outer housing tube 322 is bent for purposes of installation.

Figure 98:
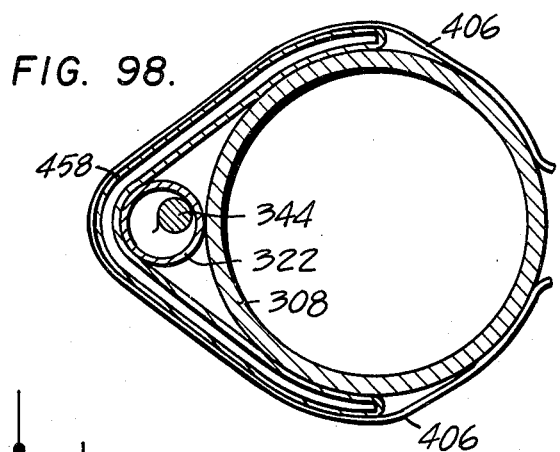
FIG. 98 is an elevation view showing an evacuated seam welded foil insulation blanket wrapped around a flash boiler on the outside of the exhaust pipe and is taken along the line and in the direction indicated by the arrows 98—98 in FIG. 85.

The end of the control rod 344 is retained by swedging 322 and 456 to secure the end of 344 as illustrated in FIGS. 84 and 85. As shown in FIGS. 83 and 98 an insulating blanket of dimpled multiple layers of metal foil as aluminum evacuated between layers and seam welded to retain the vacuum is secured over the flash boiler 306 and exhaust pipe 308 as shown. The blanket formed by seam welding the edges of the foil and evacuating the space between the welded foil sheets provides a highly effective insulator. The blanket can be wrapped completely around the exhaust pipe and flash boiler, but it is preferably placed about only the side of the exhaust pipe to which the flash boiler is attached. See FIG. 98. This permits the exhaust pipe to cool more quickly when the engine is shut off. The blanket may also be made large enough to be folded one or more times to provide multiple thicknesses when installed.

In one form of the invention the control rod 344 may be made by placing two rods side by side, clamping the end of both rods together and then twisting the rods until they are actually physically deformed to a spiral shape. The rods are then separated and one of the separated rods is put in the outer housing 322.

Several spring clamps 406 are used in installing the flash boiler 306 shown in FIGS. 83–85. This allows the flash boiler to be free to move and expand with changes in the temperature of the exhaust pipe 308. Except for the control valve the flash boiler is maintained in close heat transfer contact with the outside of the exhaust pipe 308 either by spiral wrapped tape, asbestos or glass tape, or by a ductile formable shield as shown.

It should be noted that, as pointed out above, the valve element 318 can be made by shaping the end of the rod 344 without attaching a separate formed part.

As illustrated in FIG. 83 the tank 304 is totally filled with water. A line 457 is connected to the line 312 in a T-fitting. A control valve 459 is located in the line 457, and a hose fitting 461 is on the end of the lines 457. The tank is preferably initially filled from a perfectly flat condition to eliminate an air space in the tank. To fill the tank 304 the hose fitting 461 is attached to a hose and the valve 459 is opened to let water flow into the tank 304 to fill the tank. The control valve 459 is then closed and the fill hose is disconnected from the hose fitting 461. The control valve 459 can be a one-way check valve, and can also include a drain valve.

Figure 94:
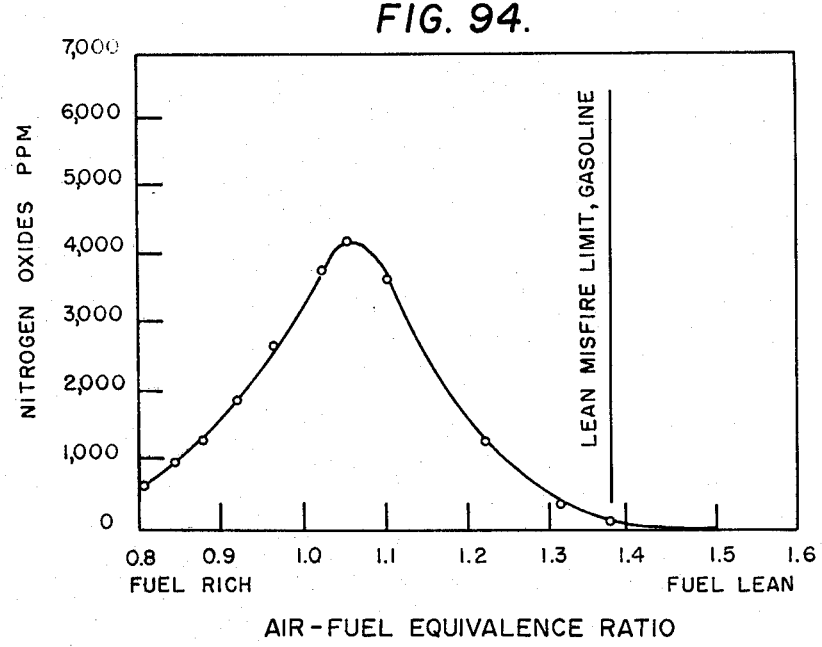
FIG. 94 is a graph of air fuel equivalence ratio versus nitrous oxides and shows how the nitrous oxides are drastically reduced at higher air-fuel ratios near the lean misfire limit line for gasoline.

FIG. 94 is a graph which shows the relationship of nitrogen oxides to air-fuel equivalence ratio. FIG. 94 also shows the lean misfire limit line for gasoline. This line lies about three-quarters of the way between the 1.3 and the 1.4 air fuel equivalence ratios. FIG. 94 illustrates that nitrogen oxides emissions are drastically reduced by operating near the lean misfire limit. Operating in this area also produces lower peak temperatures and some air cooling.

By adding hydrogen gas to the air-fuel mixture it is possible to operate on the right-hand side of the lean misfire limit line for gasoline shown in FIG. 94. The hydrogen gas has a very wide range of combustibility, and by adding hydrogen to the mixture it is possible to broaden the combustibility range, and this permits operating on the right-hand side of the lean misfire limit line as shown in FIG. 94. Adding hydrogen permits going lean and still getting consistent, steady combustion. Running on the lean side provides plenty of air to always create total combustion of the fuel so that you have a minimum of carbon monoxide and a minimum of unburned hydrocarbons. Also the temperature is brought down, in some cases as low as 1500° F. or 1300° F. degrees. In this range essentially all nitrous oxide formation is eliminated.

Even at higher combustion temperatures, the addition of steam, of course, helps to lower the combustion temperature.

However, running lean produces benefits separate and additional to the injection of steam. Running lean substantially cools the combustion cycle and in effect adds an air cycle. Thus, the addition of hydrogen to permit running lean provides benefits separate and additional to those benefits produced by the injection of steam as described above.

Another advantage of hydrogen is that it produces extremely high mobility because of its low mass, and therefore it ends up transferring energy readily between the steam, the hydrogen, the fuel and the air to create good heat transfer. This also provides good vaporization of the fuel and good distribution of all of these named constituents so that they will distribute equally between all of the cylinders. This uniform and even distribution is produced because hydrogen is an even better heat transfer agent than the steam itself.

It is an important feature of the present invention that the steam injection can be utilized to increase hydrogen gas inducted into the engine.

Hydrogen can be formed by a number of ways in association with the injected steam.

First, hydrogen can be formed by passing steam in excess over iron and then taking the resulting oxide and reducing it by hydrocarbons, such as water gas.

Secondly, the steam can be made to react directly on hydrocarbons to form hydrogen.

Third, hydrocarbons can be thermally decomposed to form hydrogen.

In all cases the yield of hydrogen from the use of the steam on the hydrocarbons can be greatly improved by the use of catalysts.

The reaction can also be made more complete and can be made to react easier by the use of ultrasonic energy.

Figure 95:
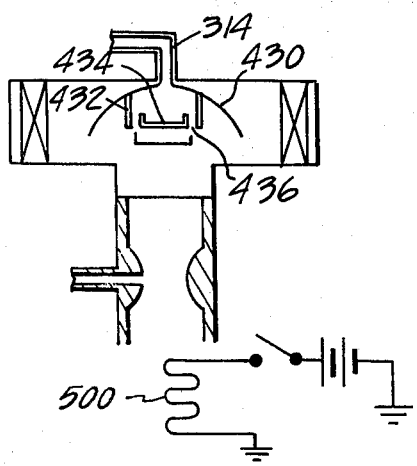
FIG. 95 is a diagrammatic side elevation view, partly in cross section, showing how a catalyst is associated with the ultrasonic steam injection arrangement shown in FIG. 71 for increasing the hydrogen gas in the fluid mixture inducted into the engine.

FIG. 95 shows an embodiment of the invention in which a catalyst is used with steam injected with ultrasonic energy.

As illustrated in FIG. 95 steam is injected in resonant shock waves through the opposed ports 434 as in the arrangements illustrated and described with references to FIGS. 71 and 92. The steam then passes over a catalyst 500 downstream of the venturi of the carburetor. As illustrated in FIG. 95 the fuel is injected at the throat. The air-fuel, steam mixture then passes over the catalyst 500.

The catalyst 500 may be a platinum catalyst. It may be preheated to an optimum reaction temperature. Platinum works better as a catalyst after it is warmed, and the injected steam helps to heat the platinum catalyst very rapidly. Electric heating may be added as illustrated in FIG. 96.

The catalyst 500 decomposes a part of the hydrocarbons in the mixture flowing across the catalyst to produce a substantial amount of hydrogen gas.

Figure 96:
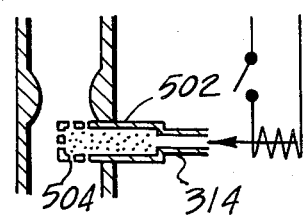
FIG. 96 is a side elevation view showing how a catalyst is mounted in a perforated structure which projects a short distance into the fuel-air mixture stream to provide an interaction area in which the catalyst reforms hydrocarbons into hydrogen gas, carbon dioxide and water in the form of steam.

FIG. 96 shows another embodiment of a catalyst constructed in accordance with the present invention. Electric heating may be added to further superheat the steam.

In FIG. 96 a cylindrical container 502 projects into the passageway downstream of the carburetor venturi. The cylinder 502 is perforated with openings 504 to permit the fuel-air mixture to flow readily into the interior of the cylinder. Superheated steam is conducted into the cylinder 502 by the steam conduit 314.

The cylinder 502 contains a catalyst for reforming the hydrocarbons into hydrogen and other components. The catalyst used in the FIG. 96 embodiment is powdered aluminum oxide and silico-carbide. The perforated cylinder 502 supports the catalyst and permits the fuel-air mixture to flow through the catalyst for the interaction to reform some of the hydrocarbons to hydrogen and other components.

Figure 97:
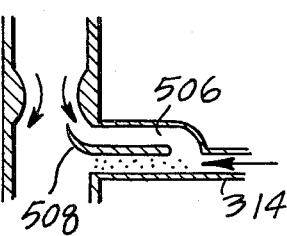
FIG. 97 is a side elevation view like FIG. 96 but showing an alternate embodiment in which the catalyst is mounted in a channel which receives steam at one end and which receives the fuel-air mixture by means of a total pressure scoop at the other end. The fuel-air mixture and the steam react with the catalyst to increase the hydrogen content of the mixture inducted into the engine.

FIG. 97 shows another embodiment of the present invention in which a channel 506 is located at one side of the passageway downstream of the carburetor throat. The channel 506 is supplied with a part of the fuel-air mixture going through the passageway by a total pressure scoop 508. Steam is also fed into the channel 506 by the steam conduit 314. A powdered catalyst is located in the channel 506, beneath the scoop 508 as illustrated, and the mixture of fuel, air and steam flows through the catalyst. Electric heating to heat the catalyst and/or further superheat the steam may be added as shown.

A suitable catalyst is powdered aluminum oxide and silico-carbide.

The channel 506 provides a means for localizing and for giving time for the reaction of the steam and the hydrocarbons. In all chemical reactions there is a certain amount of time needed to produce a desired amount of reaction, and the channel 506 provides for an adequate amount of reaction time before the components are fed back into the passageway, as illustrated by the arrow in FIG. 97.

Figure 99:
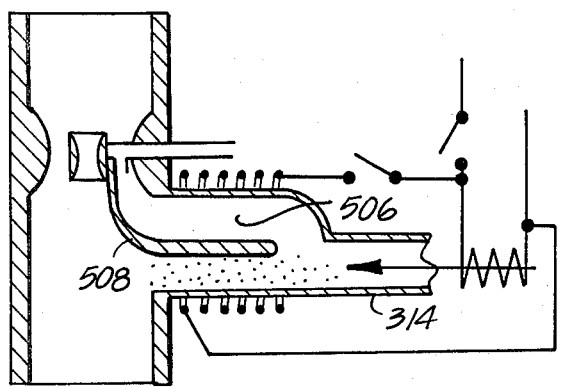
FIG. 99 is a view like FIG. 97 but showing a part of the carbureted fuel fed direct to the catalyst-steam reactor.
Figure 101:
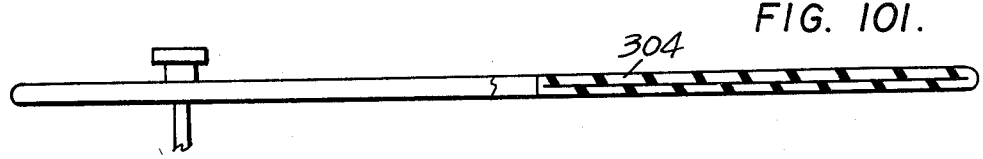
FIG. 101 is an elevation view showing the tank of FIG. 100 before it is placed on the air filter housing and before water is added to the tank.
Figure 100:
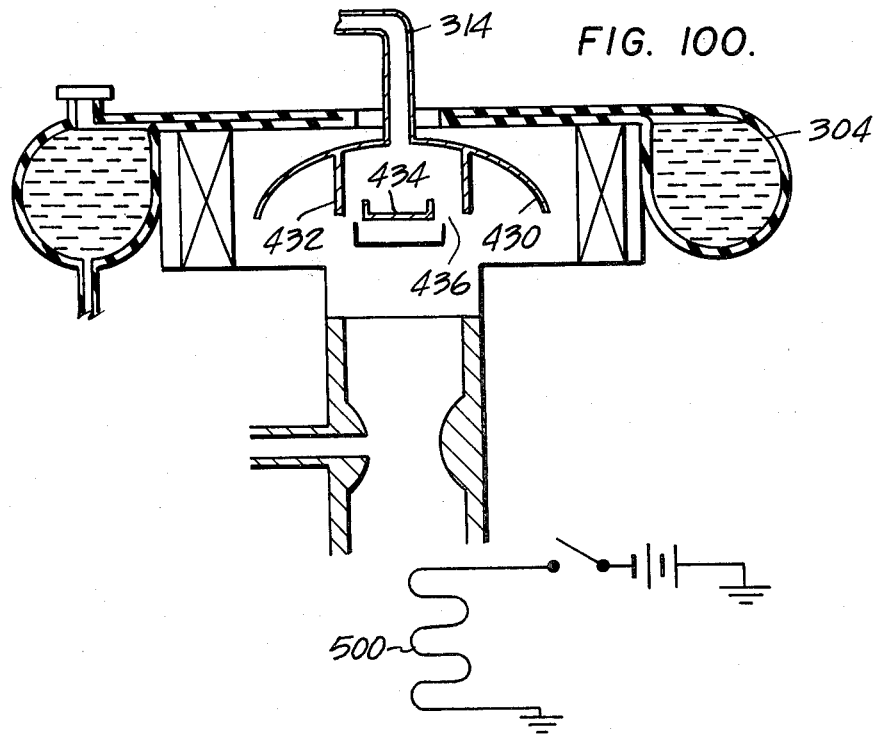
FIG. 100 is a view like FIG. 95 but showing how the water tank can be supported from the air filter housing.

As illustrated in FIG. 99, in place of the fuel air mixture a part of the carbureted fuel can be fed from the carburetor fuel output direct to the catalyst-steam reactor This reduces the heat energy required for the reaction.

The following general equation describes the reaction in which hydrogen gas is formed by the steam reforming process on hydrocarbons:

$$C_n H_m + H_2O \longrightarrow n CO + \frac{2n + m}{2} H_2$$

Under proper control conditions combustion is aided by the steam reforming process. Hydrocarbons furnish the source of hydrogen and the basic reaction is favored by higher temperatures and lower pressures. This is the combination that we have in the induction system. With the steam addition we have the temperatures and the lower pressures, and this is ideal.

The following formula describes the water gas, steam, shift reaction:

$$CO + H_2O \rightarrow CO_2 + H_2$$

This reaction is not affected by pressure, but it is favored by lower temperatures. Lower temperatures, however, reduce the reaction rate. So it is a matter of leveling and balancing.

A nickel base catalyst, a platinum catalyst or an aluminum oxide plus silico-carbide catalyst can be used for enhancing the amount of hydrogen produced by these general reactions.

This reforming process is also further aided by ultrasonic energy which (as described above) can be produced as an inherent part of the steam injection.

It is also possible to disassociate water by itself into free hydrogen gas and oxygen gas, without the presence of fuel or carbon monoxide, when the water is subjected to a high enough temperature.

In accordance with the present invention it is possible to get access to the high temperatures available in the combustion chamber by means of a coaxial flash boiler (that projects into the combustion chamber on at least a surface of the flash boiler) or by a heat pipe which conducts heat from the combustion chamber to the flash boiler with very little loss of heat in the heat pipe.

In addition, electric heating may be added to the heat from the combustion chamber to further superheat the water to cause it to disassociate into free hydrogen and oxygen.

Free hydrogen can therefore be produced in any number of ways. The free hydrogen can be produced by combining hydrocarbons with water or steam in a reaction to produce free hydrogen as one of the end products. The water alone can be disassociated by sufficient heat or by heat plus catalysts to form free hydrogen as one of the end products. The hydrocarbon fuel can be reformed by adding water or steam or some other material or in the presence of other materials (with the right amount of heat) to form free hydrogen gas as one of the end products.

As indicated above, the steam injection system of the present invention has utility in engines other than the reciprocating piston engine.

FIG. 67 illustrates an installation of the steam injection system of the present invention in a rotary engine of the Wankel type. In this case the flash boiler 306 is mounted in the exhaust pipe 308 for injecting steam into the air-fuel mixture flowing into the engine through the inlet manifold 460.

FIGS. 68 and 69 show an embodiment of the present invention incorporated in a gas turbine engine. In FIG. 68 the flash boiler 306 is mounted in the exhaust pipe of the jet engine on the outlet side of the turbine. The steam generated is injected into the combustion chamber of the gas turbine engine.

FIG. 69 shows an embodiment in which a flow-through flash boiler is used in place of the concentric type of flash boiler shown in FIG. 68.

The flash boiler can be positioned directly in the combustion chamber of the gas turbine engine instead of at the turbine outlet as illustrated in FIG. 68.

FIG. 70 illustrates an embodiment of the present invention in which a flash boiler is incorporated in a stationary combustion chamber 462 of the kind used for power plants or heaters. While pre-ignition and detonation are not problems with the combustion of fuels in gas turbine engines or in stationary combustion chambers for power plants or heaters, the injection of steam in accordance with the present invention does have the benefit of helping to control fuel vaporization, controlling the peak temperature of combustion, controlling the distribution of fuel within the combustion chamber, decreasing the desired emissions and increasing economy by improved combustion and the partial conversion of the hydrocarbon fuel to hydrogen as disclosed to further improve combustion especially in the lean range.

Another embodiment of an emission control system constructed in accordance with the present invention is illustrated in FIG. 102 and is indicated generally by the reference numeral 501.

The system 501 includes a water tank 503, a flash boiler 505 and a variable orifice control valve 507 for regulating the amount of feed water which can flow from the tank 503 to the flash boiler 505.

It is an important feature of the system 501 shown in FIG. 102 that the steam generated in the flash boiler 505 is fed into the induction system of the engine at the idle adjustment screw 509.

Feeding the steam into the engine at this point has a number of advantages. The idle adjustment screw location is a location of high turbulence in the carburetor, and this facilitates mixing of the steam with the air/fuel mixture.

Also, this location provides a very desirable relationship between the vacuum at this location and the throttle position.

This relationship is illustrated in FIG. 106 where the vacuum at the idle screw location is plotted for various throttle openings (as indicated by the dashed line). The vacuum at the idle screw location varies from about 10 inches of water at closed throttle to slightly over 100 inches of water at near full throttle in a generally linear relationship to increasing throttle opening. For the purposes of the present invention the amount and the variation of the vacuum at the idle screw provides a better coaction with the generated steam for supplying the engine need at the various throttle openings than does the vacuum at other locations, such as the vacuum within the manifold and beyond the carburetor (shown by the solid line in FIG. 106) or the vacuum at the ported vent (shown by the chain-dashed line in FIG. 106). The vacuum within the manifold and beyond the carburetor has a variation which is essentially just the opposite of what is desired for inducting the steam in the amounts required at different conditions of engine operation.

The variation in vacuum at the ported vent with changes in throttle opening is actually such that the vacuum at the ported vent does provide a desirable coaction with the steam injection system of the present invention. However, one major drawback of using the ported vent is the fact that in a substantial part of both new and used cars a ported vent is provided only for one barrel of a multi-barrel carburetor as part of the original equipment of the car. Thus, to use the ported vent for both barrels requires reworking of the carburetor. An additional drawback of using the ported vent is the fact that in many engine constructions the ported vent is connected with the vacuum spark advance so that connecting the steam injection apparatus to the ported vent requires some compensation to accomodate the effective loss of vacuum for the vacuum spark advance which is produced by connecting the steam injection conduit to the ported vent.

In contrast, introducing the steam through the idle adjustment screw has the advantage of using a connection which is almost always present in the engine carburetor, whether single barrel or multi-barrel; and the use of the idle adjustment screw does not require any other compensation because the idle adjustment screw is not connected with any associated engine apparatus, such as the vacuum spark advance.

A conduit 511 conducts feed water from the tank 503 to the metering valve 507 (shown in more detail in FIG. 109). A conduit 513 conducts the metered water from the outlet of the metering valve 507 to (as illustrated in FIGS. 102, 103 and 104) a T-joint connection 515. A conduit 517 connected to the T-joint connection 515 conducts the metered water to the inlet end of the flash boiler 505 which may be at the top as in FIGS. 102 and 103 or at the base (adjacent to the manifold) as in FIG. 105.

As best illustrated in FIGS. 102 and 109, the flash boiler 505 is a coiled tube construction which encircles an outer body 519 of the metering valve 507.

In the embodiment shown in FIG. 102 the flash boiler 505 is disposed entirely on the outside of the engine exhaust gas manifold 521 and is held in a clamped position on the outside of the exhaust manifold by a flange 523 which forms a part of the metering valve assembly 507 and which engages the upper, outer end of the flash boiler 505. See FIG. 109.

The outlet end of the flash boiler 505 is connected to the idle adjustment screw fitting 509 by a conduit 525 and a branch conduit 525A. See FIG. 102.

While obtaining the response to vacuum at the idle adjustment screw has been shown and described by connecting a conduit 525A directly to the idle adjustment screw, other apparatus for obtaining the vacuum at this point can also be used. For example, a tube can be extended downwardly within the carburetor from the top of the carburetor to the throat of the venturi at the idle adjustment screw to pick up the vacuum at this point. In new car construction, it is relatively easy to select any one of a number of desired locations on the carburetor which will provide the desired vacuum change in response to throttle openings, and it is not necessary to use the vacuum exactly at the idle adjustment screw. However, the idle adjustment screw does provide a convenient point which is available in almost all cars, both new and old, that provides the desired type of change of engine vacuum with change in throttle opening.

As illustrated in FIG. 102, the conduit 527 is connected to the ported vent entrance 529 of the engine carburetor and to the vacuum spark advance unit 531.

The vacuum at the ported vent 529 is, in most conditions of engine operation, greater than the vacuum at the idle adjustment screw 509. This relationship is graphically illustrated in FIG. 106 as described in more detail above.

Because the vacuums at the ported vent 529 and at the idle adjustment screw 509, and the vacuums within the related conduits 525A and 527, are different, it is necessary to provide a balancing apparatus and technique so that these two conduits 525A and 527 can be connected together as illustrated.

As illustrated in FIG. 105, this balancing apparatus comprises a restricting orifice 533 in the conduit 527 and an air bleed hole 535 which is open to atmosphere and which is also located in the conduit 527. The combination of this air bleed to atmosphere and the restricting orifice serves to lower the vacuum in the line 527 and so that it will essentially match the vacuum line 525A. This balancing apparatus and action insures that steam will flow to both the ported vent 529 and the idle adjustment screw 509 and prevents higher vacuums at the ported vent 529 from overpowering the vacuum in the line 525A and causing any reverse flow.

The location of the flash boiler 505 on the outside of the hot exhaust manifold 521 causes the flash boiler to pick up enough heat to convert the water in the line 517 to steam at the outlet 525 of the flash boiler.

As best illustrated in FIG. 109, the heat transfer is primarily from the hollow interior of the relatively thin wall of the body 519 and to the coils of the flash boiler 505, rather than from the exhaust manifold wall structure to the coiled tubing of the flash boiler.

Thus, as best illustrated in FIG. 109, the body 519 of the metering valve assembly has an open lower end 537 which is threaded into a tapped opening 538 in the exhaust manifold 521, and the hot exhaust gases within the exhaust manifold flow upward and into the hollow interior 539. The body 519 is preferably made of a material having a high heat conductivity such as brass, and the flash boiler 505, in a specific embodiment of the present invention, is made of commercially pure aluminum for corrosion resistance and high thermal conductivity and low cost. In this specific embodiment the OD of the flash boiler tubing is approximately ⅛ inch.

As in the prior embodiments of the present invention, the valve assembly 507 controls the amount of feed water which can flow to the flash boiler 505 to produce an amount of generated steam in response to changing engine need (discussed in more detail below) during changing conditions of operation of the engine. For example, the metering valve assembly 507 will open wider to admit more water into the flash boiler for producing greater amounts of steam at conditions of engine operation in which the engine power and exhaust gas temperatures are high, and the metering valve 507 will reduce the amount of feed water that can flow to the flash boiler 505 during conditions of engine operation in which little injected steam is needed, such as operation at low power and low throttle settings such as just above idle.

The way in which the metering valve 507 does this will now be described in detail with reference to FIG. 109.

The metering valve 507 comprises the lower body or plug 519 as noted above.

The valve assembly 507 also comprises a valve seat 541 and a movable valve element 543.

The valve element 543, in the embodiment illustrated in FIG. 109, comprises a spherical upper end formed on a wire 545, which may be about 0.060 inch OD in a specific embodiment of the present invention and which may preferably be formed of a low expansion material such as molybdenum. The greater part of the length of the wire 545 is disposed concentrically within a thin wall tube 547 which may be made of a material having a relatively high coefficient of thermal expansion, such as stainless steel. In a specific embodiment of the present invention, this stainless steel tube 547 is 0.093 inches OD. The tubing 547 is thin wall tubing providing adequate clearance between the inside diameter of the tubing 547 and the wire 545.

The upper flared end 549 of the tube 547 is held in a upper head assembly (indicated generally by the reference numeral 551 in FIG. 109). The upper head assembly 551 comprises a first member 553 which has a conically tapered seat for supporting the underside of the flare 549, and the assembly 551 includes an inner member 555 which has a cone-shaped lower end for engaging the opposite face of the flared end 549. The part 555 is threaded, by threads 557 in to the part 553, and the part 553 is retained in position within and on the shell housing 519 by a nut 559 which is threaded onto the upper end of the shell housing 519 by threads 561.

While the upper end of the rod or wire 545 is free to move with respect to the tube 547 on differential thermal expansion between these two parts, the lower end of the rod 545 is locked to the tube 547. As illustrated in the lower part of FIG. 109, the bottom end 563 is welded closed, and the tube and inside wire are bent as indicated at 565 to prevent any relative movement between these two parts at this lower end of the tube and wire. Thus, on differential thermal expansion between the tube 547 and the wire 545, the upper end 543 of the wire will move with respect to the valve seat 541 in an amount dependent on the temperature level of the exhaust gases within the engine exhaust gas manifold 521.

As the exhaust gas temperature in the exhaust manifold increases, the tube 547 will expand in a greater amount and at a greater rate than the wire or rod 545 and this will retract the upper end 543 of the wire off of the valve seat 541 to permit a greater amount of feed water to flow from the inlet 511 to the outlet conduit 513.

Normally, the metering valve assembly 507 is calibrated so that the valve is just closed off at normal engine idle speed. This calibration is normally done at the point of manufacture by adjustment of the valve seat 541. The valve seat 541 is formed on the underside of a member 567. The member 567 is movable within the fitting 511 for achieving this calibration. In one form of the invention the member 567 is threaded within the fitting 511. In another form the member 567 is held by a pressed fit within the fitting 511. In either case the calibration of the valve is set by applying vacuum to the fitting 513.

The member 567 is calibrated by moving it to a position to properly preload the seat 541 and the valve element 543 such that at the desired engine operating temperature these two members just open.

The location of the tank 503 is an important feature of the present invention. By having the tank in the engine compartment and above the engine, the water in the tank absorbs heat and tends to provide temperature stability to the engine compartment in the area around the carburetor and its induction manifold. Because the water has a high latent heat, the heat absorbed in the stored water is retained in the engine compartment over a considerable period of time, and this is helpful in subsequent start-ups after the engine has been shut off for a period of time because it helps provide improved vaporization of the fuel and more uniform distribution of temperature throughout the engine induction structure. This also provides more uniform mass distribution between each of the cylinders and also more uniform fuel/air ratio between each of the cylinders.

The storage tank 503 is also preferably made of flexible plastic material so that the water tank is soft and pliable and can conform to the space available within the engine compartment. This enables the tank to provide the required water capacity even in engine compartments which are quite crowded and which have such an irregular space arrangement that a rigid water tank could not be used.

The flexibility of the tank also facilitates initial installation.

The location of the tank above the flash boiler and the control valve assembly is also an important feature of the present invention because it provides a vertical head of water for insuring proper feed to the control valve assembly 507. This insures that the flash boiler will always receive flow regardless of the amount or lack of engine vacuum at any engine operating condition.

It is another important feature of the present invention that the system 501 incorporates both a fluidic drain valve and a flexible wall accumulator which coacts with the changing engine vacuum at the idle screw and ported vent to provide increased steam flow on acceleration and to provide decreased steam flow to the engine on deceleration over and above the regulation that is obtainable from the valve 507 itself and the dynamic response of this valve to changing engine temperatures during such an acceleration and deceleration period as required to match engine need during all conditions of operation.

On acceleration the collapsible accumulator decreases its volume by collapsing its walls in proportion to the amount of vacuum during acceleration. This provides the needed additional steam during the higher BMEP of acceleration which generates higher temperatures. The extra steam thereby prevents excessive temperature preventing both preignition and detonation and the formation of unwanted nitrous oxide.

In the FIG. 103 embodiment the flexible wall accumulator is indicated by the reference numeral 569 and the fluidic drain valve is shown at 571.

In the FIG. 104 embodiment the flexible wall accumulator and fluidic drain valve are combined in one structure as illustrated. The FIG. 104 embodiment in a preferred form can be made with wall thickness nearly uniform such that the flexible wall accumulator fills by water coming from valve 507 connection without restriction. Upon acceleration the upper part of the accumulator collapses to partially restrict further flow of fluid from the accumulator 569 to the flash boiler 505. This provides modulated flow preventing excessive water flow which could cause unstable engine operation.

On deceleration it is also important that the accumulator 569 now expands by its built-in resilience to create a vacuum on the system going to the input points of the ported vent and/or idle screws so that the fluid in these lines, including steam and/or water particles, is pulled back during this deceleration mode in which we do not want to have appreciable further steam going into the engine in order to get minimum formation of emissions especially CO (carbonmonoxide) and HC (hydrocarbons). This provides optimum combustion conditions and optimum economy of operation. This water cannot be controlled instantly by the control valve. Not that the valve does not operate quickly enough in itself, but that the mass of the material of the manifold around the valve cannot cool that quickly. Therefore, to overcome this basic inherent problem of the engine itself, the accumulator is able to control this inherent overrun of too much fluid which would be allowed to come through the system without the use of this accumulator. Further, the accumulator by design is set so that for the normal deceleration mode the excess water is fully taken up within the expanding accumulator. However, if there is still some residual fluid coming through the valve on a very heavy deceleration following a very long and heavy power use of the engine which caused a great increase in heat stored in the engine, we have the overflow capability of the fluidic control valve so that it is able to take care of this overflow without letting the water come up as high as Tee 515, and the water therefore cannot go into line 517. Instead the water will follow down line 573 to the fluidic valve 571 and overflow out of the top of the fluidic valve to get rid of the excess fluid.

As illustrated in FIG. 103, the distance D between the Tee 515 and the upturned end 571 of the fluidic drain is equal to or slightly greater than the vacuum in inches of water at idle. This has the advantage that even if the valve should leak, no fluid would be drawn into the engine during idle because the static head of the fluid in line 573 would be equal to or greater than the available vacuum in the idle system and therefore could not draw water into the engine under the conditions in which it is not needed or wanted.

The valve 571 is placed in the manner shown such that it is vertically and therefore normally wet inside to provide optimum sealing since it is important not to allow any air bleed into the system at any point to get good optimum combustion control.

The system is shown with the tube which is normally $\frac{1}{8}$ inch aluminum tubing placed within a coil 575 formed into an external, continuous support structure so that it provides a coil-like structure around the outside of the fluidic valve 571. This gives protection and support to the flat rubber (normally neoprene or similar material) valve which is, as shown, made with a structure that is essentially like a round tube which has been flattened out in the final stages of its formation and curing process.

The combined fluidic drain valve and flexible walled accumulator shown in FIG. 104 operates in essentially the same manner as described above with reference to the separate flexible wall accumulator and fluidic drain valve shown in FIG. 103.

The system of the present invention is designed to accept freezing conditions. When the engine is turned off, the control valve 507 closes. The flash boiler 505 and the water and steam feed system drains, leaving water only in the container 503, the flexible neoprene feed water tube 511, the collapsible reservoir 569 and the fluidic drain valve 571 with its coiled flexible support tube 575. These elements are designed with a form and of material to permit the required expansion of about 4% at the time of any possible freeze of the contained water and so no damage occurs on freezing. Upon starting the engine after the freeze, the local, adjacent heat melts the ice, and the system operates normally.

It is another important feature of the present invention that the dynamics of the system are matched to the engine characteristics such that within the vacuum change range the accumulator 569 will change its volume proportionate to the changes in vacuum of the engine and will therefore continuously provide the additional needed H₂O into the form of steam to the engine as the power is on the increase and will retake back excess H₂O preventing it from going in the engine on decrease of power so that it will even out dynamically the needs of the engine throughout all of the variable states of operation of power and throttle settings.

In certain conditions of operation it is desirable to be able to overrun the flash boiler so that all of the feed water passing through the flash boiler is not coverted to superheated steam. Instead, under certain conditions of engine operation, such as rapid acceleration at full throttle, it is desirable that the steam fed to the engine actually include droplets of water because of the latent heat of vaporization incorporated in these droplets of water and the effect that these droplets of water therefore have on lowering engine combustion temperatures under these particular severe conditions of engine operation. That is, if a certain amount of droplets of water are fed with the steam into the engine at these severe conditions of engine operation, the droplets of water will provide a much greater effect in lowering engine temperatures than would an equivalent amount of steam, and the resulting increased lowering of the engine operating temperatures reduces the amount of undesired engine emissions which would otherwise be produced, mostly nitrous oxide.

Another benefit of being able to override the flash boiler is that the mass of fluid is physcially greater if some of the fluid is in a liquid state rather than a gaseous state. And at these particular conditions of engine operation, it is important to provide a greater mass flow of fluid, water and steam to the engine, than would otherwise be obtainable by the dynamic operation of the metering valve assembly 507 alone. The increased fluid flow is obtained in the present invention by the combination of several features of the present invention.

In the present invention there are three effects operating.

There is a pumping effect due to the flexible wall accumulator and the inward flexing of these walls because of increasing vacuum on acceleration.

There is an increased opening of the metering valve itself because of the increasing temperatures occuring on acceleration and the resultant increase in the differential expansion between the operating elements of the metering valve.

And there is also the effect of putting more heat into the flash boiler contents already there to cause it to expand and therefore move into the input point of the engine adding, therefore, to the total mass flow into the engine.

There is one other feature that shows up in the FIG. 110 embodiment. The structure of the FIG. 110 embodiment will be described in detail below, but at this point it should be noted that in the FIG. 110 embodiment more fluid is added into the system, both from the normal differential expansion of the control and from the collapsible reservoir entrance, the added fluid causes the control rod to be more and more completely cooled, therefore causing even further opening. This provides even extra control as a result of the liquid flow and extra flow of fluid causing a further opening of the orifice itself. This, in effect, is like an overcenter snap action on acceleration. Thus, this coaxial valveflash boiler reactor is even faster in response than the FIG. 109 embodiment. Also in the FIG. 110 embodiment on deceleration the same action occurs in reverse because, as liquid flow reduces, the resulting reduction of the cooling effect of water on the center rod valve stem tends to shut the valve off even more quickly. This valve is controlled by the rate of flow of heat energy flux.

FIG. 107 illustrates another embodiment of the present invention which meets fundamental engine needs for injected steam flow by an apparatus which can regulate the flow in response to an engine vacuum condition and which may incorporate a fixed orifice rather than a variable area orifice which is varied in response to changing engine temperature conditions.

This FIG. 107 embodiment may, however, incorporate a variable area orifice; and it may also incorporate (as illustrated) apparatus for mixing fuel with the injected steam.

In the embodiment in which a fixed, rather than a variable area orifice is used, it is an important feature of the present invention that a flexible wall accumulator is associated with the water supply control to the flash boiler, or other heater, so that the increased fluid flow on acceleration is provided as a function of changing engine vacuum and so that also decreasing fluid flow is provided on deceleration in relation to changing engine vacuum also applied to the fixed area orifice.

As illustrated in FIG. 107, the system includes a water storage tank 503 and a conduit 511 extending from the bottom of the storage tank 503 to a second water tank 603.

The purpose of the tank 603 is to establish a level of water in the tank 603 at a given distance, as indicated by the legend Hw, at a given distance below the input to the flash boiler 505. This static head between the upper surface of the water in the tank 603 and the inlet to the flash boiler 505 is preferably made just greater than the static head as measured in inches of water of vacuum at the idle screw at idle RPM. See FIG. 106 where the vacuum at the idle screw at idle RPM is approximately 10 inches of water. It should be noted that this 10 inches of water is also equivalent to the same static head measured in a somewhat greater number of inches of fuel (as will be described in more detail below) since fuel has a lower specific weight than water.

A conduit 511A extends from the tank 603 to an orifice 605. As illustrated in FIG. 107, the orifice 605 may, in the simplest form of the present invention, be a fixed area orifice. It should be noted, however, that a variable area orifice may also be used with the system shown in FIG. 107, and this will become more apparent from the description which will follow.

A proportioning orifice 607 may be used in the conduit 511A when fuel is added to the injected steam, as also will be described in more detail below.

In the embodiment illustrated in FIG. 107, a fluidic drain valve 571 is combined with a flexible, resilient walled accumulator 569 at a loation between the orifice 605 and the flash boiler 505.

A conduit 525 and a related branch conduit 525A conducts the generated steam from the flash boiler 505 to the engine induction system at the idle adjustment screw 509. In the operation of the structure thus far specifically described, the height Hw between the inlet of the flash boiler 505 and the level of the water in the tank 603 is so related to the engine vacuum developed at the idle adjustment screw 509 at idle RPM that static head effectively prevents flow of steam to the engine at engine vacuums corresponding to idle RPM or less.

As engine RPM increases, the vacuum at the idle screw 509 increases generally in the manner indicated by the dashed line in FIG. 106 so that increasing engine power produces greater vacuum at the idle screw 509.

The plot of the amount of vacuum at the idle screw versus increasing throttle opening as shown in FIG. 106 represents more or less steady state engine operating conditions at each power point. Therefore, it is possible to match the engine need for injected steam at a particular throttle opening by a proper size of the orifice 605. Having selected that orifice size, then, at other steady state throttle openings, the amount of water which will flow through the orifice 605 is dependent on the amount of vacuum; and this provides a proper amount of injected steam in response to engine need.

Under dynamic change the extra amount of steam of lower quality (some entrained water droplets with the steam) is provided to meet the engine need (due to higher BMEP and higher power) in the following manner. As shown in FIG. 106 as the throttle is opened, greater vacuum appears at the 509 idle screw. This increases flow through the fixed orifice 605. Also the increased power increases the temperature of the flash boiler 505 which expands the quantity of the fluid in the flash boiler and so increases the mass flow of the fluid into the engine. In addition, flexible resilient walled reservoir 569 reduces its volume by transferring this volume to the engine collapsing its walls in direct proportion to the vacuum increase at 509 transferred through 525A, 525 and 505 to appear inside reservoir 569. This transferred volume partially overloads the flash boiler 505 resulting in lower steam quality (some entrained superheated water droplets entrained entrained within the steam flow) as desired to meet the engine need.

During dynamic change of deceleration the throttle is closed decreasing the vacuum across orifice 605 to Hw so that the static lead Hw stops further flow. Also the exhaust temperature and therefore the flash boiler 505 temperature decreases reducing the charge volume and therefore flow. Also, the reduced vacuum at 509 through 525A, 525 and 505 appears inside 569. This permits the resilient walls of the reservoir to expand and drawn any now unwanted liquid or vapor from 509, 525A, 525 and 505 back into expanding reservoir 569 thus meeting the dynamic engine need.

Note that the vacuum sensing and the fluid feed is through the same line providing optimum performance and simplicity.

Thus, at non-steady state engine operating conditions, such as acceleration and deceleration, the greater amount of injected steam needed on acceleration is provided by the flexible wall accumulator 569 which acts as an acceleration pump, and the reduced amount of injected steam required by the engine on deceleration is provided by the resilient expansion of the flexible wall accumulator 569 which takes back the amount of water flowing through the orifice 605 and the water and steam in flash boiler 505 and feed lines 525 and 525A not needed by the engine on deceleration as indicated by the lower vacuum at the idle screw 509 on deceleration.

The fluidic drain valve 571 may be located on the upper part of the accumulator 569. In this event the fluidic drain valve 571 acts as a safety device to provide a fail safe system in the event that a float controlled valve 609 for the tank 603 does not operate properly. The float controlled valve 609 comprises a valve element 609A which is normally positioned with respect to the lower end of the conduit 511 to maintain the level of water within the tank 603 at the level indicated in the drawing. The float control valve 609 includes an arm 611, a float 613 and a pivot or fulcrum 615. As the water level drops in the tank 603, the float 613 lowers and pivots the arm 611 about the fulcrum 613 to open the valve 609 and let water flow into the tank 603; and as the water level rises to the proper level as determined by the float 613, the valve 609 is shut off.

If the valve 609 and associated mechanism should malfunction, the fluidic drain valve 571 located at the top of the accumulator 569 will be opened by the head of water extending from the tank 503 to the fluidic drain valve 571 to prevent any flow of the water into the induction system of the engine.

As noted above, the fixed area orifice 605 may be replaced by a variable area orifice, and the variable area orifice may be controlled by changing engine temperatures, as described above with reference to the orifice 541 in FIG. 109.

In another embodiment of the present invention, fuel may be added to the fluid introduced to the flash boiler to form reaction products ahead of the engine cylinder. The desired reaction products are free hydrogen and carbon monoxide, and these products are readily formed by a reactor heated to temperatures of 900° C. or greater, which temperatures are easily obtained from the engine exhaust system.

In a specific embodiment of this form of the invention, as shown in FIG. 107, fuel is taken from a source, such as the engine fuel tank or the bowl in the carburetor (illustrated as 617 in FIG. 107) or other source and is conducted through a conduit 619 to a tank 621. The level of fuel in the tank 621 is regulated by a valve 623 under the action of a float 625 mounted on one end of an arm 627 which in turn is pivoted at its other end to a fulcrum 629. The float and valve structure is maintained at a given distance $H_F$ below the inlet to the flash boiler 505. The distance $H_F$ is enough greater than the distance $H_W$ that the static head for the fuel at the distance $H_F$ is equal to the static head for the distance $H_W$ of the water, and both of these static heads are either equal to or just slightly greater than the vacuum at the idle adjustment screw 509 at idle RPM. A conduit 631 conducts fuel from the tank 621 to a T-joint connection with the conduit 511A at the inlet end of the orifice 605. A proportioning orifice 633 is located in the conduit 631, and this proportioning orifice 633 is so related to the proportioning orifice 607 in the conduit 511A that the respective flow rates for the fuel in the conduit 631 and the water in the conduit 511A are regulated in the right proportions.

The mixed fuel and water flows through the orifice 605 and into the inlet of the flash boiler 505. In the flash boiler 505, the mixed fluid is heated to a temperature which produces precombustion reaction products such as free hydrogen and carbon monoxide, which greatly enhance combustion in the engine cylinders.

A hydrogen accumulator 635, preferably a resilient expandable storage container, is located at a high point between the outlet of the flash boiler and the idle adjustment screw 509 for accumulating generated hydrogen after the ignition to the engine has been switched off and while the remaining heat in the flash boiler continues to generate the hydrogen. Other high dome accumulator fixed chambers can be designed into the induction system to accomplish this same purpose.

This hydrogen accumulator 635 not only accumulates hydrogen after shutting off the engine for providing easier subsequent start-up of the engine, it also acts as an acceleration pump for injecting additional, accumulated hydrogen into the engine with increasing vacuum on engine acceleration.

The accumulator 635 will also accumulate a substantial amount of carbon monoxide in addition to the free hydrogen (the lightest gas) since carbon monoxide is also a relatively light gas.

In another form of the present invention, additives may be added to either the water storage tank 503 or to the tank 603 to produce desired precombustion reaction products. As an example of additives that can be added, ammonia could be added to either the tank 503 or the tank 603.

A preferred form of variable area orifice device for the FIG. 107 embodiment is the reactor apparatus shown in detail in FIG. 110 and indicated generally by the reference numeral 550.

In the FIG. 110 embodiment a variable area orifice 507 is provided between a valve seat 541 and a movable valve element 543. The movable valve element 543 is seated on one end of a wire or rod 545. The other end of the rod 545 is seated in a cap 637, welded or otherwise attached to a related end of a tube 547. The opposite end of the tube 547 is connected by a flare 549 to the body 519 of the reactor apparatus. The flared end 549 is held in place by a double cone member 639 having a conical surface at one end which engages the flare 549 and a conical surface at the other end which provides a seat for a flare 641 formed at one end of an intermediate tubular member 643. The other end of the tubular member extends adjacent to but is spaced from the cap 637, and the tubular member 643 is concentric with and spaced from the rod 545 so as to provide a first flow path on the inside of the tubular member 643 between the member 643 and the rod 545 and a second flow path on the outside of the tubular member 643 between the tubular member 643 and the control tube 547. These two flow paths make up the flash boiler 505 in the FIG. 110 embodiment.

A powder or a vapor deposit on porous alumina or a filament catalyst 645 such as nickle or platinum is preferably placed in the outer flow path for aiding in producing the precombustion reactions desired.

The flared end 641 is held against the conical seat provided by the member 639 by means of a threaded plug 647. The plug 647 has an inner bore 649 for providing a slide fit with one enlarged end of the movable valve element 543. As best illustrated in FIG. 111, this enlarged end of the valve element 543 has grooves 651 extending axially for permitting liquid flow from the variable area orifice formed between the valve seat 541 and the other end of the valve element 543 and to a passageway 653. The passageway 653 is connected to the upper end of the collapsible reservoir 569. The grooves 651 also connect with the inner flow passageway 505 extending between the intermediate tube 643 and the rod 545 so that these grooves admit the inflowing liquid to the inlet end of the flash boiler 505.

The reactor 550 shown in FIG. 110 is installed in the opening 538 of the exhaust manifold at an angle such that the longitudinal axis of the reactor is either horizontal or tilted slightly upward in a direction from the inlet 511A to the cap 637 at the opposite end of the reactor. This inclination of the longitudinal axis of the reactor in combination with the slight reduction in the diameter of the flow area between the outlet end of the grooves 651 and the inlet to the flash boiler 505 insures that the incoming fluid must first fill the collapsible reservoir 569 before it can flow to the flash boiler 505.

A spring 655 is seated between the enlarged end of the valve element 543 and a member 657 which provides the valve seat 541 at one end and which is also threaded within the inlet 511A to provide an adjustable seat for the spring 655.

The outlet products of the flash boiler 505 are conducted through openings 659 formed in the double conical member 639 and to a passageway 661 formed in the body 519 of the reactor. The passageway 661 connects with the conduit 525 leading to the idle adjustment screw 509.

Passageway 650 connects exhaust gas recess area 539 in body 519 to tube extension 652 to provide exhaust manifold exhaust total pressure for use in the inverter in FIGS. 112–118 below.

In the operation of the reactor shown in FIG. 110, incoming water flows into the reactor from the conduit 511A and incoming fuel flows into the reactor from the conduit 631. The mixed fluid then flows past the variable area orifice formed by the movable valve member 543 and the fixed valve seat 541, through the slots 651 and down the passageway 653 to fill the collapsible reservoir 569.

This occurs quickly on the initial start-up, and the collapsible reservoir is thereafter maintained in a filled condition in a variable container volume. The incoming fluid, as regulated by the opening of the variable area orifice, flows from the outlet into slots 651 to the inlet end of the concentric flash boiler 505 where it picks up heat. The flowing fluid flows along the rod 545 within the intermediate tube 643 until it reaches the outlet end of the tube 643. At this point the direction of flow of the fluid is reversed, and the fluid is caused to flow back along the outside of the intermediate 643 and through the openings 659 to the outlet conduit 525. The control tube 547 is made of a material having a coefficient of thermal expansion which is higher than that of the material of the rod 545 so that the tube 547 expands to a greater extent on an increase in temperature than does the rod 545, and this causes an increasing opening between the valve element 543 and the valve seat 541. This reactor thus provides a response to changing engine temperatures in substantially the same way as described above for the FIG. 109 embodiment in this respect.

The spring 655 provides an important control function in this embodiment of the present invention because the element 543 is not attached to the low coefficient of expansion control rod 545. Nor is the rod 545 attached to end plate 637 but is instead a snug slip fit at each end. Therefore, in order to provide means by which the variable area orifice will open up between 543 and 541, it is necessary to have a spring 655 to provide the continual axial load upon member 543 so that it will follow the relative expansion difference of control element 545 and the outer control tube 547. The differential expansion of these two members is the control that controls the opening of the variable area orifice. The system is normally factory preset to the normal operating temperature of combustion in the exhaust manifolds for normal low speed idle conditions by, in the factory, first setting member 657 to seat against valve member 543 to the point of just reaching the point of valve closure as measured by a vacuum applied at 525. Second, upon reaching this point at controlled room temperature, the member 657 is rotated, in a factory setting, a given further amount representing the equivalent of a preset axial load between the members, thus preloading member 545 in relation to the outer tube structure 547 such as to give a preload equivalent to the preset temperature. In other words, as the members are heated up and the relative expansion occurs, it will result in the seat just being ready to open when it reaches idle standard temperature. It is, of course, possible to make a field adjustment if it were desired by adjusting 657 in the field, but is is not normally contemplated.

The collapsible reservoir 569 provides or serves as an acceleration pump on acceleration and as a collecting reservoir on deceleration in the same way as described above in detail with reference to FIG. 107 and other embodiments of this invention.

It should also be noted that this FIG. 110 embodiment provides an additional, beneficial control function as compared to other embodiments of the present invention, in that the FIG. 110 reactor provides a change in amount of fluid output flow in response to heat flux. That is, the FIG. 110 embodiment acts, somewhat like an over center switch arrangement, for tending to provide increasing flow rates on acceleration, in direct response to increased liquid flow into the flash boiler, and it tends to provide a greater reduction in delivered fluid flow on deceleration in direct response to the decreasing fluid flow into the reactor on deceleration conditions, as described in detail above.

To maximize this control function (the response to changes in fluid flow as well as and simultaneously with changes in heat flux, the tube 547 can be welded to the rod 545 (to thereby eliminate the need for the spring 655) and the tube 547 and rod 545 can be made of the same material, all as described in more detail later on with reference to FIG. 125.

As illustrated in FIG. 110, the fluid within the inner tube 643 is primarily or entirely water in a liquid state while the fluid between the tube 643 and the tube 547 is primarily or entirely steam in a gaseous state, and both of these fluids act as a barrier to the transfer of heat from the hot exhaust gases from the outside of the tube 547 through the fluids and to the rod 545.

As will also become more apparent from the detailed description to follow regarding FIG. 125, this control method of providing a change in amount of fluid output flow in response to heat flux can be used to control the feeding of water or water plus additives to the engine instead of controlling the flow of steam.

As will also become more apparent from the detailed description relating to FIG. 125 to follow, the control members 545 and 547 can be made of the same material, rather than being made of two different materials having two different coefficients of thermal expansion; and it is in fact preferable in some applications to make these control members of the same material because doing so will provide a greater degree of overcenter type reaction to changes in heat flux to insure that the valve opens at the desired time and to insure also that the valve closes at the desired time under particular conditions of engine operation. When the control members 545 and 547 are made of the same material, a regenerative feedback effect is produced. This regenerative feedback is responsive to changes in fluid flow rates resulting from greater valve opening with increased fluid flow rates on increased heat flow rates and a greater valve closing with decreased fluid flow rates on decreased heat flow rates, all as will be described in more detail with respect to FIG. 125.

The heat flux control function is a true heat flux function which is not dependent on the thermal control feature of the valve or upon differences of coefficient of expansion of materials, and the heat flux control function is a very significant control function because of the rate of responsive and the magnitude or extent of response which it provides.

It should be noted also that this principle of control is not dependent upon the fluid being in a liquid state, but is instead operable also with the fluid in a gaseous state.

The FIG. 110 reactor structure can also be used in the FIG. 102 and FIG. 105 embodiments of the present invention.

The FIG. 110 reactor 550 can also be used with the FIG. 117 embodiment of the invention, and in this event the reactor 550 includes a passageway 650 for connecting an outlet fitting 652 to the pressure in the chamber 539. This pressure is the same as the pressure in the engine exhaust manifold, and the purpose of providing this exhaust manifold pressure at the fitting 652 is to provide pressurization of the water storage tank 503 above atmospheric pressure for use in connection with an inverter apparatus 663 to be described in more detail below with reference to FIGS. 112–118.

A number of additives can be used with the present invention. These additives include additives for increasing the combustion efficiency, such as ammonia and hydrogen peroxide and solutions of hydrogen gas as well as soluble hydrocarbons. The additives can also include additives for reducing the hardness of the water and resulting problems of deposit build-up in the conduits of the system.

The additives may also include upper cylinder lubricants and carbon and lead deposit removers and detergents for cleaning the engine.

Water soluble fuel may also be added to the fluid in the water storage tank.

The idle adjustment screw 509 shown in FIG. 108 is formed with a resonating chamber 577 at the inner end of the idle adjusting screw. This resonating chamber 577 is formed by putting a dimple 579 in the lower surface (as viewed in FIG. 108) of the inner end of the screw and forming an orifice 580 at slotted opening 581 in the upper surface of the inner end of the screw adjacent and first forward of the dimple 579. The incoming steam flowing through the hollow interior and orifice 580 of the screw 509 and out the opening 581 thus causes the opening 581 and the chamber 577 to act as a whistle in which the chamber 577 provides a resonant effect for producing ultrasonic vibrations and wave fronts in the steam flowing out of the opening 581. This has a beneficial effect in enhancing the intermixing of the injected steam with the fuel/air mixture flowing through the carburetor at this point. This resonating effect also adds energy to the reaction and is another way to add energy to the system. The resonating frequency is preferably adjusted and matched to the size of fuel droplets in the incoming fuel/air mixture to shatter these fuel droplets and vaporize the liquid fuel for better mixing and combustion.

It is believed that this ultrasonic injection of the steam contributes to precombustion reaction of the fuel/air mixture with the steam for enhancing the formation of free hydrogen and carbon monoxide.

As illustrated in FIG. 108, the idle adjustment screw 509 may preferably have a variable orifice air bleed structure 583 incorporated with the idle adjustment screw 509. The air bleed 583 includes an opening 585 for the inflow of atmospheric air. This opening 585 is closed by a ball check valve 587 under the bias of a spring 589 seated on a spring retainer seat 591. The force of the spring 589 is matched to the engine intake vacuum produced at the idle adjustment screw location so that additional lean-out air is introduced as desired.

The spring retainer 591 may also preferably have an orifice 593 for providing additional control over the amount of lean-out air introduced into the idle adjustment screw 509.

The flexible seal hose 595 supports and seals the structure 583 to the idle screw 509. The seal 595 can be rotated by the fingers relative to the structure 583 to rotate the idle screw 509 as required for the idle screw 509 adjustment. A contrasting colored longitudinal index line or ridge 597 is provided on the surface of the seal 595. With the idle screw 509 seated, the seal 595 is adjusted so that the index mark 597 is vertical for reference, and this index mark 597 is then used to make accurate, synchronized adjustments when two idle screws are used as in FIG. 105. Alternatively, an adjustable split index ring 599 having a split 601 may be used for the index function.

The vacuum in the inlet manifold of the engine at idle is a maximum and progressively decreases with increasing throttle opening as illustrated by the solid line in FIG. 106.

The present invention takes advantage of this relationship of the vacuum within the inlet manifold to produce an inverted relationship between the vacuum at the outlet end of the fluid injection apparatus so that the vacuum at the outlet end of the fluid injection apparatus goes from zero at closed throttle to a maximum at full throttle as shown by the line labeled "Inverter Line" in FIG. 106.

The term "vacuum" as used herein has been used to refer to the difference in pressure between the pressure existing at the outlet end of the steam injection apparatus and the pressure normally existing (ambient atmospheric pressure) over the fluid in the storage tank 503. As will be described in more detail below, the pressure over the fluid in the storage tank 503 may be increased above normal atmosphere, as by introducing engine exhaust pressure, and in this event the term "vacuum" will be used to indicate the difference between the pressure existing at the outlet end of the fluid injection apparatus and the super atmospheric pressure existing over the fluid in the storage tank.

The embodiments of the present invention which will now be described use a decreasing vacuum field to produce an increasing vacuum effect. One embodiment of an inverter apparatus for obtaining this result is shown in FIGS. 112-116.

Another embodiment of the present invention for obtaining this result is shown in FIG. 118.

Thus, in accordance with the present invention, the engine vacuum existing below the butterfly of the carburetor, such as in the intake manifold, can also be used to control the amount of fluid (steam or water) inducted into the engine induction system even though the vacuum within the manifold and beyond the carburetor varies in a manner directly opposite the generally desired relationship of increasing vacuum with increasing throttle opening as described above.

The way that this is accomplished in the FIGS. 112-116 embodiment of the present invention is by the use of an inverter apparatus 663 which converts the vacuum within the manifold and beyond the carburetor to a vacuum which does increase, substantially linearly, with increasing throttle opening.

One embodiment of an inverter apparatus for performing this function of the present invention is illustrated in FIG. 112 and is indicated generally by the reference numeral 663.

The inverter apparatus 663 compris a T-shaped member 665 having one opening 667 adapted for connection to an outlet hose 669 of the PCV valve 670 (see FIG. 117) and having another opening 671 adapted for connection directly (or through an ultrasonic generator 670 as illustrated in FIG. 112) to a hose 673. The hose 673 connects to an opening 675 (see FIG. 117) located beyond the carburetor butterfly valve 677.

The inverter apparatus 663 has a downwardly extending cylinder 677 which provides a cylindrical bore 693 for a piston 691.

The lower end of the cylinder 677 has a washer 707 held in position by a snapring 705. The washer has an opening 679 and a hose nipple extension 654 to connect to an exhaust line 656.

An exhaust vent 658 is located in the sidewall of the lower part of the bore 693 for regulating the position of the piston 691 at full throttle (FIG. 116) to maintain a passageway 702 of the piston in communication with a passageway 683 in this full throttle condition of operation, as will be described in more detail below, and to prevent the piston from dropping to the position illustrated in FIG. 114 (engine off). The exhaust pressure acts on the underside of the piston 691 in the full throttle condition of operation (because the piston 691 partially restricts flow of the exhaust pressure from the vent line 656 through the vent 658 to atmosphere) and thus prevents the side wall 700 of the upper end of the piston 691 from blocking the flow of steam from the passageway 683 to the engine at full throttle.

The downwardly extending cylinder 677 also has two vertically elongated ports 681 formed in the upper side walls of the stem and a bleed port 660 at the lower end of the bore 693.

The port 683 formed in a side wall of the cylinder 677 connects to a stem 685 which is in turn connected to the conduit 525A which conducts the steam from the outlet of the reactor 550.

A filter 687, formed of plastic or rubber foam or any other suitable water porous filter material, is disposed on the outside of the cylinder 677 for filtering air before the air is permitted to go into the ports 681.

The piston 691 is mounted for axial movement within the inner bore 693. The piston 691 has a lower flange 695 which engages the inner surface of the bore 693 in a sliding fit, and the upper portion of the piston 691 has a guide slot 697 which coacts with a radially inwardly protecting guide flange 699 formed on the interior of the cylinder 677.

The side of the piston opposite to that having the guide slot 697 is formed with a flow passageway slot 701 for permitting flow of fluid from the conduit 525A through the flow passageway 701 and to the outlet opening 671 when the piston flange 695 is disposed below the port 683.

A spring 703 seats on an internal base 702 within the hollow interior of the piston 691 and biases the piston downwardly within the bore 693.

In operation of the inverter apparatus 663, at idle conditions (FIG. 112) the vacuum in the T-section 667 and 671 is maximum (see the solid line in FIG. 106) and large enough to overcome the gravitational force and spring 703 force against the piston to bring it up to the point shown in FIG. 112. In the position shown, the port 683 is open and therefore any fluid or residual steam in line 525A is vented to the atmosphere through the exhaust vent 658.

As the manifold vacuum decreases with the throttle opening and power increase, the PVC valve 670 unseats and opens, causing the pressure in line 669 to decrease even more than the vacuum in the manifold below the carburetor. This reduced vacuum at part throttle (FIG. 115) allows the force of the spring 703 to force the piston 691 downward beyond the port 683 so that flange 695 passes beyond the port 683 and the vacuum of the line 669 from the PCV valve appears through the orifice of the restriction 701. The vacuum at 525A is a vacuum determined by the ratio of the vacuum within the PCV line 669 as metered by orifice 701 versus the atmospheric pressure at port 658 as metered by the spaced clearance 694 between the flange 695 and the inner bore 693 of the cylinder.

As the throttle and power are further increased to full throttle (FIG. 116), the manifold vacuum and the PCV vacuum as appearing in 669 decrease, causing the piston 691 to further move downward.

This results in a change in the ratio of the orifice 701 above the port 683 on the one hand and the orifice of 701 plus the clearance restriction 694 between the flange 695 and the inner bore 693 of the cylinder added together on the other hand. In the condition of operation illustrated in FIG. 116, the vacuum in 683 is equal to the full vacuum in 669.

In going from part throttle (FIG. 115) to full throttle (FIG. 116), the vacuum of the shorter section 701 above the port 683 continues to increase as its restriction decreases, and the net result is an increase in vacuum as the piston 691 drops farther down the bore, which lowering of the piston accompanies the decreasing vacuum within the PCV line 669.

The important thing to note at this point is that the passageway 701 acts as a restrictor and the amount of the restriction that it provides is dependent upon the relative vertical position of the piston 691 with respect to the passageway 693. As the piston 691 moves farther downward in the cylinder, the length of the passageway 701 decreases and the restriction that this passageway provides also decreases.

The pressure which is effectively applied to the passageway 683 is therefore dependent upon the ratio of the orifice which are provided by (a) the effective length of the passageway 701 above the passageway 683 to (b) the restriction provided by the effective length of the passageway 701 below the opening 683 and the restriction provided by the clearance 700 between the flange 695 and the inner surface of the cylindrical bore 693. Thus, as the piston 691 moves farther down within the bore 693, the restriction provided between the flange 695 and the side wall of the bore 693 remains essentially constant but the restriction provided by the passageway 701 below the opening 683 increases because a greater length of this passageway 701 is disposed below the opening 683.

Also, as the piston 691 is lowered, it uncovers ports 681 to allow air to enter through these ports, through the filter 687, to provide leaning out of the engine as desired for optimum engine performance at its optimum lean fuel/air ratio for best economy and minimum emissions. These ports are shaped for optimum fuel/air ratio change and may be larger at the bottom than at the top so that as the piston moves downward with increasing engine power, there is an increasing amount of air available for lean-out for maximizing economy and for lowering emissions.

The position of the piston 691 is dependent upon two factors. The spring force exerted by spring 703 on the top of the piston varies with the vertical position of the piston 691 within the cylinder because of the changing extension or compression of the spring. The differential between the pressures acting on the top side of the piston 691 and the pressure acting on the bottom side of the piston 691 also serves to provide a force which effects the position of the piston 691 within the cylinder. That is, at engine idle (FIG. 112) and part throttle (FIG. 115) the bottom face of the piston 691 is effectively exposed to atmospheric pressure, when the flange 695 passes below the opening 683, because atmospheric pressure is transmitted to the interior of the lower part of the bore 693 through the opening 658. The upper surface of the piston 691 is subjected to a vacuum pressure which is dependent primarily on the PCV line pressure but which is affected to some extent by the atmospheric pressure admitted through the ports 681 (when the top edge of the piston 691 partially opens these ports at part throttle), and by the partial pressure exerted on the top surface of the piston 691 by the incoming fluid flowing through the opening 683 and to the outlet conduit 671.

At full throttle (FIG. 116) the lower surface of the piston 691 is subjected to a super atmospheric pressure (caused by the engine exhaust pressure transmitted through the line 656) as regulated by the spring force 681 and the related open area of the vent 658. By using the engine exhaust pressure to pressurize the storage tank 503 to a super atmospheric pressure and then transmitting the higher pressure through the conduit 656 to the lower end of the bore 693, the differential pressure across the piston 691 is substantially increased at full throttle (as compared to the differential without the pressure of the exhaust gas). This is graphically illustrated in FIG. 106 (see the legends at the right hand end of the Inverter Line). The increased differential at full throttle provides the important benefit of insuring that the feed of steam to the engine is maintained, and not blocked off by the part 700 of the piston, at full throttle.

One engine shut down, the engine exhaust pressure goes to zero, and the residual exhaust in the lower end of the bore 693 is bled to atmosphere through the bleed port 660 so that the piston can move to the bottom of the bore 693. This downward movement of the piston 691 positions land 700 to block off passageway 683 and also opens ports 681 to a maximum so that the engine shuts off clean.

The line 652 preferably has a fluidic check valve (somewhat similar to valve 571 of FIG. 103) so that the engine exhaust pressure can be rectified to maximize the effect of this pressure and can be introduced into the tank 503 beneath the surface of the liquid to maximize cleaning of the exhaust gas before transmitting the pressure to the inverter 663.

The effect of the inverter apparatus construction and mode of operation shown in FIG. 112 and described above is to convert the relationship of vacuum within the manifold and beyond the carburetor (the relationship shown in the solid line in FIG. 106) from a relationship in which the vacuum is a maximum at closed throttle and is a minimum at full throttle to a relationship in which the vacuum at closed throttle is zero and varies, as shown by the Inverter Line in FIG. 106, in an increasing manner to a maximum at full throttle. This converted vacuum condition at the passageway 683 of the inverter apparatus 663 is therefore exactly the type of vacuum relationship which is desired for changing engine throttle opening conditions.

The inverter apparatus shown in FIG. 112 also has a further advantage in that the vacuum at closed throttle, which can be at idle or deceleration (FIG. 112) or at engine off (FIG. 114), is in fact zero so that all fluid coming from the line 525A is positively drained to atmosphere through the outlet openings 658 and 660 on a closed throttle condition (engine operating) or blocked by the land 700 (engine off). This insures that no fluid from the seam line 525A can go to the engine on closed throttle, whether or not auxiliary fluidic drain valves or other drain apparatus are used with the system. In fact, this construction shown in FIG. 112 makes it unnecessary to use any auxiliary drain devices. Furthermore, by locating the inverter essentially right at the point of intake to the engine induction system, the desired shut-off and drain of steam is insured without the opportunity for any overrun. The draining operation of the FIG. 112 apparatus is essentially instantaneous. When the throttle is closed, any excess fluid in the line 525A is drained instantly and the access to the engine is cut off by the flange 695.

The manner in which the flange 695 of the piston rides up above the port 683 on closed throttle (engine operating) not only permits drain of the fluid from the port 683 to drain outlets 658 and 660, but the flange 695 also serves to block any possible flow of fluid from the orifice 683 up into the outlet passageway 671. In this respect, the piston 691 acts as a valve.

It should be noted also that the relationship of the length of the piston 691 to the length of the inner bore 693, the shape of the land 700 and the positioning of the slots 681 insure that no fluid can go to the engine on engine off.

On engine shut-down, the vacuum drops off to zero and the spring 703 forces the piston 691 downwardly until the flange 695 seats on the plate 707 supported on the snap-ring 705 at the lower end of the inner bore 693. When the flange 695 engages the plate 707, the upper land 700 of the piston 691 is disposed opposite the port 683 to block flow from the port. Any leakage past the land 700 flows out the slots 681 and through the air filter 687 surrounding these slots.

That is, when the engine is shut off, the vacuum in the PCV line 669 goes to zero and the spring 703 forces the piston 691 downwardly until the flange 695 engages the washer 707. At that point the land 700 of the side wall of the piston above the opening 702 blocks flow through the opening 683. This effectively prevents any flow of fluid from the line 525A to the engine. If there should be any leakage of fluid past this side wall portion 708 of the piston, whatever leakage might occur must flow out of the ports 681 before such leakage could get to the outlet 671 and to the engine.

The ports 681 thus provide two functions. The ports provide positive protection against leakage flow into the engine on engine shutdown. However, the primary purpose of the ports 681 is to provide additional lean out on certain operating conditions. Because the piston 691 moves downwardly with increasing engine power, the cross sectional area of each port 681 that is opened increases proportionally to provide additional and increasing lean out of the engine with increasing engine power.

The relationship of the piston 691 to the location and configuration of the ports 681 is normally provided so that there is no engine lean out at idle. That is, at idle conditions of operation the piston 691 blocks any flow from the ports 681 into the conduit 673. However, if some lean out flow is desired at idle, the relative proportions and positions of the piston 691 and the ports 681 can be constructed to accomplish the desired lean out.

As illustrated in FIG. 112, an ultrasonic generator 670 can be used with the inverter apparatus 663. The inlet end 672 of the ultrasonic generator 670 is connected to or can be made (as illustrated in FIG. 112) integral with the outlet 671 of the inverter.

The fluid flow going into the inlet end 672 of the ultrasonic generator (the combined PCV valve crank case gases, the steam from the conduit 525A and any additional lean out air induced through the openings 679 and 681, flow through an orifice 674. The fluid flowing through the orifice 674 flows partly into a resonating chamber 676, and the main body of the flow goes into the outlet 678 of the ultrasonic generator 670. The effect of the resonating chamber 676 is to produce standing waves 680 in the outlet conduit 678 at ultrasonic frequencies, and this ultrasonic generator provides a highly efficient mixing of all materials in the flow stream and also provides shock waves for enhancing the mixing of the material in the conduit 678 with the air/fuel mixture flowing out of the lower end of the carburetor. The ultrasonic generator 670 therefore uses the flow energy of the flow stream for improving the vaporization and mixing of the flow out of the inverter apparatus 663 with the flow out of the carburetor.

FIG. 119 shows a lean out valve 709 which can be used with the PCV valve 669 in the FIG. 102 and FIG. 105 embodiments to provide additional lean out air for increased efficiency of combustion and reduction of emissions. The lean out valve 709 comprises an outer valve body 711 which is threaded with a T-section 713 for insertion within the PCV line 669. The lean out valve 709 also comprises a movable valve element 715 having a tapered stem 717 and an upper flange 719. The flange 719 is a guide flange having air flow cut outs in the periphery of the flange (see FIG. 120). A spring 721 engages the underside of the flange 719 and seats on a spring seat 723 to bias the valve element 715 upward, toward the dashed line position illustrated, where the tapered lower end of the stem 717 provides a minimum of restriction to flow of atmospheric air through the interior of the body 711 and past the slotted flange 719 and through the reduced diameter bore 723 and into the interior of the PCV valve line 669.

A snap-ring 725 limits the upward movement of the valve element 715 and a ledge 727 limits the downward movement of the valve element 715.

In the operation of the lean out valve 709 the movable valve element 717 moves to the position shown in solid outline at engine idle. In this position the valve stem 717 substantially blocks all flow of atmospheric air into the line 669 because the large diameter portion of the stem is placed in substantially flow blocking relationship with the bore 723. The valve element 715 is moved downward to the position illustrated in the solid outline at idle because the vacuum within the line 669 is high enough, in relationship to atmospheric pressure, to cause an unbalance of pressure between the top side of the flange 719 and the bottom side of the flange to overcome the biasing force of the spring 721 and move the valve element downward to the position illustrated. That is, the differential pressure is enough greater than the flow area through the slots in the flange 719 at engine idle to position the valve element 715 as illustrated in solid outline.

As the vacuum in the line 669 decreases, the flow area through the slots in the flange 719 are so related to the spring force 721 as to permit the valve element 715 to move progressively upward with reduction in the vacuum in the PCV line 669, and this provides a variable orifice between the tapered valve stem 717 and the passageway 723 to permit increasing amounts of atmospheric air to bleed into the PCV line 669 for increasing lean out with increasing throttle position.

The inverter apparatus shown and described above in relation to FIGS. 112–116 can be used as a substitute in the FIGS. 102 and 105 embodiments for the lean out valve 709 by connecting the inverter apparatus in the PCV valve line in place of the air lean out valve 709.

In this event the steam outlet line 525 is connected to the inlet 683 of the inverter rather than being connected to the idle adjustment screw 509.

It should be noted also that the PCV valve line 669 is in all cases connected to the engine induction system beyond the butterfly valve so that the vacuum in this line 669 does vary, as illustrated by the solid outline in FIG. 106, from a maximum at closed throttle to the minimum at full throttle.

FIG. 117 is an elevation view of an embodiment of an emission control system incorporating the inverter apparatus of FIGS. 112–116 and also incorporating the reactor apparatus 550 of FIG. 110.

Parts in the FIG. 117 apparatus which correspond with parts shown in other views of the drawings have been indicated by corresponding reference numerals.

Thus, the FIG. 117 embodiment includes a water storage tank 503, a conduit 511 for conducting water from the tank 503 to the reactor 550, a fuel supply tank 617, a conduit 619 (with a flow regulating restrictor 633) for conducting fuel from the fuel supply tank 617 to the reactor 550, a conduit 525A for conducting the steam and precombustion reaction products from the reactor 550 to the inverter 663, a PCV valve 670, a conduit 667 for conducting flow from the PCV (positive crank case ventillation) valve 670 to a T-connection at the outlet of the inverter 663, a PCV line 667 (to which the outlet of the inverter 663 is connected), and a line 673 which connects the junction of the PCV line 667 and the outlet of the inverter 663 to the engine induction system at a location 675 beyond the butterfly 677 of the carburetor. The location 675 is that normally used for inducting the flow by gases of the PCV valve into the engine induction system. The present invention, however, is not limited to this particular point of connection to the carburetor. The proper functioning of the inverter 663 in the system of the present invention is dependent only on making the connection to the engine induction system at a point where the vacuum decreases with increasing throttle settings.

The FIG. 117 embodiment also includes conduits 652 for transmitting exhaust gas pressure to the storage tank 503, a fluidic check valve 654 for rectifying the alternating pressure of the exhaust gas, and conduits 656, 657 for transmitting the superatmospheric pressure from the storage tank 503 to the inverter 663 and to the fuel tank 617.

In the operation of the FIG. 117 embodiment, the feed water is fed from the tank 503 to the reactor 550 by both gravity and vacuum. In this particular embodiment the effect of the vacuum of the feed of water is considerably greater than the effect of gravity; and as a result, the water supply tank 503 can be located below the level of the reactor 550, if so desired.

Fuel from the tank 617 is fed through the conduit 619 and past the flow regulating restrictor 633 to the reactor 550. As illustrated in FIG. 117, the fuel conduit 619 is connected to the reactor 550 at the inlet connection 653. Alternately, the fuel conduit 619 can be connected to the reactor at the inlet conduit 631 (see FIG. 110). When the fuel conduit 619 is connected to the inlet conduit 631 of the reactor 550, the water and the fuel are premixed before passing through the variable orifice control valve 507. When the fuel conduit 619 is connected to the inlet 653 of the reactor 550, the fuel is mixed with the water downstream of the variable orifice flow control valve 507.

It should also be noted that the FIG. 117 embodiment can use a fixed orifice (such as the orifice 605 shown in FIG. 107) in place of the variable orifice 507 in the reactor 550.

The fact that the inverter 663 of the FIG. 114 embodiment provides the capability of shutting off any flow to the engine entirely on both engine shut off and on deceleration (a) makes it possible to connect the fuel line downstream of the flow control orifice 507 and (b) makes it possible to use a fixed orifice (such as the orifice 605 of FIG. 107) in place of the variable orifice 507. That is, since the inverter has a piston 691 which is positionable (as described in detail above with reference to FIGS. 112–116), to insure against any flow of fluid from the inlet 683 to the outlet 671 on both engine shut off and on engine deceleration, and at idle, it is not necessary to provide or to rely on a flow shut off valve (such as the variable orifice flow control valve 507 of FIG. 110) upstream of the inverter apparatus 663.

A fixed orifice 633 for control of the fuel flow (allowing entrance at 653) and a fixed orifice 605 (in place of the variable orifice 507) can be used because the inverter 663 is capable of providing an increasing vacuum with increasing engine power to match the engine need. By proper choice of orifice sizes the desired rate of flow of the water and of the fuel to the reactor is controlled without having to have variable orifice valves in the feed lines. The variable vacuum with fixed orifices provide the variable flow desired.

The flash boiler 505 shown in FIG. 117 is illustrated as part of the reactor 550. It should be noted, however, that the flash boiler 505 is not limited to the coaxial construction shown in FIG. 117 and in FIG. 110 but can instead, in the FIG. 117 embodiment, be formed of tubing as in the FIGS. 109, 103 and 105 embodiments; and the flash boiler can also be metal tubing such as aluminum wound around the exhaust manifold or the header. The particular form of the flash boiler is not critical to the construction or mode of operation of the FIG. 117 embodiment.

In summary on the FIG. 117 embodiment it really is not necessary to have anything more than a fixed orifice for controlling the water flow to be converted to steam.

If precombustion reaction products are desired, the fuel conduit 619 can additionally be connected in association with the water feed line 511 and the fuel flow is mixed with the water in a flash boiler which serves as a reactor for not only converting the water to steam but also for converting the fuel and steam into precombustion reaction products.

The particular form of the flash boiler-reactor is not critical, and the FIG. 110 reactor has been referred to primarily to illustrate one form of reactor which is effective to produce the results desired. If fuel is added to the water to provide precombustion reaction products, adequate temperatures are required in the flash boiler to produce the reaction. That is, temperatures of 900° F. or above are preferable to provide the complete reaction desired.

The outlet of the reactor 550, the fitting 525 shown in FIG. 110, is connected to the conduit 525A. This conduit 525A thus conducts the steam and precombustion reaction products to the inlet 683 of the inverter apparatus 663, and the flow of the steam and precombustion reaction products is then regulated by the structure of the inverter apparatus 663 under various engine operating conditions, such as operation at idle, operation at part throttle, operation at full throttle, deceleration and engine shut off as described fully and in detail above with reference to FIGS. 112-116.

Another embodiment of an inverter apparatus for using a decreasing vacuum field to produce an increasing vacuum effect is illustrated in FIG. 118 and is indicated generally by the reference numeral 729.

The inverter apparatus 729 comprises a first valve 731 and a second valve 733. Both valves 731 and 733 are located in a conduit 735 which connects to the manifold 675. The steam inlet line 525A is connected to a location 737 in the line 735 between the valves 731 and 733.

A pressure sensing line 739 extends from the manifold 675 and is connected to each of the valves 731 and 733 to control the opening and closing of the valves in response to changes in vacuum in the manifold.

The valve 731 is constructed to be normally closed at high vacuums as sensed by the line 739 (high vacuums such as exist at engine idle), and the value 733 is constructed to be normally open at high vacuums as sensed by the line 739.

In operation the valve 731 progressively opens with decrease in the vacuum sensed by the control line 739, and the valve 733 progressively closes with decrease in the vacuum sensed by the control line 739 so that the vacuum produced at the connection 737 of the steam inlet conduit 525A increases from zero at engine idle to a maximum at full throttle and is thus an inversion of the change in vacuum existing in the manifold 675.

The FIG. 118 construction also provides zero vacuum (atmospheric pressure) at engine idle since the valve 733 is fully open and valve 731 is fully closed at this idle condition of operation. This construction is preferably used in connection with the exhaust pressurization of the liquid storage tank.

Another embodiment of an injector assembly for injecting fluid at the idle screw opening is illustrated in FIG. 121 and is indicated generally by the reference numeral 751.

The injector assembly 751 comprises an injector tube 753 which corresponds generally to the tube 509 shown in FIG. 108, but the injector assembly shown in FIG. 121 has a separate threaded sleeve 755 which can be adjustably positioned with respect to the injector tube 753 in the initial installation to compensate for different thread requirements and different carburetor port constructions from car-to-car. For example, some cars will require U.S. type threads while other cars will require metric type threads, and the injector assembly shown in FIG. 121 permits one injector tube 753 to be used in both cases. Also, by way of further example, some automobiles will have the port structure positioned at a location different from the port structure of other cars, and the injector assembly shown in FIG. 121 permits the initial position of the inner ends of the threaded sleeve 755 to be varied with respect to the position of the injector tube 753 to accomodate for this difference in location of the port structure.

In the initial installation of the injector assembly 751, the threaded sleeve 755 is threaded into the carburetor and rotated to a position where the inner ends of the threads on the sleeve 755 are positioned properly with respect to the internal port structure of the carburetor.

The injector tube 753 is then inserted axially through the interior of the threaded sleeve 755 until the conical surface 757 on the inner end of the injector tube 753 seats in the idle screw port, or related opening, in the caburetor. At this point the orifice 581 of the injector tube 753 is properly located with respect to the inner end of the threaded sleeve 755, and the injector tube 753 and the sleeve 755 are locked together in this relative position of the two parts. The two parts can be locked and sealed together by a swaging nut 759 as illustrated in FIG. 21 or other locking methods, such as the use of a lock tight compound, can be used. A swaging tool can be used in some cases.

An indicator sleeve 595 having an indexing mark 597 (as in the FIG. 108 embodiment) is then slipped over the outer end of the injector tube 753, and the injector assembly can be rotated, as an assembly, to the desired position in the carburetor idle screw location by noting the number of turns of the indicator mark 597.

The indicator mark 597 also permits two or more of the injector assemblies 751 to be rotated in synchronism in cars which have two or more barrels in the carburetor.

The indexing mark 759 is quite important when synchronizing the adjustments of two or more injector assemblies 751 in cars having two or four barrel carburetors because each injector assembly 751 can be rotated, say a ¼ of a turn, and the resulting change in exhaust emissions can then be read out on the test instruments. All assemblies can be kept synchronized throughout the adjustment, merely by visually noting the relative positions of the indexing marks 759.

The two parts injector assembly 751 shown in FIG. 121 thus permits a single injector tube 753 to be used for all makes of cars, regardless of the type of thread and regardless of the differences of location of the internal port structure.

Another embodiment of an emission control system constructed in accordance with the present invention is illustrated in FIG. 122 and is indicated generally by the reference numeral 761.

Many of the component parts of the system 761 shown in FIG. 122 correspond to component parts earlier described in other views of the drawings, and the same reference numerals have therefore been used in FIG. 122 to denote those component parts which are the same as component parts illustrated in the other drawing views.

Thus, an emission control system 761 shown in FIG. 122 comprises a water storage tank 503. The water is conducted from the water supply tank 503 to a variable orifice control valve 507 by a supply line 511.

The flow area through the control oridice 507 is varied in response to the temperature of the exhaust gases in exhaust pipe 521, and the structure and mode of operation of the variable flow control orifice 507 is essentially the same as that illustrated and described with reference to FIG. 109.

The variable flow control orifice 507 and related structure is constructed as a subassembly which can be screwed into the exhaust pipe 521 by the threads 538 as a subassembly of the emission control system 761. The thermal response is obtained by the difference in coefficients of thermal expansion between an outer tube 547 and an inner rod 545 (not illustrated in FIG. 122 but shown in FIG. 109).

As the temperature of the exhaust gases increases, the outer tube expands more than the inner rod and moves a valve element 543 away from a valve seat 541 to increase the size of the flow passageway, all as illustrated and described above in reference to FIG. 109.

The fluid then flows from the conduit 511, though the orifice 507 and into a conduit 513.

In this case it should be noted that the fluid passes through the flow control orifice 507 and into the conduit 513 as a liquid because there is no flash boiler in the emission control system 761 as shown in FIG. 22. However, there is a significant amount of heat transfer from the structural parts of the flow control orifice 507 to the liquid passing through this orifice because of the high heat conductivity of these parts. The molybdenum wire 545 (see FIG. 109) in particular transfers a considerable amount of heat to the liquid passing through the flow contol orifice 507.

As noted above, since there is no flash boiler in the FIG. 122 embodiment, the liquid in the line 511 is not converted to steam in the line 513 but is instead retained as a liquid. Even in the applications illustrated and described above which do incorporate a flash boiler (for example, the FIGS. 102, 105 and 107 embodiments) it has been found desirable, in some applications, to use the flash boiler only for adding heat to the liquid but not to add enough heat to change the liquid to steam. In such applications the flash boiler 505 is constructed and located in a way such that the liquid is not converted or substantially converted to vapor in the conduit 513 or in the related structure up to the point of injection into the engine. This has an advantage in that the control of the fluid flow and related structure can be made simpler and more compact when regulating the flow of liquid than can be the case when the flow to be regulated is steam or substantially steam.

With the amount of heat that is added to the fluid (by the structure of the orifice 507 alone or structure of that orifice in combination with the flash boiler) the liquid temperature is raised sufficiently so that the injected liquid is rapidly transformed into vapor at the lower pressure existing in the induction system of the engine. That is, it is believed that the heated liquid pretty much instantaneously flashes into a vapor immediately after being injected into the engine induction system with all those embodiments of the present invention which do not actually convert the liquid to steam before injection into the engine.

The conduit 513 in the FIG. 122 embodiment is connected to a fluidic drain valve 571 by a T-connection 763, and the conduit 513 is preferably shaped in a coil 575 around the outside of the fluidic drain valve 571 as illustrated in FIG. 122.

The outlet end of the coil 575 extends upward, as a continuation of the conduit 513, to a flexible walled accumulator 569, and the conduit 513 includes an upper end part 765 which is disposed axially within the accumulator 569. The part 765 has an end 767 which extends up to within about one inch of the top part of the accumulator to leave a small space within this part of the accumulator. The space acts as a void on deceleration.

As illustrated in FIG. 122, the vertical distance D between the open upper end 767 of the tube part 765 and the upper tip 571 of the fluidic drain valve is made equal in static head to the vacuum existing at the idle screw opening 509 when the engine is running at idle. The coil 575 can be extended or compressed to make fine adjustments in the vertical location of the tip 571.

When the vacuum at the idle screw 509 is the vacuum at idle or less (such as on deceleration) the vacuum exerted on the line 513 is not sufficient to draw fluid from the open upper end 767 of the tube 765 and through the conduit 525 and injector assembly 751 into the engine. Instead, there is a void in the upper part of the accumulator 569 above the open upper end 767 and no fluid flows into the engine.

As the vacuum at the idle screw opening 509 increases with increasing engine throttle opening (see FIG. 106) the increasing vacuum is transmitted to the interior of the flexible walled accumulator 569, causing the accumulator to immediately constrict. This forces the liquid previously stored in the accumulator (below the level of the tip 767) to be squeezed upward and into the conduit 525 and through the injector assembly 751 into the engine. At the same time, the thermal control valve 507 begins to open (because of the increasing heat in the exhaust pipe 521), and the vacuum transmitted from the idle screw opening 509 back through the injector assembly 751, conduit 525, flexible accumulator 569, conduit 513 and conduit 511 draws water from the water storage tank 503 to continue to produce a continued flow of liquid to and through the injector assembly 751.

Thus, while the thermal control valve 507 is usually set to be closed at idle, the flexible walled accumulator 569 functions to immediately supply the needed fluid to the engine on acceleration, even though the thermal control valve 507 is at that point in time still closed. The response of the thermal control valve 507 is very quick, however, and the valve 507 opens up almost immediately on acceleration to permit the continued flow of liquid as described above.

On deceleration, the throttle is closed, and the vacuum at the opening 509 drops off to a level below that required to draw fluid from the level of the point 767 in the flexible walled accumulator 569. The stored energy of the resilient walls of the accumulator 569 also cause these walls to flex outward (after being pressed inward by the vacuum condition existing at acceleration or steady state operation). This distension of the walls of the accumulator provides a very fast response for sucking all liquid out of the conduit 529 and the injector assembly 751 above the accumulator 569.

The action of the thermal control valve 507 on deceleration is somewhat slower than that of the flexible walled accumulator 569. The thermal control valve 507 tends to remain open for a short period of time on deceleration because of the inherent mass of the structure and heat soak in the engine exhaust system on deceleration. In this event the fluidic drain valve 571 opens to permit any excess flow of fluid passing through the thermal control valve 507 to drain off through the open upper tip 571 rather than being fed by siphoning action into the idle screw opening 509 of the engine which is, as illustrated, somewhat lower than the effective intake level (the upper surface of the liquid in the storage tank 503) of the conduit 511.

The combination of the flexible walled accumulator 569 and the fluidic drain valve 571 provides a very fast responding discrimination between varying engine operating conditions to help modulate the correct amount of fluid to the engine, while the thermal control valve 507 serves as a basic regulating or monitoring device for controlling the flow to the engine, particularly under steady state operating conditions.

The emission control system shown in FIG. 122 has proven to be a very cost effective system for supplying an amount of fluid in response to the engine's need for the fluid. While the system shown in FIG. 122 does not realize all of the optimum benefits that can be achieved with other embodiments of the present invention described above, such as, for example, the system using the reactor apparatus shown in FIG. 110 for producing precombustion reaction products, the FIG. 122 system does provide a highly effective system for controlling the flow of fluid to the engine to reduce emissions and to improve economy with a construction that is quite simple to manufacture and to install and that is, as noted above, very cost effective.

While not illustrated in FIG. 122, the emission control system 761 can incorporate an air lean-out mechanism, such as the air lean-out valve 709 illustrated in FIG. 102 in association with the PCV valve 607 and related line for providing additional air lean-out under certain conditions of engine operation.

Furthermore, the feed arrangement illustrated in FIG. 122 wherein the basic regulating or monitoring valve 507 and conduit 513 feeds the fluid to the bottom of the discriminator combination (the fluidic drain valve 571 and the flexible walled accumulator 569) can be incorporated in the FIGS. 102 and 105 embodiments.

Another embodiment of an emission control system is illustrated in FIG. 123 and is indicated generally by the reference numeral 771.

The system 771 is like the system 761 shown in FIG. 122 in that the system 771 supplies the fluid to the engine in the form of a liquid rather than as steam.

The system 771 shown in FIG. 123 controls the flow of fluid to the engine by an inverter apparatus substantially the same as that illustrated in FIGS. 112-117 with the only significant difference being in the sizes of the orifices within the inverter apparatus 663. In the system illustrated in FIG. 123 the sizes of the orifices within the inverter apparatus 663 are smaller than the related orifices of the inverter apparatus 663 used in the FIG. 117 embodiment. In particular, the orifices 701 and 702 (shown in FIG. 112) and the space 694 shown in FIG. 112 have a larger cross section when these orifices are used for controlling steam and precombustion reaction products than the cross sections involved when a liquid is controlled.

The system 771 shown in FIG. 123 comprises several component parts which are the same as component parts in other embodiments described above, and the same reference numerals have been used in FIG. 123 to denote these same parts.

The system 771 shown in FIG. 123 includes a liquid storage tank 503 which stores water or water plus additives such as ammonia and alcohol and other additives as noted above in other parts of this specification.

A conduit 511 has a filter 769 on the inlet end and is connected at its outlet end to a passageway 683 of an inverter apparatus 663.

The inverter apparatus 663 is constructed the same as that illustrated in FIGS. 112-117 so that the passageway 683 leads to the interior of a cylindrical bore 693 (see FIG. 12).

The movable piston 691 then controls the amount of fluid fed from the passageway 683 through the outlet passageway 671 and to the inlet of the engine at a point beyond the carburetor butterfly 677.

The way in which the piston 691 is positioned in response to the vacuum in the inlet manifold (and the exhaust gas pressure transmitted to the converter apparatus 663 by the conduit 652) is described in detail above with reference to FIGS. 112-117.

The piston 691 is positioned as illustrated in FIG. 112 at engine idle, is positioned as illustrated in FIG. 114 at engine shut-off, is positioned as illustrated in FIG. 115 at part throttle and is positioned as illustrated in FIG. 116 at full throttle.

The amount of fluid (which in the FIG. 123 embodiment is either water or water plus additives) flowing to the engine is therefore regulated by the position of the piston 693 and related orifices in response to engine need at each engine operating condition.

In the FIG. 123 embodiment the liquid is supplied to the engine at substantially the same temperature as exists in the supply tank 503. This temperature is about 110°-115° F. under normal conditions of operation. However, the fluid is supplied to a vacuum condition as soon as it passes beyond the piston 691, and this promotes rapid vaporization of the liquid.

While the inverter apparatus 663 shown in the FIG. 123 system has been illustrated as associated with the PCV line, this is not necessary; and the inverter apparatus functions quite satisfactorily without any association with the PCV line.

The system shown in FIG. 123 is a very cost effective system which is applicable to all cars, generally with a minimum of modification since all cars of recent manufacture have existing PCV lines. Also, the system shown in FIG. 123 eliminates the need for feeding the liquid in through the idle screw. This is a benefit in some cases because not all cars have idle screw openings which are suitable for some of the embodiments of the present invention.

As in the other embodiments of invention using the inverter apparatus 663, the system 771 shown in FIG. 123 provides for desired lean-out within the inverter apparatus itself by the operation of the ports 681 (see FIG. 15). Also, as in the other embodiments using the inverter apparatus 663, the FIG. 771 system eliminates the need for an extra drain valve since the inverter apparatus 663 incorporates drain openings 658 and 660 (see FIG. 112) which are effective at idle, and the inverter apparatus provides positive shut-off of flow of fluid at engine off (see FIG. 114).

On acceleration the way in which the exhaust pressure is fed to the top of the tank (through the conduit 656 as illustrated in FIG. 123) provides extra pressurization for increased flow on acceleration, and the way in which the piston 691 positively blocks off flow on deceleration (see FIG. 112) eliminates the need for an accumulator as part of a discriminator combination to accomodate any overrun resulting from a thermal control valve.

The embodiment shown in FIG. 124 is basically like that illustrated in FIG. 123 (and the like reference numerals have been used to show like parts) with the exception that the exhaust pressurization for the water supply tank 503 is obtained by a direct connection of the conduit 652 to the interior of the tank 503 and a rectifier valve 654 like that shown in FIG. 117 for converting the pulsating, oscillating character of the exhaust gases to a rectified pressure. The rectifier valve 654 also directs the incoming exhaust gases below the surface of the water so that these gases are cleaned. This insures that you have only clean gas coming down through the conduit 656 to the bottom of the inverter apparatus 663.

The rectifier valve 654 eliminates the effects of tuned exhaust systems and the negative pressure result of tuned exhaust systems at the cruising ranges at normal design conditions.

Another embodiment of an emission control system constructed in accordance with the present invention is illustrated in FIG. 126 and is indicated generally by the reference numeral 775. The component parts of the system 775 that correspond to like parts in other drawing views have been indicated by the same reference numerals.

The system 775 shown in FIG. 126 uses the rectified pressure of the engine exhaust gases to provide the pressure differential for producing flow across the variable area flow control orifice 507 (FIG. 125) instead of using the vacuum in the engine induction system for producing this pressure differential.

Because the rectified exhaust gas pressure is used in this way, the injector assembly 509 can be located at the top of the induction system above the butterfly 677 as illustrated in FIG. 126. The injector assembly 509 can also be located at any other position that might be desired, such as at the idle adjustment screw or below the butterfly 677.

The injector assembly 509 includes a threaded plug 590 which can be adjusted to vary the compression of the spring 589 and thus the pressure set point at which the system 775 will begin the feeding of fluid past the ball check valve 587. Normally the spring 589 is set to provide a nominal small pressure (such as, for example, ½ pound above atmosphere). The exact setting is dependent upon the fuel pressure available.

A fuel pump 777 supplies fuel to both the carburetor, through a branch conduit 779 and to the fuel tank 617 through a branch conduit 781 and a float controlled valve 783.

A water soluble fuel such as alcohol can also be added to the water in the storage tank 503 in place of or in addition to the fuel supplied through the conduit 619 and a fluidic check valve 504 permits the tank 503 pressure to bleed back to just above one atmosphere on engine shut-off.

It is an important feature of the operation of the system 775 that the flow of fluid is controlled in response to heat flux. This control function is obtained by the control valve assembly shown in detail in FIG. 125.

As noted earlier in this application, the control valve assembly shown in FIG. 125 is generally similar to that shown in FIG. 110, and corresponding reference numerals have been used to designate corresponding parts. The FIG. 125 assembly is, however, specifically constructed to maximize the heat flux effect so that any change in the heat flux of the engine, resulting from a dynamic change in an engine operation condition (such as acceleration, deceleration, power changes, etc.) produces an almost instantaneous and significant corresponding change in the relative positions of the control valve element 543 and control valve seat 541.

The valve assembly construction shown in FIG. 125 is a true heat flux responsive valve, rather than being only a thermal responsive valve; and the mode of operation is such that the valve assembly provides a regenerative feedback on a dynamic change in engine operating condition so that the change in position of the valve element 543, in and of itself, increases the controlled response.

For example, on an acceleration (where the valve element 543 is moved to a more open position by the increased temperature differential between the outside tube 547 and the inside rod 545 resulting from the increase in exhaust gas temperatures) the increased flow of fluid which is permitted by this opening movement of the valve element 543 cools the rod 545 more than it cools the outside tube 547; and this provides a greater differential in the temperatures between these two elements producing a greater differential in the relative thermal expansions and produces a larger opening through the valve 507, again adding to the flow.

In the valve assembly construction shown in FIG. 125, the valve element in the rod 545 and the tubes 547 and 643 are preferably made of the same material because this will tend to insure that the thermal expansion response of these elements will produce this regenerative feedback result both in a valve opening direction on increase in heat flux and in a valve closing direction in response to a decrease in heat flux.

The ability to positively close off the valve 507 under certain conditions of engine deceleration is important because it provides the desired operating result, and obtaining positive shut-off permits the elimination of some auxiliary drain valve and shut-off valve and decelerator pump elements.

In the FIG. 125 construction the rod 545 is welded (at 546) or otherwise suitably connected to the outer end of the tube 547. This permits a regulated amount of preload to be placed on the rod 545 to engage the valve element 543 in positive fluid sealing contact with the valve seat 541. The amount of the preload is determined by the adjustment of the preload adjusting sleeve 657. After the sleeve 657 has been turned to provide the desired amount of preload, it is preferably locked in place by lock tight or other suitable locking means.

In this regard it should be noted that the sleeve 657 is welded (at 642) to the tube 643 which in turn is welded (at 510) to the tube 511 so that each unit of rotation of the sleeve 657 will produce a corresponding change in the preload on the valve 507 corresponding to a related temperature differential between the outer tube 547 and the rod 545. This amount of temperature differential must therefore occur before the valve 507 will unseat under the dynamic conditions of heat flow produced by changes in the exhaust gas temperatures of the engine resulting from engine acceleration.

The regenerative feedback action of the increased flow of fluid on engine acceleration was described in detail above.

On deceleration the engine exhaust gas temperatures drop. The heat flux across the tube 547 and rod 545 drops and causes the valve element 543 to move toward a more closed position with respect to the valve seat 541. This decreases the flow of fluid through the variable orifice 507, and the decreased fluid flow provides less cooling for the rod 545 so that the temperature differential between the inner rod 545 and the outer tube 547 decreases. This in turn produces less temperature differential, and the decrease in the relative thermal expansions and produces a smaller opening through the valve 507, again decreasing the fluid flowing through the valve 507.

The regenerative feedback feature thus works in both valve opening and valve closing directions, and it works in the direction desired to produce the change in fluid flow needed by the engine on both an increase in heat flux and a decrease in heat flux.

Where the heat flux is substantially constant, such as, for example, on steady state engine operation at partially open throttle, the cooling effect of the fluid flowing through the valve 507 will become stabilized and balanced with respect to the heat flux. This stabilization occurs quickly. The temperature differential produced by the heat flux between the higher temperature outer tube 547 and the lower temperature inner rod 548 is balanced by the cooling effect of the fluid flowing through the valve 507 (which fluid tends to cool the inner rod 545 more than it cools the outer tube 547) so that the valve 507 is opened to an extent which provides the amount of fluid flow for maintaining this stabilized differential expansion of the rod 545 and outer tube 547.

Another embodiment of an emission control system constructed in accordance with the present invention is illustrated in FIGS. 127 and 128 and is indicated generally by the reference numeral 785. The component parts of the system 785 that correspond to like parts in other drawing views have been indicated by the same reference numerals.

The emission system 785 incorporates a computer 787. As shown in FIGS. 128 and 129, the computer is operatively connected through a control line 789, to control the opening of a variable orifice control valve or variable output pump 507 for regulating the flow of water to the reactor 550. The computer 787 is also operatively connected, through a line 791, to control the opening of a variable orifice control valve or variable output pump 633 for regulating the flow of fuel from the tank 617 to the reactor 550.

The computer 787 is also connected to a first temperature sensing thermocouple 793, by connecting lines 795, and to a second temperature sensing thermocouple 797, through connecting lines 799.

As illustrated in FIG. 129, the thermocouple 793 is located near the outer end of the outer tube 547 so that this thermocouple is responsive to changes in the exhaust gas or combustion temperature.

The thermocouple 797 is located well within the interior of an inner tube 801 so that this thermocouple is responsive primarily to a temperature which exists in the central part of the reactor 550. The temperature in this part of the reactor will vary in dependence on particular engine operating conditions.

The temperature at this location in the central part of the reactor will, for example, be essentially the same as the temperature at the location of the outer thermocouple 793 when the engine is operating at idle and the fluid control valves or variable output pumps 507 and 633 are closed. In this condition of operation all parts of the reactor 550 are heated by the heat of the exhaust or combustion gases to substantially the same level; and, as a result, there is no heat flux between the locations of these two thermocouples in this condition of operation.

On acceleration the temperature of the combustion gases rise quickly and the temperature at the location of the outer thermocouple 793 becomes substantially higher than the temperature at the location of the inner thermocouple 797. This differential temperature signal transmitted to the computer 787 causes the computer to open the variable orifice control valves or variable displacement pumps 507 and 633 in the conduits 511 and 619, and the fluid flowing into the reactor 550 then exerts a greater cooling effect on the centrally located thermocouple 797 than it does on the peripherally located thermocouple 793. This differential cooling effect increases the temperature differential sensed by these two thermocouples and transmitted to the computer 787 so that the computer 787 produces an additional flow from the controls 507 and 633.

On steady state operation the temperature differential between the peripherally located thermocouple 793 and the centrally located thermocouple 797 becomes stabilized at a certain related condition of combustion gas temperature and amount of liquid flow through the controls 507 and 633.

During steady state operation also, as you change from one steady state engine speed to another, the combustion gas temperature changes and produces a modulated change in the opening of the controls 507 and 633 and the amount of fluid flow through the controls. This in turn produces a modulated increase in the differential colling effect between the thermocouple 797 and 793 to produce changes in fluid flow amounts at stabilized conditions with small changes in engine power levels.

On deceleration the temperature of the combustion gases decreases and decreases the temperature differential between the peripheral thermocouple 793 and the central thermocouple 797. The lower temperature differential signal transmitted to the computer 787 moves the controls 507 and 633 in a decreasing flow direction. The reduced fluid flow produced by this reduced flow of the controls 507 and 633 in turn reduces the differential between the cooling effect on the central thermocouple 797 and the peripheral thermocouple 793. This causes the thermocouple to transmit an additional lowered decrease in temperature differential for further reduced flows through the controls 507 and 633.

The control action of the computer 787 on the fuel flow control valve or variable flow pump 633 in response to the temperature differential signals transmitted by the two thermocouples is substantially the same as that described above with reference to the control action on the water flow control valve 507.

In the preferred form of the invention the computer is preprogrammed, in both the valve opening (acceleration) and valve closing (deceleration) directions, not only to respond to the combination of the heat flux differential and the fluid flow cooling differential, but also to provide an additional amount of valve movement (in an opening direction on engine acceleration and in a closing direction on engine deceleration). This insures that the engine's need for increased liquid is met on acceleration and insures that the control 507 moves to a completely closed condition on decelerations which are sufficiently rapid.

Closing the fluid control 507 completely on deceleration is quite important because of the physical condition which exists in the engine in making a rapid deceleration from a relatively high speed. Closing the throttle at high RPM's creates a sudden and high vacuum, in the order of 25 inches of mercury or more. This is like operating at very high altitude; and combustion, even with an excellent ignition system, is difficult. For example, 23 inches of mercury vacuum is equivalent to operating at 35,000 feet of altitude. It is therefore very important that nothing be done to intefere with the combustion. In fact, it is preferable to take action, such as introducing additional gaseous free hydrogen, to enhance combustion under these severe conditions. If combustion is incomplete, on such deceleration (as is often the case), the unburned hydrocarbons and carbon monoxide emissions increase substantially.

It is quite apparent then that no coolant should be added on such deceleration conditions, and preprogramming the computer to provide a positive shut-off of the water control valve or variable output pump 507 insures that the control does go fully closed to provide a substantial benefit in engine operation.

While FIGS. 128 and 129 show dual thermocouples, another embodiment of the present invention incorporates a single thermocouple for sensing changes in combustion gas temperature. In this embodiment the peripherally located thermocouple 793 is used because it is quite responsive to changes in combustion gas temperature.

This embodiment of the invention also incorporates preprogramming in the computer for both acceleration and deceleration conditions.

The computer is programmed to maintain the valve or pump 507 closed at combustion gas temperatures existing at idle condition of operation and is programmed to not only open the flow of valve or pump 507 to a certain flow corresponding to a certain temperature above idle, but also to provide an additional amount of flow in response to a rapid change in temperature corresponding to engine acceleration.

The computer is preprogrammed for deceleration conditions of operation (in much the same way as described above with reference to the two thermocouple form of the invention) to close off the flow of control 507 completely on rapid deceleration from relatively high engine RPM.

Upon arriving at a steady state operation at combustion gas temperatures above idle tempertures the computer increases the flow of control 507 to a flow corresponding to the temperature level at that condition of operation.

Thus, every temperature has a related flow for the control 507 corresponding to the steady state condition of operation at that temperature, and the preprogrammed increased flow and decreased flow are produced in response to rapid changes in combustion gas temperature corresponding to acceleration and deceleration.

The system 785 shown in FIG. 128 also incorporates a check valve 624 in the fuel line 619 and a check valve 622 in an air line 620. The air line 622 provides controlled supplemented air as required for heat in the catalytic action by burning part of the fuel (described in more detail below with reference to the FIGS. 125, 130 and 131 embodiments) to reform the fuel in the reactor 550.

The conduit 511 from the water storage tank 503 has a check valve 628 at the upper, inlet end of the valve or pump 507.

The conduit 511 check valve 628 permits the valve or pump 507 to be filled with water gravity or pump suction and prevents back flow.

The main water storage tank 503 also has a vent 502 to atmosphere.

In operation, the check valve 628 permits the pump or valve 507 to be supplied with water from the main storage tank. When the engine power is increased, as on acceleration or operation at full throttle, the temperature of the outer thermocouple 793 rises rapidly, as does the differential between the temperature of the outer thermocouple 793 and the inner thermocouple 797. This opens the valve or pump 507 to admit more water, and the valve or pump 633 is also opened to admit more fuel and air to the reactor 550.

In the FIG. 128 embodiment an additional shut-off valve 809 is located closely adjacent to the injector 509 and is connected by a line 811 to the computer 787. The computer 787 closes the valve 809 on engine deceleration as a further safeguard against introducing any coolant into the engine under this condition of operation. Because the shut-off valve 809 is located quite close to the injector 509, it effectively shuts off any introduction of coolant into the engine on deceleration.

While the valves 507 and 633 in the FIG. 128 embodiment have in places been illustrated and described as valves, these valves can be replaced by variable displacement pumps that can vary the displacement from zero displacement flow to a maximum flow under the control of the computer 787.

The emission control system shown in block diagram form in FIG. 127 illustrates that a number of additional control signal inputs may be incorporated in addition to the signals of the thermocouples 793 and 797. For example, the control signal inputs may include the pressure of the exhaust gas and the vacuum in the inlet manifold or at the ported vent or at the idle screw or at some other point in the induction system.

FIG. 130 shows a pulse pump constructed in accordance with another embodiment of the present invention. In FIG. 130 the pulse pump is indicated generally by the reference numeral 813.

The pulse pump 813 is operated by the pulsations in the engine exhaust gas pressure and is effective to pump water (or a mixture of water, fuel and air) to a thermal control valve (or to a reactor in the case of a mixture of pumped water, fuel and air) using the power available from the engine exhaust pressure. The pulse pump 813 is effective to pump the fluid in direct relation to the various engine operating conditions.

The pulse pump 813 comprises an upper part 810 and a lower part 812. A diaphragm 815 is clamped between the upper and lower parts around the periphery of the diaphragm. This peripheral engagement of the diaphragm forms a sealed upper chamber 814 and a sealed lower chamber 816.

The exhaust pressure is applied to the lower chamber 816 by an exhaust gas conduit 652 and the exhaust gas in this conduit 652 is preferably taking as near as possible with a fairly large conduit for nil flow restriction to an exhaust valve to maximize both the pressure peak and the individual pressure pulses. Ideally and preferably the gas inlet port should face the exhaust flow stream to pick up total pressure head (velocity plus static head).

The exhaust gas conduit 652 is also preferably the same as the conduit 652 of the reactor shown in FIG. 125, and picking off the exhaust gas pressure as near as possible to the outlet of an exhaust valve insures that the highest possible exhaust gas temperature is available for use in the reactor (such as the reactor shown in FIG. 125).

The upper part 810 of the pulse pump (see FIG. 130) has one opening connected to the water inlet line 511 from the storage tank 563 and a second opening connected to a mixture outlet line 510 at the reactor inlet and these two lines 511 and 510 correspond to the similarly numbered lines 511 and 510 in FIG. 128.

An air line 620 and a fuel line 619 at fuel tank 617 are also connected to related openings in the top part 810 when the pulse pump is used with a reactor form of the present invention. The water line 511 has a check valve 628, the fuel line 619 has a check valve 624, the air line 620 has a check valve 622 and the mixture outlet line 510 has a check valve 626 (shown only in FIG. 130) which is connected in reverse orientation to the check valves 622, 624 and 628.

The air, fuel and water lines are connected for feeding into the pump 813 while the mixture outlet line 510 is connected for conducting the outlet from the pump 813 to the thermal control valve or the reactor unit.

The inlet lines for the water, air and fuel each have proportioning orifices upstream of their respective check valves. Thus, the water inlet line 511 has an orifice 607, the fuel line 619 has an orifice 633, and the air line 620 has an orifice 630 as illustrated.

The diaphragm 815 has a thickness and configuration that insures that the excursion of the diaphragm will vary in dependence on the magnitude of the pressure peak of the exhaust gases (so that the amount of fluids pumped by the diaphragm through the outlet line 510 will correspondingly vary in dependence on the amount of gas pressure on each cycle of operation. Alternately, the diaphragm may be in the form of a bellows. The frequency of flexure of the diaphragm 815 will of course be the same as the frequency of the opening and closing of the exhaust valve. As a result, the pulse pump 813 pumps the water, fuel and air fluids in proportioned relations and in amounts which are directly related to the brake mean effective pressure of the engine and of course in proportion to frequency for the RPM at which the engine is operated.

The pulse pump 813 thus in itself supplies water in direct relation to engine need and it also supplies a proportioned mixture of water, fuel and air to the reactor in direct relation to engine need.

While the pump 813 has been shown in FIG. 130 as a single pump for pumping a mixture of fluids, a single pump can be used for pumping water alone (either to a thermal unit with a control valve, such as the FIG. 125 type of thermal unit, or to a thermal unit without a control valve, such as the FIG. 129 type of thermal unit) or the separate functions can be performed by separate pumps. For example, in certain embodiments of the invention, one pump 813 is used for water, a separate pump 813 is used for fuel, and a third pump 813 is used for pumping air. Separate pumps facilitate the making of adjustments on the amount of fluid being pumped by that particular pump.

The functional effect of controlling the amount of water being pumped in response to the magnitude of the exhaust gas pressure peak on each cycle permits the amount of fluid to be controlled without additional metering by a thermal control valve or computer in some embodiments of the invention. On acceleration the exhaust pressure peaks increase to provide increased water feed, and on deceleration the pressure peaks drop off abruptly to cut off water flow. And on stabilized engine operation the pressure peaks maintain flow at a stable output level related to the engine need. Combining the pump 813 with a thermal control valve is, however, desirable in some applications as this provides an additional fine regulation on the water flow rate in response to engine need.

As noted above, on deceleration the flow of water is cut off entirely; however, in those application of the invention in which fuel is reformed in a converter, the metering valve is set to provide a minor amount of fluid flow on deceleration since the hydrogen produced by the reformation aids in sustaining combustion during the deceleration.

In accordance with the present invention a catalyst 821 is preferably included in the outer chamber between the tubes 547 and 643 in the reactor shown in FIG. 125. This catalyst is in either granular form (as shown in FIG. 125) or in monolithic form (a block 817 with poreous openings 819 as shown in FIG. 131). This catalyst helps to lower the temperature at which the fuel can be reformed, and air can be added to burn part of the fuel to add heat for raising the temperature. This added heat increaes the efficiency at which the steam and fuel react to form precombustion reaction products. The catalyst is also located in the reactor, in the outer channel, where it does not interfere with the control function of the reactor. The heat from the catalystic action is added in the outer, hotter part of the thermal control mechanism.

The way in which water is supplied to the engine induction system in accordance with the present invention improves engine performance and increases engine power because the cooling of the inducted air into the combustion chamber prior to closing of the inlet valve is maximized.

Changing water from a liquid state to a vapor state in the induction cools the inducted air because it takes from the air the heat required for the latent heat of vaporization of the water. Cooling the air increases the density of the air and therefore increases the amount of air (and oxygen) inducted into the engine, as compared to the amount of air that would have been inducted without the cooling produced by the vaporization of the water.

Since it is the vaporization from a liquid state to a vapor state (and not the temperature of the water) that provides the major cooling effect on the air, it is normally desirable (except in some situations, such as acceleration, in which the injection of water droplets into the combustion chamber may be desired to lower peak temperatures in the combustion chamber) to maximize the vaporization, both in terms of total amount of the water vaporized and in terms of completeness of the vaporization before the closing of the inlet valve of the engine combustion chamber.

The present invention accomplishes this objective by heating the water to provide heated, or superheated water, which can be quickly vaporized in the induction system to maximize the cooling effect on the inducted air.

In some forms of the present invention two separate paths are provided for supplying added fluids to the engine. In one path heated water, without reformed fuel, is supplied with the inducted air to produce the maximum cooling effect on the inducted air and to maximize the amount of inducted air. A second, separate path is used for supplying reformed precombustion products produced by a reactor and the two paths are not combined until at a point as near as possible to the inlet valve of the combustion chamber.

It should also be noted that the various forms of the reactors shown in the drawings for converting fuel to precombustion reaction products (such as, for example, FIG. 129) are illustrative only and that all such reactors must be of adequate size to accomplish the required heat transfer from the exhaust gases or must otherwise produce the required heat. In this regard, the heat can be supplied by the precombustion reaction alone without heat transfer from exhaust gases; however, the amount of oxygen in all cases must be suitably regulated by prevent burning of all the fuel in the reactor and to maintain a suitable amount of unburned fuel sufficient to produce the desired amount of precombustion reaction products in the conversion reaction.

Thus, all of the embodiments of the present invention supply the inducted aqueous fluid (whether steam or steam plus water particles or steam plus precombustion reaction products or water alone or water plus additives) in amounts which vary in response to the engine's need for these materials at the varying conditions of engine operation. The engine needs different amounts of fluid (in the case of steam both in quantity and quality) to provide the desired reduction in emissions, and increased efficiencies of engine operations at varying conditions of operation of the engine. Thus, the engine's need for fluid at any particular condition of operation is dependent on the amount of fluid which will produce the best engine operation at that condition. The best engine operation includes obtaining complete lean, clean combustion with lowest emission of HC, CO and NOX and best fuel economy without detonation, preignition or after-fire (dieseling). The engine need for fluid varies widely from no fluid at all under certain conditions of operation to amounts of fluid flow in the same order of magnitude of fuel flow at other conditions of engine operation. The engine's need for fluid is zero at engine shut-off as no water can be permitted to flow into the engine when shut off. If the water flow into the engine were to be permitted at shut-off, corrosion and/or liquid lock will occur. At normal steady state low speed idle only a trace amount of fluid or no fluid at all is required to give optimum low idle emissions. Increasing quantities of fluid proportionate to power are required as engine power is increased at each steady state point. Under dynamic conditions, for example, acceleration at high BMEP, an extra amount of fluid is required over and above operation at a steady state condition; and, in the case of steam, the steam should be of a lower quality, that is, with a certain percentage of water droplets carried with the steam in order to give maximum combustion cooling, to keep the nitroux oxide emissions within satisfactory limits. On deceleration, less fluid is required at each point in the deceleration, than would be desired for operation at steady state at any of those points.

Providing satisfactory precombustion reaction is another significant point in determining the engine's need for steam. By providing a proper amount of steam at a proper temperature for any particular condition of engine operation, the desired precombustion reactions can be maximized and this maximization enhances engine performance. It improves the quality of combustion and therefore lowers the emissions and it improves engine efficiency and economy and engine cleanliness.

The engine's need for fluid is also determined by limiting the fluid to an amount that will not hurt combustion. For instance, in deceleration if fluid is not limited, too much fluid can be introduced to cause the combustion to be poor.

This will produce incomplete combustion. It will cool the flame sufficiently that undesirable amounts of HC and CO will be produced. Engine efficiency can be seriously impaired. Hydrocarbon deposits also increase.

On acceleration, the engine's need for fluid is dependent on introducing the right amount of fluid to absorb (by its high specific heat; plus latent heat of vaporization of water droplets included with the steam; plus heat of dissociation) excess engine heat generation, which would otherwise go toward producing high combustion and surface peak temperatures and peak pressures at about top dead center (but this still must be done without introducing too much fluid so as to impair combustion with the undesirable effects noted above). By introducing the right amount of additional fluid, the energy is absorbed as energy in steam which is given back within the latter part of the cycle as expansion of the steam adding smoothly at favorable crank angle to the power stroke and torque of the engine. The right amount of additional fluid at this point therefore prevents hot spots and smooths the pressure and temperature energy conversion. Also, the right amount of fluid needs to be introduced to provide for engine cleanliness. The right amount of fluid will provide both clean combustion and removal of engine deposits. Further, it is needed to inject the right amount of fluid in order to heat and thereby vaporize the fuel to get fuel-air ratio distribution and mass distribution between the cylinders. This gives maximum economy and lowest emissions. The present invention provides the amount of fluid in response to engine's need for fluid under all of these various conditions of engine operation by regulating the amount of fluid in response to one or more conditions of engine operation as described in detail above.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for providing improved combustion and reduced emissions in an internal combustion engine having a combustion zone and an exhaust, comprising
    feeding both fuel and controlled amounts of an aqueous fluid into said combustion zone, and
    in response to engine need to vary the fluid-fuel ratio according to varying combustion conditions, automatically increasing the weight ratio of said aqueous fluid to said fuel during and responsive to engine acceleration.

2. The method of claim 1 wherein the aqueous fluid is steam and including the step of injecting some liquid water with the steam on acceleration to increase the heat absorbing capacity of the injected steam and water.

3. The method of claim 1 including decreasing said ratio during deceleration.

4. The method of claim 1 including controlling the feeding of the additional amount of fluid during acceleration by engine vacuum, sensing the vacuum at a point in the engine induction system where the amount of the vacuum increases with increased engine power.

5. The method of claim 1 comprising feeding the fluid to the engine through the idle screw.

6. The method of claim 2 including
    storing the water to be supplied during acceleration in a flexible-walled accumulator and collapsing the flexible wall of the accumulator in response to increasing engine vacuum on acceleration to produce at least part of the increased amount of water on acceleration of the engine.

7. The method of claim 1 including the steps of mixing a hydrocarbon with water and heating the resultant mixture in a reactor to convert the water to steam and to form precombustion reaction products, and feeding the steam and reaction products to said combustion chamber as at least a portion of said aqueous fluid and as a portion of said fuel.

8. The method of claim 7 including regulating the flow of the mixture into the reactor by a variable orifice controlled in response to the temperature of the exhaust gases.

9. The method of claim 1 including feeding water from a reservoir, converting the water to steam, injecting the steam into the engine at a point where the vacuum increases with increasing engine power, and maintaining the level of the water in the reservoir at a static head which is equal to the engine vacuum at idle RPM at said point of injection.

10. The method of claim 1 including the steps of sensing in said engine a vacuum that decreases with increasing engine power, controlling the feeding of the aqueous fluid to said combustion zone in response to the sensed vacuum, and feeding the controlled amount of said fluid through a variable restrictor which provides a restriction to fluid flow that decreases in relation to a decreasing sensed engine vacuum during engine operation.

11. The method of claim 10 including shutting off the flow of fluid at a sensed vacuum value equal to that produced at engine idle.

12. The method of claim 10 including converting a decreasing vacuum field to an increasing vacuum effect by inverter means comprising a piston having one surface subjected to exhaust gas pressure for increasing the feed of fluid at low sensed vacuums, and changing the restriction of said variable restrictor in response to the changing vacuum effect.

13. The method of claim 12 including storing water in a water storage tank, taking feed water from the storage tank, adding exhaust pressure to the water storage tank, and applying the pressure existing above the water in the storage tank to said piston surface of the inverter means.

14. The method of claim 1 including draining, at a point prior to feeding to the engine, the fluid at certain conditions of operation such as, engine off and engine idle and deceleration, to prevent the feeding of the fluid to the engine in said selected conditions of engine operation.

15. The method of claim 6 including distending the flexible wall of the accumulator in response to decreasing engine vacuum on deceleration to accumulate at least some of the water in the accumulator to produce a decreased amount of fluid on deceleration of the engine.

16. The method of claim 1 comprising controlling the feeding and amount of the fluid by the exhaust pressure from the engine exhaust.

17. The method of claim 1 comprising controlling the feeding and amount of the fluid by the temperature of the gases exhausted from said engine.

18. The method of claim 1 wherein the feeding and amount of the fluid is controlled by the power output of the engine.

19. The method of claim 1 having means for automatically cutting off the fluid when the engine stops.

20. The method of claim 1 including generating superheated steam, maintaining the steam superheated until the steam is injected in the combustion zone, and decreasing the quality of the superheated steam with increase in engine power.

21. The method of claim 1 including converting water to steam in a flash boiler by heat developed from the combustion and injecting the steam as said aqueous fluid into the fuel-air mixture for the engine.

22. The method of claim 21 including generating the steam in a flash boiler having two passageways, one for water inlet flow and one for steam outlet flow, and wherein the flash boiler includes a first element made of one material having one coefficient of thermal expansion and connected to a valve seat and a second element made of a second material having a coefficient of thermal expansion less than said one material and connected to a movable valve element and wherein the two passageways are concentric, with the water inlet flow passageway disposed next to the second material having a coefficient of thermal expansion less than said one material so that the inflowing water maximizes the cooling effect on said second element, especially during acceleration, to provide, in itself, a control function.

23. The method of claim 21 including maintaining the flash boiler partially full of water so that on acceleration an extra amount of steam is produced by the sudden increase in temperature of the combustion and increased conversion of the water in the partially full flash boiler concurrent with the sudden increase of the temperature.

24. The method of claim 21 including pumping water to the flash boiler by a pump responsive to acceleration of the engine.

25. The method of claim 21 including increasing the flow of water to the flash boiler by conducting exhaust gas from the engine exhaust to the water supply for said flash boiler.

26. The method of claim 25 including rectifying the exhaust pressure.

27. The method of claim 21 including generating the steam in a flash boiler exposed to the full combustion temperature at the surface of the combustion chamber.

28. The method of claim 27 including placing a heat pipe around the seat of an exhaust valve to heat the flash boiler.

29. The method of claim 21 wherein the engine has an automatic choke system and including supplying at least a part of the steam produced in the flash boiler to a bi-metal control element of an automatic choke system to provide rapid removal of the enrichment necessary to start the engine.

30. The method of claim 21 including injecting additives from the group consisting of $H_2O_2$, ammonia, and upper cylinder lubricants and anti-valve sticking agents by an acceleration pump operative only on acceleration of the engine.

31. The method of claim 21 including supplying water to the flash boiler at a constant feed pressure, reducing the impedance in the flow system to a level where the flow system will flow more than enough steam to meet the engine need, and then cutting down on the flow by metering the flow in response to engine need.

32. The method of claim 31 including metering the water flow into the flash boiler by a variable orifice valve having a valve element movable with respect to a valve seat, retracting the valve element from the valve seat on an increase in the temperature in the combustion zone and contouring the valve element and valve seat relative to one another to produce a varying area for fluid flow which is matched to the engine's need corresponding to each amount of retraction of the valve element.

33. The method of claim 1 including controlling the feeding of the fluid to said combustion zone through the entire range of operation of the engine from start-up, through idle, through acceleration, at all power levels, through deceleration and at shut-off, and supplying the amount and quality of steam needed by the engine for each condition of operation.

34. The method of claim 1 including regulating the feeding of said fluid to said combustion zone in response to the engine heat at a selected location in the engine and modulating the regulated feed in response to engine vacuum.

35. A method of improving a combustion process of the kind in which a fuel is mixed with air and vaporized and then burned in a combustion chamber of an engine, said method comprising, injecting an aqueous fluid into the combustion chamber, and controlling the amount of fluid injected in response to a condition of the combustion including increasing the flow rate of fluid to the combustion chamber with increasing heat generation in the combustion chamber.

36. A method as defined in claim 35 wherein the engine has an exhaust and wherein said increasing heat generation is measured by the temperature of the exhaust from the combustion chamber.

37. A method as defined in claim 35 wherein the combustion chamber is a combustion chamber of an engine and the condition is the amount of energy flow through the engine.

38. A method as defined in claim 35 wherein the combustion chamber is an engine combustion chamber and the condition is the brake mean effective pressure of the engine.

39. Apparatus for providing improved combustion and reduced emissions in an internal combustion process engine comprising the combination of
a combustion chamber,
means for feeding fuel into said combustion chamber,
means for injecting controlled amounts of an aqueous fluid into said combustion chamber, and
means in response to engine need for increasing the weight ratio of said aqueous fluid to said fuel during and responsive to engine acceleration.

40. The apparatus of claim 39 comprising the combination of an induction system having a carburetor and a port immediately below the carburetor, and means for injecting said controlled amounts of fluid into said port.

41. The apparatus of claim 39 including means for feeding lean-out air in combination with the fluid.

42. The apparatus of claim 39 including fluidic drain valve means for draining excess fluid from the inlet to the engine on engine shut-down and on engine deceleration.

43. The apparatus of claim 39 including vacuum control means for controlling the feeding and amount of fluid in response to vacuum generated by the induction system of the engine.

44. The apparatus of claim 43 wherein the control means include converter means for converting a decreasing vacuum field to an increasing vacuum effect and comprising a variable restrictor and means for decreasing its restriction to fluid flow with a decreasing sensed engine vacuum during engine operation.

45. The apparatus of claim 44 wherein the converter means include a piston having one surface subjected to exhaust gas pressure for increasing the feed of fluid at low sensed vacuums.

46. The apparatus of claim 39 having flash boiler means with two passageways, one for water inlet flow and one for steam outlet flow, said flash boiler means including a first element made of one material having one coefficient of thermal expansion and connected to a valve seat and a second element made of a second material having a coefficient of thermal expansion less than said one material and connected to a movable valve element said two passageways being concentric, with the water inlet flow passageway disposed next to the second material having a coefficient of thermal expansion less than said one material so that the inflowing water maximizes the cooling effect on said second element, especially during acceleration, to provide, in itself, a control function.

47. The apparatus of claim 39 including flash boiler means for converting water to steam by heat developed from the combustion process, vacuum control acceleration means for injecting an extra amount of water into the flash boiler on acceleration and comprising a chamber, a vacuum actuated diaphragm and piston associated with the chamber for drawing water into the chamber on start-up of the engine when vacuum is produced, spring means for forcing the piston downwardly to force the water out of the chamber on acceleration when the engine vacuum decreases and conduit means for conducting the water forced out of the chamber to the flash boiler for conversion to steam in the flash boiler simultaneously with acceleration of the engine.

48. The apparatus of claim 39 including regulator means for controlling the feed of fluid to said combustion chamber and comprising thermal controlled valve means and discriminator means for modulating the regulated feed of fluid from the regulator means comprising a fluidic drain valve and a flexible walled accumulator, both responsive to engine vacuum.

49. The apparatus of claim 48 wherein the fluid is fed into the bottom of the discriminator means and wherein the discriminator means create at engine idle and during engine deceleration a void in the top part of a flexible walled accumulator for preventing feed of fluid to the engine at idle and during deceleration.

50. The apparatus of claim 39 including acceleration control means for feeding an additional amount of fluid during acceleration in response to engine vacuum, and wherein said acceleration control means include a flexible walled accumulator for storing water and collapsible in response to increasing engine vacuum on acceleration to feed at least some of the fluid in the accumulator to the engine on acceleration and distensible in response to decreasing engine vacuum on deceleration to accumulate at least some of the fluid in the accumulator to produce a decreased amount of fluid on deceleration.

51. A reactor unit for generating steam and precombustion reaction products for feeding into a combustion zone of an internal combustion engine and comprising converter means for converting water to steam and for converting a first material to precombustion reaction products and control means for controlling the feed of the steam and precombustion reaction products of said combustion zone of the engine in response to an engine operating condition.

52. The method of claim 1 including controlling the flow of said fluid to said combustion zone in response to heat flux produced by the engine.

53. The method of claim 52 including controlling said fluid flow by controlling the orifice of a variable orifice valve by first and second thermally expansible control elements.

54. The method of claim 53 including using the flow of the fluid controlled by the valve to provide a regenerative feedback for additional repositioning of the variable orifice valve on a change of heat flux occuring during dynamic change in engine operating conditions.

55. The method of claim 1 including disassociating at least a substantial portion of the aqueous fluid into free hydrogen and oxygen gases before feeding to the engine.

56. The method of claim 55 including feeding the aqueous fluid and fuel to a reactor, subjecting the reactor to the heat of the combustion gases of the engine, and using a catalyst within the reactor which is effective to lower the temperature at which the fuel and aqueous fluid are reformed into gaseous precombustion reaction products within the reactor, and then feeding the resultant materials to said combustion zone.

57. The method of claim 1 including feeding the aqueous fluid into said combustion zone in response to engine exhaust pressure.

58. The method of claim 1 including controlling the feed of the aqueous fluid to said combustion zone by a computer responsive to at least one engine operating condition.

59. The method of claim 58 wherein said condition is exhaust gas temperature.

60. The method of claim 58 including reacting fuel with the aqueous fluid in a reactor and controlling both the flow of the aqueous fluid and the flow of the fuel to the reactor by the computer.

61. The method of claim 1 including controlling the feeding of the aqueous fluid to the combustion zone by a pulse pump operated by pulsations in the engine exhaust gas pressure.

62. The apparatus of claim 39 including heat flux control means for the fluid flow and comprising a variable orifice valve responsive to heat flux produced by the engine.

63. The apparatus of claim 39 including means for disassociating at least a substantial portion of the aqueous fluid into free hydrogen and oxygen gases before feeding to the engine.

* * * * *